# (12) United States Patent
Isetani et al.

(10) Patent No.: US 7,840,017 B2
(45) Date of Patent: Nov. 23, 2010

(54) AUDIO MESSAGE TRANSFER SHEET AND MANUFACTURING METHOD THEREOF, AND POWER SUPPLY CIRCUIT

(75) Inventors: Yukihiko Isetani, Tokyo (JP); Takaaki Okada, Tokyo (JP); Hideo Shimizu, Tokyo (JP); Yoshiaki Ide, Tokyo (JP); Yasuhiro Fukuda, Tokyo (JP); Takeshi Yamakami, Tokyo (JP); Fumihiro Hanazawa, Tokyo (JP); Akira Yamazaki, Tokyo (JP)

(73) Assignee: Toppan Forms Co., Ltd., Tokyo (JP)

( * ) Notice: Subject to any disclaimer, the term of this patent is extended or adjusted under 35 U.S.C. 154(b) by 1305 days.

(21) Appl. No.: 10/569,740

(22) PCT Filed: Aug. 30, 2004

(86) PCT No.: PCT/JP2004/012465

§ 371 (c)(1),
(2), (4) Date: Feb. 28, 2006

(87) PCT Pub. No.: WO2005/021280

PCT Pub. Date: Mar. 10, 2005

(65) Prior Publication Data

US 2007/0018446 A1    Jan. 25, 2007

(30) Foreign Application Priority Data

| Aug. 28, 2003 | (JP) | ............... 2003-304719 |
| Aug. 28, 2003 | (JP) | ............... 2003-304720 |
| Dec. 5, 2003  | (JP) | ............... 2003-406656 |
| Mar. 31, 2004 | (JP) | ............... 2004-107536 |
| May 27, 2004  | (JP) | ............... 2004-158298 |
| May 27, 2004  | (JP) | ............... 2004-158299 |
| Jun. 15, 2004 | (JP) | ............... 2004-177021 |
| Jun. 15, 2004 | (JP) | ............... 2004-177023 |
| Jun. 15, 2004 | (JP) | ............... 2004-177024 |
| Jun. 15, 2004 | (JP) | ............... 2004-177025 |

(51) Int. Cl.
| H04R 25/00  | (2006.01) |
| H04R 1/02   | (2006.01) |
| H04B 5/00   | (2006.01) |
| H01L 41/053 | (2006.01) |
| H01L 41/083 | (2006.01) |

(52) U.S. Cl. .................. 381/152; 381/79; 381/190; 381/334; 310/322

(58) Field of Classification Search .............. 381/79, 381/91, 152, 190, 334, 365, 386; 181/161, 181/163, 174, 199; 310/313 C, 322, 323.01, 310/325
See application file for complete search history.

(56) References Cited

U.S. PATENT DOCUMENTS 4,791,741 A * 12/1988 Kondo .................. 40/455

(Continued)

FOREIGN PATENT DOCUMENTS

JP    62-203832 A    12/1987

(Continued)

OTHER PUBLICATIONS

Chinese Office Action dated Jun. 3, 2009.
Japanese Office Action dated Jan. 29, 2010.

*Primary Examiner*—Curtis Kuntz
*Assistant Examiner*—Jesse A Elbin
(74) *Attorney, Agent, or Firm*—Fitch, Even, Tabin & Flannery

(57) ABSTRACT

Sheet-like audio information recording/reproducing means capable of recording/reproducing audio information is sandwiched between two support sheets from front and back only in part of the area thereof and these two support sheets are further sandwiched between two surface sheets and the support sheets and surface sheets are bonded together.

2 Claims, 66 Drawing Sheets

U.S. PATENT DOCUMENTS

| | | | |
|---|---|---|---|
| 5,063,698 A * | 11/1991 | Johnson et al. | 40/124.03 |
| 2001/0018809 A1 * | 9/2001 | Heropoulos et al. | 40/544 |
| 2002/0027999 A1 * | 3/2002 | Azima et al. | 381/152 |
| 2002/0067840 A1 * | 6/2002 | Kobayashi | 381/190 |
| 2005/0227214 A1 * | 10/2005 | Clegg | 434/309 |

FOREIGN PATENT DOCUMENTS

| | | |
|---|---|---|
| JP | 63-170173 A | 7/1988 |
| JP | 64-033694 A | 2/1989 |
| JP | 2-089696 A | 3/1990 |
| JP | 3-68477 A | 7/1991 |
| JP | 3-222263 A | 10/1991 |
| JP | 5-7483 A | 2/1993 |
| JP | 06-024182 | 2/1994 |
| JP | 06-135184 | 5/1994 |
| JP | 07-025186 | 1/1995 |
| JP | 7-16456 A | 4/1995 |
| JP | 7-219437 A | 8/1995 |
| JP | 8-332789 A | 12/1996 |
| JP | 9-202072 A | 8/1997 |
| JP | 9-244535 A | 9/1997 |
| JP | 09-283245 A | 10/1997 |
| JP | 11-070770 A | 3/1999 |
| JP | 11-144701 A | 5/1999 |
| JP | 11-263089 A | 9/1999 |
| JP | 2001-100684 | 4/2001 |
| JP | 2001-121858 A | 5/2001 |
| JP | 2001-178599 A | 7/2001 |
| JP | 2001-242788 A | 9/2001 |
| JP | 2002-321472 A | 11/2002 |
| JP | 2003-246165 A | 9/2003 |
| JP | 2004-152650 A | 5/2004 |
| KR | 1992-0001402 | 2/1992 |
| KR | 2001-0087661 A | 9/2001 |
| WO | WO 97/22466 A | 6/1997 |

\* cited by examiner

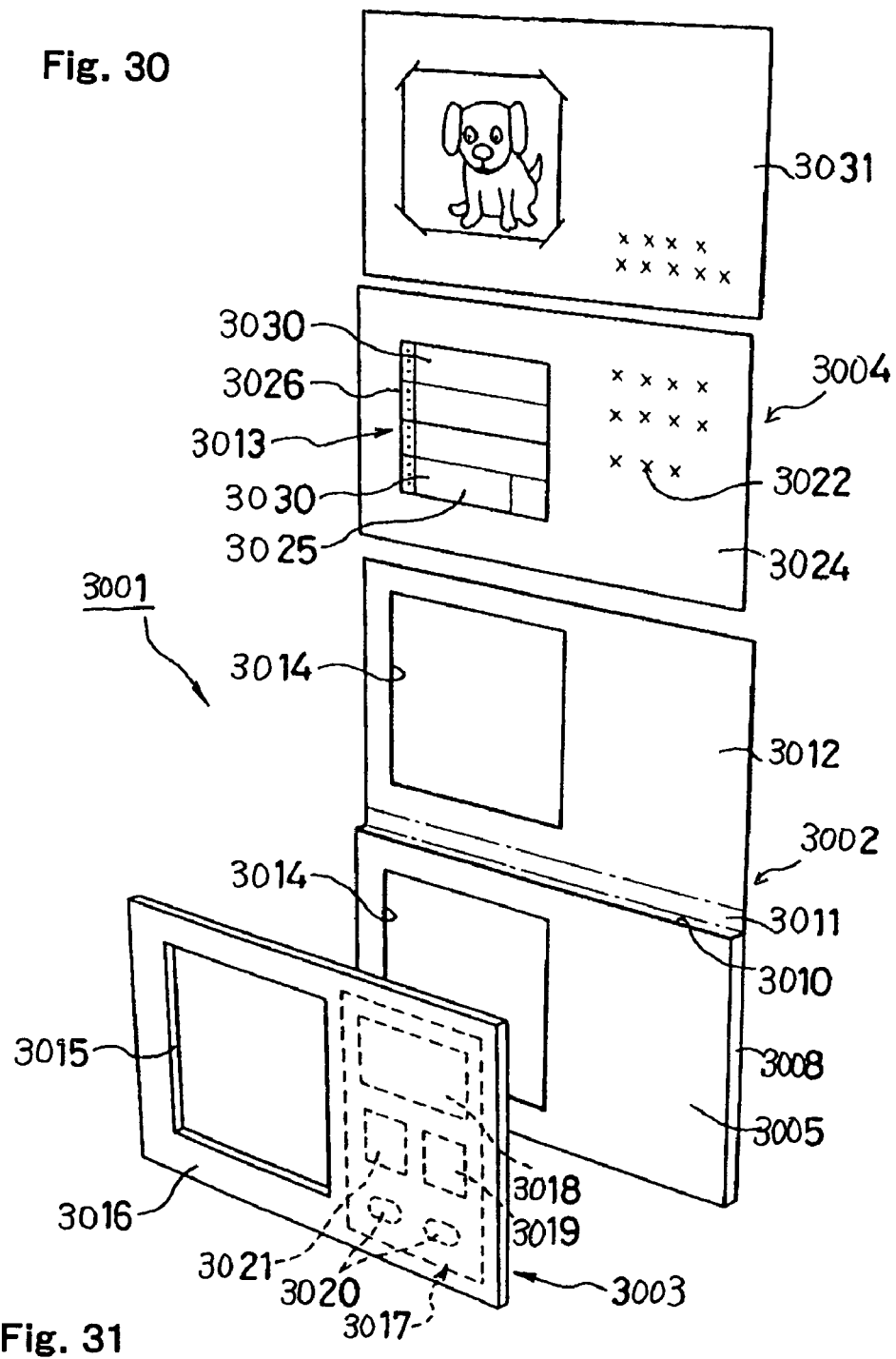
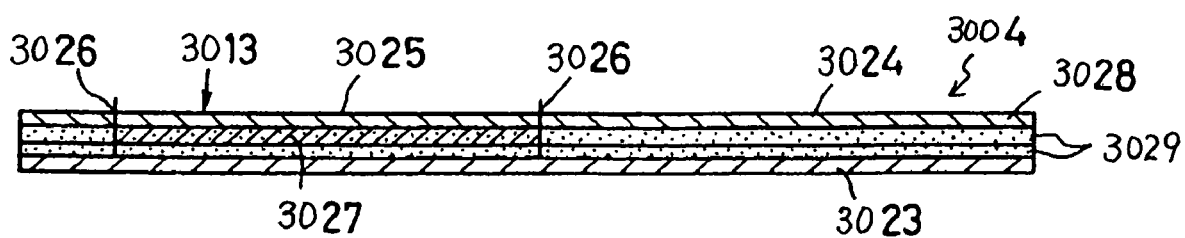

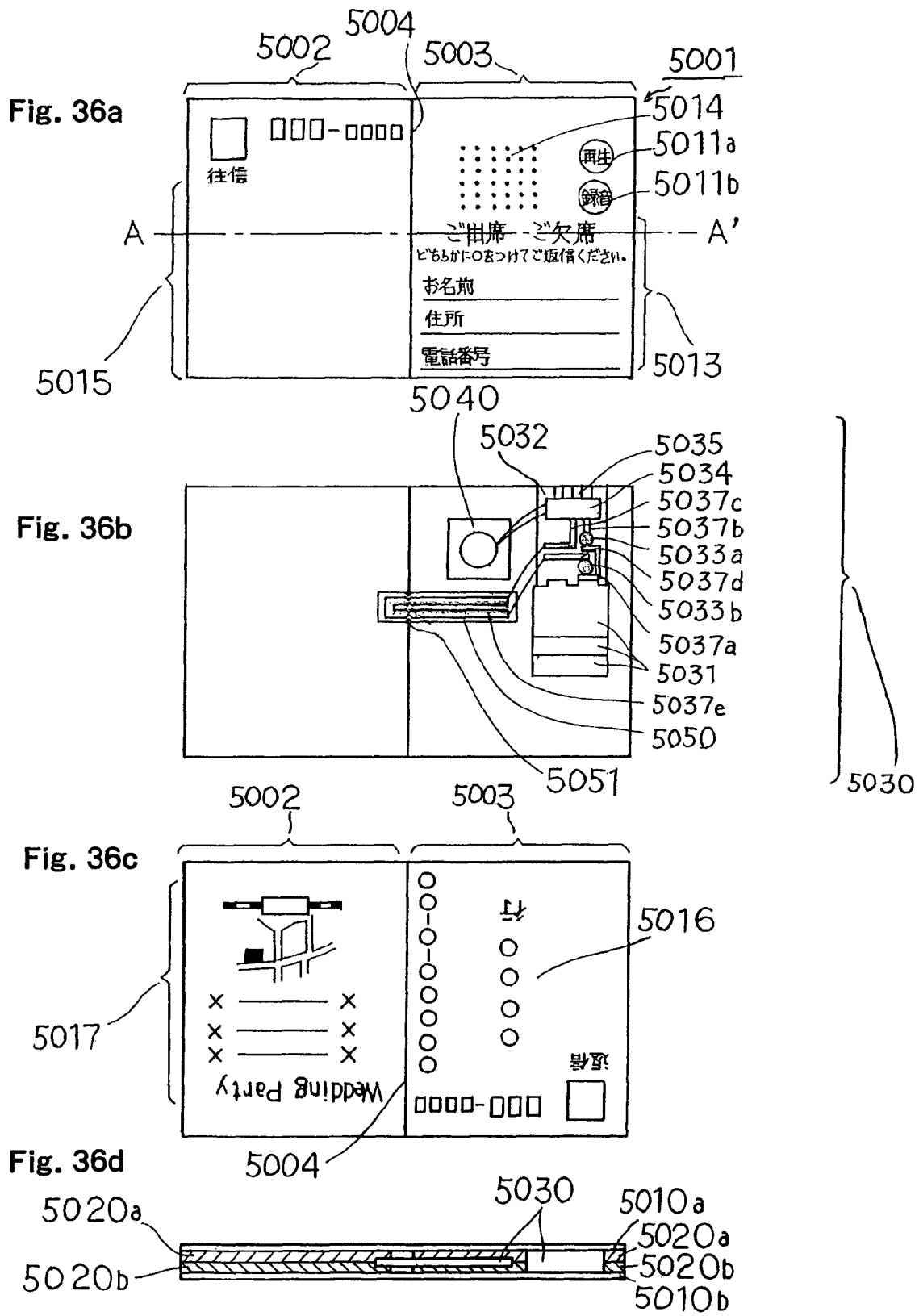

Fig. 37
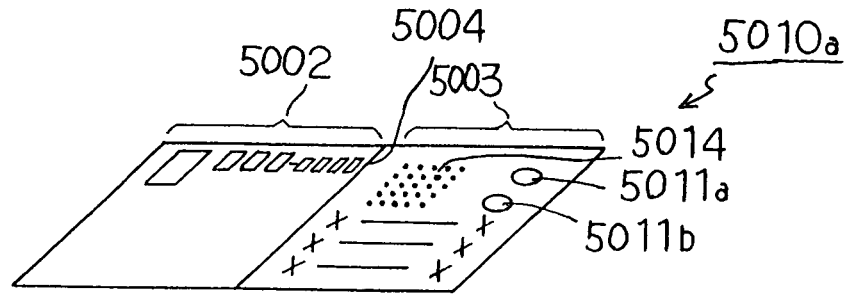
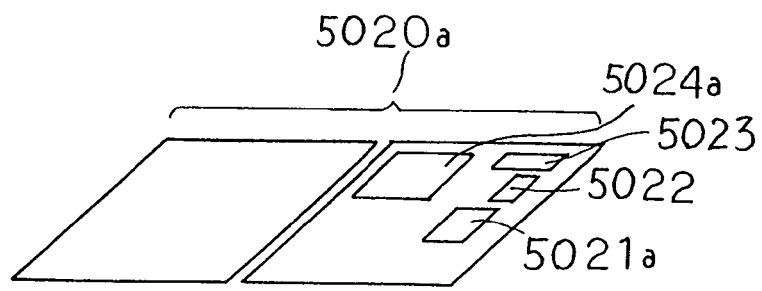
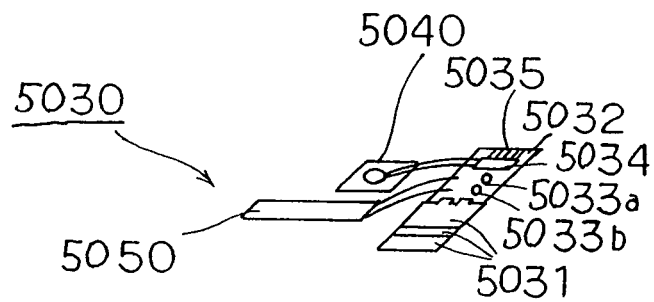
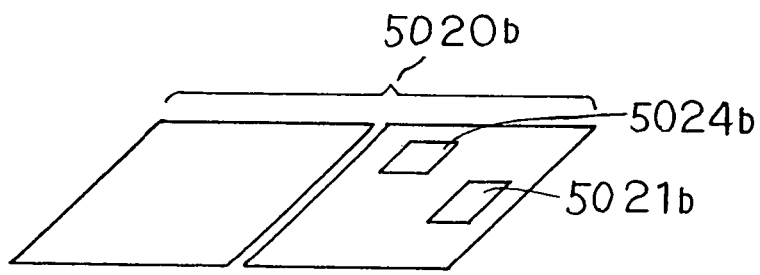
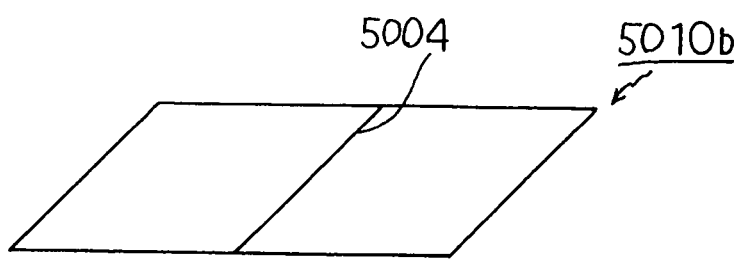

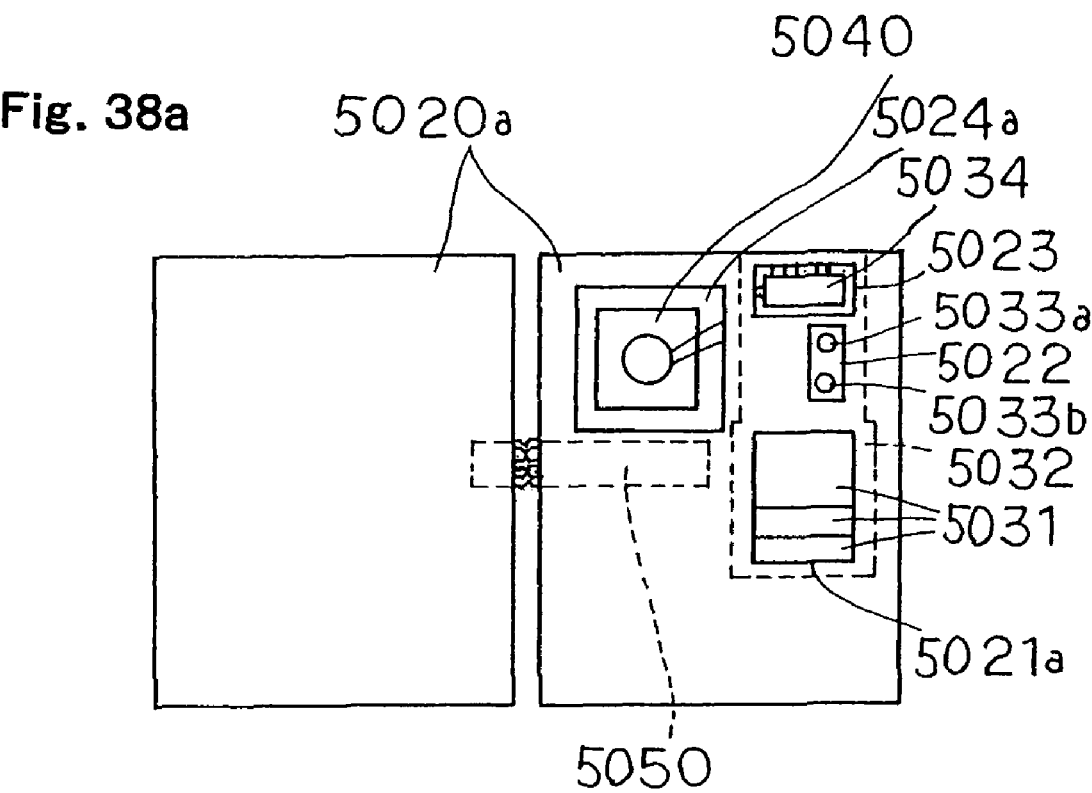
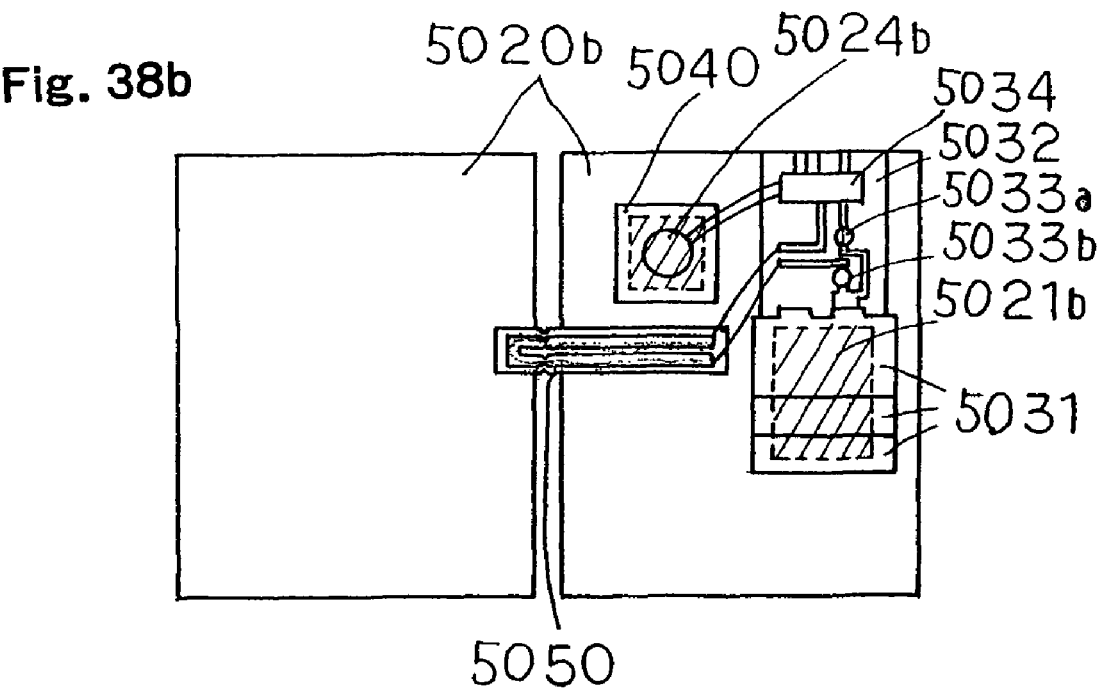

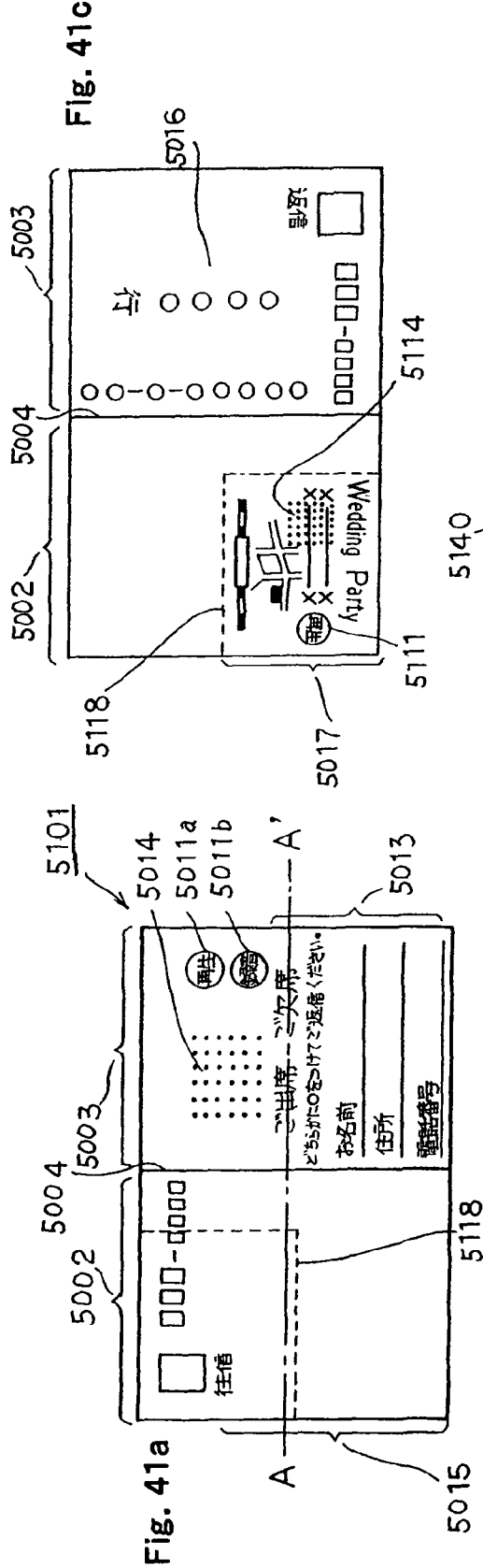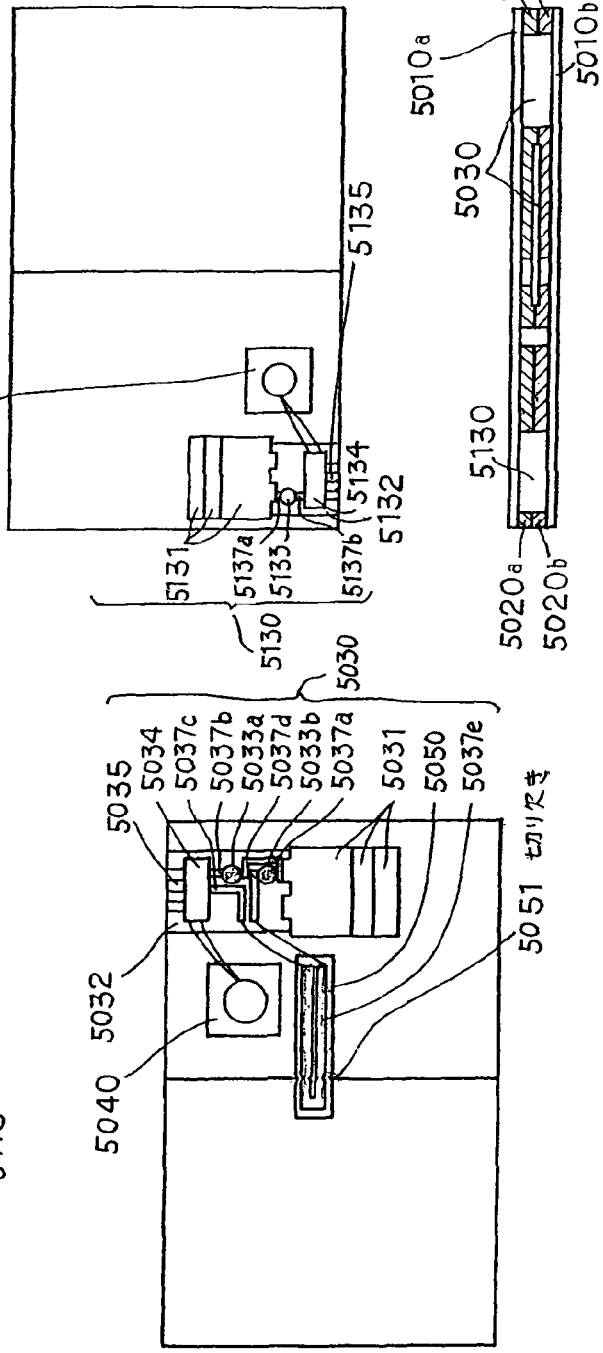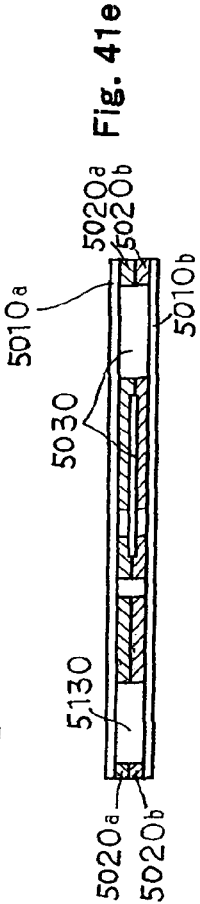

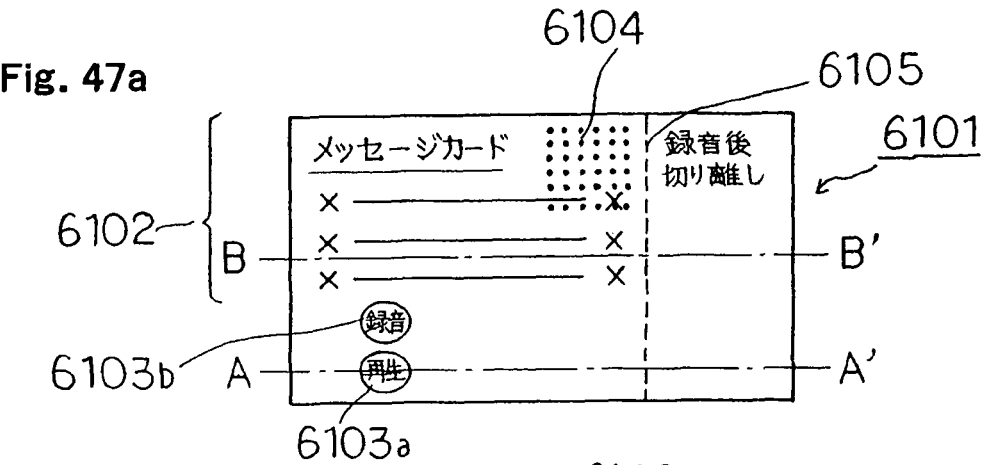
Fig. 47a
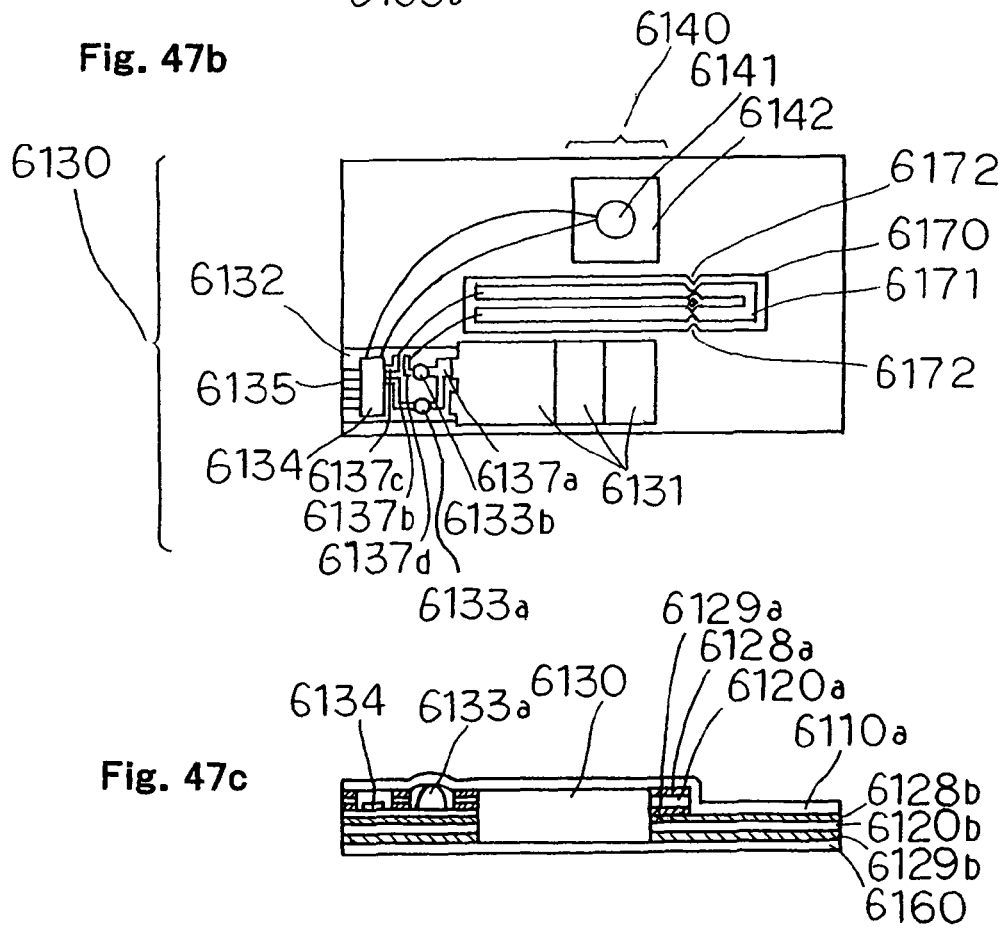
Fig. 47b
Fig. 47c
Fig. 47d

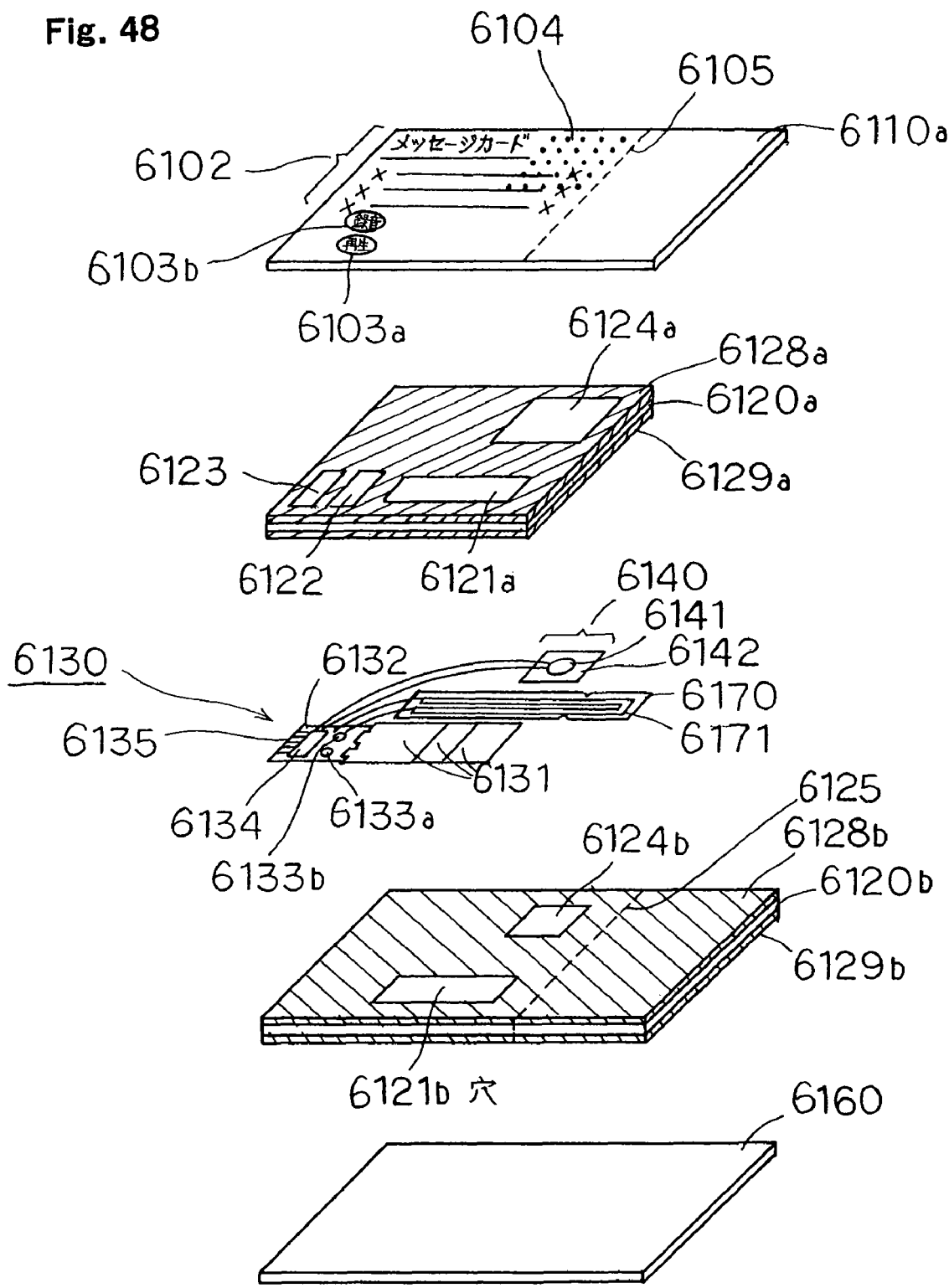

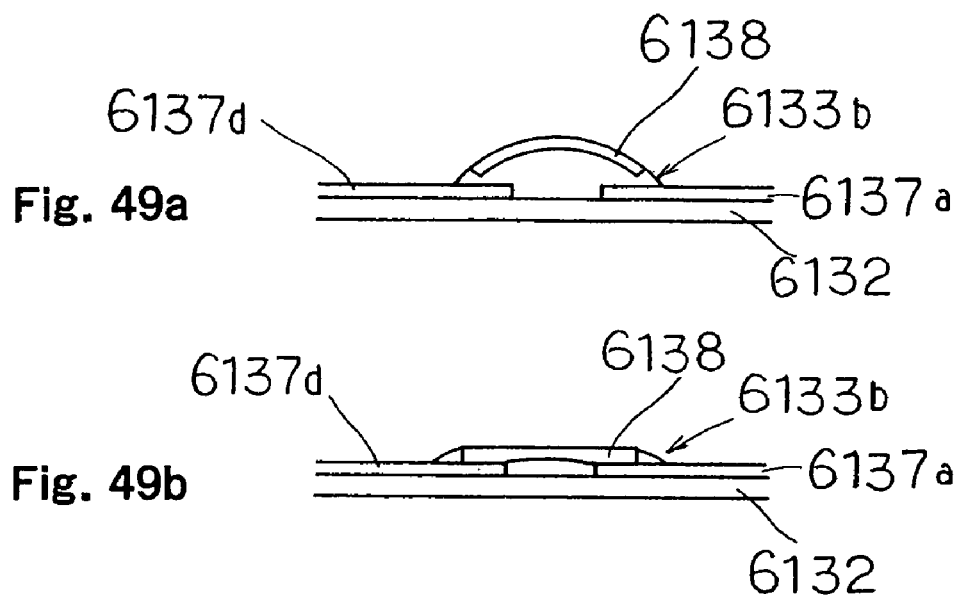
Fig. 49a
Fig. 49b
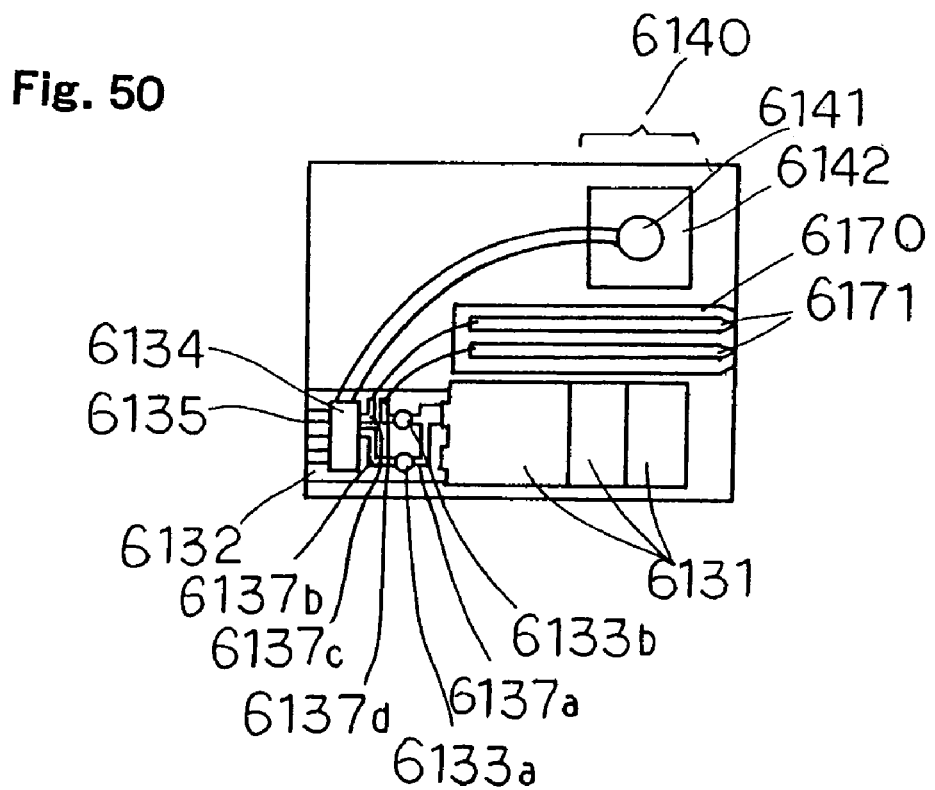
Fig. 50

Fig. 51a
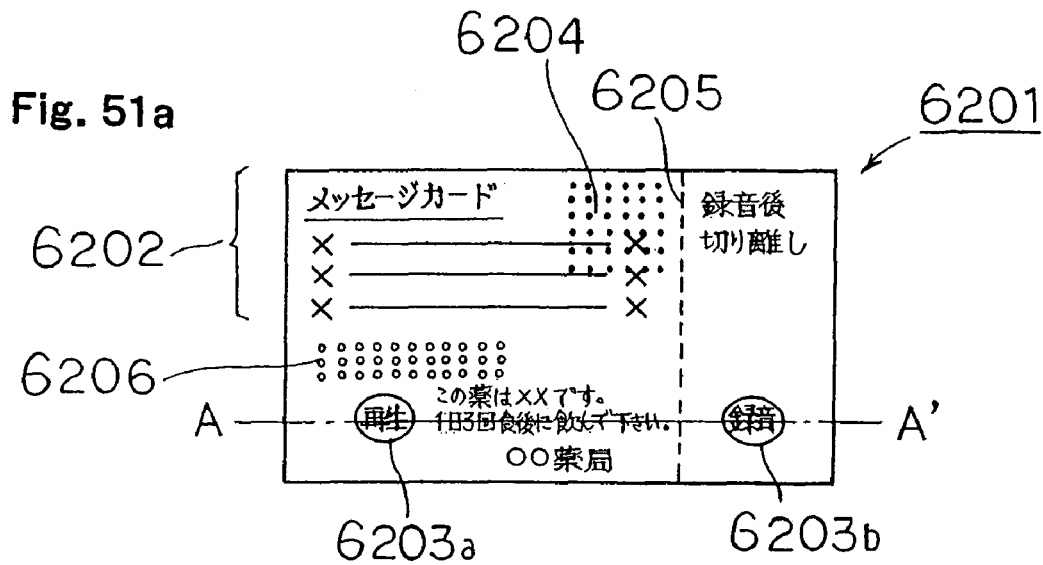
Fig. 51b
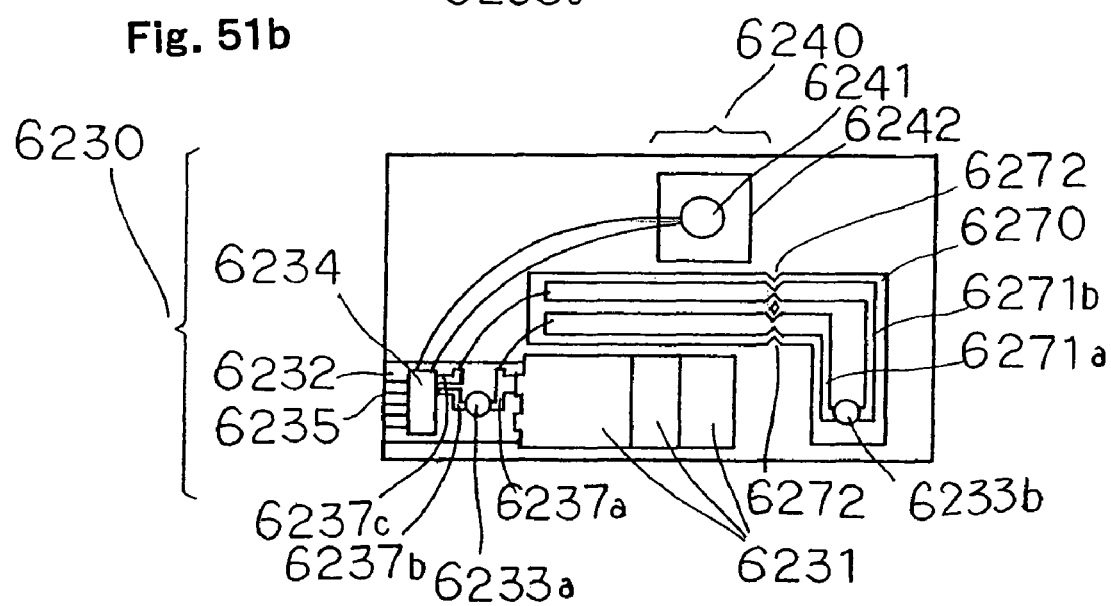
Fig. 51c

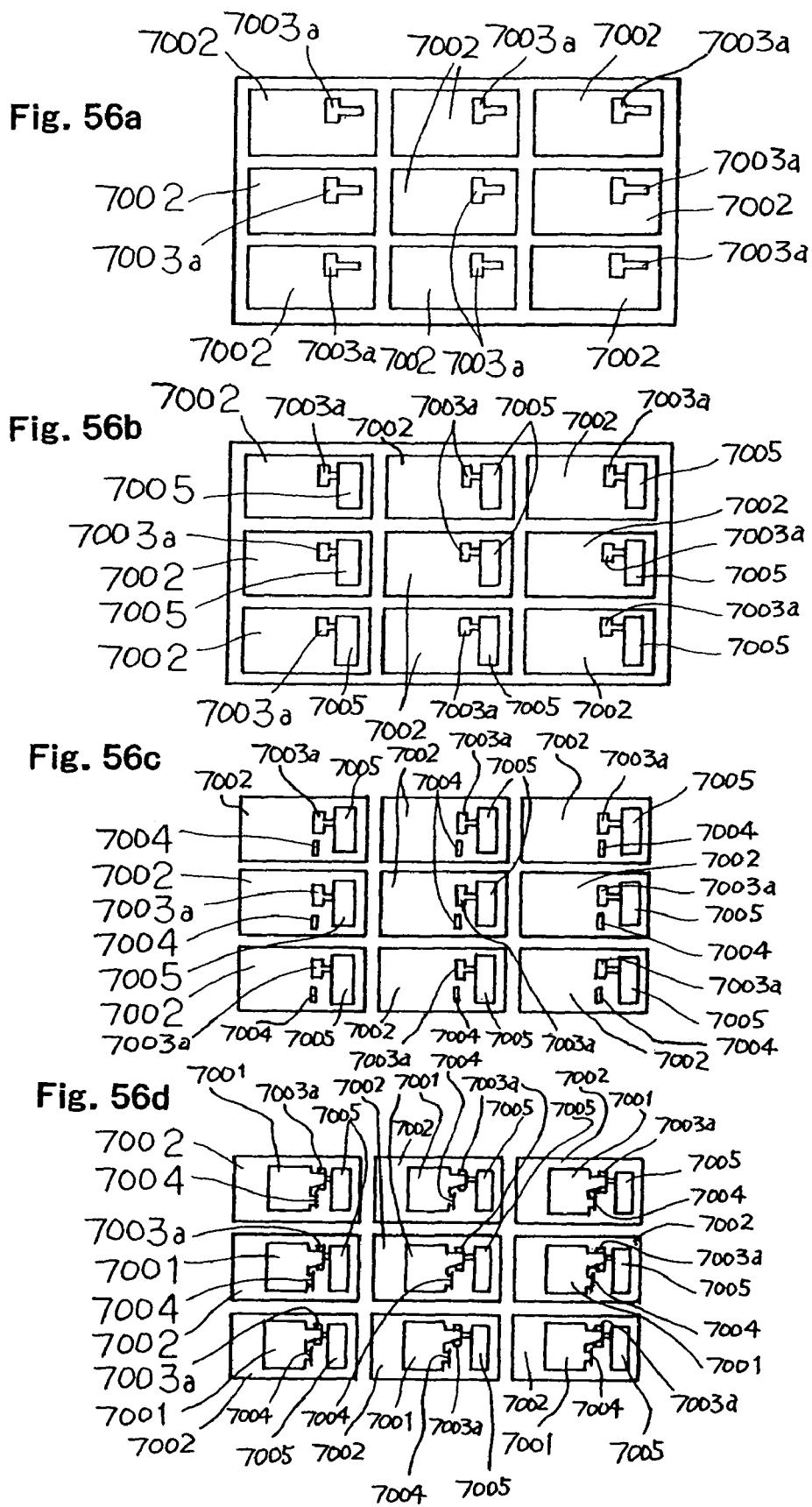

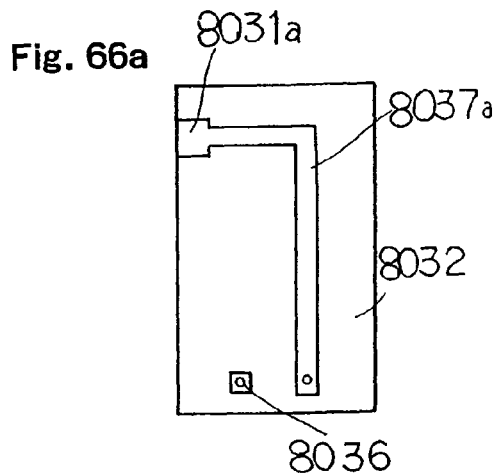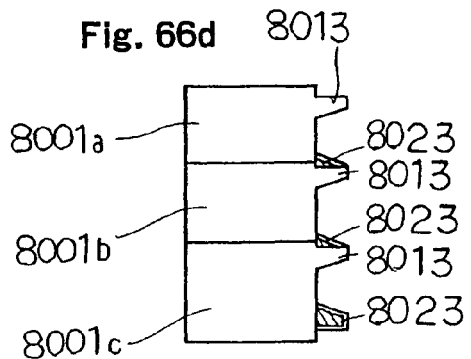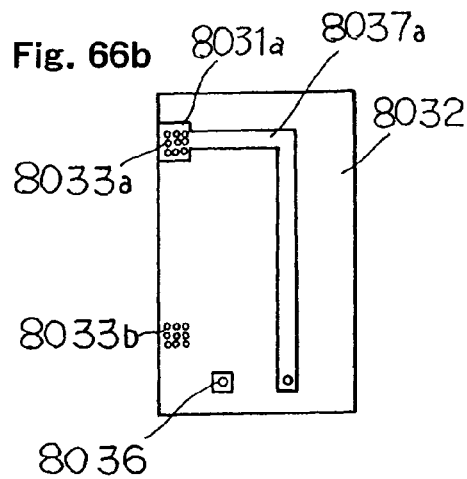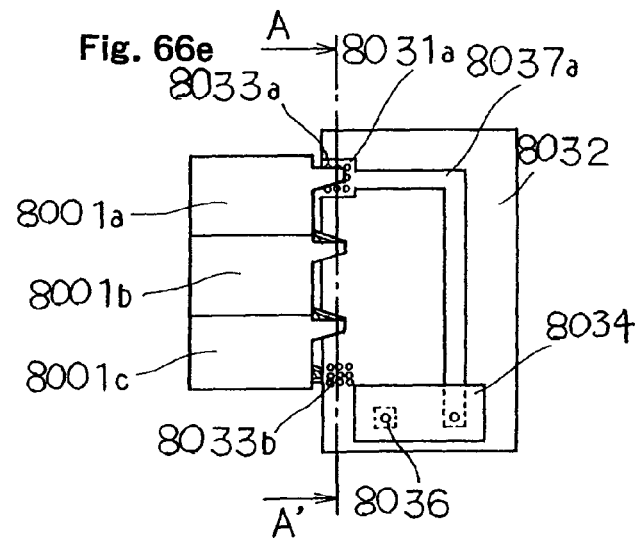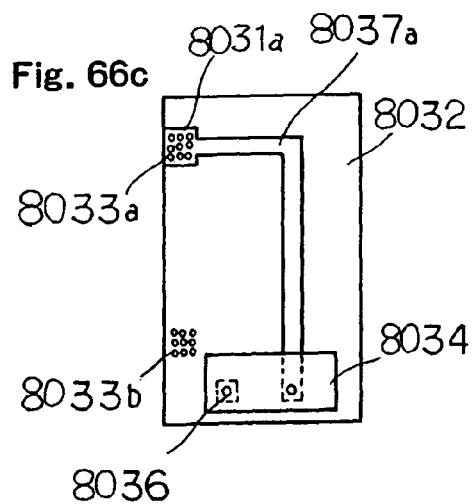

AUDIO MESSAGE TRANSFER SHEET AND MANUFACTURING METHOD THEREOF, AND POWER SUPPLY CIRCUIT

This Application is the National Phase of International Application No. PCT/JP2004/012465 filed Aug. 30, 2004, which designated the U.S. and was not published under PCT Article 21(2) in English, and this application claims, via the aforesaid International Application, the foreign priority benefit of and claims the priority from Japanese Application No. 2003-304719, filed Aug. 28, 2003, Japanese Application No. 2003-304720, filed Aug. 28, 2003, Japanese Application No. 2003-406656, filed Dec. 5, 2003, Japanese Application No. 2004-107536, filed Mar. 31, 2004, Japanese Application No. 2004-158298, filed May 27, 2004, Japanese Application No. 2004-158299, filed May 27, 2004, Japanese Application No. 2004-177021, filed Jun. 15, 2004, Japanese Application No. 2004-177023, filed Jun. 15, 2004, Japanese Application No. 2004-177024, filed Jun. 15, 2004, and Japanese Application No. 2004-177025, filed Jun. 15, 2004, the complete disclosures of which are incorporated herein by reference.

BACKGROUND OF THE INVENTION

1. Field of the Invention

The present invention relates to an audio message transfer sheet with built-in audio information recording/reproducing means capable of recording/reproducing audio information and a manufacturing method thereof, an audio information output sheet, a POP (Point of Purchase) indicator, a sound information delivery apparatus, an audio information delivery component, a label, and a power supply circuit used for the same and a manufacturing method thereof.

2. Description of the Related Art

Conventionally, with regard to an article to be delivered such as direct mail or greeting card, a sender creates the article, specifies the destination of the article and then delivers the created article to the specified destination. The article created and delivered in this way may be made up of a printed matter describing information of which the sender wants to notify the destination enclosed in an envelope or information of which the sender wants to notify the destination printed on a sheet such as post card, etc.

At the destination of the article delivered, after reception of the article, the information printed on the article is browsed. and in this way the information of which the sender wants to notify the destination is recognized.

However, when the article to be delivered with printed information of which the sender wants to notify the destination is sent by the sender, the information printed on the article delivered from the sender is browsed at the destination, and thereby the information of which the sender wants to notify the destination is transferred to the destination, a desired message of the sender of the article to be delivered can be transferred to the destination only visually and in this way the type of transferable information is limited.

Therefore, an information carrier constructed so as to incorporate an audio apparatus capable of recording/reproducing audio information in direct mail and transfer the message with audio is conceived.

FIG. 1a is a plan view of an information carrier with an audio apparatus capable of recording/reproducing audio information incorporated in direct mail, FIG. 1b is a cross-sectional view along the line A-A' shown in FIG. 1a.

As shown in FIG. 1a, 1b, this conventional example is constructed of a direct mail component 501a having a display section 502 on which address information, etc., is printed with a built-in audio apparatus 503 capable of recording/reproducing audio information. Furthermore, this audio apparatus 503 is constructed of a PC board 507 mounted with an IC memory 512 for recording audio information and a power supply battery 511, a speaker 509 which outputs audio information recorded in the IC memory 512, a switch 508 to be operated when outputting the audio information recorded in the IC memory 512 from the speaker 509, all of which are mounted on a mount 503a, and pasted to the direct mail component 501a, covered with a cover 513 having a hole from which the switch 508 and speaker 509 are exposed.

In the direct mail 501 constructed as shown above, address information, etc., is printed on the display section 502 and audio information is recorded in the audio apparatus 503, and then the audio apparatus 503 with audio in which information is recorded is pasted to the direct mail component 501a and delivered to the destination. At the destination of the direct mail 501, after reception of the direct mail 501 if the switch 508 is operated, the audio information recorded in the audio apparatus 503 is output through the speaker 509. This direct mail 501 is disclosed in Japanese Patent Application Publication No. 1999-70770.

However, since the information carrier incorporating the above described audio apparatus is constructed of an audio apparatus mounted on or pasted to the direct mail component on which address information, etc., is printed, there is a problem that the area to which the audio apparatus is pasted becomes so thick that the address information, etc., cannot be printed with the audio apparatus incorporated. For this reason, in the case of the above described information carrier, the address information, etc., is printed on the direct mail component first and then the audio apparatus is mounted on or pasted to the direct mail component.

Furthermore, since the audio apparatus is mounted on or pasted to the direct mail component and the area is thick, if the direct mail is folded or an external force is applied to this area, the audio apparatus may be peeled from the direct mail component. When the direct mail is two-folded or folded in a Z-figure, the direct mail should be folded in such a way as to avoid the area where the audio apparatus is mounted, which causes a problem that the area where the audio apparatus is mounted or the area which becomes a folding line when the direct mail is folded is limited.

Furthermore, the above described audio information output sheet capable of recording/reproducing audio information needs to be provided with audio information outputting means such as a speaker for outputting the recorded audio information, but the audio information outputting means such as a speaker is required to have certain dimensions to secure a predetermined sound volume, which results in a problem that it is difficult to reduce the size of the entire audio information output sheet.

Furthermore, POP indicators on which advertisement information on goods, etc., is displayed as a POP are conventionally attached to showcases at a shop such as a department store, supermarket or recently a convenience store, and sales promotion activities for goods, etc., are conducted using these POP indicators. For such POP indicators, various display methods or various shapes of POP indicators are considered in order to attract attention of visitors to the store.

For example, Japanese Patent Application Publication No. 2001-178599 discloses a POP indicator with a window through which inventory tags attached together with the POP indicator are visible formed in a showcase and a noticeably decorated window frame formed integral with the POP display section to thereby attract attention to advertisement information displayed on the POP display section.

However, in a conventional POP indicator, only advertisement information on goods is displayed as a POP, and therefore visitors to the store can only visually recognize advertisement information and there are cases where depending on the design of the POP or size of characters, etc., such a POP indicator may not be adequate to attract attention.

Furthermore, in the case of the POP indicator, an amount of information of advertisement information displayed as a POP is limited by the size thereof and the POP indicator is often attached to a showcase and in that case, the size of the POP indicator is preferably not too large so that it is kept out of the way of a visitor when the visitor picks up a product from the showcase, and therefore there is a problem that it is difficult to display a large amount of advertisement information as a POP.

Furthermore, there are a variety of types of devices capable of recording/reproducing sound information such as audio. With the slimming down of batteries, downsizing of recording control elements, slimming down of pronouncing devices, etc., in recent years, there is a proposal on a thin audio recording/reproducing instrument combining these elements. As a product which uses this audio recording/reproducing instrument, for example, a mail card which incorporates a thin recording/reproducing instrument in one sheet of a double-page sheet, designed to output audio from the recording/reproducing instrument through a switch operation linked with an operation of opening the other sheet is disclosed in Japanese Patent Application Publication No. 1997-202072. Furthermore, a duplicate delivery slip which combines a recording/reproducing instrument which records audio information directed to the destination of an article to be delivered with a slip is also disclosed in Japanese Patent Application Publication No. 2003-246165.

Now, the above described delivery slip provided with a recording/reproducing instrument is only designed so that the sender of the article inputs audio and the receiver reproduces the audio, and therefore it does not cause much time and trouble when the sender transmits a message with audio to the receiver and can be useful because in this way it is possible to make an impression to the receiver that the article is a present given with heartfelt feelings.

However, such a recording/reproducing instrument can be used only when sending an article to be delivered and there has been actually no recording/reproducing instrument that can be used to send a message with audio itself as a main article to be delivered. Therefore, there has been a demand for one which is thin, without being bulky, capable of delivering a message with audio using recording/reproducing means with excellent usability during recording or reproduction.

Furthermore, Japanese Examined Application Publication No. 1991-45433 and Specification of Japanese Patent No. 2889151 disclose an audio card capable of recording/reproducing audio information.

Such an audio card is provided with audio inputting means for inputting audio information, recording means for recording audio information input through audio inputting means, audio outputting means for outputting the audio information recorded in the recording means, a recording button which is pressed when audio information is input through the audio inputting means, a playback button which is pressed when audio information is output through the audio outputting means and controlling means for controlling these operations, and designed so that the audio information is recorded by pressing the recording button and the audio information is reproduced by pressing the playback button.

Here, the audio information is recorded in the audio card capable of recording audio information in such a way as to overwrite audio information recorded in the recording means with the audio information input through the audio inputting means. For this reason, after audio information is recorded in the recording means, if the recording button is pressed mistakenly, the audio information already recorded in the recording means is erased. Therefore, above described Japanese Examined Application Publication No. 1991-45433 describes a technology which adopts a structure that the recording button is easily detachable so that the recording button is detached after audio information is recorded, thereby avoiding audio information from being erased by misoperation of the recording button. Furthermore, the audio card described in the above described Specification of Japanese Patent No. 2889151 is constructed in such a way that when the playback button and recording button are simultaneously pressed after audio information is recorded, control is performed such that further recording of audio information is prohibited, thereby avoiding audio information from being erased by misoperation of the recording button.

However, as described above, in the case of the structure that the recording button is made easily detachable so that the recording button is detached after audio information is recorded to thereby avoid audio information from being erased by misoperation of the recording button, when an audio card with audio information recorded therein is delivered, the audio card is delivered to the destination with part of the audio card detached, causing a problem that the appearance of the audio card to be delivered becomes unattractive.

Furthermore, in the case of the structure that when the playback button and recording button are pressed simultaneously after audio information is recorded, further recording of audio information is prohibited, there is a problem that it is not possible to visually confirm whether the recording of audio information is prohibited or not. For this reason, there may be a case where although the recording is not prohibited yet after audio information is recorded, the user may send the audio card without placing the audio card in a prohibited state believing that the recording is already prohibited. In that case, the recording button may be pressed mistakenly later and the audio information recorded may be erased. Furthermore, in order to prohibit the recording of audio information, the recording button is pressed to record the audio information, and therefore when the recording button is pressed before the playback button is pressed, part of the audio information recorded may be erased.

Furthermore, a double postal card combining a transmitting message card and reply message card is conventionally used for many applications such as invitation for an event, for example, another party of a wedding ceremony, an order form of goods or service, etc. Address information such as the address, name of the receiver is written on the front of such a transmitting message card and information transmitted from the sender to the receiver is written on the back. Furthermore, address information such as the address, name of the sender is written on the front of the reply message card and an area is provided on the back thereof for entering information to be transmitted from the sender to the receiver.

The double postal card structured in this manner is folded along a connecting area between the transmitting message card and reply message card in such a way that address information such as the address, name of the receiver is exposed and sent to the destination, and at the destination the transmitting message card is cut from the reply message card along the connecting area, the information to be transmitted from the receiver to the sender is written on the back of the reply message card and only the reply message card is sent back to the sender.

As such, the double postal card combining the transmitting message card and reply message card has a limited amount of information that can be transferred from the sender to the receiver or from the receiver to the sender and both the transmitting message card and reply message card need to include the address information, which further limits the amount of information thereof.

Therefore, Japanese Patent Application Publication No. 2001-121858 discloses a double postal card having a structure that a sheet having a vertical size equal to or double the standard vertical size of a postal card and a horizontal size four times the standard horizontal size is folded into the size of the postal card, so that a greater amount of information can be transferred in the standard size of the postal card.

However, though an amount of information that can be transferred may be increased with such a double postal card, the information can be transferred from the sender to the receiver or from the receiver to the sender only visually, which limits the type of information that can be transferred.

Here, if the audio card disclosed in above described Japanese Examined Application Publication No. 1991-45433 is applied to the above described double postal card, information can be transferred with audio from the sender to the receiver or from the receiver to the sender of the double postal card. For example, in the case of an invitation to another party of a wedding ceremony, if a reply message card is structured so as to be able to record audio information and a reply about whether or not to attend the other party of the wedding ceremony is sent from the receiver of the invitation with a message recorded in the reply message card to the sender of the invitation, the sender of the invitation can receive the message with audio from the receiver of the invitation.

However, even with the above described double postal card with the structure that the recording button is easily detachable so that detaching the recording button after audio information is recorded prevents audio information from being erased by misoperation of the recording button, when this reply message card is sent with audio information recorded in the reply message card as described above, the reply message card is sent back to the sender with part thereof detached, which results in a problem that the appearance of the reply message card sent back becomes unattractive.

Such a problem is not limited to the above described double postal card, and can also occur with an audio information delivery component combining a transmitting message section and reply message section.

Furthermore, a label structured so that it can be pasted to an object to be labeled such as an article using an adhesive is conventionally provided in various modes according to the use and used for various applications. Such a label can transfer information with the information printed or written on the surface thereof.

Furthermore, in recent years, Japanese Patent Application Publication No. 2001-242788 discloses a label with information to be transferred displayed on the surface thereof and processed into a convex form including Braille characters, capable of transferring information to the visually handicapped, too. In this way, displaying information to be transferred on the surface of a label and processing it into a convex form including Braille characters allows the information displayed on the surface to be transferred to the able-bodied and allows the information expressed through convex form processing to be transferred to the visually handicapped, too.

However, the above described label, to the surface of which convex form processing including Braille characters is applied, can transfer information expressed in Braille characters to the visually handicapped who can read Braille characters, but cannot transfer information to the visually handicapped who cannot read Braille characters.

Here, those who can read Braille characters account for less than 20% of all the visually handicapped and the proportion is less than 5% when people with weak sight and senior citizens are included. For this reason, even if a label, to the surface of which convex form processing including Braille characters is applied is used, there still is a problem that it is difficult to transfer information to many visually handicapped and people with weak sight.

Furthermore, in recent years, not a small number of products driven by battery power are required to save space of a power supply section in order to achieve the downsizing and multi-functions and as a means for meeting such a demand, a button-type battery is used. Furthermore, the above described audio card, etc., requires a low-profile battery.

Here, in recent years, Japanese Patent Application Laid-Open No. 2000-502206 discloses a paper battery having a structure of a positive electrode and negative electrode laminated together through an electrolytic layer. This paper battery is partitioned by the electrolytic layer into the positive electrode and negative electrode and the respective electrodes of the positive electrode and negative electrode are exposed on different surfaces of the paper battery. For this reason, when such a paper battery is mounted on a circuit substrate to construct a power supply circuit, one of the positive electrode and negative electrode does not face the circuit substrate and the electrode not facing the circuit substrate will have a connection terminal for providing a connection with the circuit substrate connected by soldering, etc. through which it is connected to the circuit substrate. However, when the electrodes of the paper battery are connected to the circuit substrate through the connection terminal, the resistance between the electrode and the circuit substrate increases. Moreover, doing so requires an additional operation, which results in reduced productivity and increased cost.

Therefore, the Specification of Japanese Patent No. 2866383 discloses a technology of folding part of a paper battery so that a positive electrode and a negative electrode are formed on the same surface. This technology folds part of the paper battery whose positive electrode and negative electrode are formed on different surfaces, superimposes this paper battery on the circuit substrate through an insulating film provided with holes through which parts of the positive electrode and negative electrode are exposed and connects the positive electrode and negative electrode of the paper battery, and circuit substrate through these holes.

However, as described above, when part of the paper battery is folded and the positive electrode and negative electrode are thereby formed on the same surface, this means that the paper battery is continuously used with part of the paper battery folded and this involves a problem that the paper battery is used in an environment unfavorable to the paper battery compared to the use of the paper battery without folding.

Furthermore, as described above, in the case of a power supply circuit made up of a paper battery laminated on the circuit substrate, it is possible to apply, for example, an anisotropic/conductive film or an anisotropic/conductive adhesive to a connection terminal of the paper battery, and then mount the paper battery on the circuit substrate and electrically connect and bond together the paper battery and circuit substrate using the anisotropic/conductive film or anisotropic/conductive adhesive.

However, as described above, when the paper battery and circuit substrate are connected using an anisotropic/conductive film or anisotropic/conductive adhesive and the paper battery is mounted on a circuit substrate to thereby manufacture a power supply circuit, the anisotropic/conductive film or anisotropic/conductive adhesive is applied to the electrodes of the paper battery first, and then the paper battery and circuit substrate are provisionally crimped and then the paper battery and circuit substrate are completely crimped, which results in a problem that such a manufacturing step is more complicated and productivity is reduced.

Furthermore, there is also a problem that the anisotropic/conductive film or anisotropic/conductive adhesive cannot be easily controlled, is expensive and thereby requires complicated control and increases the manufacture cost of the power supply circuit.

SUMMARY OF THE INVENTION

It is an object of the present invention to provide a bendable or foldable audio message transfer sheet allowing information to be printed thereon and a manufacturing method thereof.

Furthermore, it is another object of the present invention to provide an audio information output sheet which can be downsized while securing a predetermined sound volume.

Furthermore, it is a further object of the present invention to provide a POP indicator which can attract sufficient attention of consumers and contain a large amount of advertisement information.

Furthermore, it is a challenge of the present invention to allow the above described recording/reproducing means to be delivered on a delivery system based on a conventional delivery slip and it is a still further object of the present invention to facilitate delivery of a voice message as a present.

Furthermore, it is a still further object of the present invention to provide an audio message transfer sheet whose appearance does not become unattractive when recording of audio information is prohibited and which makes it possible to visually confirm that recording is prohibited.

Furthermore, it is a still further object of the present invention to provide an audio information delivery component comprising a transmitting message section and a reply message section connected together, wherein the reply message section is structured so as to be able to record audio information and it is possible to prevent recorded audio information from being erased mistakenly without degrading the appearance.

Furthermore, it is a still further object of the present invention to provide a label capable of transmitting information to the able-bodied and the visually handicapped alike.

Furthermore, it is a still further object of the present invention to provide a power supply circuit comprising a paper battery whose positive electrode and negative electrode are exposed on different surfaces, mounted on a sheet-like circuit substrate, the power supply circuit capable of being formed without increasing the resistance between the paper battery and circuit substrate and without folding the paper battery.

Furthermore, it is a still further object of the present invention to provide a method of manufacturing a power supply circuit comprising a paper battery connected to a circuit substrate, capable of improving productivity without increasing the manufacturing cost.

In the present invention, audio information recording/reproducing means capable of recording/reproducing audio information has a sheet-like structure, and this audio information recording/reproducing means is sandwiched between two support sheets and these support sheets are further sandwiched between two surface sheets, which allows the audio information recording/reproducing means to be bent or folded, and the audio information recording/reproducing means is sandwiched from front and back in only part of the area of the two support sheets facing the audio information recording/reproducing means, and therefore the difference in thickness between the area in which the audio information recording/reproducing means is incorporated and other area is reduced though the audio information recording/reproducing means is incorporated therein, which allows information to be printed on the surface sheet.

Furthermore, making the outside shape of the two support sheets equal to the outside shape of the surface sheets can make the thickness of the entire audio message transfer sheet substantially uniform.

Furthermore, dividing each of the two support sheets into a plurality of portions makes it possible to increase the degree of freedom in bending and folding of the audio message transfer sheet.

Furthermore, adopting a structure that the two support sheets are connected along a bend line facilitates positioning of the two support sheets.

Furthermore, when audio information outputting means provided for the audio information recording/reproducing means for outputting audio information is constructed of a piezo-electric element which outputs audio information, a film sheet having a larger diameter than the piezo-electric element, pasted to one surface of the piezo-electric element and a diaphragm provided with a hole having a diameter larger than the diameter of the piezo-electric element and smaller than the diameter of the film sheet, pasted to a film sheet in such a way that the piezo-electric element fits into the hole, and the diaphragm is bonded to the support sheet only in the area of the surface of bonding with the film sheet which is not bonded to the film sheet, it is possible to prevent the thickness of the area where the audio information outputting means is provided from increasing and cause the audio information outputting means to be fixed to the surface sheet without being bonded thereto and thereby avoid vibration of the piezo-electric element and diaphragm from being interfered.

Furthermore, by adopting a structure that two support sheets sandwich the audio information recording/reproducing means around operating means and the audio information recording/reproducing means is mounted on one support sheet in the area in which the operating means is provided and making the height of the operating means lower than the thickness of the support sheet, the operating means is surrounded by the support sheet which is thicker than the height of the operating means and it is thereby possible to prevent the operating means from being operated when force majeure is applied from outside.

Furthermore, if an ink receiving layer is laminated on the surface of at least one of the two surface sheets which does not face the support sheet, when information is printed on the surface sheet by an ink-jet printer later, the information is printed clearly on the surface sheet.

Furthermore, if this ink receiving layer is superimposed on the surface sheet before the support sheets sandwiching the audio information recording/reproducing means are sandwiched between the surface sheets, it is possible to laminate the ink receiving layer with excellent flatness of the surface sheets and when the surface sheets consist of single pieces cut out from a continuous sheet, the ink receiving layer is laminated on the continuous surface sheet, which facilitates the lamination of the ink receiving layer.

Furthermore, according to the present invention, the area of at least the audio information output section of the audio information recording/reproducing means sandwiched between the two surface sheets can be folded along a bend line, and therefore the downsizing can be achieved by folding the area where at least the audio information output section is incorporated with respect to other areas without reducing the size of the audio information output section.

Furthermore, according to the present invention, when mounted on an object by a mounting member, advertisement information displayed as a POP on the surface sheet is visually recognized and when the operating means is operated, audio information recorded in the audio information recording/reproducing means is reproduced.

In this way, audio information is recorded in the audio information recording/reproducing means and this audio information is designed to be reproducible by the operating means, and therefore if the advertisement information is recorded as audio information in the audio information recording/reproducing means, the advertisement information is visually recognized and provided as audio information as well, and in this way it is possible to attract attention of consumers and also include a large amount of advertisement information.

Furthermore, since this operating means and the surface sheet in the area where the operating means is pasted protrude from other areas, the operating means can be easily operated.

Furthermore, if the surface sheet is made of synthetic paper suitable for printing, it is possible not only to print advertisement information as a POP on the surface sheet but also to improve the durability of the surface sheet. In the area where the operating means is pasted in particular, the surface sheet may deteriorate when the operating means is operated, but using synthetic paper can suppress deterioration of the surface sheet.

Furthermore, when the power supply section which supplies power to the audio information recording/reproducing means is constructed of a plurality of paper batteries made up of positive electrodes and negative electrodes exposed from different surfaces, if these plurality of paper batteries are connected in series and the audio substrate which is mounted with the audio information recording/reproducing means and connected to the power supply section is constructed of a first conductive area connected to one of both electrodes of the power supply section and a second conductive area connected to the other of the two electrodes of the power supply section formed on different surfaces in such a way that both electrodes of the power supply section are connected to the first conductive area and second conductive area, all that is needed is to connect the plurality of paper batteries and the audio substrate only at two locations, which can reduce the manufacturing cost.

Furthermore, according to the present invention, when a conductive member is sandwiched between two surface sheets, an IC chip having a storage area and a second switch are electrically connected through the conductive member, and if the second switch is operated in this condition, a second instruction signal for recording audio information in the IC chip is input to the IC chip and the audio information input through the audio information inputting/outputting means is recorded in the IC chip. Then, if the conductive member is removed from the two surface sheets, the IC chip and second switch are electrically left open and even if the second switch is operated in this condition, the second instruction signal for recording the audio information in the IC chip is not input to the IC chip and even if audio information is thereby input via the audio information inputting means, the audio information is not recorded in the IC chip. For this reason, if the conductive member is removed from the two surface sheets after the audio information is recorded in the IC chip, the audio information recorded in the IC chip is not erased even if the second switch is operated later.

Thus, recording of the audio information in the IC chip is enabled by the conductive member sandwiched between the two surface sheets and the recording of the audio information in the IC chip is prohibited by removing this conductive member from the two surface sheets, and therefore even if the recording of the audio information in the IC chip is prohibited, the surface sheets which become the appearance of the audio message transfer sheet remain as they are, preventing the appearance from becoming unattractive. Furthermore, whether the recording of the audio information in the IC chip is prohibited or not can be determined through the presence/absence of the conductive member, and therefore it is possible to visually confirm that the recording is prohibited.

Furthermore, audio information is recorded in the first audio information recording/reproducing means sandwiched between the two surface sheets with the transmitting message section and the reply message section connected. Then, when the transmitting message section is separated from the reply message section along the connection part in order to send the reply message section, wiring for recording audio information sandwiched between the two surface sheets in such a way as to span the transmitting message section and the reply message section of the first audio information recording/reproducing means sandwiched between the two surface sheets is cut. In this way, when the transmitting message section is separated from the reply message section, it is not possible to record audio information in the first audio information recording/reproducing means, preventing the audio information already recorded in the first audio information recording/reproducing means from being erased mistakenly. Furthermore, of the first audio information recording/reproducing means, the portion other than the wiring for recording the audio information is sandwiched between the two surface sheets on the reply message section side, and therefore it is possible for the receiver of the reply message section to reproduce the audio information recorded in the first audio information recording/reproducing means.

Furthermore, according to the present invention, audio information is recorded in the audio information recording/reproducing means sandwiched between the two sheet base materials, this label is pasted to an object, the object is supplied to the destination of the audio information by delivery, etc., and then the audio information recorded in the audio information recording/reproducing means is reproduced at the destination of the audio information and the desired audio information is thereby transmitted to the destination.

Furthermore, according to the present invention, a paper battery is constructed of a positive electrode and a negative electrode laminated through an electrolytic layer with both the positive and negative electrodes exposed from different surfaces, and the paper battery is connected to a sheet-like circuit substrate on which a conductive area to be connected to the electrodes is formed and a power supply circuit is formed of the paper battery and the conductive area, in order for one of the positive electrode and negative electrode to be connected to a first conductive area formed on one surface of the circuit substrate, the paper battery is mounted on the surface on which the first conductive area is formed and the other electrode of the positive electrode and negative electrode is connected to a second conductive area formed on the other surface, and in this way a power supply circuit is formed of the paper battery, and the first and second conductive areas.

In this way, one of the positive electrode and negative electrode exposed from the different surfaces of the paper battery is connected to the first conductive area formed on one surface of the sheet-like circuit substrate, the other of the positive electrode and negative electrode is connected to the second conductive area formed on the other surface to thereby form a power supply circuit, and therefore it is possible to form a power supply circuit without increasing the resistance between the paper battery and the circuit substrate and without folding the paper battery.

Furthermore, if the circuit substrate is provided with a notch for the other electrode to fit from the front side into the back side of the circuit substrate so that the other electrode of the paper battery fits into the side on which the second conductive area is formed through the notch and is connected to the second conductive area, it is possible to allow the other electrode of the paper battery to fit into the other side of the circuit substrate through the notch and connect to the second conductive area even when the paper battery is mounted on any part other than the end of the circuit substrate.

Furthermore, when a plurality of sets of first and second conductive areas are formed and as many paper batteries as the sets of first and second conductive areas are mounted so as to be connected to the plurality of first and second conductive areas, and when the plurality of first and second conductive areas are connected so that the plurality of paper batteries are connected in series, if the first and second conductive areas are formed so that at least some of the plurality of paper batteries overlap with one another, it is possible to reduce the area of the circuit substrate on which the plurality of paper batteries are mounted and realize a cost reduction.

According to the present invention, when the paper battery is mounted on the circuit substrate so that the positive electrode and negative electrode of the paper battery face the two connection terminals provided on the circuit substrate and then ultrasonic vibration is applied to the mutually facing areas, the positive electrode and negative electrode of the paper battery are melted, and the positive electrode and negative electrode of the paper battery and the two connection terminals of the circuit substrate are thereby electrically connected through ultrasonic bonding.

By so doing, it is possible to electrically connect the paper battery and the circuit substrate without using expensive materials such as an anisotropic/conductive film or anisotropic/conductive adhesive, prevent the manufacturing cost from increasing, simplify manufacturing steps and improve productivity.

Furthermore, if a hole is made in the area in which the connection terminal of the circuit substrate is formed, the positive electrode and negative electrode of the paper battery melted through ultrasonic vibration flow into this hole, which increases the bonding force between the paper battery and circuit substrate.

Furthermore, when the paper battery is mounted on the circuit substrate, if no connection terminal is formed in part of the area facing the positive electrode and negative electrode of the circuit substrate, part of the area facing the positive electrode and negative electrode of the circuit substrate is melted through ultrasonic vibration and the bonding force between the paper battery and circuit substrate is thereby increased.

The above and other objects, features, and advantages of the present invention will become apparent from the following description with reference to the accompanying drawings which illustrate an example of the present invention.

BRIEF DESCRIPTION OF THE DRAWINGS

FIG. 1b is a cross-sectional view along the line A-A' shown in FIG. 1a;

FIG. 2b illustrates an inner structure of the audio message transfer sheet shown in FIG. 2a;

FIG. 2c is a cross-sectional view along the line A-A shown in FIG. 2a;

FIG. 5b illustrates how the sheet is folded along the bend line shown in FIG. 5a;

FIG. 8b illustrates an inner structure of the audio message transfer sheet shown in FIG. 8a;

FIG. 8c is a cross-sectional view along the line A-A' shown in FIG. 8a;

FIG. 9b illustrates an inner structure of the audio message transfer sheet shown in FIG. 9a;

FIG. 9c is a cross-sectional view along the line A-A' shown in FIG. 9a;

FIG. 11b illustrates an inner structure of the audio message transfer sheet 301 shown in FIG. 11a;

FIG. 11c is a cross-sectional view along the line A-A' shown in FIG. 11a;

FIG. 12b illustrates an inner structure of the audio message transfer sheet shown in FIG. 12a;

FIG. 12c is a cross-sectional view along the line A-A' shown in FIG. 12a;

FIG. 13b illustrates an inner structure of the audio message transfer sheet shown in FIG. 13a;

FIG. 13c is a cross-sectional view along the line A-A' shown in FIG. 13a;

FIG. 15b illustrates an inner structure of the audio information output sheet shown in FIG. 15a;

FIG. 15c is a cross-sectional view along the line A-A' shown in FIG. 15a;

FIG. 19b illustrates an inner structure of the audio information output sheet shown in FIG. 19a;

FIG. 19c is a cross-sectional view along the line A-A' shown in FIG. 19a;

FIG. 21b illustrates an inner structure of the POP indicator shown in FIG. 21a;

FIG. 24b is a cross-sectional view along the line A-A' shown in FIG. 24a;

FIG. 24c is a cross-sectional view along the line B-B' shown in FIG. 24a;

FIGS. 23a, 23b is connected to the paper battery shown in FIG. 25;

FIGS. 23a, 23b is connected to the paper battery shown in FIG. 25;

FIG. 27b illustrates an inner structure of the POP indicator shown in FIG. 27a;

FIG. 30 illustrates the sound information delivery apparatus shown in FIG. 28 broken down into a package, recording/reproducing means carrier and delivery slip;

FIG. 31 is a cross-sectional view of a delivery slip of the sound information delivery apparatus shown in FIG. 28;

FIG. 32b illustrates an inner structure of the audio message transfer sheet shown in FIG. 32a;

FIG. 32c is a cross-sectional view along the line A-A' shown in FIG. 32a;

FIG. 32d is a cross-sectional view along the line B-B' shown in FIG. 32a;

FIG. 35e is a cross-sectional view along the line B-B' shown in FIG. 35a;

FIG. 36a is a plan view of a double postal card which constitutes an audio information delivery component according to a thirteenth embodiment of the present invention;

FIG. 36b illustrates an inner structure of the double postal card shown in FIG. 36a;

FIG. 36c is a rear view of the double postal card shown in FIG. 36a;

FIG. 36d is a cross-sectional view along the line A-A' shown in FIG. 36a;

FIG. 37 illustrates a laminated structure of the double postal card shown in FIGS. 36a to 36d;

FIG. 38a illustrates a laminated structure of the support sheet and audio information recording/reproducing section shown in FIGS. 36a to 36d and FIG. 37;

FIG. 38b illustrates a laminated structure of the support sheet and audio information recording/reproducing section shown in FIGS. 36a to 36d and FIG. 37;

FIG. 41a is a plan view of a double postal card which constitutes an audio information delivery component according to a fourteenth embodiment of the present invention;

FIG. 41b is a plan view of an inner structure of the double postal card shown in FIG. 41a;

FIG. 41c is a rear view of the double postal card shown in FIG. 41a;

FIG. 41d is a rear view of an inner structure of the double postal card shown in FIG. 41a;

FIG. 41e is a cross-sectional view along the line A-A' shown in FIG. 41a;

FIG. 44b illustrates an inner structure of the label shown in FIG. 44a;

FIG. 44c is a cross-sectional view along the line A-A' shown in FIG. 44a;

FIG. 47a is a plan view of a label according to a sixteenth embodiment of the present invention;

FIG. 47b illustrates an inner structure of the label shown in FIG. 47a;

FIG. 47c is a cross-sectional view along the line A-A' shown in FIG. 47a;

FIG. 47d is a cross-sectional view along the line B-B' shown in FIG. 47a;

FIG. 48 illustrates a laminated structure of the label shown in FIGS. 47a to 47d;

FIG. 49a is a cross-sectional view of the vicinity of the switch shown in FIGS. 47a to 47c when the switch is not pressed through the recording button;

FIG. 49b is a cross-sectional view of the vicinity of the switch shown in FIGS. 47a to 47c when the switch is pressed through the recording button;

FIG. 50 illustrates an inner structure of the label shown in FIGS. 47a to 47d when cut into two areas along perforation;

FIG. 51a is a plan view of a label according to a seventeenth embodiment of the present invention;

FIG. 51b illustrates an inner structure of the label shown in FIG. 51a;

FIG. 51c is a cross-sectional view along the line A-A' shown in FIG. 51a;

FIG. 53b is a cross-sectional view along the line A-A' shown in FIG. 53a;

FIG. 53c is a cross-sectional view along the line B-B' shown in FIG. 53a;

FIG. 54b illustrates a structure of the surface opposite to the surface shown in FIG. 54a;

FIG. 55b illustrates a structure of the surface opposite to the surface shown in FIG. 55a;

FIG. 56a illustrates a method of manufacturing the power supply circuit shown in FIGS. 55a, 55b;

FIG. 56b illustrates a method of manufacturing the power supply circuit shown in FIGS. 55a, 55b;

FIG. 56c illustrates a method of manufacturing the power supply circuit shown in FIGS. 55a, 55b;

FIG. 56d illustrates a method of manufacturing the power supply circuit shown in FIGS. 55a, 55b;

FIG. 57a illustrates a structure of the surface of an embodiment of a sheet-like circuit substrate on which the paper battery shown in FIGS. 53a to 53c is mounted, on which the paper battery is mounted;

FIG. 57b illustrates a structure of the surface opposite to the surface shown in FIG. 57a;

FIG. 58a illustrates a structure of the surface of a power supply circuit with the paper battery shown in FIGS. 53a to 53c mounted on the circuit substrate shown in FIGS. 57a to 57d, on which the paper battery is mounted;

FIG. 58b illustrates a structure of the surface opposite to the surface shown in FIG. 58a;

FIG. 59a is a plan view of an embodiment of a paper battery used for a power supply circuit according to a twentieth embodiment of the present invention;

FIG. 59b is a cross-sectional view along the line A-A' shown in FIG. 59a;

FIG. 59c is a cross-sectional view along the line B-B' shown in FIG. 59a;

FIG. 60a illustrates a structure of the surface of an embodiment of a sheet-like circuit substrate on which the paper battery shown in FIGS. 59a to 59c is mounted, on which the paper battery is mounted;

Figure 59A:
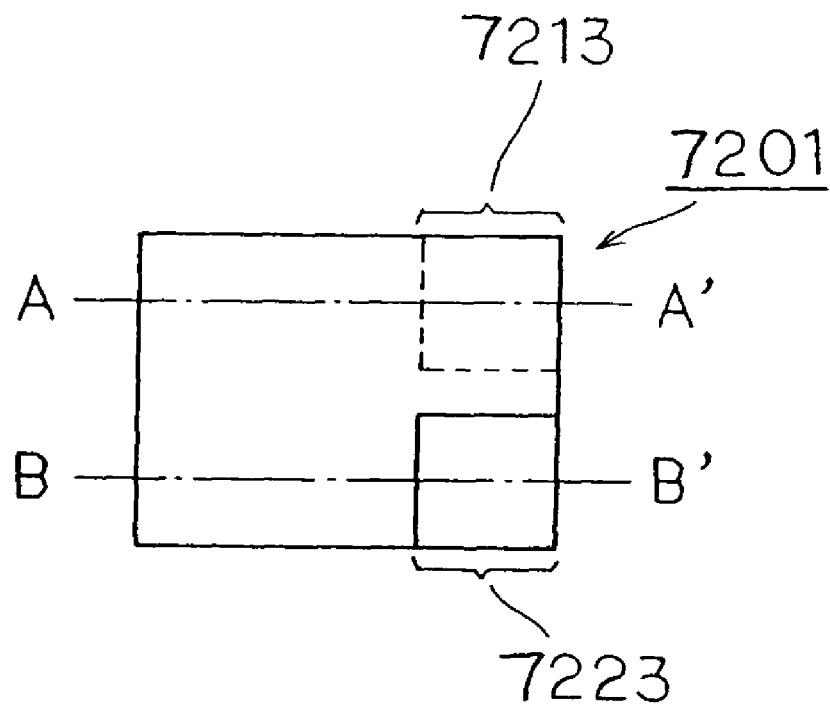
Figure 59B:
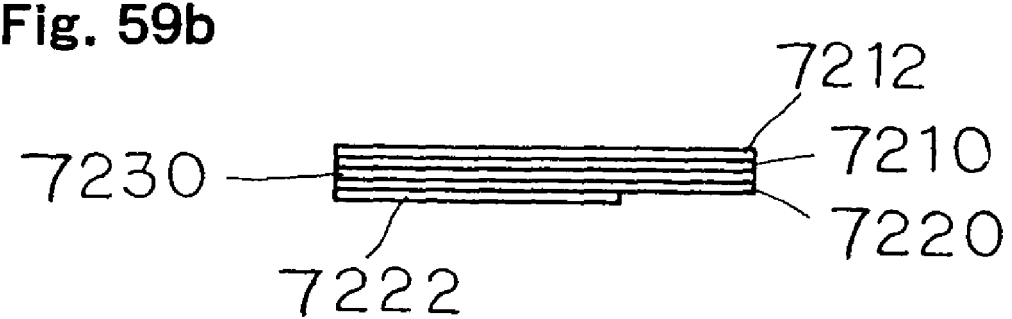
Figure 59C:
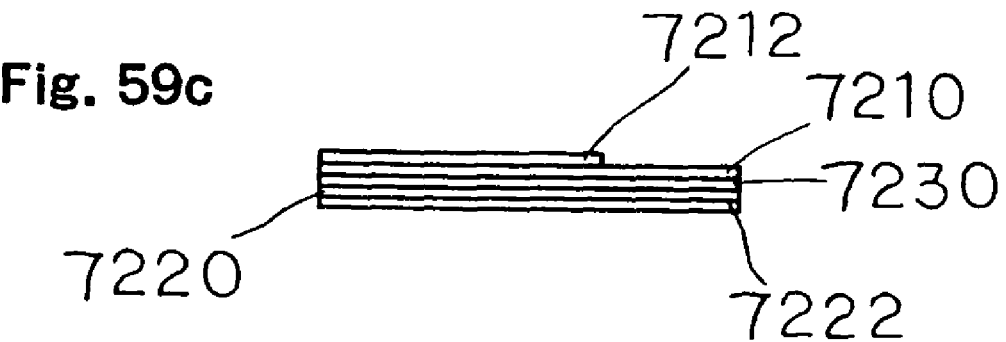
Figure 60A:
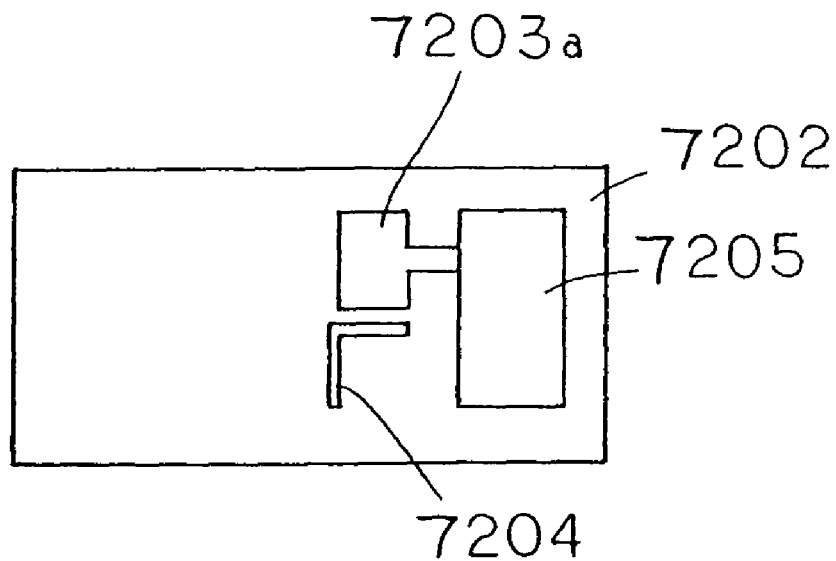
Figure 60B:
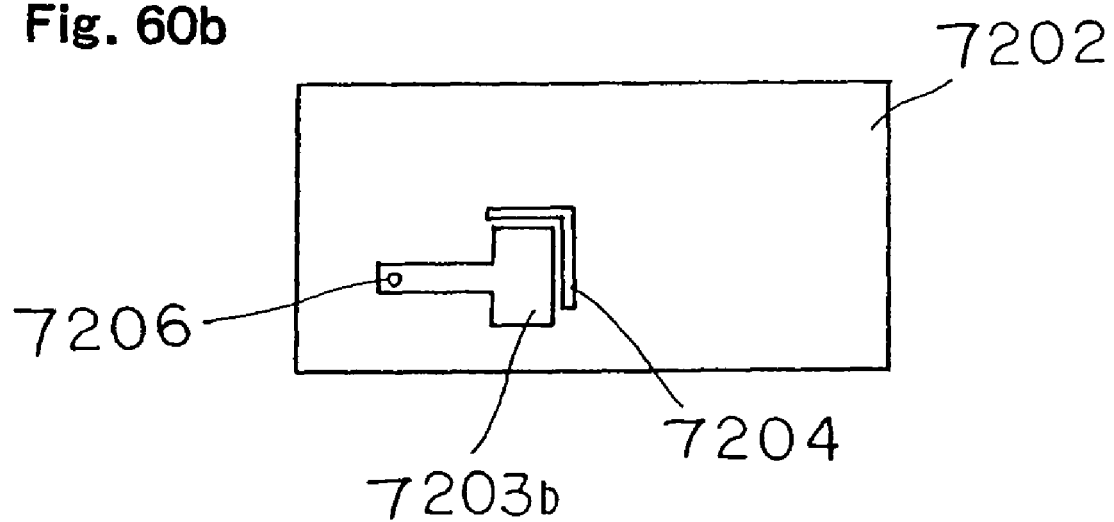
Figure 61A:
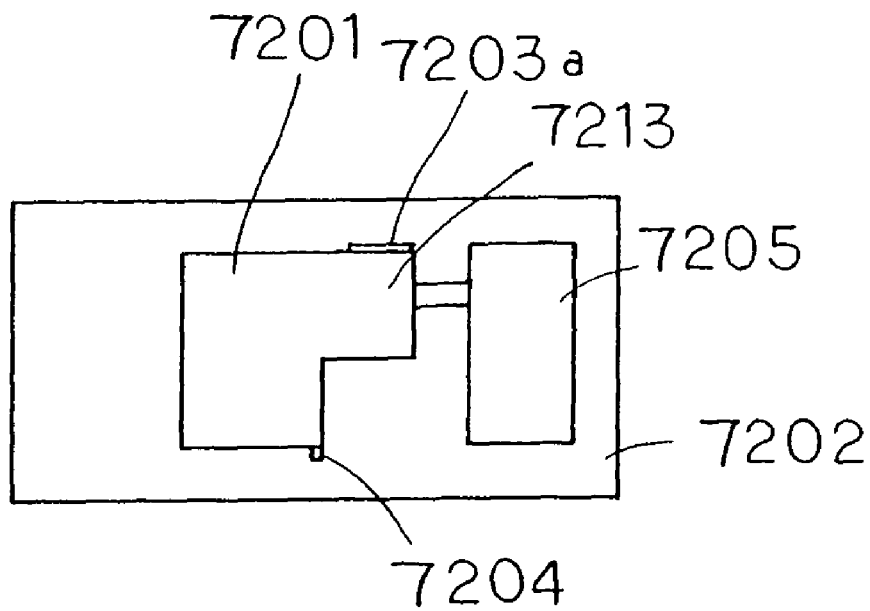
Figure 61B:
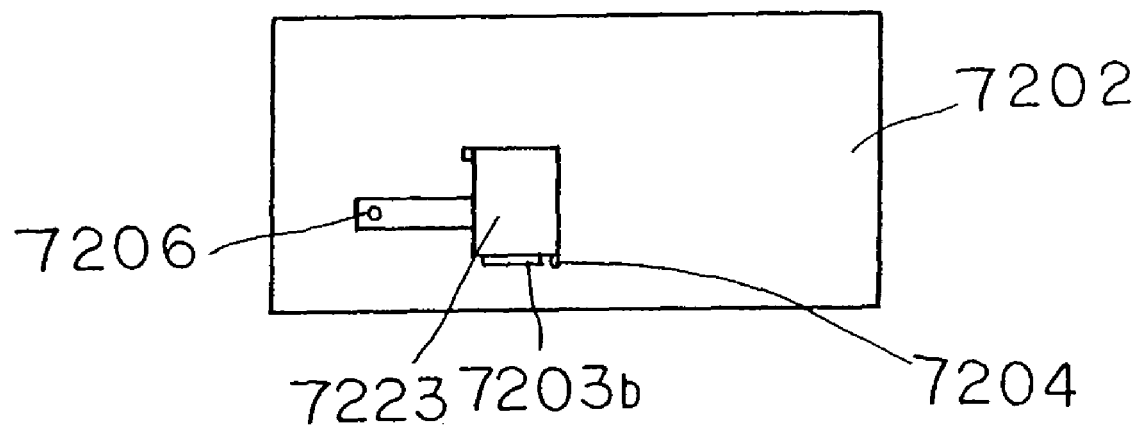
Figure 62A:
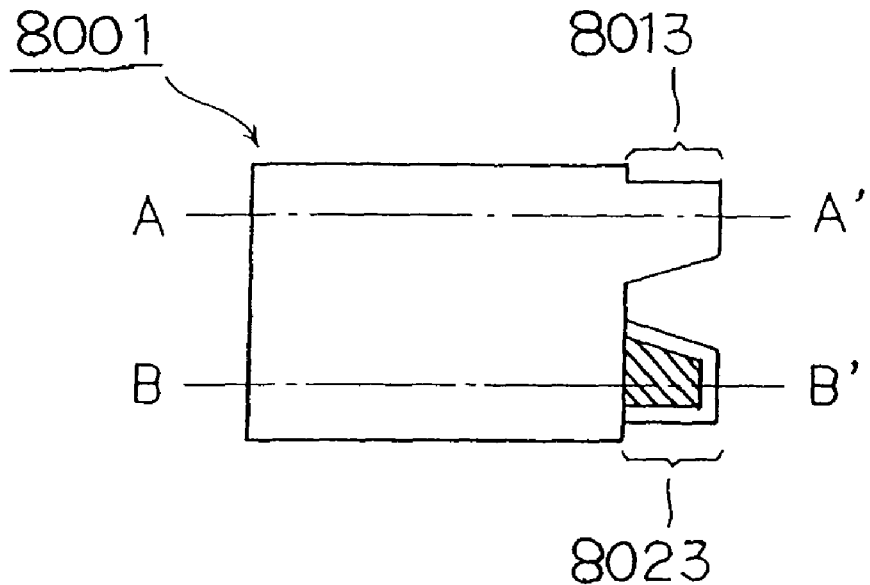
Figure 62B:
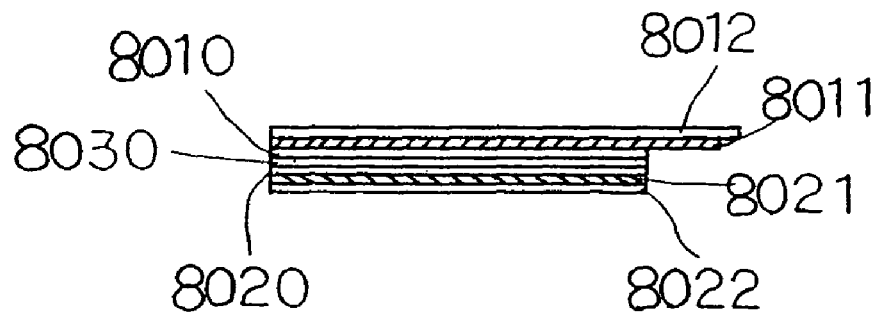
Figure 62C:
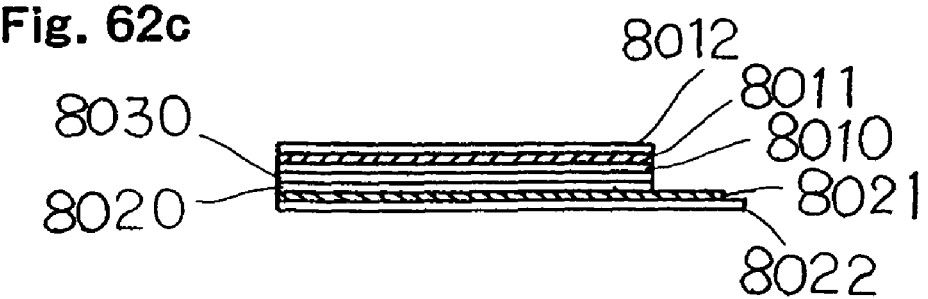
Figure 63:
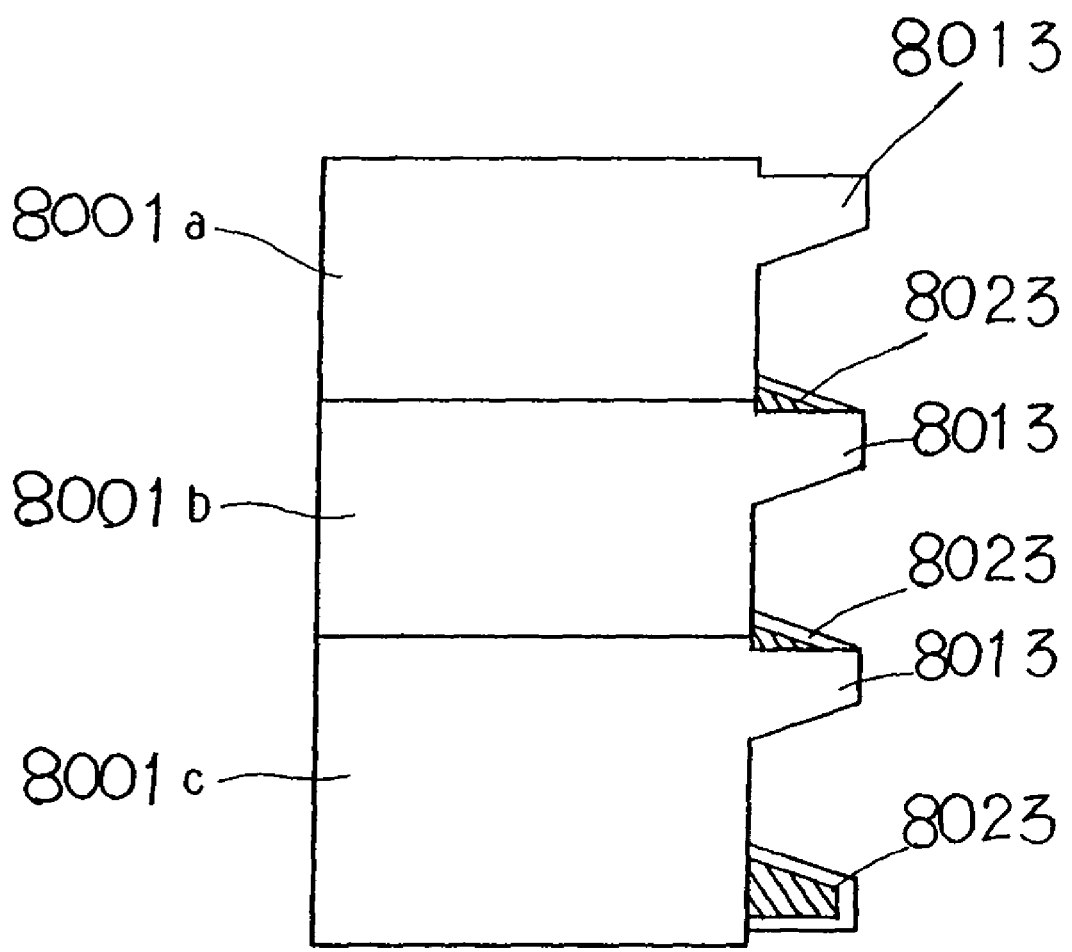
Figure 64A:
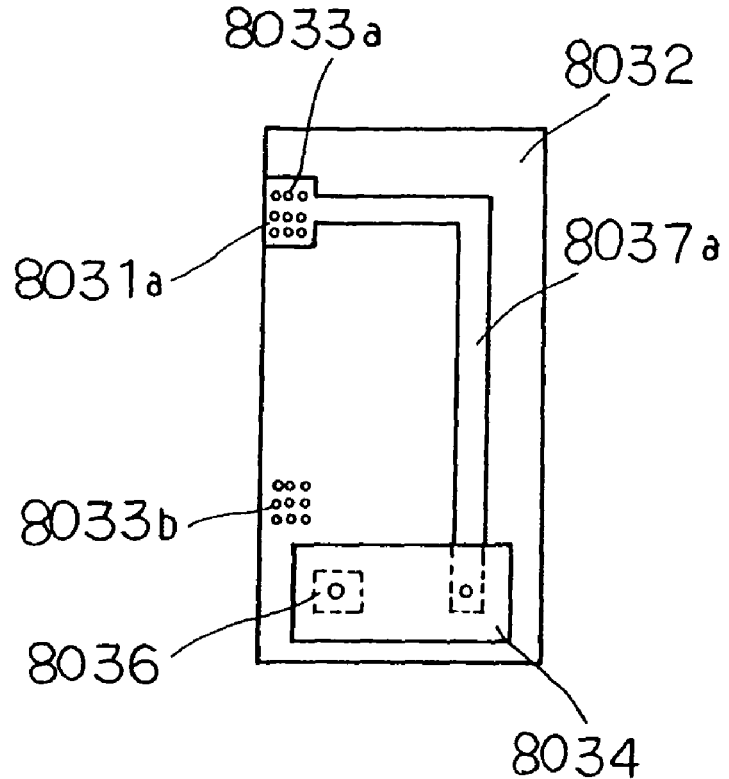
Figure 64B:
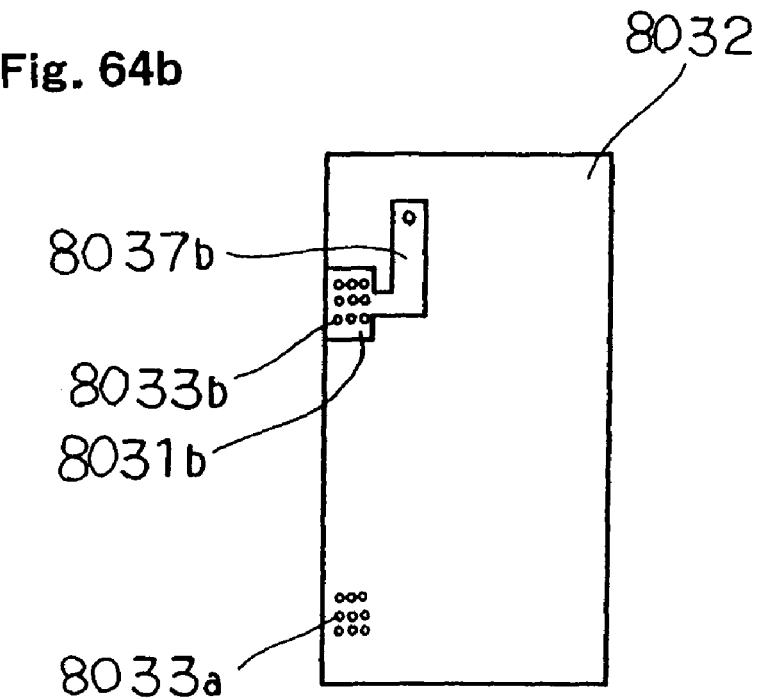
Figure 65A:
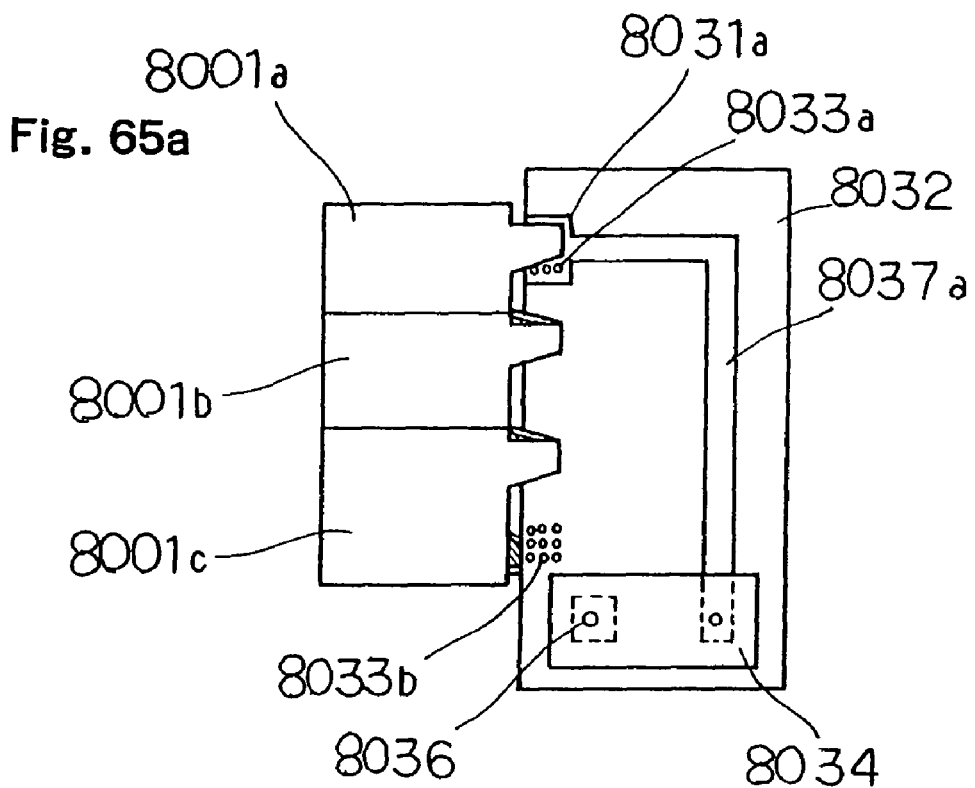
Figure 65B:
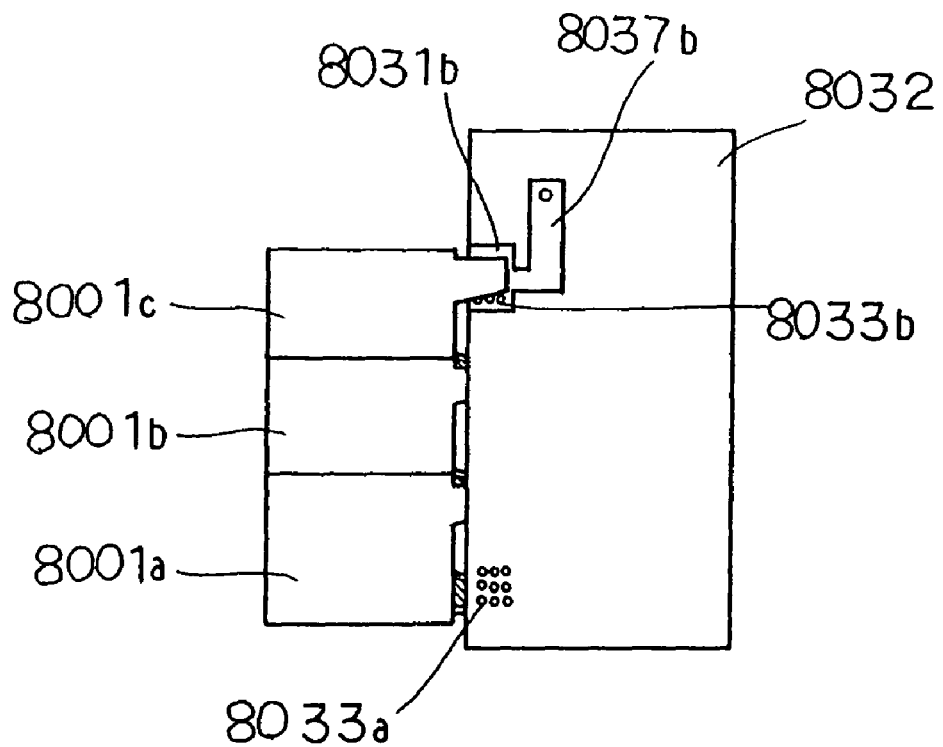
Figure 67:
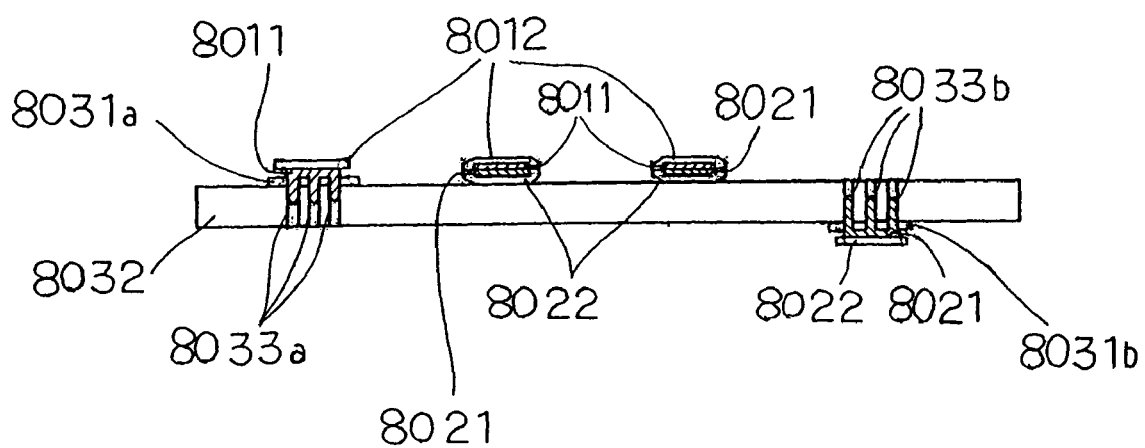
Figure 68A:
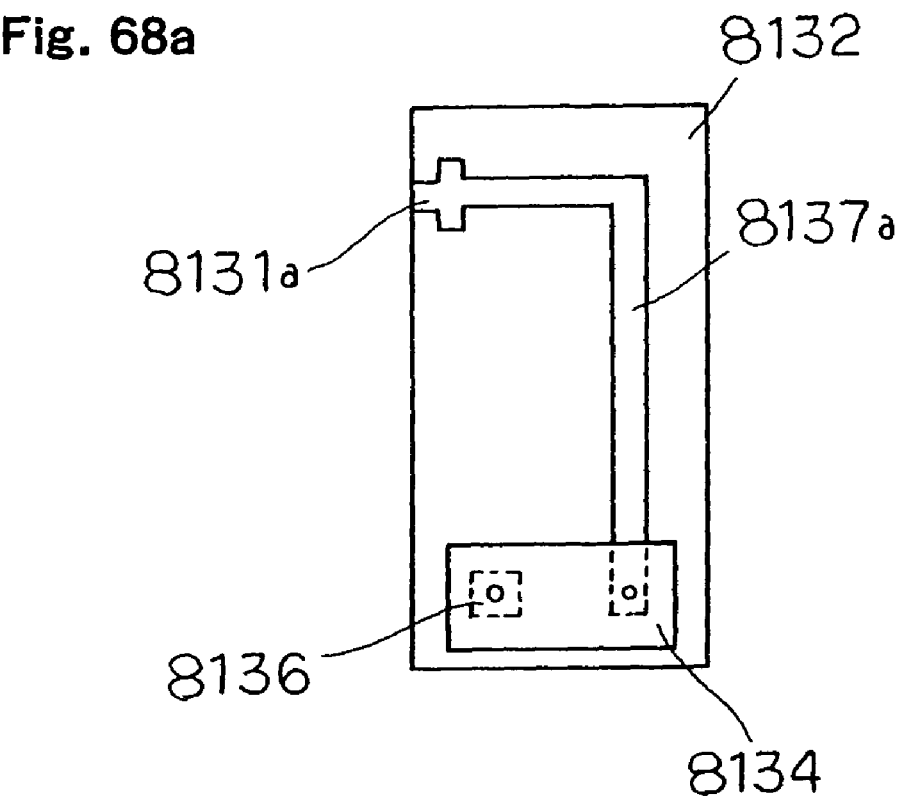
Figure 68B:
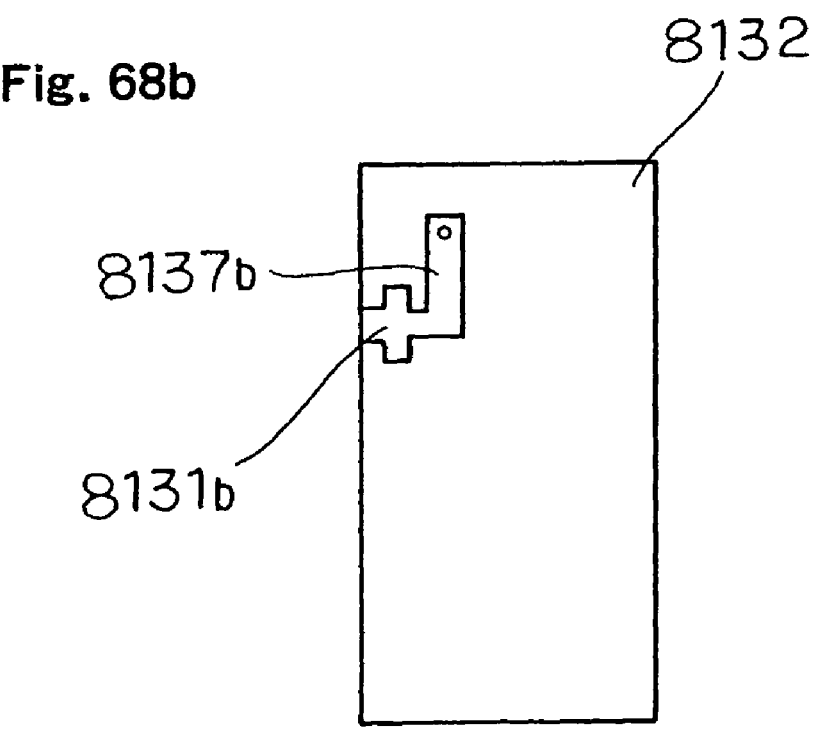
Figure 69A:
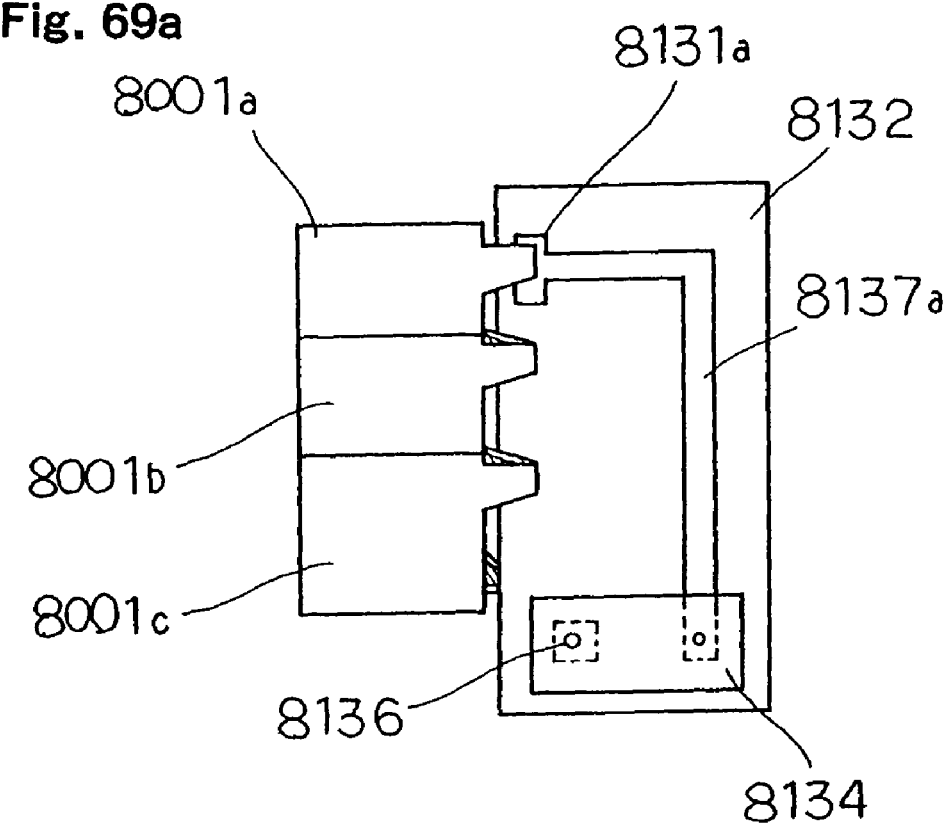
Figure 69B:
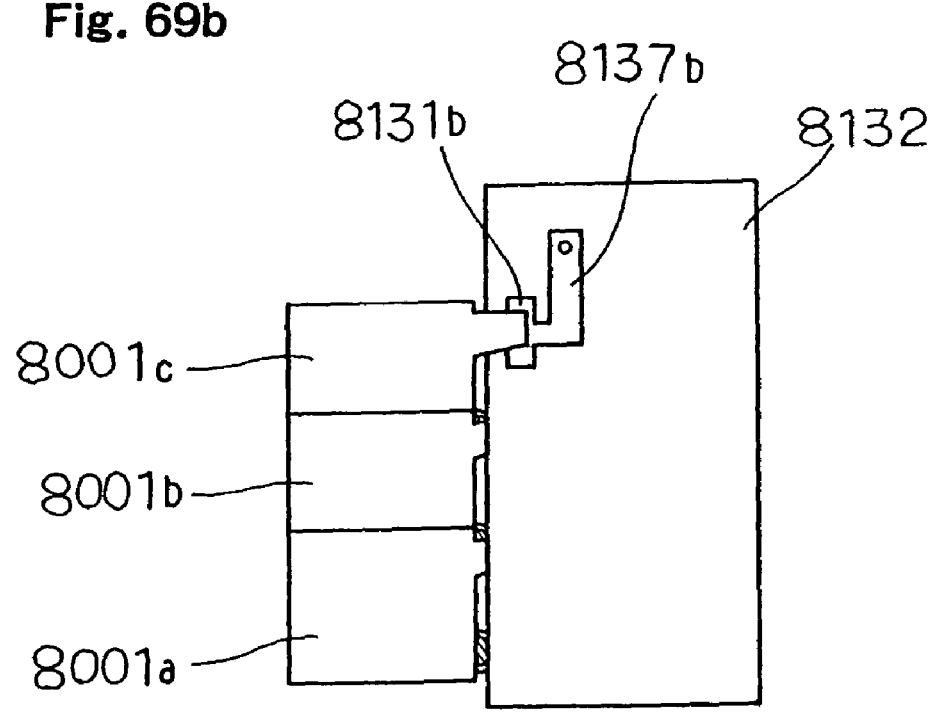
Figure 70A:
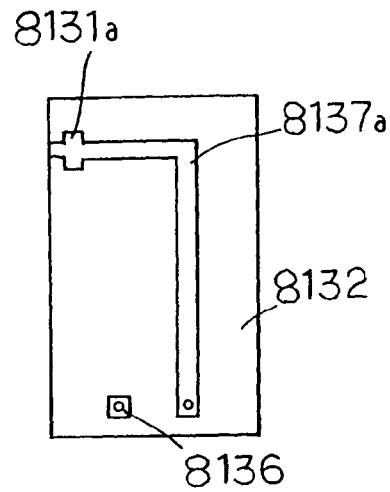
Figure 70C:
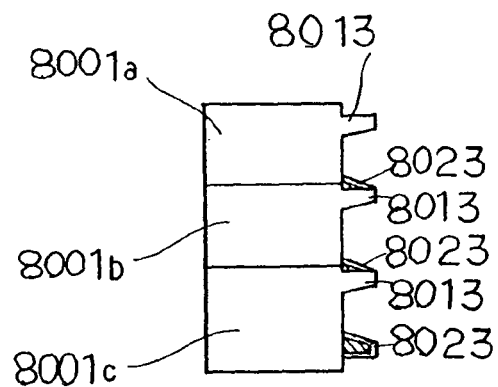
Figure 70B:
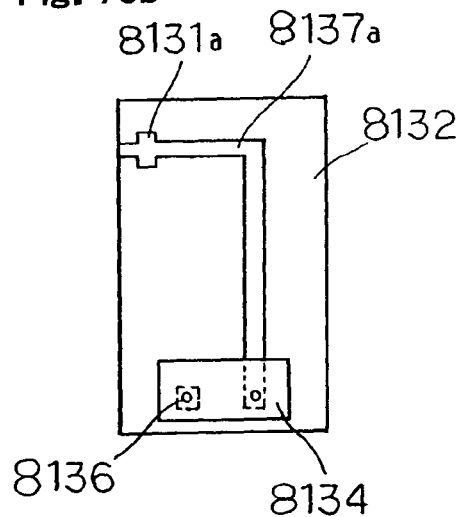
Figure 70D:
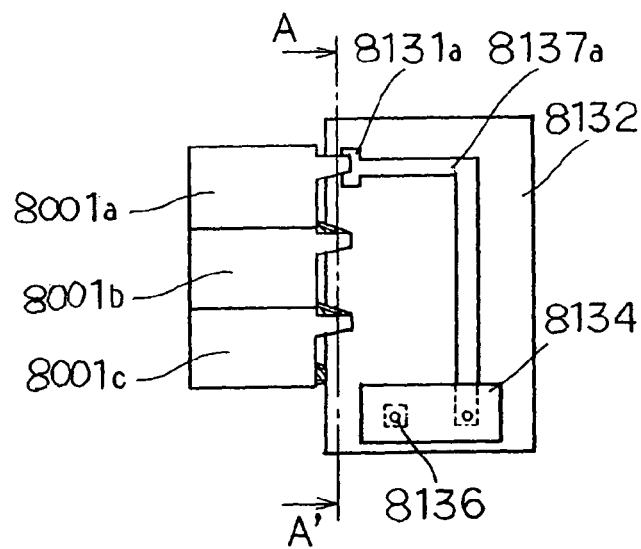
Figure 71:
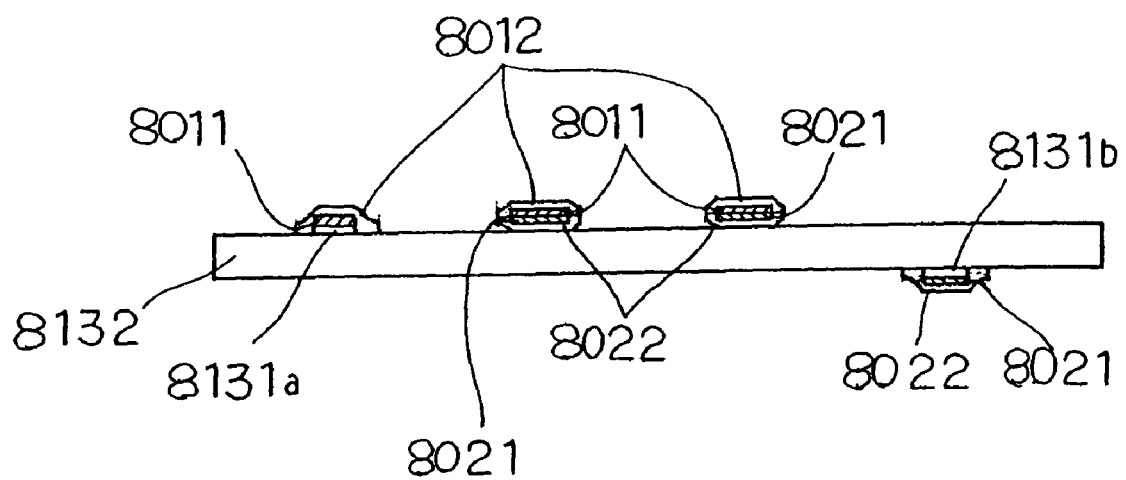

FIG. 60b illustrates a structure of the surface opposite to the surface shown in FIG. 60a;

FIG. 61a illustrates a structure of the surface of a power supply circuit with the paper battery shown in FIGS. 59a to 59c mounted on the circuit substrate shown in FIGS. 60a, 60b, on which the paper battery is mounted;

FIG. 61b illustrates a structure of the surface opposite to the surface shown in FIG. 61a;

FIG. 62a is a plan view of an embodiment of a paper battery used for a power supply circuit manufactured using a method of manufacturing a power supply circuit according to a twenty-first embodiment of the present invention;

FIG. 62b is a cross-sectional view along the line A-A' shown in FIG. 62a;

FIG. 62c is a cross-sectional view along the line B-B' shown in FIG. 62a;

FIG. 63 illustrates the three paper batteries shown in FIGS. 62a to 62c connected in series;

FIG. 64a illustrates a structure of one surface of an embodiment of a sheet-like circuit substrate used for a power supply circuit manufactured using a method of manufacturing a power supply circuit according to a twenty-first embodiment of the present invention;

FIG. 64b illustrates a structure of the other surface of the circuit substrate shown in FIG. 64a;

FIG. 65a illustrates a structure of one surface of the power supply circuit with the paper batteries shown in FIG. 63 mounted on the circuit substrate shown in FIGS. 64a, 64b;

FIG. 65b illustrates a structure of the other surface of the power supply circuit shown in FIG. 65a;

FIG. 66a illustrates a method of manufacturing the power supply circuit shown in FIGS. 65a, 65b;

FIG. 66b illustrates a method of manufacturing the power supply circuit shown in FIGS. 65a, 65b;

FIG. 66c illustrates a method of manufacturing the power supply circuit shown in FIGS. 65a, 65b;

FIG. 66d illustrates a method of manufacturing the power supply circuit shown in FIGS. 65a, 65b;

FIG. 66e illustrates a method of manufacturing the power supply circuit shown in FIGS. 65a, 65b;

FIG. 67 illustrates a connection state between the substrate of the power supply circuit and the paper battery manufactured using the manufacturing method shown in FIGS. 66a to 66e;

FIG. 68a illustrates a structure of one surface of an embodiment of a sheet-like circuit substrate used for a power supply circuit manufactured using a method of manufacturing a power supply circuit according to a twenty-second embodiment of the present invention;

FIG. 68b illustrates a structure of the other surface of the circuit substrate shown in FIG. 68a;

FIG. 69a illustrates a structure of one surface of the power supply circuit with the paper batteries shown in FIG. 63 mounted on the circuit substrate shown in FIGS. 68a, 68b;

FIG. 69b illustrates a structure of the other surface of the power supply circuit shown in FIG. 69a;

FIG. 70a illustrates a method of manufacturing the power supply circuit shown in FIGS. 69a, 69b;

FIG. 70b illustrates a method of manufacturing the power supply circuit shown in FIGS. 69a, 69b;

FIG. 70c illustrates a method of manufacturing the power supply circuit shown in FIGS. 69a, 69b;

FIG. 70d illustrates a method of manufacturing the power supply circuit shown in FIGS. 69a, 69b; and FIG. 71 illustrates a connection state between the substrate of the power supply circuit manufactured using the manufacturing method shown in FIGS. 70a to 70d and the paper battery.

DETAILED DESCRIPTION OF THE PREFERRED EMBODIMENTS

First Embodiment

Figure 2A:
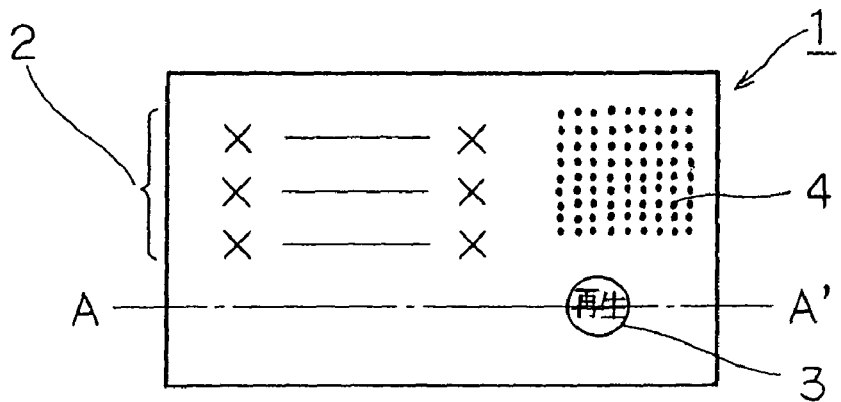
FIG. 2a is a plan view of an audio message transfer sheet according to a first embodiment of the present invention.
Figure 2B:
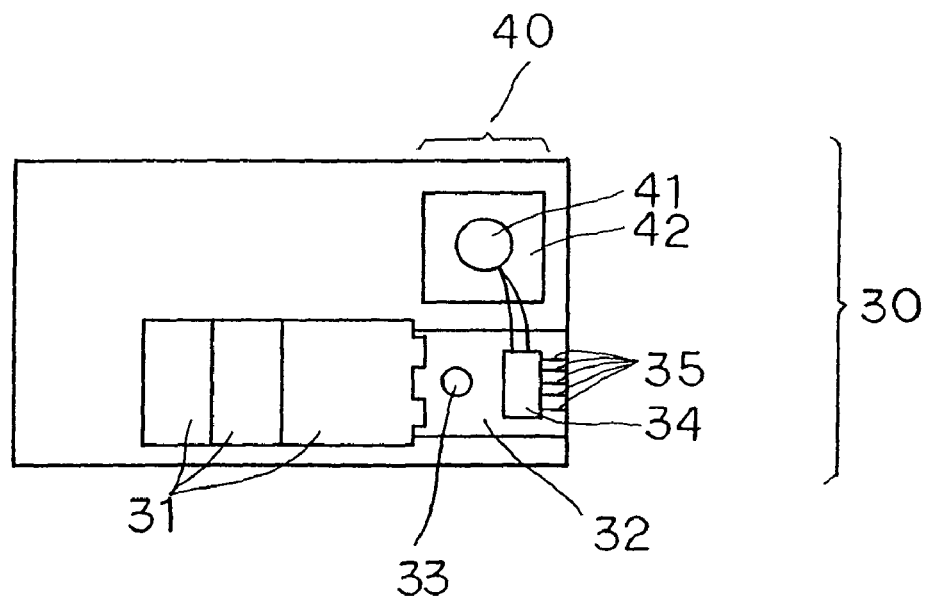
Figure 2C:
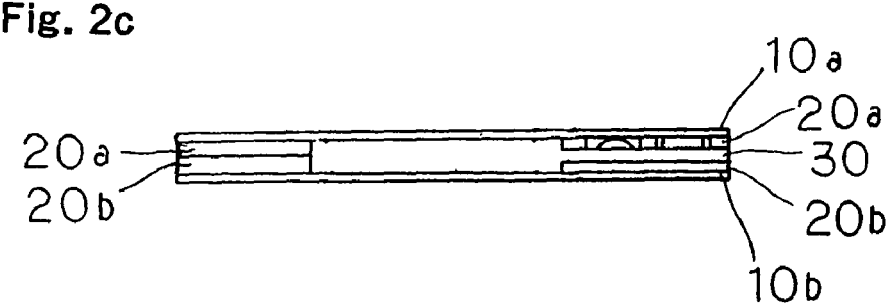
Figure 3:
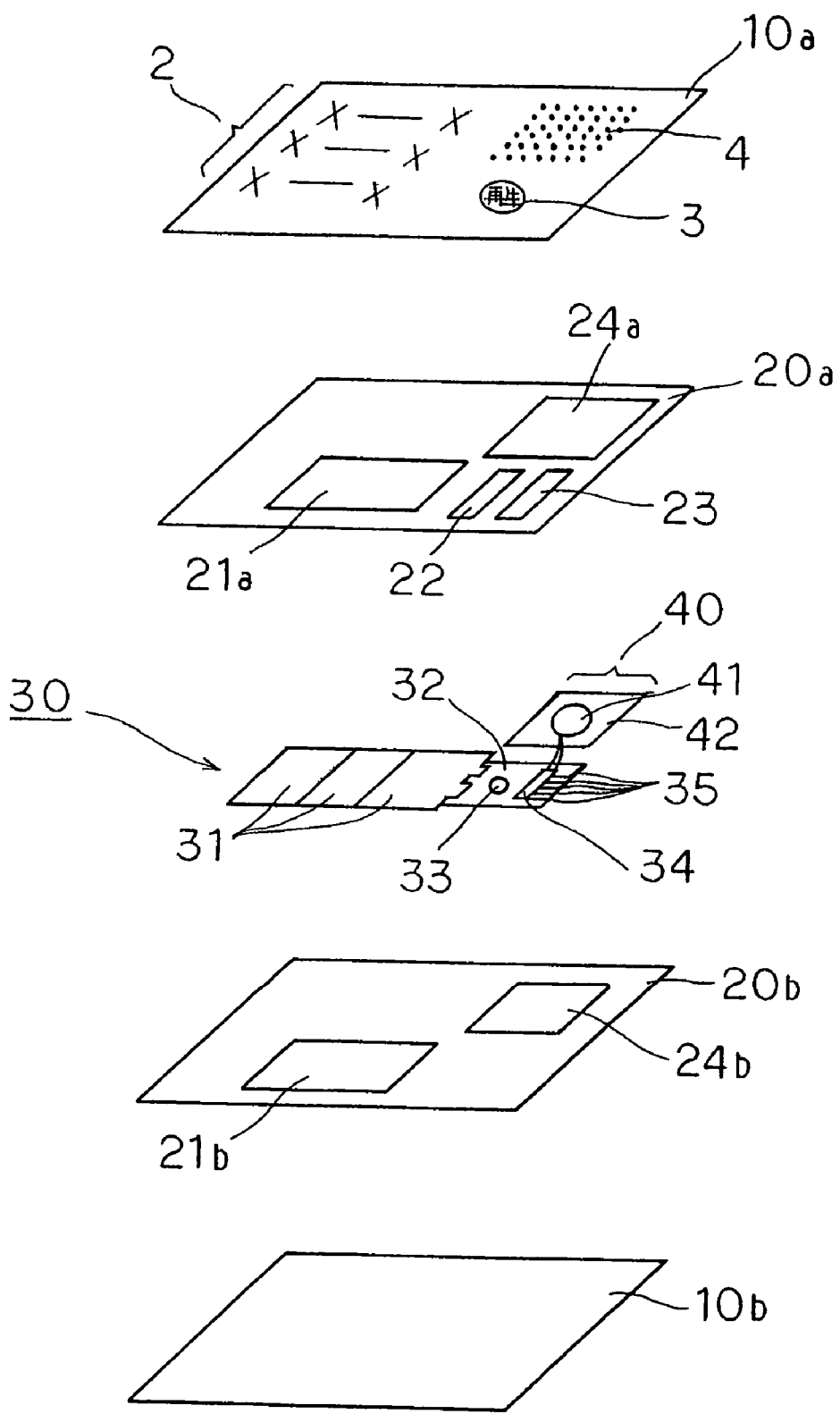
FIG. 3 illustrates a laminated structure of the audio message transfer sheet shown in FIGS. 2a to 2c.

FIG. 2a is a plan view of an audio message transfer sheet according to a first embodiment of the present invention, FIG. 2b illustrates an inner structure of the audio message transfer sheet shown in FIG. 2a and FIG. 2c is a cross-sectional view along the line A-A' shown in FIG. 2a. Furthermore, FIG. 3 illustrates a laminated structure of the audio message transfer sheet 1 shown in FIGS. 2a to 2c.

As shown in FIGS. 2a to 2c and FIG. 3, this embodiment is constructed of a sheet-like audio information recording/reproducing section 30 capable of recording/reproducing audio information sandwiched between two support sheets 20a, 20b made of a flexible and thin material such as paper base material with the support sheets 20a, 20b between which the audio information recording/reproducing section 30 is sandwiched being further sandwiched between two surface sheets 10a, 10b having the same outside shapes as those of the support sheets 20a, 20b, made of a flexible and thin material such as paper base material. The surface sheets 10a, 10b, support sheets 20a, 20b and audio information recording/reproducing section 30 are bonded to one another through adhesive work applied to the front and back of the support sheets 20a, 20b. This adhesive work can be realized, for example, by pasting a double-faced tape to the front and back of the support sheets 20a, 20b or applying a hot-melt type adhesive thereto.

Furthermore, the audio information recording/reproducing section 30 is constructed of a sheet-like audio information output section 40 made up of a piezo-electric element 41, a diaphragm 42 and a film sheet which will be described later, for outputting recorded audio information, an audio substrate 32 mounted with a thin IC chip 34 which is audio information recording means for recording audio information and a thin switch 33 which is operating means operated for outputting the audio information recorded in the IC chip 34 from the audio information output section 40, and flexible paper batteries 31 connected to the audio substrate 32, for supplying power to the audio substrate 32, and the audio substrate 32 is further provided with connection terminals 35 for inputting audio information to the IC chip 34 from outside. In this way, the audio information recording/reproducing section 30 has sheet-like structure. Here, the audio substrate 32 is a flexible, thin substrate made of fiberglass reinforced plastics (FRP), polyethylene terephthalate (PET), polyimide or lead frame, etc., with the IC chip 34 bonded by means of anisotropic/conductive adhesive (ACP), anisotropic/conductive film (ACF), wire bonding or the like.

Furthermore, when superimposed with the audio information recording/reproducing section 30, the support sheet 20a is provided with holes 21a, 22, 23, 24a in areas facing the paper batteries 31, switch 33, IC chip 34 and audio information output section 40, respectively. Furthermore, when superimposed with the audio information recording/reproducing section 30, the support sheet 20b is provided with holes 21b, 24b in areas facing the paper batteries 31 and audio information output section 40, respectively.

In this way, the holes 21a, 22, 23, 24a are formed in the areas of the support sheet 20a facing the paper batteries 31, switch 33, IC chip 34 and audio information output section 40, and the holes 21b, 24b are formed in the areas of the support sheet 20b facing the paper batteries 31 and audio information output section 40, which reduces the difference in thickness between the areas where the paper batteries 31, switch 33, IC chip 34 and audio information output section 40 and the other areas, improves flatness of the surface sheets 10a, 10b and facilitates printing of information on the surface sheets 10a, 10b. Furthermore, by making the total thickness of the support sheets 20a, 20b equivalent to or greater than the thickness of the thickest part of the audio information recording/reproducing section 30, it is possible to make the surface sheets 10a, 10b substantially flat. In this case, by sandwiching the thin parts of the audio information recording/reproducing section 30, for example, the area of the audio substrate 32 between the support sheets 20a, 20b, the audio substrate 32 is fixed. Since the area of the paper batteries 31 is connected to the audio substrate 32, this area need not be sandwiched between the support sheets 20a, 20b. Furthermore, since the surface sheets 10a, 10b are pasted to the support sheets 20a, 20b, even when the audio information recording/reproducing section 30 has projections and depressions, the surface sheets 10a, 10b may be recessed by being pressed, but when there is no pressing force as in the case of an ink-jet type, the surface sheets 10a, 10b can maintain the flatness, and thereby allows printing as well.

Figure 4A:
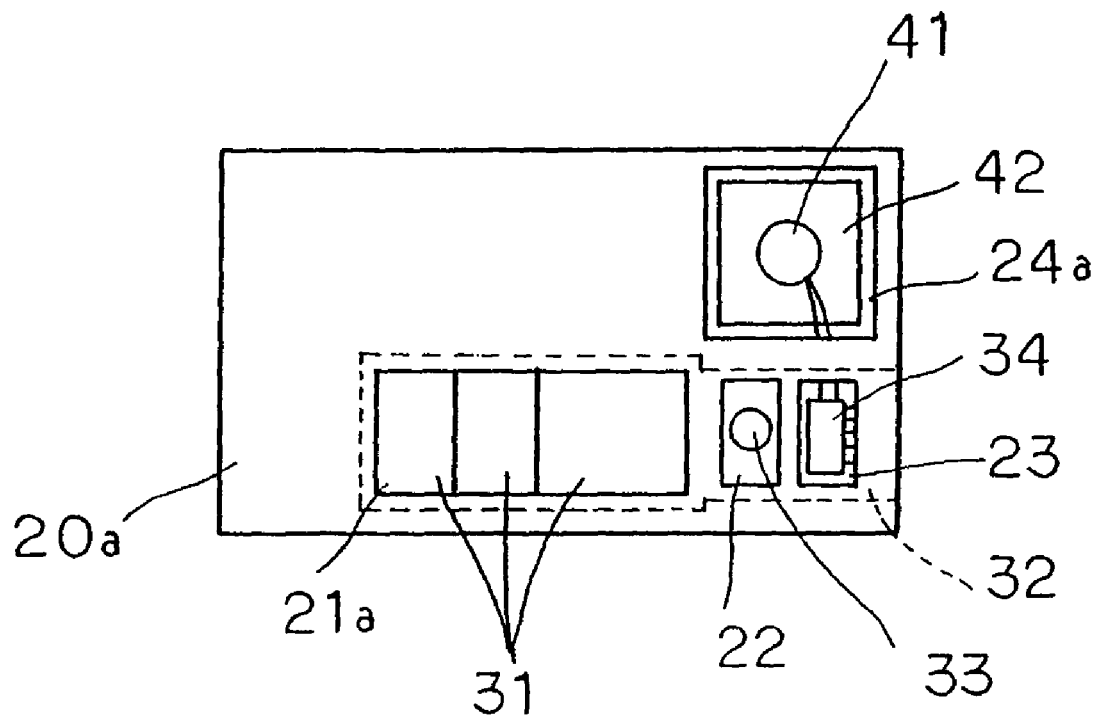
FIG. 4a illustrates a laminated structure of the support sheets and audio information recording/reproducing section shown in FIGS. 2a to 2c and FIG. 3.
Figure 4B:
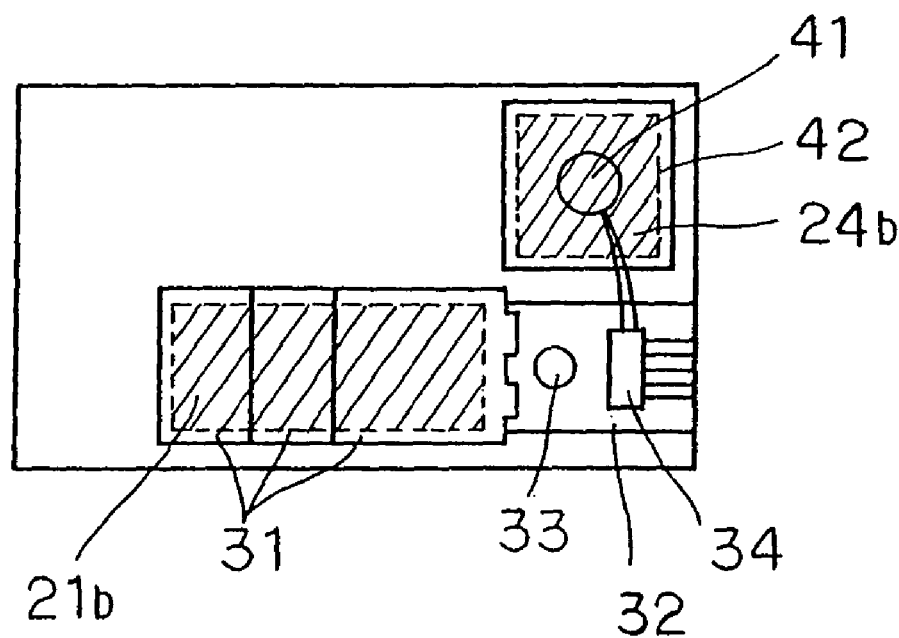
FIG. 4b illustrates a laminated structure of the support sheet and audio information recording/reproducing section shown in FIGS. 2a to 2c and FIG. 3.

FIG. 4a illustrates the support sheet 20a shown in FIGS. 2a to 2c and FIG. 3 and audio information recording/reproducing section 30 laminated together and FIG. 4b illustrates the support sheet 20b shown in FIGS. 2a to 2c and FIG. 3 and the audio information recording/reproducing section 30 laminated together.

As shown in FIG. 4a, the hole 21a formed in the area of the support sheet 20a facing the paper batteries 31 is smaller than the paper batteries 31 and the hole 22 formed in the area facing the switch 33 is larger than the switch 33, the hole 23 formed in the area facing the IC chip 34 is larger than the IC chip 34 and the hole 24a formed in the area facing the audio information output section 40 is larger than the audio information output section 40.

Furthermore, as shown in FIG. 4b, the hole 21b formed in the area of the support sheet 20b facing the paper batteries 31 is smaller than the paper batteries 31 and the hole 24b formed in the area facing the audio information output section 40 is smaller than the audio information output section 40.

In this way, the audio information recording/reproducing section 30 is laminated with only parts thereof sandwiched between the two support sheets 20a, 20b from front and back and fixed through adhesive work applied to the front and back of the support sheets 20a, 20b.

Figure 1A:
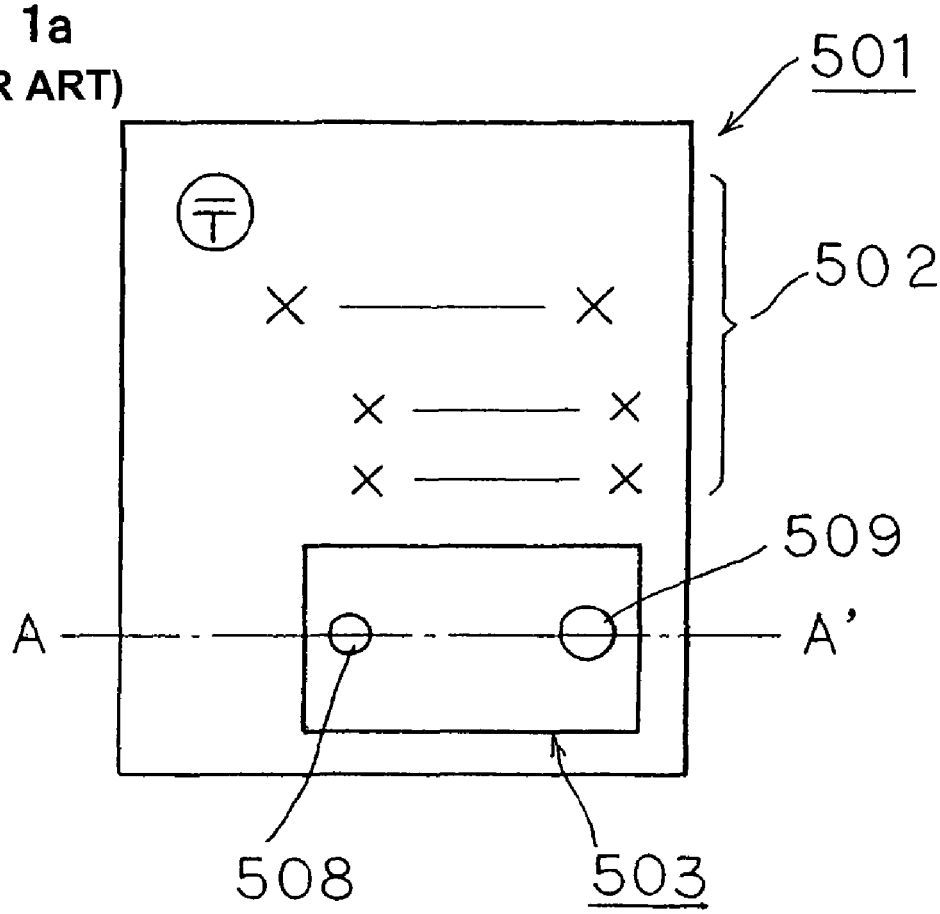
FIG. 1a is a plan view of an information carrier with an audio apparatus capable of recording/reproducing audio information incorporated in a direct mail.
Figure 1B:
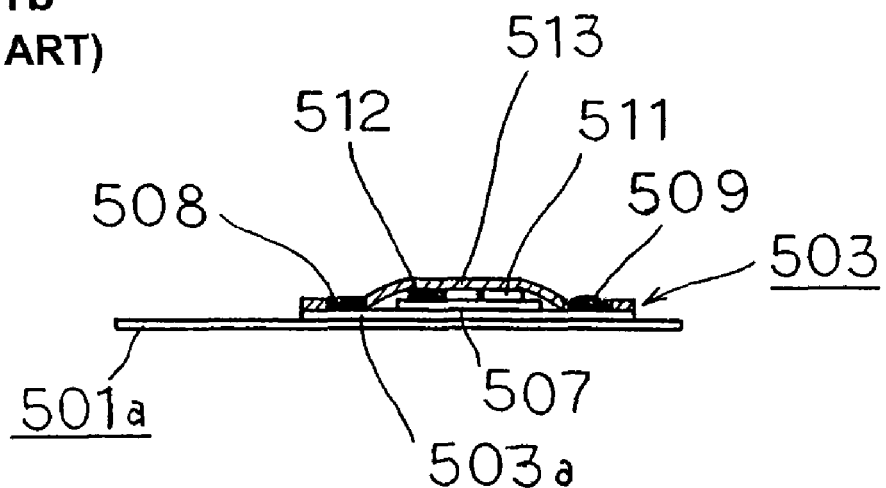

Furthermore, of the two surface sheets 10a, 10b, the surface sheet 10a facing the switch 33 and IC chip 34 through the holes 22, 23 of the support sheet 20a is provided with an information display area 2 where address information, etc., is printed when this audio message transfer sheet 1 is mailed and the area facing the switch 33 through the hole 22 of the support sheet 20a is provided with a printed playback button 3 for operating the switch 33. Furthermore, in the area facing the audio information output section 40 through the hole 24a of the support sheet 20a, an audio output area 4 made up of an array of fine holes for outputting audio output from the audio information output section 40 is formed. Even when the front and back of the audio information output section 40 are covered with the surface sheets 10a, 10b, the formation of the audio output area 4 made up of an array of fine holes can compensate for a reduction of sound volume output from the audio information output section 40. In the audio output area 4, holes of 0.1 mm in diameter are formed horizontally and vertically at intervals of 1.5 mm through laser beam machining. Therefore, unlike punching or perforation using needles, etc., no burrs are formed and the holes are never clogged with burrs. Furthermore, in FIG. 1, though the information display area 2 is not provided above the audio output area 4, information including the playback button 3 is actually printed over the entire surface of the surface sheet 10a, and therefore the information display area 2 may also be provided above the audio output area 4. Furthermore, instead of providing the playback button 3 on the surface sheet 10a by printing, it is also possible to paste a seal to the area facing the switch 33 after information is printed on the surface sheet 10a.

Here, in the case of the audio message transfer sheet 1 structured as described above, the audio information recording/reproducing section 30 is laminated with only part thereof sandwiched between the two support sheets 20a, 20b from front and back as mentioned above and fixed through adhesive work applied to the front and back of the support sheets 20a, 20b. Since the support sheets 20a, 20b are provided with holes 21a, 21b, 22, 23, 24a, 24b in the areas facing the paper batteries 31, switch 33, IC chip 34 and audio information output section 40 of the audio information recording/reproducing section 30, when the support sheets 20a, 20b and the audio information recording/reproducing.section 30 are laminated, it is necessary to precisely align the holes 21a, 22, 23, 24a formed in the support sheet 20a with the holes 21b, 24b formed in the support sheet 20b.

Therefore, the support sheets 20a, 20b may be made up of one sheet so that two support sheets 20a, 20b are constructed by folding this one sheet and the holes 21a, 22, 23, 24a formed in the support sheet 20a are aligned precisely with the holes 21 b, 24b formed in the support sheet 20b.

Figure 5A:
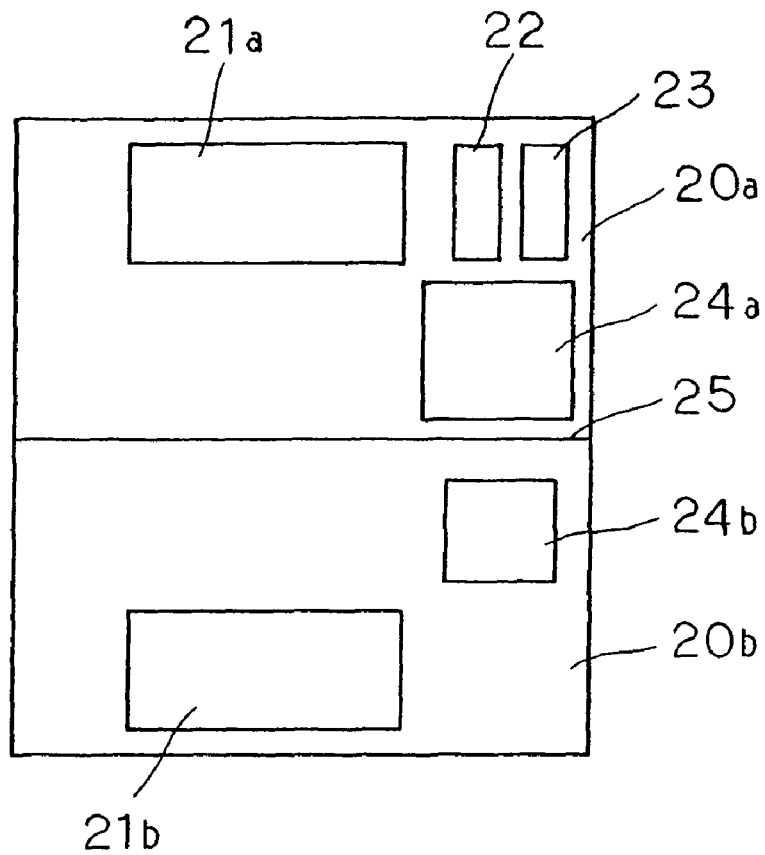
FIG. 5a illustrates a structure when the two support sheets shown in FIG. 2c and FIG. 3 are made up of one sheet.
Figure 5B:
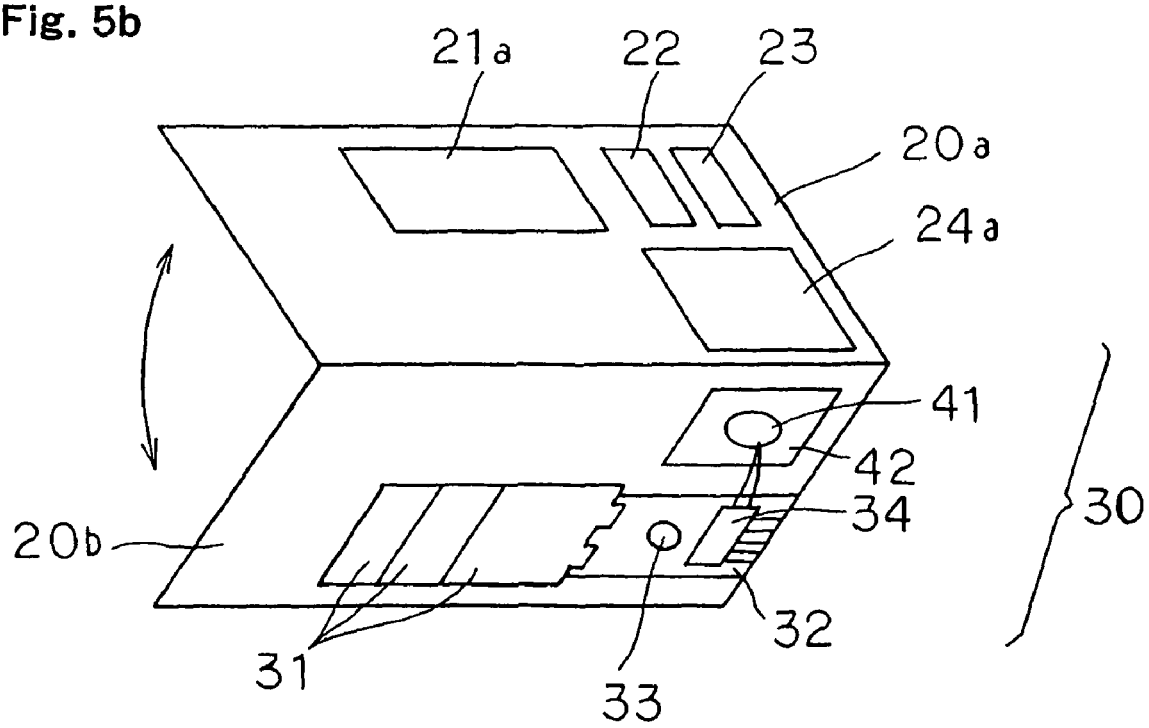

FIG. 5a illustrates a structure of the two support sheets 20a, 20b shown in FIG. 2c and FIG. 3 constructed of one sheet and FIG. 5b illustrates how the sheet is folded along the bend line 25 shown in FIG. 5a.

As shown in FIGS. 5a, 5b, the two support sheets 20a, 20b shown in FIG. 2c and FIG. 3 are mutually connected along the half-cut bend line 25, the support sheets 20a, 20b are folded along the bend line 25 so that the audio information recording/reproducing section 30 is sandwiched between these two support sheets 20a, 20b and the audio information recording/reproducing section 30 is fixed through adhesive work applied to both surfaces of the support sheets 20a, 20b. In this way, the holes 21a, 22, 23, 24a formed in the support sheet 20a are precisely aligned with the holes 21b, 24b formed in the support sheet 20b.

The structure of the audio information output section 40 will be explained in detail below.

Figure 6:
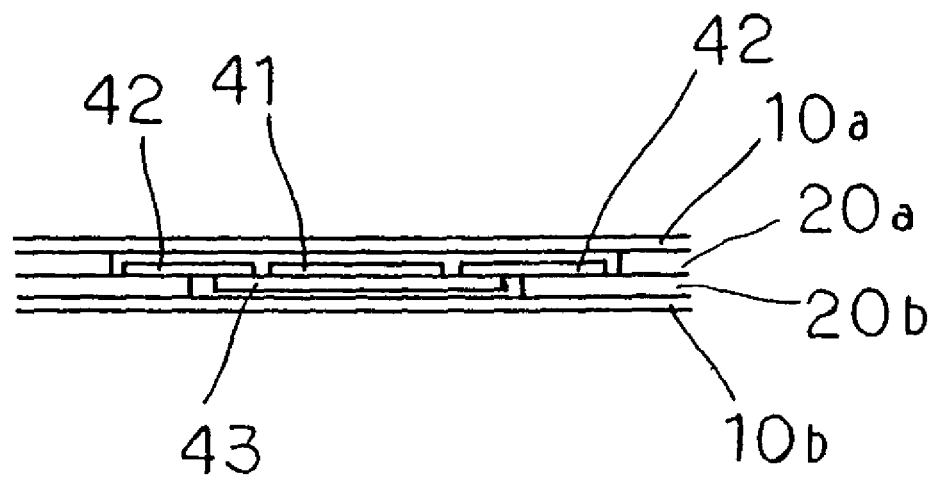
FIG. 6 illustrates the structure of the audio information output section shown in FIG. 2b.

FIG. 6 illustrates the structure of the audio information output section 40 shown in FIG. 2b and is a cross-sectional view around the audio information output section 40 of the audio message transfer sheet 1 shown in FIG. 2b.

As shown in FIG. 6, the audio information output section 40 in this embodiment is constructed of a flexible piezo-electric element 41 for outputting audio information recorded in the IC chip 34, a flexible film sheet 43 pasted to one side of the piezo-electric element 41 and a flexible diaphragm 42 pasted to the film sheet 43 and made of styrene paper, etc., for amplifying vibration of the piezo-electric element 41. Here, the diameter of the film sheet 43 is designed to be greater than the diameter of the piezo-electric element 41, and therefore when the piezo-electric element 41 is pasted to the film sheet 43, an area where the piezo-electric element 41 is not pasted and exposed remains around the piezo-electric element 41 on the surface of the film sheet 43 to which the piezo-electric element 41 is not pasted. Furthermore, the diaphragm 42 is designed to have a hole having a diameter greater than that of the piezo-electric element 41 and smaller than the diameter of the film sheet 43, and therefore the diaphragm 42 can be pasted to only the film sheet 43 so that the piezo-electric element 41 can fit into this hole on the surface of the film sheet 43 to which the piezo-electric element 41 is pasted. This diaphragm 42 is bonded to the support sheet 20b in the area out of the surface to which the film sheet 43 is pasted where the film sheet 43 is not pasted through adhesive work applied to both sides of the support sheet 20b. This prevents the thickness of the area where the audio information output section 40 is provided from increasing and causes the audio information output section 40 to be fixed to the surface sheets 10a, 10b without being bonded, thus avoiding the vibration of the piezo-electric element 41 and diaphragm 42 from being interfered. Furthermore, setting the length of one side of the diaphragm 42 to, for example, 2.8 times the diameter of the piezo-electric element 41 can obtain the maximum sound volume effect of audio information output from the piezo-electric element 41. The audio information output section 40 structured in this way can also function as a microphone for inputting audio information, and in that case, a switch (not shown) for inputting audio information through the audio information output section 40 needs to be provided on the audio substrate 32. Furthermore, for the piezo-electric element 41, it is possible to use a PZT-PMN based (lead-zirconate-titanate+lead magnesium niobate) material having a diameter of 27 mm, thickness of 0.16 mm.

The structure of the periphery of the switch 33 will be explained in detail below.

Figure 7:
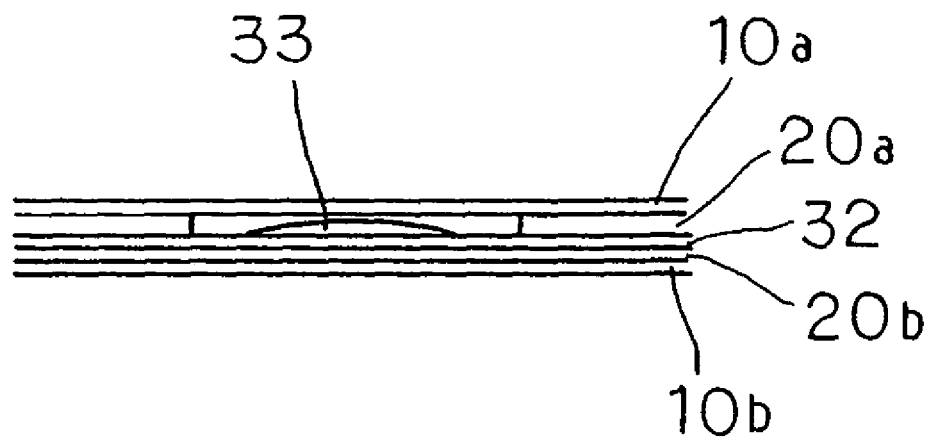
FIG. 7 is a cross-sectional view around the switch of the audio message transfer sheet shown in FIG. 2b.

FIG. 7 is a cross-sectional view of the periphery of the switch 33 of the audio message transfer sheet 1 shown in FIG. 2b.

The switch 33 shown in FIG. 2b has flexibility. Furthermore, as shown in FIG. 7, of the support sheets 20a, 20b in the area where the switch 33 is mounted, only the support sheet 20a is provided with a hole 22 in the area facing the switch 33, and therefore the audio substrate 32 is sandwiched and fixed by the two support sheets 20a, 20b around the switch 33, while in the area of the audio substrate 32 where the switch 33 is mounted, the audio substrate 32 is mounted on one support sheet 20b and fixed through adhesive work applied to both sides of the support sheet 20b.

Here, if the height of the switch 33 is assumed to be smaller than the thickness of the support sheet 20a, the switch 33 is surrounded by the support sheet 20a which is thicker than the height of the switch 33, which avoids the switch 33 from being operated when a force majeure is applied from outside. When the audio message transfer sheet is passed through a destination sorter using postal code (mail-sorting system), this prevents the playback button 3 from being pressed and the paper batteries 31 from being uselessly consumed or audio information recorded in the IC chip 34 from being overwritten or erased during delivery.

A method of recording audio information in the above described audio message transfer sheet 1 will be explained below.

As described above, audio information may be recorded in the IC chip 34 through the audio information output section 40, but in that case, noise may be mixed into the audio information, drastically degrading the quality of sound recorded in the IC chip 34. Therefore, the connection terminals 35 provided on the audio substrate 32 are connected to the audio input source so that the audio information is recorded in the IC chip 34 through the connection terminals 35, thus making it possible to record the audio information in the IC chip 34 without any noise getting therein. In this case, instead of connecting the paper batteries 31 to the audio substrate 32, if the audio substrate 32 is supplied with power from outside through the connection terminals 35, the paper batteries 31 will not be consumed when audio information is recorded in the IC chip 34.

The above described audio message transfer sheet 1 may be formed into a postal card size and used as mail or may be formed into a card size and used as a business card or a message card with audio, etc.

Second Embodiment

Figure 8A:
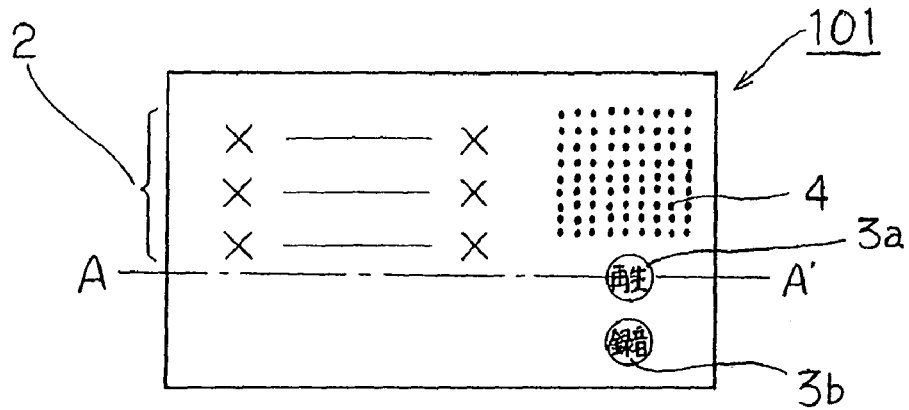
FIG. 8a is a plan view of an audio message transfer sheet according to a second embodiment of the present invention.
Figure 8B:
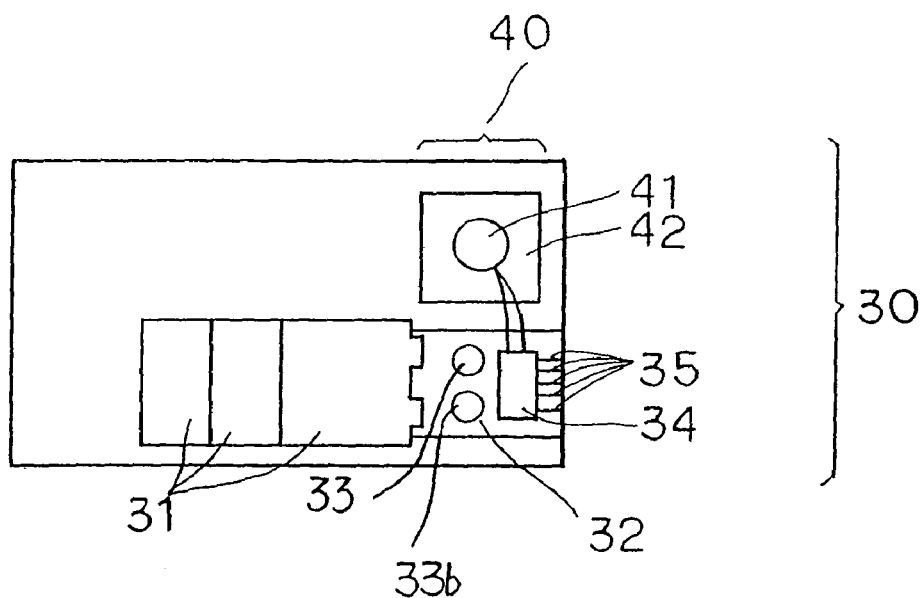
Figure 8C:
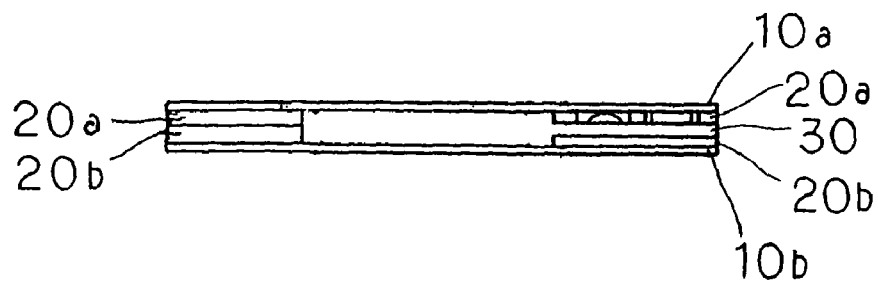

FIG. 8a is a plan view of an audio message transfer sheet according to a second embodiment of the present invention, FIG. 8b illustrates an inner structure of the audio message transfer sheet shown in FIG. 8a and FIG. 8c is a cross-sectional view along the line A-A' shown in FIG. 8a.

As shown in FIGS. 8a to 8c, this embodiment differs from the first embodiment only in that the audio substrate 32 is provided with a switch 33b to be pressed when audio information is recorded in the IC chip 34 and a recording button 3b is printed on an area facing the switch 33b of the surface sheet 10a. As in the case of the playback button 3a, the recording button 3b may not necessarily be printed on the surface sheet 10a but it is also possible to print information on the surface sheet 10a and then paste a seal to the area facing the switch 33b.

In the audio message transfer sheet 101 structured as described above, when audio information is recorded in the IC chip 34, if audio information is input through the audio information output section 40 with the recording button 3b provided on the surface sheet 10a held down, the audio information input through the audio information output section 40 is recorded in the IC chip 34 and if the playback button 3a provided on the surface sheet 10a is pressed, the audio information recorded in the IC chip 34 is output through the audio information output section 40.

Third Embodiment

Figure 9A:
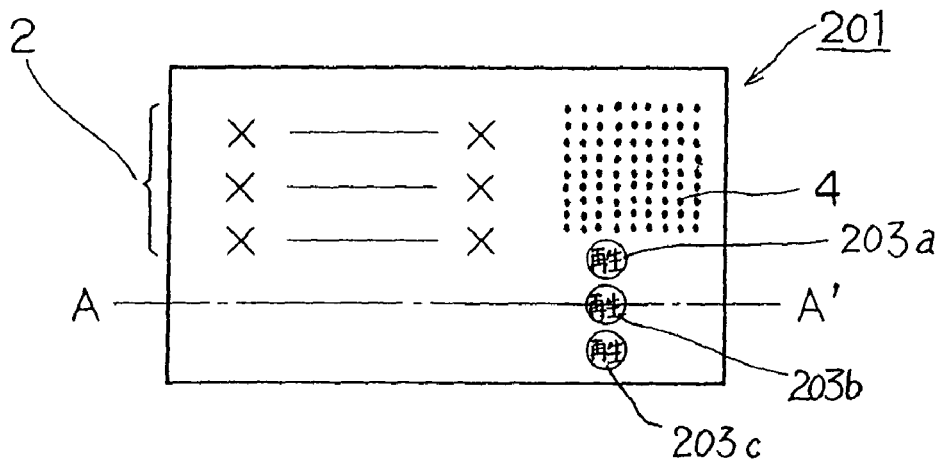
FIG. 9a is a plan view of an audio message transfer sheet according to a third embodiment of the present invention.
Figure 9B:
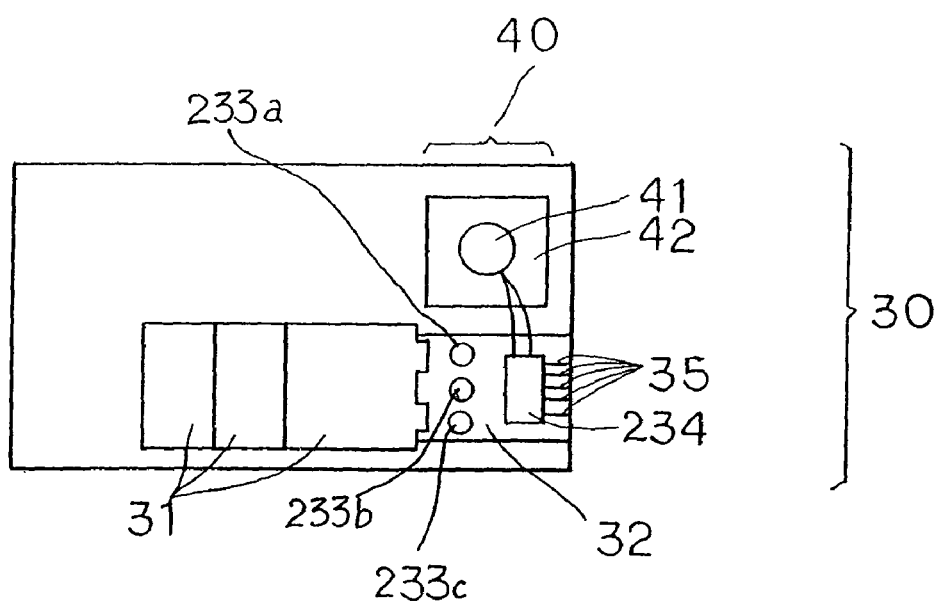
Figure 9C:
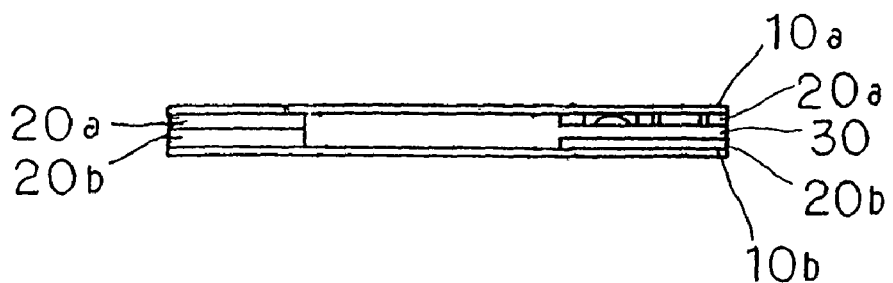
Figure 10:
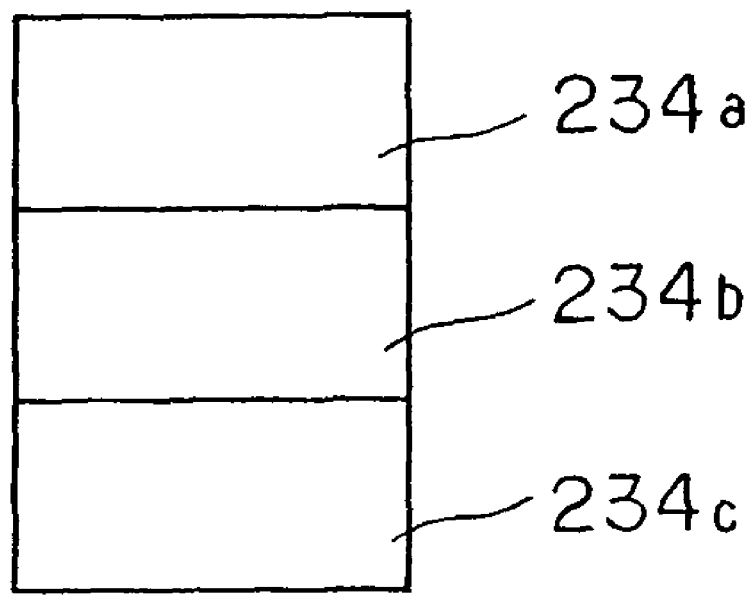
FIG. 10 illustrates a recording area of the IC chip shown in FIG. 9b.

FIG. 9a is a plan view of an audio message transfer sheet according to a third embodiment of the present invention, FIG. 9b illustrates an inner structure of the audio message transfer sheet 201 shown in FIG. 9a and FIG. 9c is a cross-sectional view along the line A-A' shown in FIG. 9a. Furthermore, FIG. 10 illustrates a recording area of the IC chip 234 shown in FIG. 9b.

As shown in FIGS. 9a, 9b, this embodiment is equivalent to the first embodiment further provided with three switches 233a to 233c to be pressed when audio information recorded in an IC chip 234 is reproduced on an audio substrate 32 and three playback buttons 203a to 203c printed in the areas facing the switches 233a to 233c on a surface sheet 10a. Furthermore, as shown in FIG. 10, the recording area of the IC chip 234 in which audio information is recorded is divided into three areas 234a to 234c and different pieces of audio information are recorded in the respective areas 234a to 234c.

In the audio message transfer sheet 201 structured as described above, of the three playback buttons 203a to 203c, when the playback button 203a is pressed, for example, the audio information recorded in the recording area 234a of the IC chip 234 out of the audio information recorded in the IC chip 234 is output from the audio information output section 40, when the playback button 203b is pressed, the audio information recorded in the recording area 234b of the IC chip 234 out of the audio information recorded in the IC chip 234 is output from the audio information output section 40, and when the playback button 203c is pressed, the audio information recorded in the recording area 234c of the IC chip 234 out of the audio information recorded in the IC chip 234 is output from the audio information output section 40.

In this way, by recording a plurality of pieces of audio information in one IC chip 234 and selectively pressing the plurality of playback buttons 203a to 203c provided on the surface sheet 10a, it is possible to selectively output a plurality of pieces of audio information recorded in the IC chip 234 from the audio information output section 40.

This embodiment is provided with three playback buttons 203a to 203c and switches 233a to 233c and the information recording area in the IC chip 234 is divided into three areas 234a to 234c, but the number of playback buttons and switches and the number of portions into which the information recording area in the IC chip is divided is not limited to 3.

Fourth Embodiment

Figure 11A:
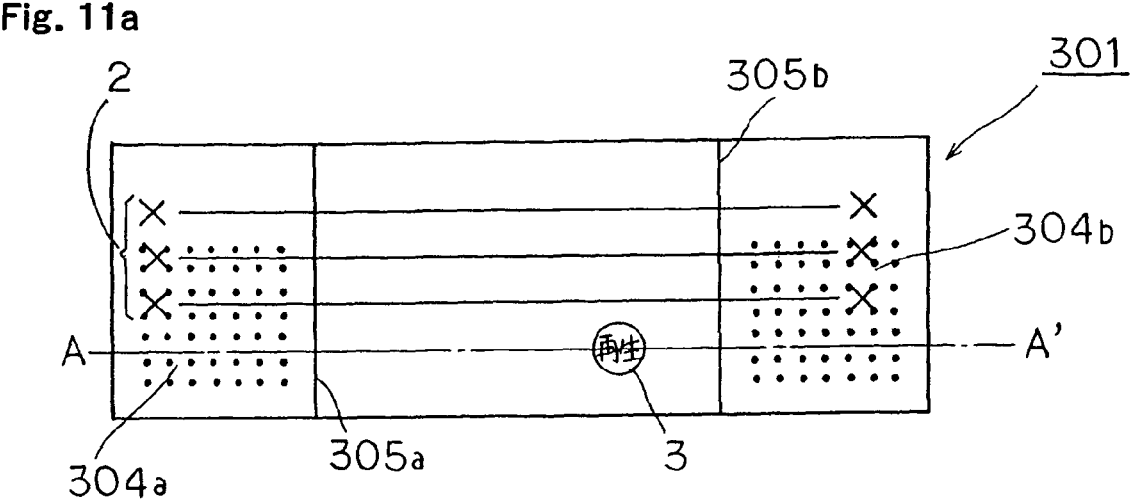
FIG. 11a is a plan view of an audio message transfer sheet according to a fourth embodiment of the present invention.
Figure 11B:
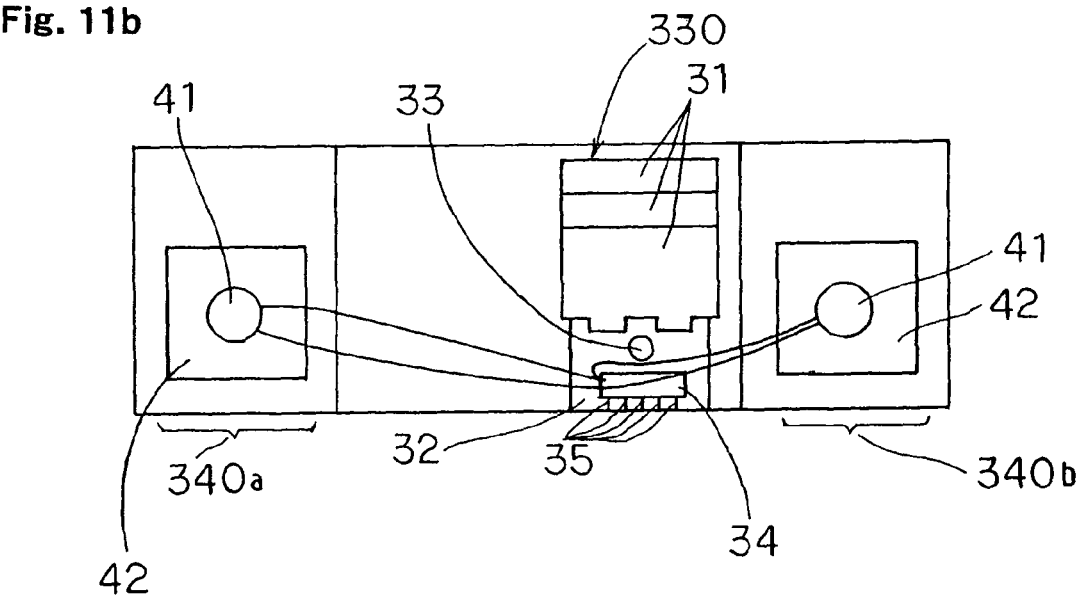
Figure 11C:
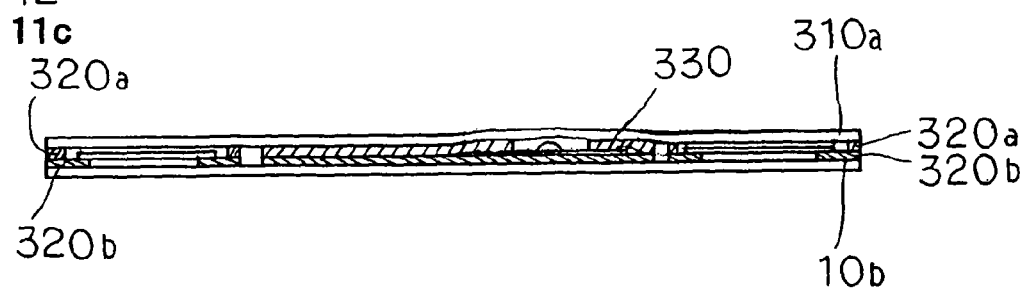

FIG. 11a is a plan view of an audio message transfer sheet according to a fourth embodiment of the present invention, FIG. 11b illustrates an inner structure of the audio message transfer sheet 301 shown in FIG. 11a and FIG. 11c is a cross-sectional view along the line A-A' shown in FIG. 11a.

As shown in FIGS. 11a to 11c, this embodiment is equivalent to the first embodiment further provided with two audio information output sections 340a, 340b on an audio information recording/reproducing section 330, and a surface sheet 310a is provided with audio output areas 304a, 304b for outputting audio information from these audio information output sections 340a, 340b through bend lines 305a, 305b. Furthermore, support sheets 320a, 320b are divided into three portions so as to correspond to three adjoining areas along the bend lines 305a, 305b of the surface sheet 310a so that the audio output areas 304a, 304b can be folded along the bend lines 305a, 305b. An information display area 2 is provided so as to span three adjoining areas along the bend lines 305a, 305b.

In the audio message transfer sheet 301 structured as described above, audio information recorded in an IC chip 34 is output from the two audio information output sections 340a, 340b, and therefore it is possible to increase the sound volume of the output audio information compared to the first embodiment. In this case, a piezo-electric element 41 is used as a device for outputting the audio information recorded in the IC chip 34, and therefore even when the audio information recorded in the IC chip 34 is output from the two audio information output sections 340a, 340b, the life of paper batteries 31 is not shortened.

Furthermore, since the two audio output areas 304a, 304b are foldable along the two bend lines 305a, 305b, when the audio information recorded in the IC chip 34 is not output from the audio information output sections 340a, 340b, the audio output areas 304a, 304b can be folded along the bend lines 305a, 305b so as to improve the portability of the audio message transfer sheet 301. For example, setting the size of the sheet when the audio output areas 304a, 304b are folded along the bend lines 305a, 305b to a business card size allows the audio message transfer sheet 301 to be housed in a business card case, etc.

Furthermore, it is also possible to cause different pieces of audio information to be output from the two audio information output sections 340a, 340b. This allows the receiver of the audio message transfer sheet 301 to listen to the information recorded in the IC chip 34 as stereophonic broadcast, for example.

This embodiment is provided with two audio information output sections 340a, 340b, but the number of audio information output sections is not limited to 2. Furthermore, an information display area 2 is provided extending over three adjoining areas along the bend lines 305a, 305b, but it is also possible to provide the information display area in only some of the adjoining three areas along the bend lines 305a, 305b.

Furthermore, according to this embodiment, one audio substrate 32 is connected to the two audio information output sections 340a, 340b, but it is also possible to provide one audio substrate for each of the audio information output sections 340a, 340b and output audio information recorded in IC chips provided on the audio substrates by operating the respective switches provided on the audio substrates.

Furthermore, according to this embodiment, the support sheets 320a, 320b are divided into three portions so as to correspond to the three adjoining areas along the bend lines 305a, 305b of the surface sheet 310a, but it is also possible to further divide the support sheets divided so as to correspond to the three adjoining areas along the bend lines 305a, 305b. Adopting such a structure further increases the degree of freedom in bending or folding the audio message transfer sheet 301. Dividing the support sheet into a plurality of portions in this way is not limited to this embodiment, but can also be applied to the above described first to fourth embodiments and fifth and sixth embodiments which will be described later.

Fifth Embodiment

Figure 12A:
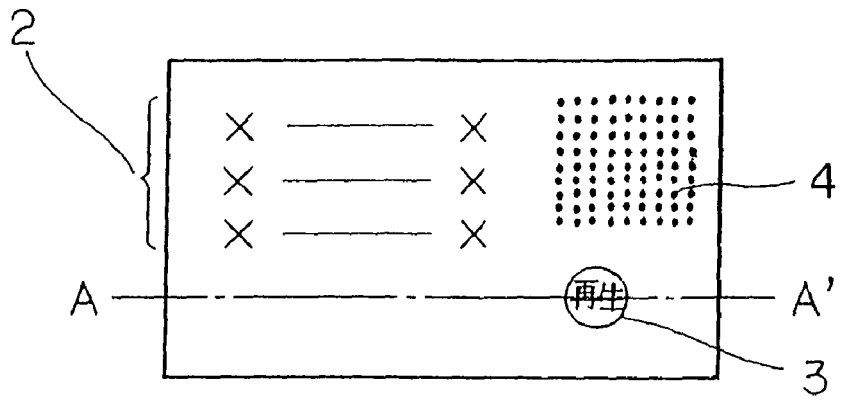
FIG. 12a is a plan view of an audio message transfer sheet according to a fifth embodiment of the present invention.
Figure 12B:
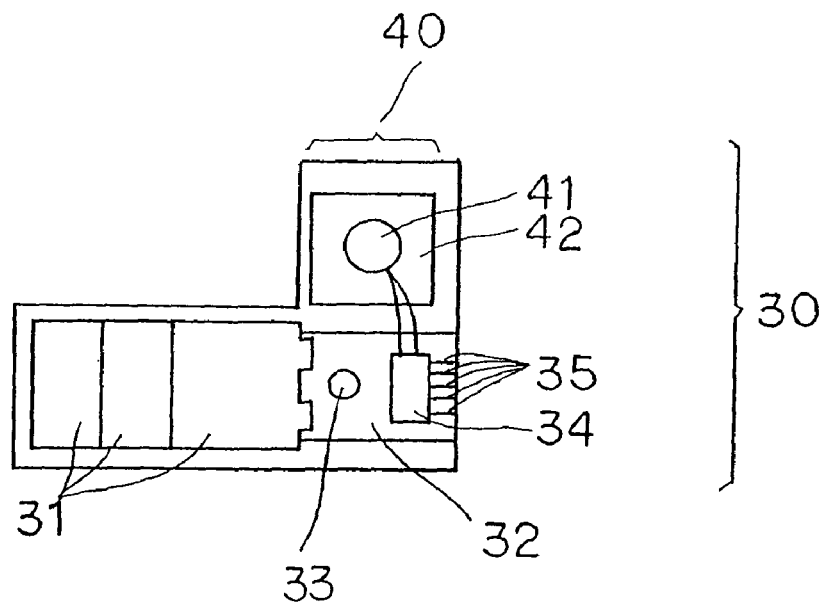
Figure 12C:
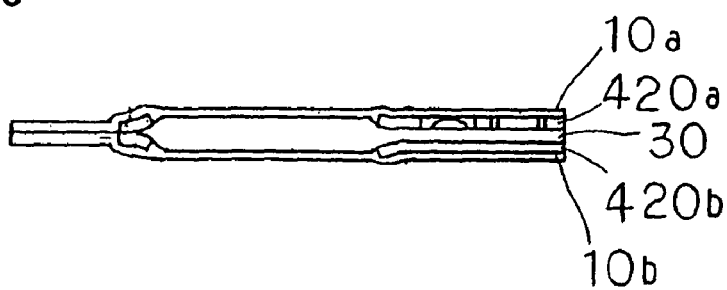

FIG. 12a is a plan view of an audio message transfer sheet according to a fifth embodiment of the present invention, FIG. 12b illustrates an inner structure of the audio message transfer sheet shown in FIG. 12a and FIG. 12c is a cross-sectional view along the line A-A' shown in FIG. 12a.

As shown in FIGS. 12a to 12c, this embodiment only differs from the first embodiment in that the outside shapes of support sheets 420a, 420b are smaller than the outside shapes of the surface sheets 10a, 10b.

Thus, the present invention is equally applicable to a case where the outside shapes of the support sheets 420a, 420b are smaller than the outside shapes of the surface sheets 10a, 10b and a case where the outside shapes of the support sheets 420a, 420b are greater than the outside shapes of the surface sheets 10a, 10b.

Sixth Embodiment

Figure 13A:
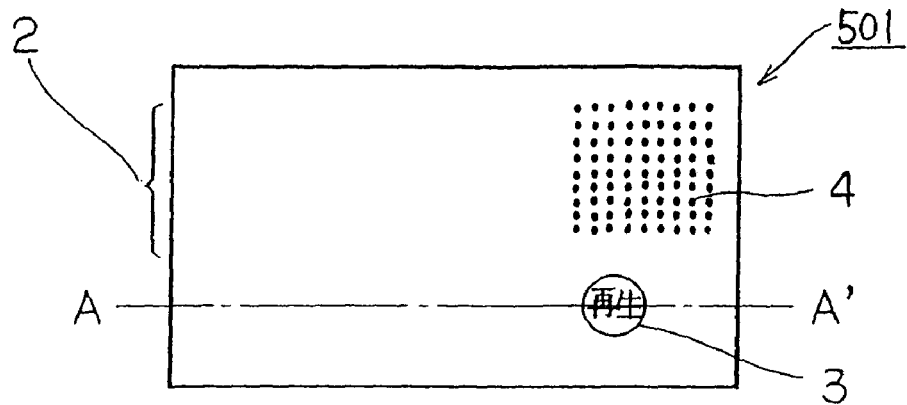
FIG. 13a is a plan view of an audio message transfer sheet according to a sixth embodiment of the present invention.
Figure 13B:
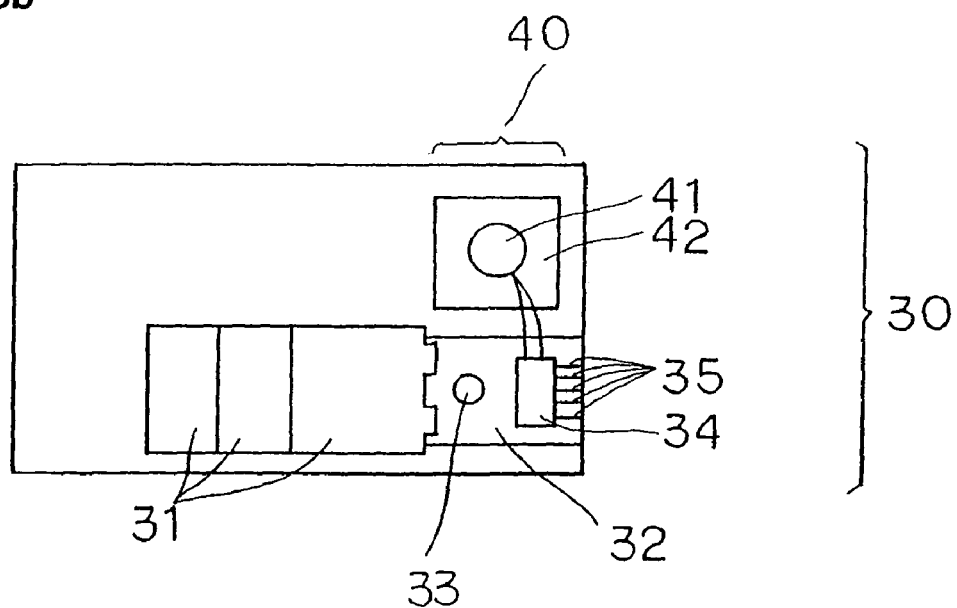
Figure 13C:
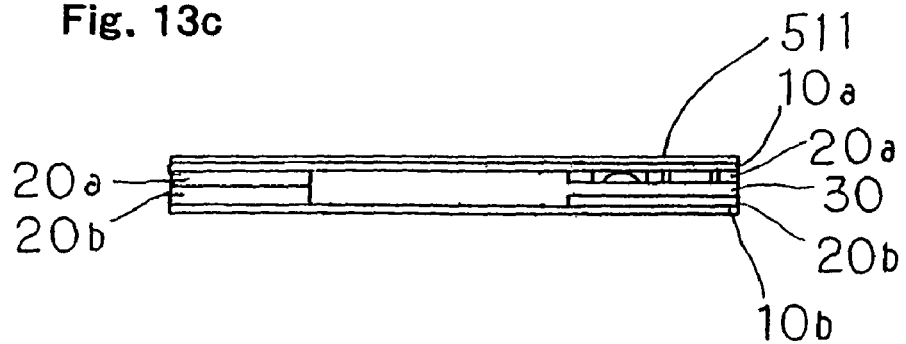

FIG. 13a is a plan view of an audio message transfer sheet according to a sixth embodiment of the present invention, FIG. 13b illustrates an inner structure of the audio message transfer sheet shown in FIG. 13a and FIG. 13c is a cross-sectional view along the line A-A' shown in FIG. 13a.

As shown in FIGS. 13a to 13c, this embodiment corresponds to the first embodiment with an ink receiving layer 511 superimposed on the surface of a surface sheet 10a not facing a support sheet 20a.

In the audio message transfer sheet 501 structured as described above, the ink receiving layer 511 is laminated on the surface of the surface sheet 10a not facing the support sheet 20a on which the information display area 2 is provided, and therefore when information is printed on an information display area 2 using an ink-jet printer, it is possible to print the information clearly on the information display area 2.

A method of manufacturing the above described audio message transfer sheet 501 will be explained below.

FIGS. 14a to 14f illustrate a method of manufacturing the audio message transfer sheet 501 shown in FIGS. 13a to 13c.

Figure 14A:
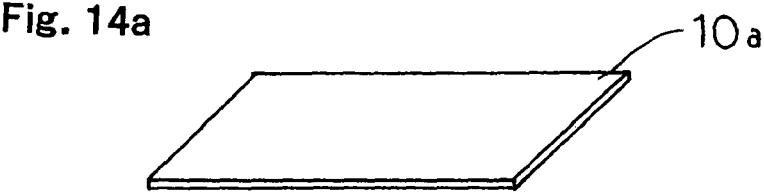
FIG. 14a illustrates a method of manufacturing the audio message transfer sheet shown in FIGS. 13a to 13c.
Figure 14B:
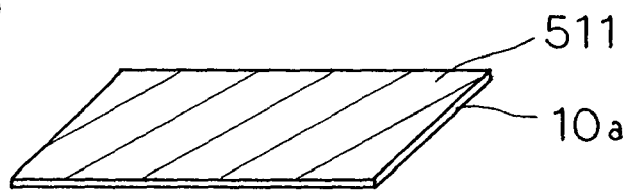
FIG. 14b illustrates a method of manufacturing the audio message transfer sheet shown in FIGS. 13a to 13c.

First, the ink receiving layer 511 as shown in FIG. 14b is superimposed on the surface sheet 10a as shown in FIG. 14a. When the surface sheet 10a is cut from continuous forms paper into single sheets, if the ink receiving layer 511 is superimposed on the surface sheet 10a of continuous forms paper, the ink receiving layer 511 can be easily superimposed.

Figure 14C:
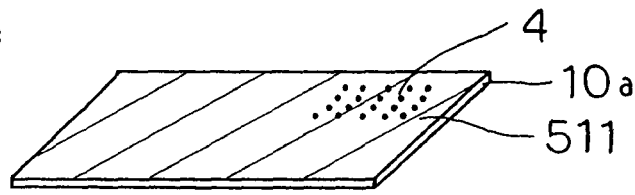
FIG. 14c illustrates a method of manufacturing the audio message transfer sheet shown in FIGS. 13a to 13c.

Next, as shown in FIG. 14c, holes of 0.1 mm in diameter are formed in the surface sheet 10a on which the ink receiving layer 511 is superimposed through laser beam machining as described above to provide an audio output area 4.

Figure 14D:
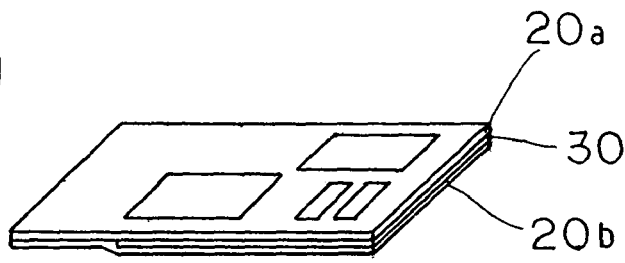
FIG. 14d illustrates a method of manufacturing the audio message transfer sheet shown in FIGS. 13a to 13c.

Furthermore, as shown in FIG. 14d, an audio information recording/reproducing section 30 is sandwiched between two support sheets 20a, 20b.

Figure 14E:
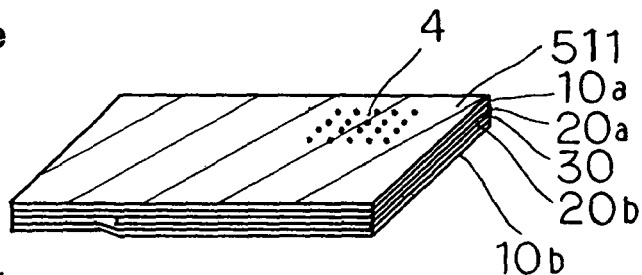
FIG. 14e illustrates a method of manufacturing the audio message transfer sheet shown in FIGS. 13a to 13c.

Then, as shown in FIG. 14e, the support sheets 20a, 20b between which the audio information recording/reproducing section 30 is sandwiched are further sandwiched between the surface sheets 10a, 10b.

Figure 14F:
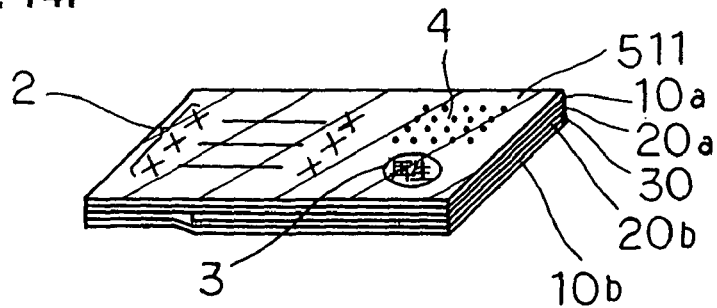
FIG. 14f illustrates a method of manufacturing the audio message transfer sheet shown in FIGS. 13a to 13c.

This completes an audio message transfer sheet with no information printed on the surface of the surface sheet 10a, and then as shown in FIG. 14f, a playback button 3 is printed on the surface sheet 10a on which the ink receiving layer 511 is superimposed and information is printed on the information display area 2 using an ink-jet printer.

This embodiment has explained the case where the ink receiving layer 511 is superimposed on the surface sheet 10a of the audio message transfer sheet 1 shown in the first embodiment as an example, but it is also possible to superimpose the ink receiving layer 511 on the surface sheet 10b of the audio message transfer sheet 1 or it is also possible to superimpose the ink receiving layer 511 only on the surface sheet 10a or on the surface sheets 10a, 10b of the audio message transfer sheet shown in the above described second to fifth embodiments.

In the inventions shown in the above described first to sixth embodiments, the audio information recording/reproducing means capable of recording/reproducing audio information has a sheet-like structure, and of the areas of the two support sheets between which the audio information recording/reproducing means is sandwiched from front and back, bonded together, facing the audio information recording/reproducing means, the audio information recording/reproducing means is sandwiched from front and back between only portions of those areas, and therefore the sheet can be easily bent or folded and information can be printed on the surface sheet.

Furthermore, when the two support sheets have the same outside shapes as those of the surface sheets, the thickness of the entire audio message transfer sheet can be made substantially uniform.

Furthermore, when the two support sheets are each divided into a plurality of portions, it is possible to increase the degree of freedom in bending and folding the audio message transfer sheet.

Furthermore, when the two support sheets are connected together along a bend line, the two support sheets can be easily aligned with each other.

Furthermore, in the case of the structure that the audio information outputting means provided on the audio information recording/reproducing means for outputting audio information is constructed of a piezo-electric element for outputting audio information, a film sheet having a larger diameter than that of the piezo-electric element, pasted to one surface of the piezo-electric element and a diaphragm having a hole with a diameter larger than the diameter of the piezo-electric element and smaller than the diameter of the film sheet, pasted to the film sheet so that the piezo-electric element fits into the hole, wherein the diaphragm is bonded to the support sheets only in the area not bonded to the film sheet of the surface of bonding with the film sheet, it is possible to prevent the thickness of the area in which the audio information outputting means is provided from increasing and cause the audio information outputting means to be fixed without being bonded to the surface sheet and thereby prevent vibration of the piezo-electric element and diaphragm from being interfered.

Furthermore, in the case of the structure that two support sheets sandwich the audio information recording/reproducing means around the operating means and the audio information recording/reproducing means is mounted on one support sheet in the area where the operating means is provided, if the height of the operating means is smaller than the thickness of the support sheet, the operating means is surrounded by the support sheet whose thickness is greater than the height of the operating means, which makes it possible to avoid the operating means from being operated when a force majeure is applied from outside.

Furthermore, in the case of the structure that an ink receiving layer is superimposed on the surface not facing at least one support sheet of the two surface sheets, if information is printed on the surface sheet using an ink-jet printer later, it is possible to clearly print information on the surface sheet.

Furthermore, in the case of the structure that this ink receiving layer is superimposed on the surface sheet before the support sheets between which the audio information recording/reproducing means is sandwiched are sandwiched between the surface sheets, it is possible to superimpose the ink receiving layer with excellent flatness of the surface sheets and when the surface sheet is cut from continuous forms paper into single pieces, the ink receiving layer is superimposed on the surface sheet of the continuous forms paper, facilitating the superimposition of the ink receiving layer.

Seventh Embodiment

Figure 15A:
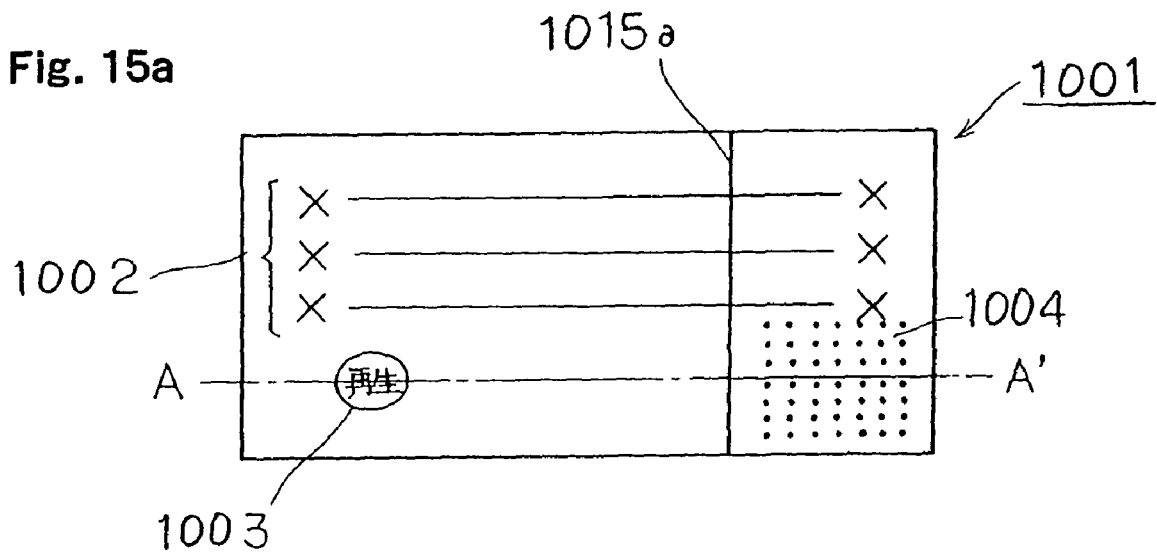
FIG. 15a is a plan view of an audio information output sheet according to a seventh embodiment of the present invention.
Figure 15B:
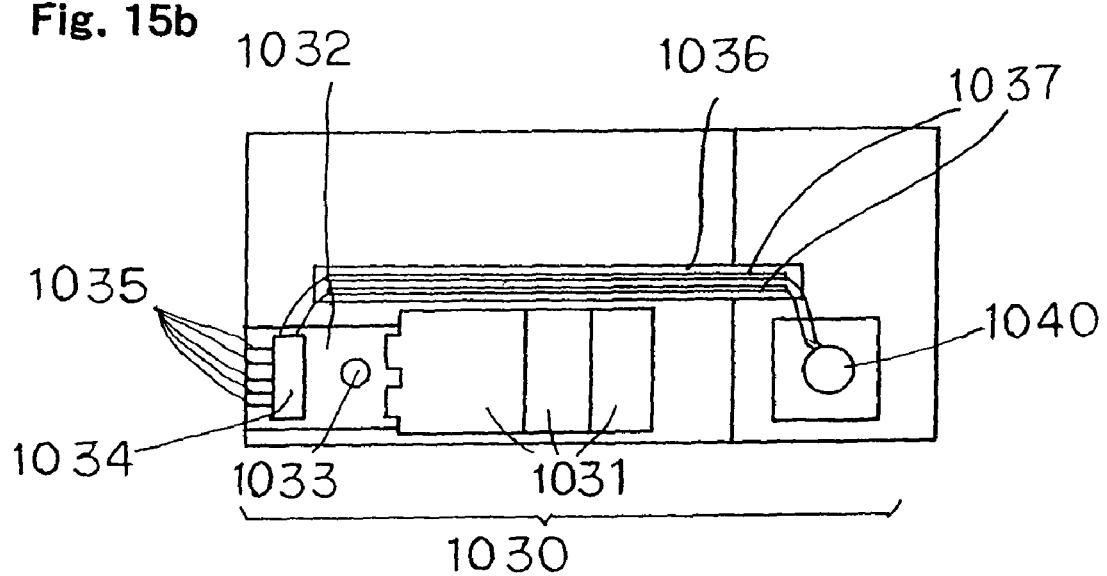
Figure 15C:
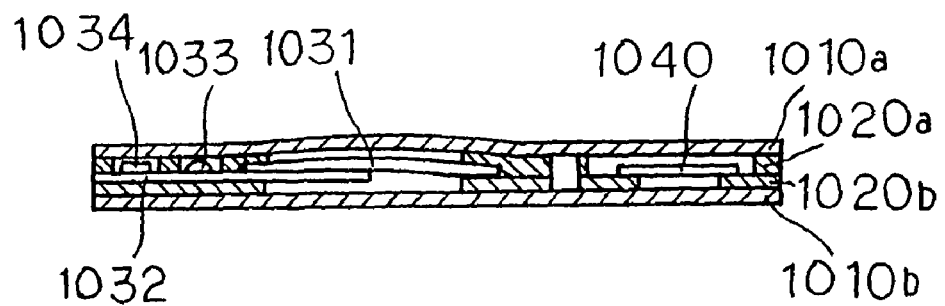
Figure 16:
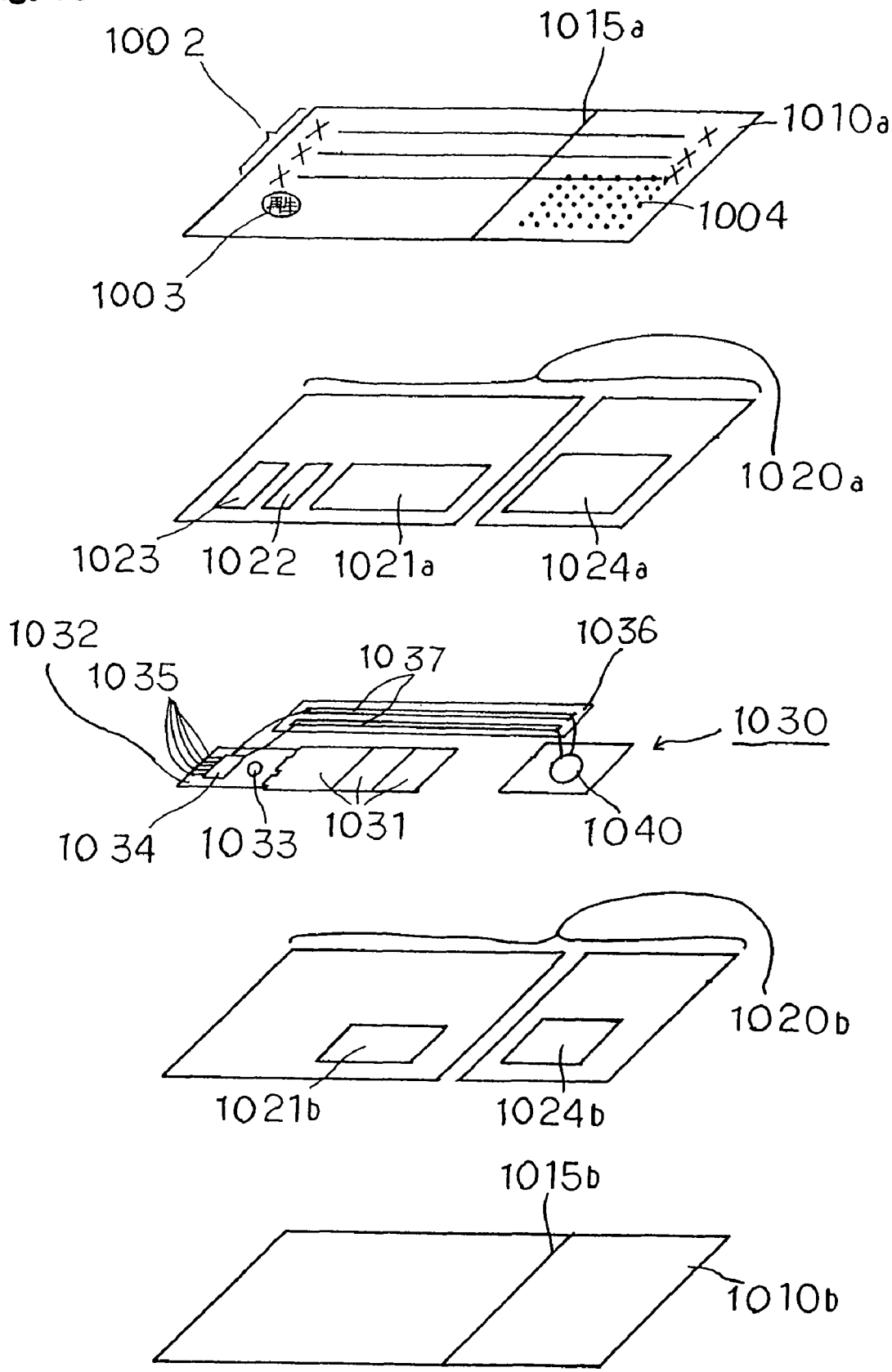
FIG. 16 illustrates a laminated structure of the audio information output sheet shown in FIGS. 15a to 15c.

FIG. 15a is a plan view of an audio information output sheet according to a seventh embodiment of the present invention, FIG. 15b illustrates an inner structure of the audio information output sheet shown in FIG. 15a and FIG. 15c is a cross-sectional view along the line A-A' shown in FIG. 15a. Furthermore, FIG. 16 illustrates a laminated structure of the audio information output sheet 1 shown in FIGS. 15a to 15c.

As shown in FIGS. 15a to 15c and FIG. 16, this embodiment is constructed in such a way that a sheet-like audio information recording/reproducing section 1030 capable of recording/reproducing audio information is sandwiched between two support sheets 1020a, 1020b made of a flexible, thin base material such as paper base material, the support sheets 1020a, 1020b between which the audio information recording/reproducing section 1030 is sandwiched are sandwiched between two surface sheets 1010a, 1010b made of a flexible, thin base material such as paper base material and the sheets can be folded along the areas in which bend lines 1015a, 1015b of the surface sheets 1010a, 1010b are provided as bend lines. The surface sheets 1010a, 1010b, support sheets 1020a, 1020b and audio information recording/reproducing section 1030 are bonded to one another through adhesive work applied to the front and back of the support sheets 1020a, 1020b. This adhesion can be realized by pasting a double-faced tape to the front and back of the support sheets 1020a, 1020b or applying a hot-melt type adhesive thereto.

Furthermore, the audio information recording/reproducing section 1030 is constructed of a sheet-like audio information output section 1040 for outputting recorded audio information, an audio substrate 1032 mounted with a thin IC chip 1034 which is an audio information recording section for recording audio information and a thin switch 1033 which is operated to output the audio information recorded in the IC chip 1034 from the audio information output section 1040, and flexible paper batteries 1031 connected to the audio substrate 1032 for supplying power to the audio substrate 1032 and a connection substrate 1036 made of a polyimide film on which a wiring pattern 1037 for connecting the IC chip 1034 and the audio information output section 1040 is formed, and the audio substrate 1032 is further provided with connection terminals 1035 for inputting/outputting audio information to/from the IC chip 1034 from/to outside. In this way, the audio information recording/reproducing section 1030 has a sheet-like structure. Here, the audio substrate 1032 is a flexible, thin substrate made of fiberglass reinforced plastics (FRP), polyethylene terephthalate (PET), polyimide or lead frame, etc., with the IC chip 1034 bonded thereto by means of anisotropic/conductive adhesive (ACP), anisotropic/conductive film (ACF) or wire bonding. A connection substrate 1036 is not limited to one made up of a polyimide film but any film made of resin such as PET having at least flexibility can be used.

Furthermore, when superimposed on the surface sheet 1010*a*, the support sheet 1020*a* is divided into two portions through the area facing the bend line 1015*a* and when superimposed on the audio information recording/reproducing section 1030, holes 1021*a*, 1022, 1023, 1024*a* are formed in the areas facing the paper batteries 1031, switch 1033, IC chip 1034 and audio information output section 1040 respectively. Furthermore, when superimposed on the surface sheet 1010*b*, the support sheet 1020*b* is divided into two portions through the area facing the bend line 1015*b* and when superimposed on the audio information recording/reproducing section 1030, holes 1021*b*, 1024*b* are formed in the areas facing the paper batteries 1031 and audio information output section 1040 respectively.

Furthermore, the connection substrate 1036 for connecting the IC chip 1034 and audio information output section 1040 is provided sandwiched between the divided areas of the support sheets 1020*a*, 1020*b*.

Figure 17A:
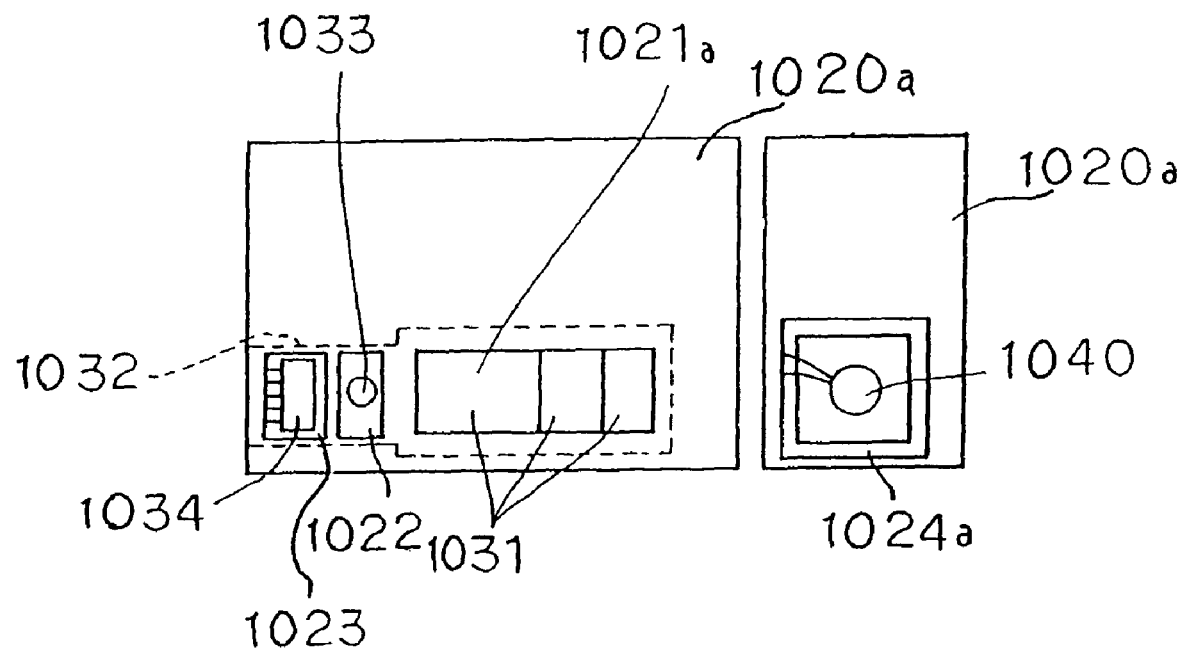
FIG. 17a illustrates a laminated structure of the support sheet and audio information recording/reproducing section shown in FIGS. 15b, 15c and FIG. 16.

FIG. 17*a* illustrates a laminated structure of the support sheet 1020*a* and audio information recording/reproducing section 1030 shown in FIGS. 15*b*, 15*c* and FIG. 16 and FIG. 17*b* illustrates a laminated structure of the support sheet 1020*b* and audio information recording/reproducing section 1030 shown in FIGS. 15*b*, 15*c* and FIG. 16.

As shown in FIG. 17*a*, the hole 1021*a* formed in the area of the support sheet 1020*a* facing the paper batteries 1031 is smaller than the paper batteries 1031 and the hole 1022 formed in the area facing the switch 1033 is greater than the switch 1033, the hole 1023 formed in the area facing the IC chip 1034 is greater than the IC chip 1034 and the hole 1024*a* formed in the area facing the audio information output section 1040 is greater than the audio information output section 1040.

Figure 17B:
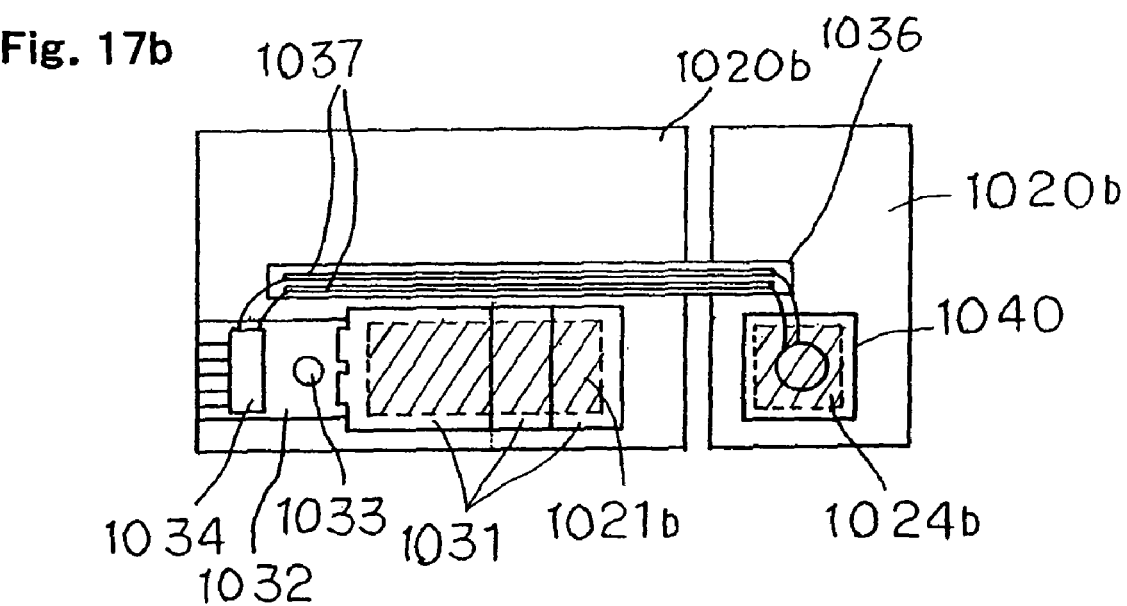
FIG. 17b illustrates a laminated structure of the support sheet and audio information recording/reproducing section shown in FIGS. 15b, 15c and FIG. 16.

Furthermore, as shown in FIG. 17*b*, the hole 1021*b* formed in the area of the support sheet 1020*b* facing the paper batteries 1031 is smaller than the paper batteries 1031 and the hole 1024*b* formed in the area facing the audio information output section 1040 is smaller than the audio information output section 1040.

In this way, the audio information recording/reproducing section 1030 is laminated so that only part thereof is sandwiched between the two support sheets 1020*a*, 1020*b* from front and back and fixed through adhesive work applied to the front and back of the support sheets 1020*a*, 1020*b*.

Furthermore, of the two surface sheets 1010*a*, 1010*b*, the surface sheet 1010*a* facing the switch 1033 and IC chip 1034 through the holes 1022, 1023 of the support sheet 1020*a* is provided with an information display area 1002 where address information, etc., is printed when this audio message transfer sheet 1001 is used, for example, as a business card and the area facing the switch 1033 through the hole 1022 of the support sheet 1020*a* is provided with a playback button 1003 for operating the switch 1033. Furthermore, in the area facing the audio information output section 1040 through the hole 1024*a* of the support sheet 1020*a*, an audio output area 1004 made up of an array of fine holes for outputting audio output from the audio information output section 1040 is formed and the area where the audio output area 1004 is formed is foldable along the bend line 1015*a* with respect to the other areas. Even when the front and back of the audio information output section 1040 are covered with the surface sheets 1010*a*, 1010*b*, the formation of the audio output area 1004 made up of an array of fine holes can compensate for a reduction of sound volume output from the audio information output section 1040. In the audio output area 1004, holes of 0.1 mm in diameter are formed horizontally and vertically at intervals of 1.5 mm through laser beam machining.

A method of use of the audio information output sheet 1001 structured as described above will be explained below.

Figure 18A:
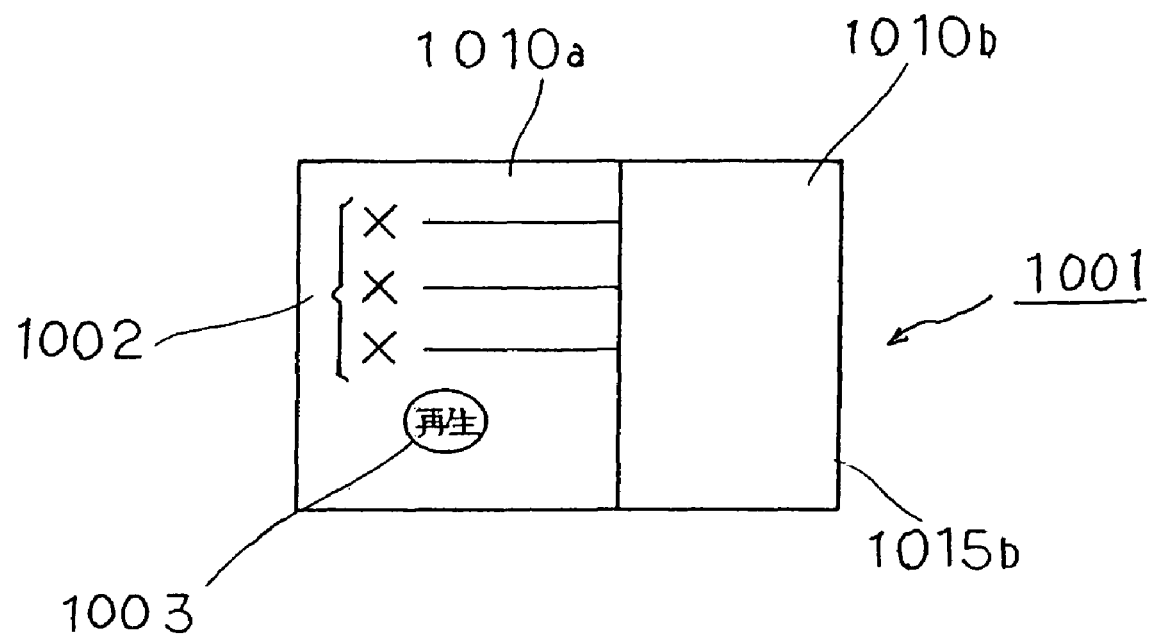
FIG. 18a illustrates the audio information output sheet shown in FIGS. 15a to 15c and FIG. 16 not in use.
Figure 18B:
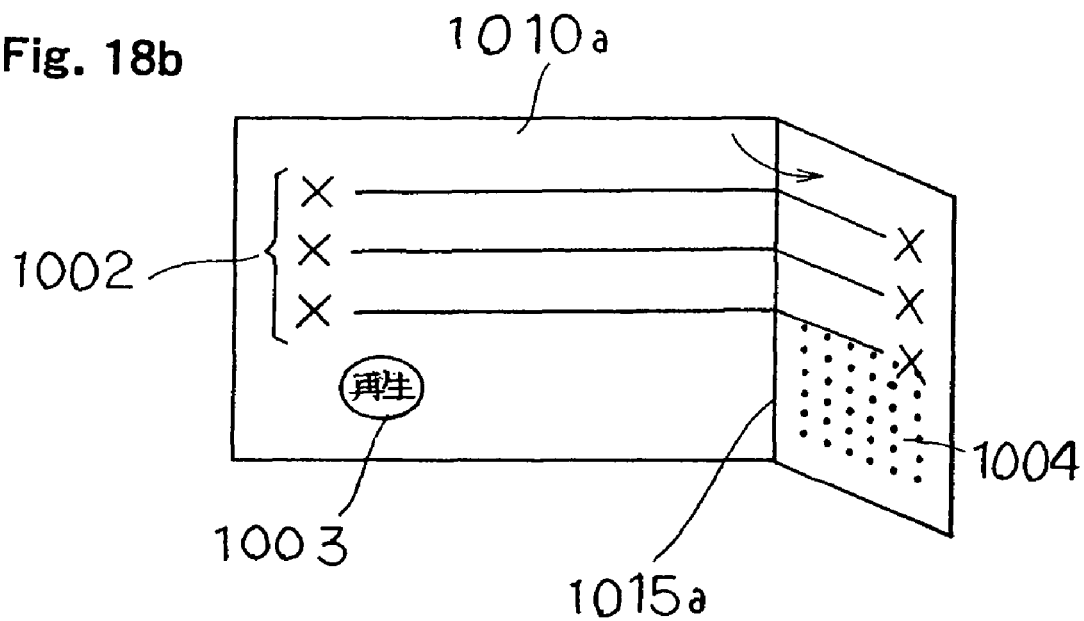
FIG. 18b illustrates the audio information output sheet shown in FIGS. 15a to 15c and FIG. 16 in use.

FIG. 18*a* illustrates the audio information output sheet 1001 shown in FIGS. 15*a* to 15*c* and FIG. 16 not in use and FIG. 18*b* illustrates the audio information output sheet 1001 shown in FIGS. 15*a* to 15*c* and FIG. 16 in use.

When the audio information output sheet 1001 shown in FIGS. 15*a* to 15*c* and FIG. 16 is not in use, the audio information output sheet 1001 is folded along the bend lines 1015*a*, 1015*b* as shown in FIG. 18*a*. In this condition, the area of the audio information output section 1040 of the audio information recording/reproducing section 1030 sandwiched between the support sheets 1020*a*, 1020*b* and the surfaces sheet 1010*a*, 1010*b* is folded along the bend lines 1015*a*, 1015*b* with respect to the other areas, and if the size of the audio information output sheet 1001 in this condition is assumed to be a business card size, it is possible to insert the folded audio information output sheet 1001 into a business card case, etc., and thereby improve portability. Furthermore, in this condition, the audio output area 1004 provided on the surface sheet 1010*a* is not exposed to output the audio output from the audio information output section 1040 to outside. Furthermore, since the IC chip 1034 and the audio information output section 1040 are connected by a wiring pattern 1037 formed on the connection substrate 1036 sandwiched between the divided areas of the support sheets 1020*a*, 1020*b*, even if the audio information output sheet 1001 can be folded along the folded sections 1015*a*, 1015*b*, it is possible to avoid the wiring between the IC chip 1034 and the audio information output section 1040 from being broken. Furthermore, when the audio information output sheet 1001 is folded as shown in FIG. 18*a*, if the spacing between the divided areas of the support sheet 1020*a*, 1020*b* is adjusted to be equal to or greater than the distance between the surface sheets 1010*b* which become outside in the folded section, that is, at least twice the thickness of the audio information output sheet 1001, it is possible to keep the folding state.

When the audio information output sheet 1001 shown in FIGS. 15*a* to 15*c* and FIG. 16 is in use, as shown in FIG. 18*b*, when the folded audio information output sheet 1001 is opened and the playback button 1003 is pressed, the audio information recorded in the IC chip 1034 of the audio information recording/reproducing section 1030 is output from the audio information output section 1040. Here, in this condition, the audio output area 1004 provided in the surface sheet 1010*a* is exposed to output the audio output from the audio information output section 1040 to outside. Furthermore, if the audio information output sheet 1001 is kept open so that the adjoining areas form a certain angle along the bend line 1015*a* as shown in FIG. 18*b*, it is possible to output audio information with the audio information output sheet 1001 placed on a desk, etc.

In this way, the audio information output sheet 1001 is folded when not in use and the audio information output sheet 1001 is opened and audio information is output when the audio information output sheet 1001 is in use, so that it is possible to miniaturize the card while securing the sound volume of audio information output.

According to this embodiment, only the area of the audio information recording/reproducing section 1030 in which the audio information output section 1040 is sandwiched between the support sheets 1020*a*, 1020*b* and surface sheets 1010*a*, 1010*b* is foldable with respect to the other areas, but it is also possible to adopt a structure that the area of the audio information recording/reproducing section 1030 in which the audio information output section 1040 and part of the area other than the audio information output section 1040 are sandwiched is foldable with respect to the other areas. In that case, if the audio substrate 1032 is made up of a polyimide film as in the case of the connection substrate 1036, even if it is sandwiched between the surface sheets 1010a, 1010b and support sheets 1020a, 1020b so that the audio substrate 1032 spans the bend lines 1015a, 1015b, it is possible to secure durability with respect to the folding operation of the audio information output sheet 1001 along the bend lines 1015a, 1015b.

Furthermore, according to this embodiment, the playback button 1003 which is pressed to output audio information recorded in the IC chip 1034 from the audio information output section 1040 is provided at such a position that the playback button 1003 is exposed even when the audio information output sheet 1001 is folded along the bend lines 1015a, 1015b, but it is also possible to provide the playback button 1003 in the area of the surface sheet 1010a where the playback button 1003 is not exposed when the audio information output sheet 1001 is folded along the bend lines 1015a, 1015b. In that case, it is possible to prevent the playback button 1003 from being pressed when the audio information output sheet 1001 is folded along the bend lines 1015a, 1015b and avoid unnecessary consumption of the paper batteries 1031.

Furthermore, it is also possible to make the audio information output section 1040 function as a microphone for inputting audio information and record audio information in the IC chip 1034 through the audio information output section 1040. However, in that case, the audio substrate 1032 needs to be provided with a switch (not shown) for inputting audio information through the audio information output section 1040.

Eighth Embodiment

Figure 19A:
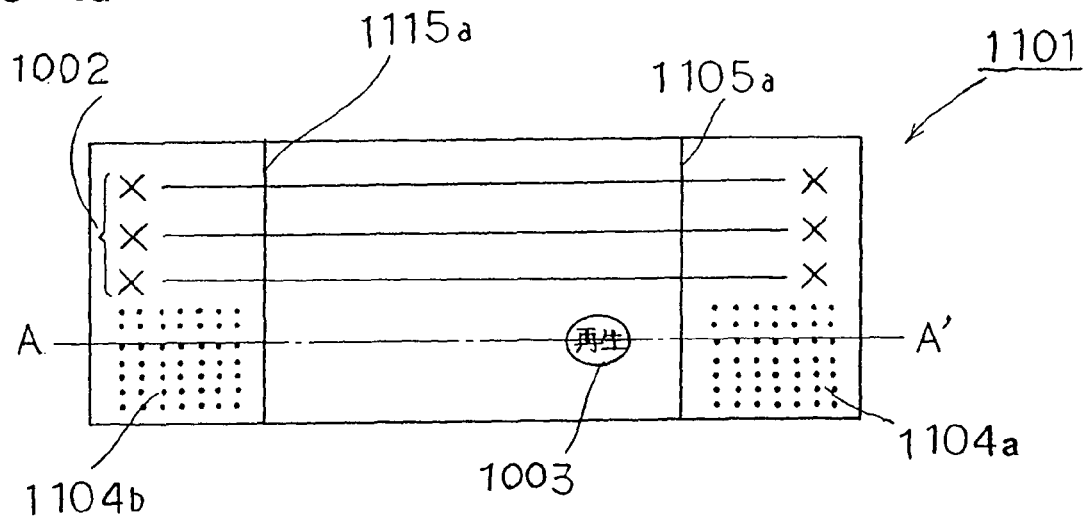
FIG. 19a is a plan view of an audio information output sheet according to an eighth embodiment of the present invention.
Figure 19B:
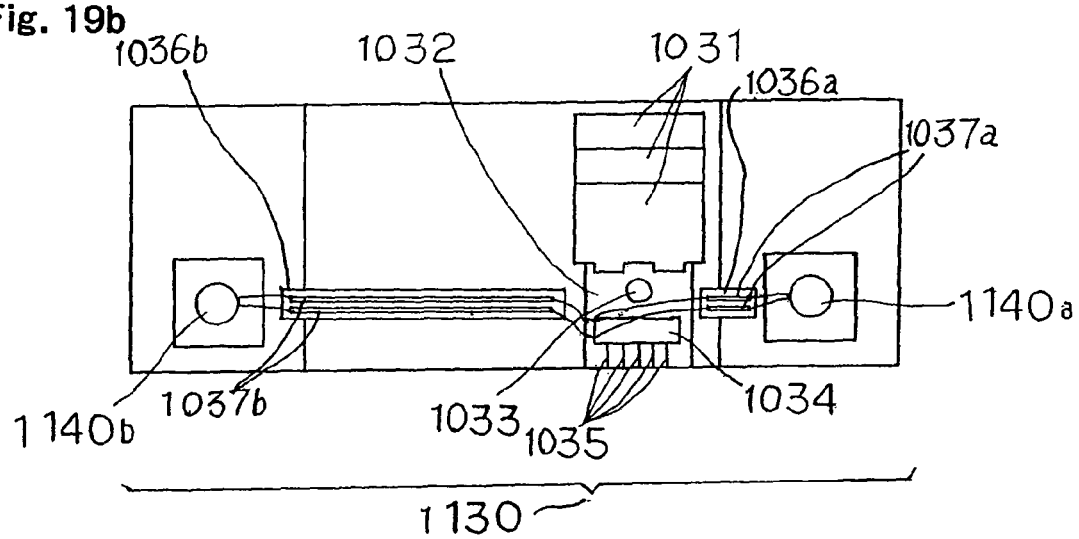
Figure 19C:
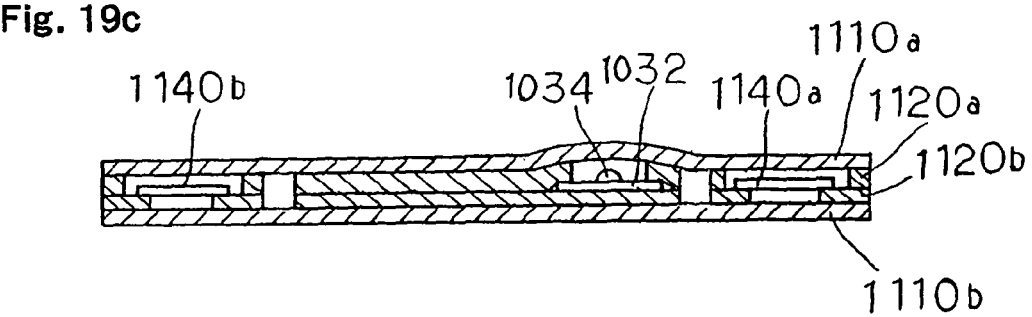

FIG. 19a is a plan view of an audio information output sheet according to an eighth embodiment of the present invention, FIG. 19b illustrates an inner structure of the audio information output sheet 1101 shown in FIG. 19a and FIG. 19c is a cross-sectional view along the line A-A' shown in FIG. 19a.

As shown in FIGS. 19a to 19c, this embodiment differs from the seventh embodiment in that two audio information output sections 1140a, 1140b are connected to an audio substrate 1032 through wiring patterns 1037a, 1037b formed on connection substrates 1036a, 1036b and the areas where the audio information output sections 1140a, 1140b are sandwiched between support sheets 1120a, 1120b and surface sheets 1110a, 1110b are foldable along bend lines 1105a, 1115a with respect to the other area. The support sheets 1120a, 1120b are also divided into three areas through areas facing the bend lines 1105a, 1115a provided on the surface sheet 1110a as in the case of the seventh embodiment.

A method of use of the audio information output sheet 1101 structured as described above will be explained below.

Figure 20A:
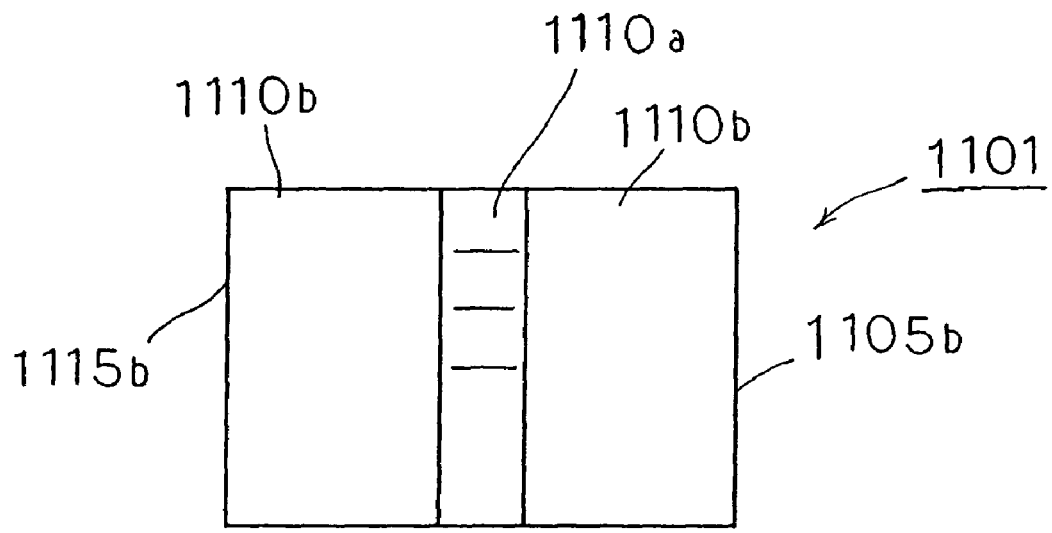
FIG. 20a illustrates the audio information output sheet shown in FIGS. 19a to 19c not in use.
Figure 20B:
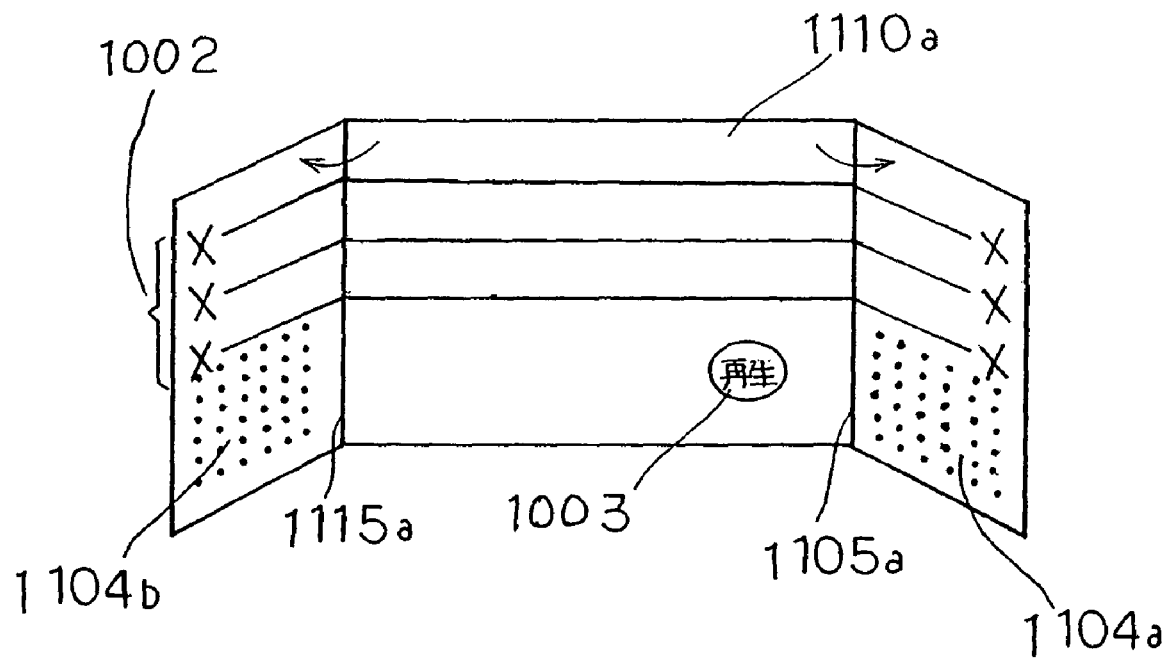
FIG. 20b illustrates the audio information output sheet shown in FIGS. 19a to 19c in use.

FIG. 20a illustrates the audio information output sheet 1101 shown in FIGS. 19a to 19c not in use and FIG. 20b illustrates the audio information output sheet 1101 shown in FIGS. 19a to 19c in use.

When the audio information output sheet 1101 shown in FIGS. 19a to 19c is not in use, the audio information output sheet 1101 is folded along the bend lines 1105a, 1105b, 1115a, 1115b as shown in FIG. 20a. In this condition, the areas of the audio information recording/reproducing section 1130 in which the audio information output sections 1140a, 1140b are sandwiched between the support sheets 1120a, 1120b and surface sheets 1110a, 1110b are folded along the bend lines 1105a, 1105b, 1115a, 1115b with respect to the other area and if the size of the audio information output sheet 1101 in this condition is assumed to be a business card size, the folded audio information output sheet 1101 can be inserted in a business card case, etc., which improves portability. Furthermore, in this condition, the audio output areas 1104a, 1104b provided on the surface sheet 1110a to output audio output from the audio information output sections 1140a, 1140b to the outside are not exposed. Furthermore, in this condition, the playback button 1003 which is pressed to output audio information recorded in the IC chip 1034 from the audio information output sections 1140a, 1140b is not exposed, and therefore the playback button 1003 is not pressed mistakenly, which avoids unnecessary consumption of the paper batteries 1031.

Furthermore, when the audio information output sheet 1101 shown in FIGS. 19a to 19c is used, by opening the folded audio information output sheet 1101 as shown in FIG. 20b and pressing the playback button 1003, audio information recorded in the IC chip 1034 of the audio information recording/reproducing section 1130 is output from the audio information output sections 1140a, 1140b. In this condition, the audio output areas 1104a, 1104b provided on the surface sheet 1110a to output audio output from the audio information output sections 1140a, 1140b to outside are exposed. Furthermore, when the audio information output sheet 1101 is kept open so that the adjoining areas form a predetermined angle along the bend lines 1105a, 1115a as shown in FIG. 20b, it is possible to output audio information with the audio information output sheet 1101 placed on a desk, etc.

In this way, this embodiment adopts a structure foldable three fold along the bend lines 1105a, 1105b, and therefore it is possible to widely secure areas to which audio information is output with respect to the size in the folded state and thereby realize a large sound volume.

In this embodiment, it is also possible to adopt a structure that the area of the audio information recording/reproducing section 1130 in which the audio information output sections 1140a, 1140b and part of areas other than the audio information output sections 1140a, 1140b are sandwiched is made foldable with respect to the other area. In that case, if the audio substrate 1032 is made up of a polyimide film, even when the audio substrate 1032 is sandwiched between the surface sheets 1110a, 1110b and support sheets 1120a, 1120b so that the audio substrate 1032 spans the bend lines 1105a, 1115a, it is possible to secure durability with regard to the folding operation of the audio information output sheet 1101 along the bend lines 1105a, 1115a.

Furthermore, it is also possible to make audio information pieces output from the audio information output sections 1140a, 1140b different from each other. In this way, it is possible to listen to information recorded in the IC chip 1034 as stereophonic broadcast, for example.

Furthermore, this embodiment is provided with two audio information output sections 1140a, 1140b, but the number of the audio information output sections 1140a, 1140b is not limited to two. In that case, at least one audio information output section is made foldable three fold among the two areas sandwiched between the support sheets 1120a, 1120b and surface sheets 1110a, 1110b and the other area. For example, it is possible to adopt a three-fold structure with four audio information output sections provided, with two areas formed with two sets of audio information output sections sandwiched between the support sheets 1120a, 1120b and surface sheets 1110a, 1110b and the other area. In this case, too, by adopting a structure that different pieces of audio information are output to two areas, it is possible to listen to information recorded in the IC chip 1034 as stereophonic broadcast, for example.

Furthermore, instead of limiting to a three-fold foldable structure as with this embodiment, it is also possible to provide areas foldable along bend lines in areas adjoining the audio output areas 1104a, 1104b along the bend lines 1105a, 1115a, that is, areas where the audio substrate 1032 is sandwiched in the upper or lower part in the figure. In that case, too, the support sheets 1120a, 1120b sandwiched between the surface sheets 1110a, 1110b are preferably divided along bend lines, but in that case, too, if the spacing between the divided areas of the support sheets 1120a, 1120b is adjusted to be equal to or greater than the distance between the surface sheets 1110b which become outside in the folded section when the audio information output sheet 1101 is folded, it is possible to keep the folding state. For example, when areas which are foldable along bend lines are provided in the upper and lower parts in the figure of the area adjoining the audio output areas 1104a, 1104b along the bend lines 1105a, 1115a are provided, the audio information output sheet 1101 is folded as shown in FIG. 20a first, and then the above described areas in the upper and lower parts are folded, if the spacing between the areas adjoining along the bend lines 1105a, 1115a of the support sheets 1120a, 1120b is adjusted to be equal to or greater than twice the thickness of the audio information output sheet 1101 and the spacing between the area in which the audio substrate 1032 is sandwiched between the support sheets 1120a, 1120b and areas constituting the upper and lower parts thereof is adjusted to be at least three times the thickness of the audio information output sheet 1101, it is possible to keep the folding state.

Furthermore, according to the seventh and eighth embodiments, the support sheets are divided along the bend line, but the support sheets can also be made of an easily foldable material so that the support sheets are not divided.

According to the invention shown in the seventh and eighth embodiments, the area of the audio information recording/reproducing means in which at least the audio information output section is incorporated is made foldable along bend lines and the area in which the audio information output section is incorporated is folded with respect to the other area so as to realize miniaturization, and therefore it is not necessary to reduce the size of the audio information output section and it is possible to realize miniaturization while securing a predetermined sound volume.

Furthermore, in the case of the structure that the audio information recording/reproducing means is made of a sheet-like base material, two support sheets are bonded together with the audio information recording/reproducing means sandwiched in between from front and back, the two support sheets are divided along bend lines and the audio information recording/reproducing means is sandwiched from front and back in only some of the areas facing the audio information recording/reproducing means, it is possible to improve flatness of the surface irrespective of the foldable structure and thereby facilitate printing of information on the surface sheet.

Furthermore, in the case of the structure that the spacing between the divided areas of the support sheets when the audio information output sheet is folded is equal to or greater than the distance between the surface sheets which become the outside in the folded section of the two surface sheets, it is possible to keep the folding state when the audio information output sheet is folded along the bend line.

Furthermore, in the case of the structure that the audio information recording/reproducing means includes a plurality of audio information output sections and a plurality of areas each incorporating at least one audio information output section are made foldable along bend lines with respect to the other area, it is possible to increase a sound volume of audio information output without increasing the size of the audio information output sheet in the folding state.

Ninth Embodiment

Figure 21A:
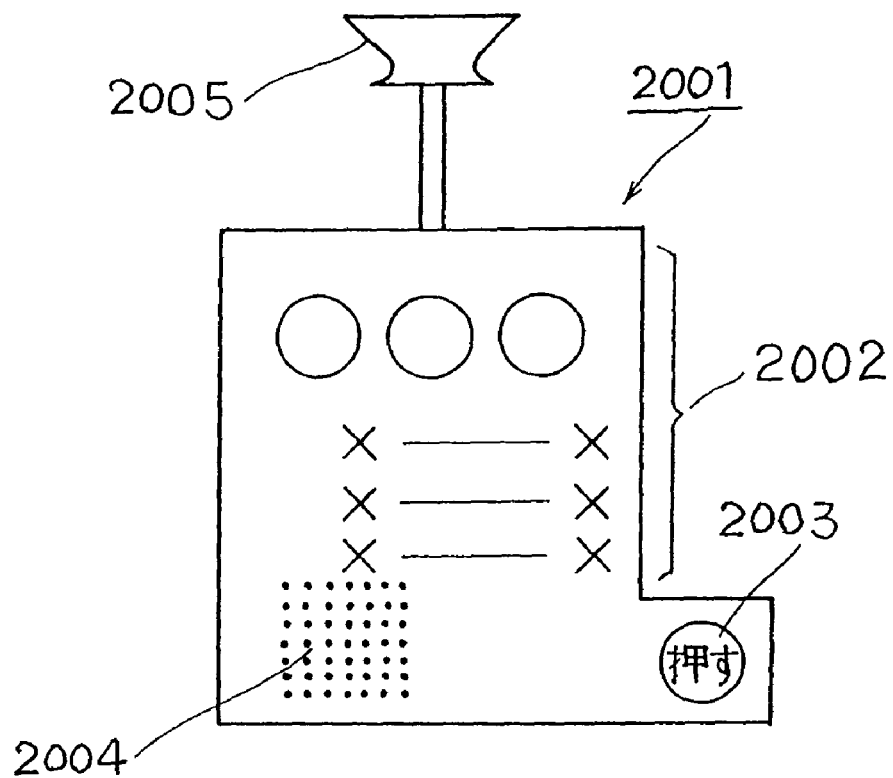
FIG. 21a is a plan view of a POP indicator according to a ninth embodiment of the present invention.
Figure 21B:
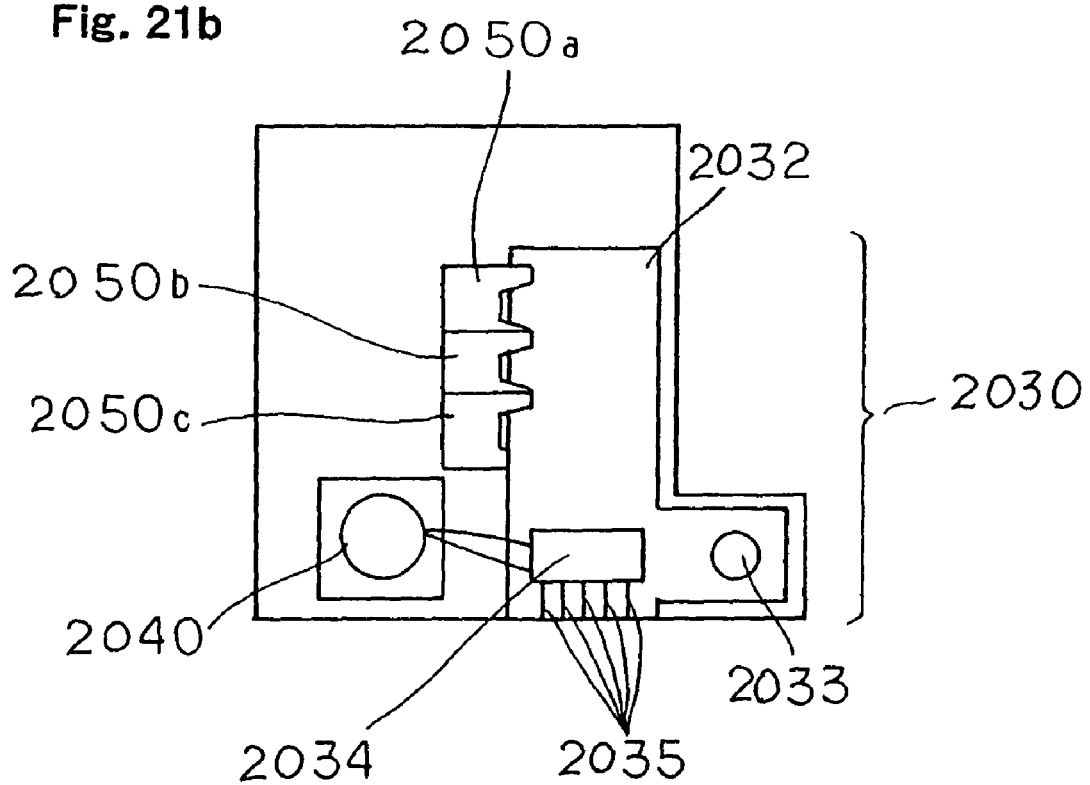

FIG. 21a is a plan view of a POP indicator 2001 according to a ninth embodiment of the present invention and FIG. 21b illustrates an inner structure of the POP indicator 2001 shown in FIG. 21a. Furthermore, FIG. 22 illustrates a laminated structure of the POP indicator 2001 shown in FIGS. 21a, 21b.

Figure 22:
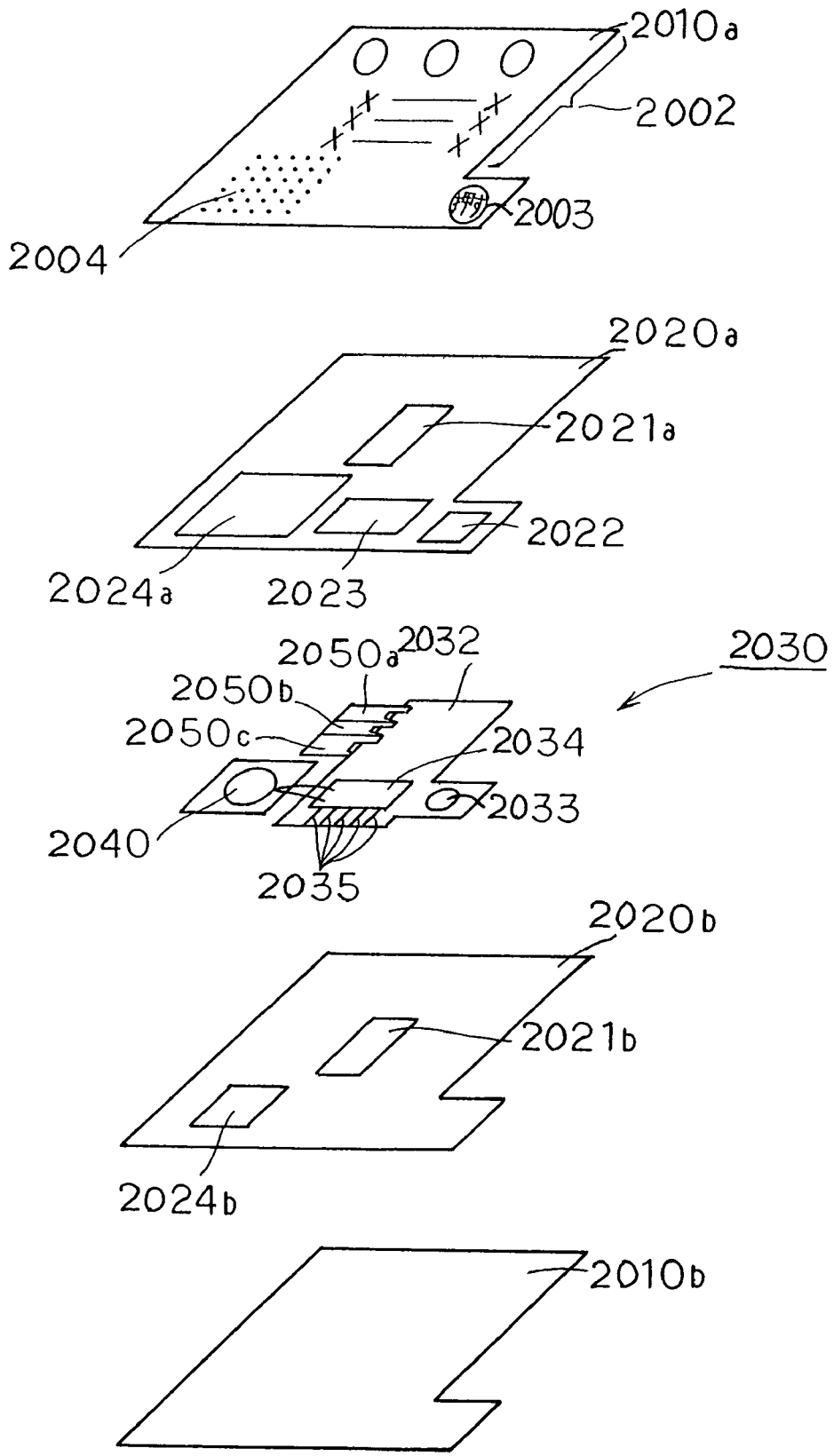
FIG. 22 illustrates a laminated structure of the POP indicator shown in FIGS. 21a, 21b.

As shown in FIGS. 21a, 21b and FIG. 22, this embodiment is constructed in such a way that a sheet-like audio information recording/reproducing section 2030 capable of recording/reproducing audio information is sandwiched between two support sheets 2020a, 2020b made of a flexible, thin base material such as paper base material and the support sheets 2020a, 2020b between which the audio information recording/reproducing section 2030 is sandwiched are further sandwiched between a surface sheet 2010a and a back sheet 2010b having the same outside shapes as those of the support sheets 2020a, 2020b, made of a flexible, thin base material such as paper base material. Furthermore, a mounting member 2005 for mounting the POP indicator 2001 on an object such as a showcase is provided. The surface sheet 2010a, back sheet 2010b, support sheets 2020a, 2020b and audio information recording/reproducing section 2030 are mutually bonded through adhesive work applied to the front and back of the support sheets 2020a, 2020b whereby the audio information recording/reproducing section 2030 is pasted to the surface of the surface sheet 2010a. This adhesive work can be realized by pasting a double-faced tape to the front and back of the support sheets 2020a, 2020b or applying a hot-melt type adhesive thereto. Furthermore, some areas of the surface sheet 2010a, back sheet 2010b, support sheets 2020a, 2020b and audio information recording/reproducing section 2030 protrude from other areas.

Furthermore, the audio information recording/reproducing section 2030 is constructed of an audio substrate 2032 mounted with an IC chip 2034 which is audio information recording means and a switch 2033 which is operating means, an audio information output section 2040 and three paper batteries 2050a to 2050c and the area of the audio substrate 2032 on which the switch 2033 is mounted protrudes from the other area.

The IC chip 2034 is designed to record audio information and the audio information output section 2040 is designed to output the audio information recorded in the IC chip 2034 when the switch 2033 is pressed. Furthermore, the three paper batteries 2050a to 2050c are connected in series by means of an anisotropic/conductive adhesive (ACP) or anisotropic/conductive film (ACF), both ends of which are connected to the audio substrate 2032 to serve as a power supply section to supply power to the audio substrate 2032.

Furthermore, the audio substrate 2032 is provided with connection terminals 2035 for inputting audio information to the IC chip 2034 from outside and is a flexible, thin substrate made of fiberglass reinforced plastics (FRP), polyimide or lead frame, etc., with the IC chip 2034 connected thereto by means of an anisotropic/conductive adhesive (ACP), anisotropic/conductive film (ACF) or wire bonding.

Furthermore, the support sheet 2020a is made of a thin base material and the thickness thereof is set according to the required durability as appropriate and when superimposed on the audio information recording/reproducing section 2030, holes 2021a, 2022, 2023, 2024a are formed in the areas facing the paper batteries 2050a to 2050c, switch 2033, IC chip 2034 and audio information output section 2040 and the area in which the hole 2022 is formed protrudes from the other areas.

Furthermore, the support sheet 2020b is made of a thin base material, but the thickness thereof is set according to the required durability as appropriate and when superimposed on the audio information recording/reproducing section 2030, holes 2021b, 2024b are formed in the areas facing the paper batteries 2050a to 2050c and audio information output section 2040 and the area facing the switch 2033 through the audio substrate 2032 protrudes from the other areas.

Figure 23A:
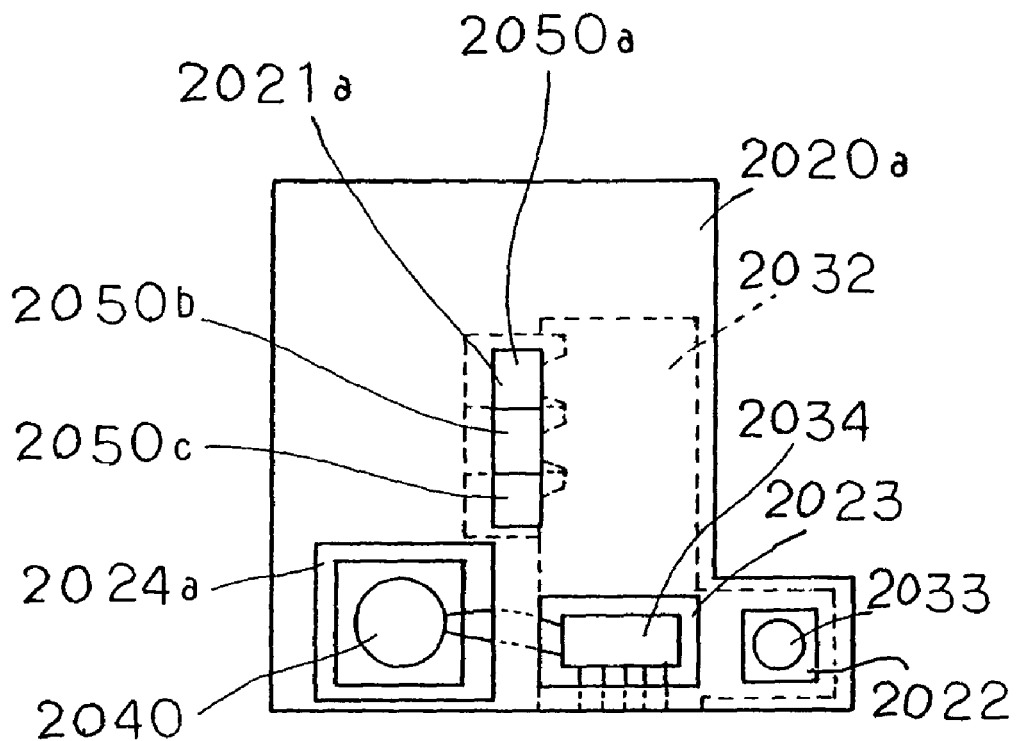
FIG. 23a illustrates a laminated structure of the support sheets and audio information recording/reproducing section shown in FIG. 22b and FIG. 23.
Figure 23B:
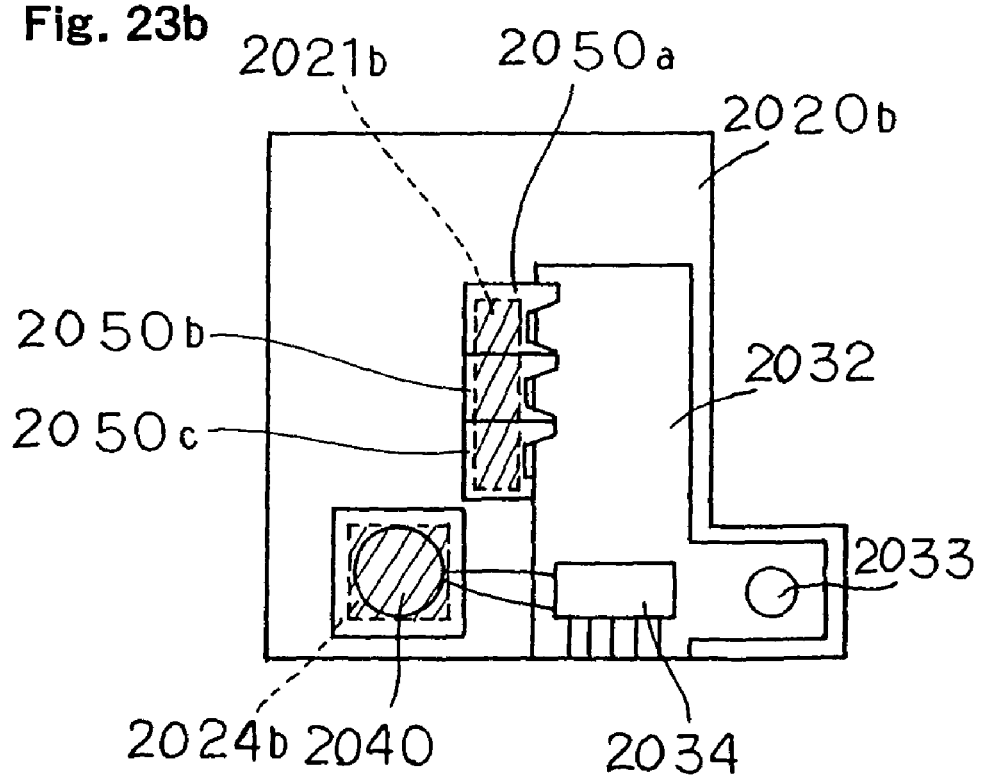
FIG. 23b illustrates a laminated structure of the support sheet and audio information recording/reproducing section shown in FIG. 22b and FIG. 23.

FIG. 23a illustrates a laminated structure of the support sheet 2020a and audio information recording/reproducing section 2030 shown in FIG. 22b and FIG. 23 and FIG. 23b illustrates a laminated structure of the support sheet 2020b and audio information recording/reproducing section 2030 shown in FIG. 22b and FIG. 23.

As shown in FIG. 23a, the size of the hole 2021a formed in the area of the support sheet 2020a facing the paper batteries 2050a to 2050c is smaller than the size of three paper batteries 2050a to 2050c connected, the hole 2022 formed in the area facing the switch 2033 is greater than the switch 2033, the hole 2023 formed in the area facing the IC chip 2034 is greater than the IC chip 2034 and the hole 2024a formed in the area facing the audio information output section 2040 is greater than the audio information output section 2040.

Furthermore, as shown in FIG. 23b, the size of the hole 2021b formed in the area of the support sheet 2020b facing the paper batteries 2050a to 2050c is smaller than the three paper batteries 2050a to 2050c connected and the hole 2024b formed in the area facing the audio information output section 2040 is smaller than the audio information output section 2040.

In this way, the audio information recording/reproducing section 2030 is laminated so that only part thereof is sandwiched between the two support sheets 2020a, 2020b from the front and back of the sheet and fixed through adhesive work applied to the front and back of the support sheets 2020a, 2020b.

Furthermore, the surface sheet 2010a is provided with an information display area 2002 on which advertisement information is printed as a POP, a playback button 2003 for operating the switch 2033 is provided in the area of the support sheet 2020a facing the switch 2033 through the hole 2022, an audio output area 2004 made up of an array of fine holes for outputting audio output from the audio information output section 2040 is formed in the area facing the audio information output section 2040 through the hole 2024a of the support sheet 2020a. Since the audio output area 2004 is formed with such an array of fine holes, it is possible to compensate for a reduction of sound volume output from the audio information output section 2040 even when the front and back of the audio information output section 2040 are covered with the surface sheet 2010a and back sheet 2010b. In the audio output area 2004, holes of 0.1 mm in diameter are formed horizontally and vertically at intervals of 1.5 mm through laser beam machining. Therefore, unlike punching or perforation using needles, etc., no burrs are formed and the holes are never clogged with burrs and the audio output area 2004 can also print advertisement information as a POP. Furthermore, when the audio information recording/reproducing section 2030 is sandwiched, the surface sheet 2010a and back sheet 2010b are shaped so that the area in which the switch 2033 is incorporated protrudes from the other areas. Furthermore, if the surface sheet 2010a is made of synthetic paper suitable for printing such as foam PET (polyethylene terephthalate), it is possible not only to print advertisement information as a POP on the surface sheet 2010a but also to improve durability of the surface sheet 2010a. Especially in the area provided with the playback button 2003, the surface sheet 2010a may degrade when the playback button 2003 is pressed, but using synthetic paper can suppress the degradation of the surface sheet 2010a. Furthermore, if all the surface sheet 2010a, back sheet 2010b and support sheets 2020a, 2020b are likewise made of synthetic paper, it is possible to improve watertightness of the entire POP indicator 2001.

The POP indicator 2001 structured as described above is used by being hung from a showcase, etc., using a mounting member 2005. Advertisement information is printed as a POP on the information display area 2002 allowing a visitor to a shop at which the POP indicator 2001 is mounted to visually recognize the advertisement information. Furthermore, when the visitor presses the playback button 2003, audio information recorded in the IC chip 2034 is reproduced and output from the audio information output section 2040 through the audio output area 2004. Therefore, if, for example, information on products displayed on the showcase is written in the IC chip 2034 beforehand, the POP indicator 2001 is hung from the showcase using the mounting member 2005, when the visitor presses the playback button 2003, the information on the product displayed on the showcase from which the POP indicator 2001 is hung is output as audio from the audio information output section 2040 through the audio output area 2004. The visitor can recognize information on the product, etc., as audio information. In addition, it is also possible to record information such as quiz and music in the IC chip 2034 and output this information from the audio information output section 2040 when the playback button 2003 is pressed. Furthermore, since the amount of information recorded in the IC chip 2034 is greater than the amount of information printed on the information display area 2002, it is possible to provide a large amount of information for the visitor.

The paper batteries 2050a to 2050c incorporated in the above described POP indicator 2001 will be explained in detail below.

Figure 24A:
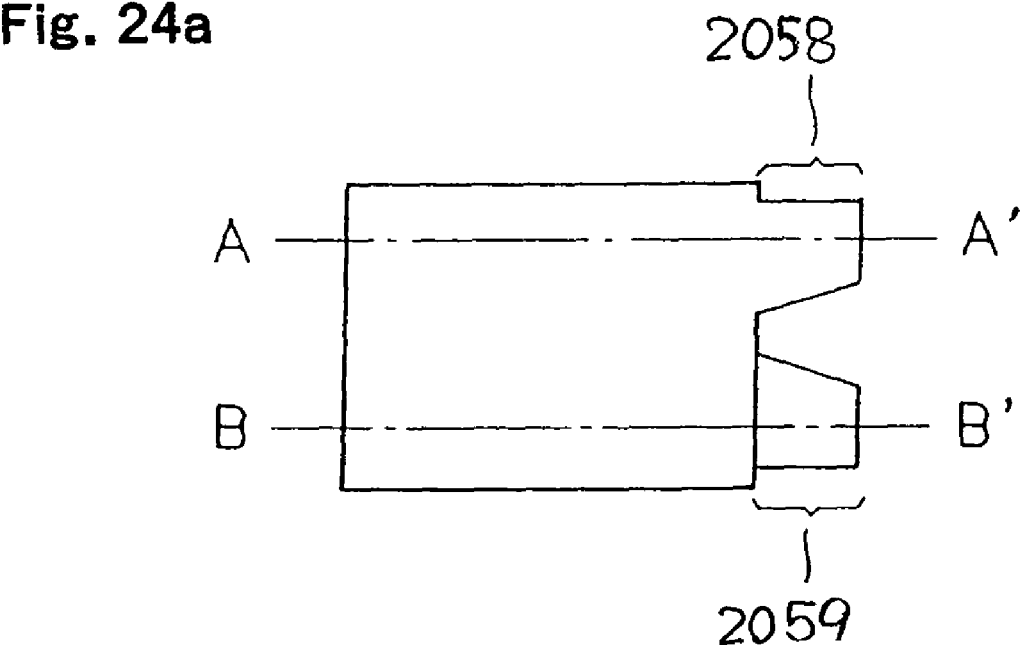
FIG. 24a is a plan view of the structure of the paper battery shown in FIG. 21b, FIG. 22 and FIGS. 23a, 23b.
Figure 24B:
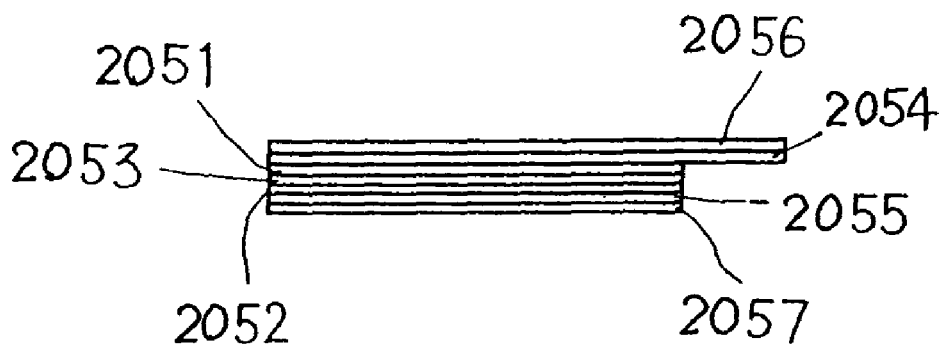
Figure 24C:
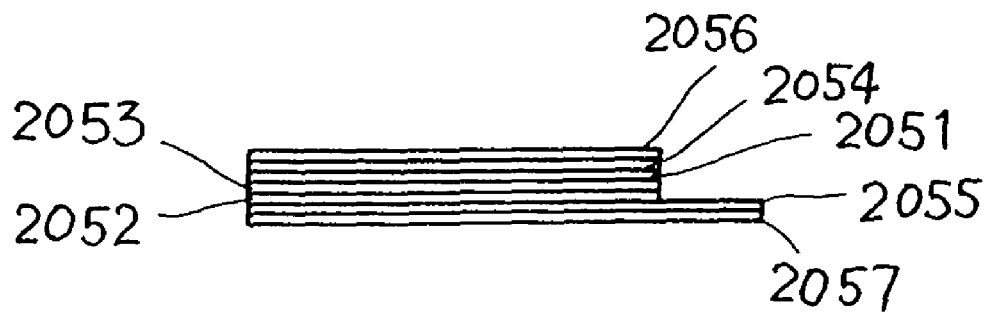

FIG. 24a is a plan view of the structure of the paper batteries 2050a to 2050c shown in FIG. 21b, FIG. 22 and FIGS. 23a, 23b, FIG. 24b is a cross-sectional view along the line A-A' shown in FIG. 24a and FIG. 24c is a cross-sectional view along the line B-B' shown in FIG. 24a.

As shown in FIGS. 24a, 24b, the paper batteries 2050a to 2050c of this embodiment each have a positive electrode layer 2051 made of manganese dioxide, etc., and a negative electrode layer 2052 made of zinc, etc., laminated together through a gel electrolytic layer 2053. A protective film 2056 made of PET (polyethylene terephthalate), etc., coated with conductive ink 2054 is superimposed on the positive electrode layer 2051 side and a protective film 2057 made of PET, etc., coated with conductive ink 2055 is superimposed on the negative electrode layer 2052 side. Furthermore, the protective film 2056 coated with the conductive ink 2054 includes a protruding area 2058 which protrudes from the outside shape of the positive electrode layer 2051, negative electrode layer 2052 and electrolytic layer 2053, and protective film 2057 coated with the conductive ink 2055 includes a protruding area 2059 which protrudes from the outside shape of the positive electrode layer 2051, negative electrode layer 2052 and electrolytic layer 2053, and these protruding areas 2058, 2059 protrude from the outside shapes of the positive electrode layer 2051, negative electrode layer 2052 and electrolytic layer 2053 in areas different from one other. Here, since the conductive inks 2054, 2055 are coated on the positive electrode layer 2051 side and negative electrode layer 2052 side of the protective films 2056, 2057 respectively, the surfaces of the protruding areas 2058, 2059 from which the conductive inks 2054, 2055 are exposed are different from each other.

In the paper batteries 2050a to 2050c structured as described above, the conductive ink 2054 coated on the protective film 2056 is electrically continuous with the positive electrode layer 2051, and therefore the conductive ink 2054 in the protruding area 2058 constitutes a positive electrode and the conductive ink 2055 coated on the protective film 2057 is electrically continuous with the negative electrode layer 2052, and therefore the conductive ink 2055 in the protruding area 2059 constitutes a negative electrode.

Figure 25:
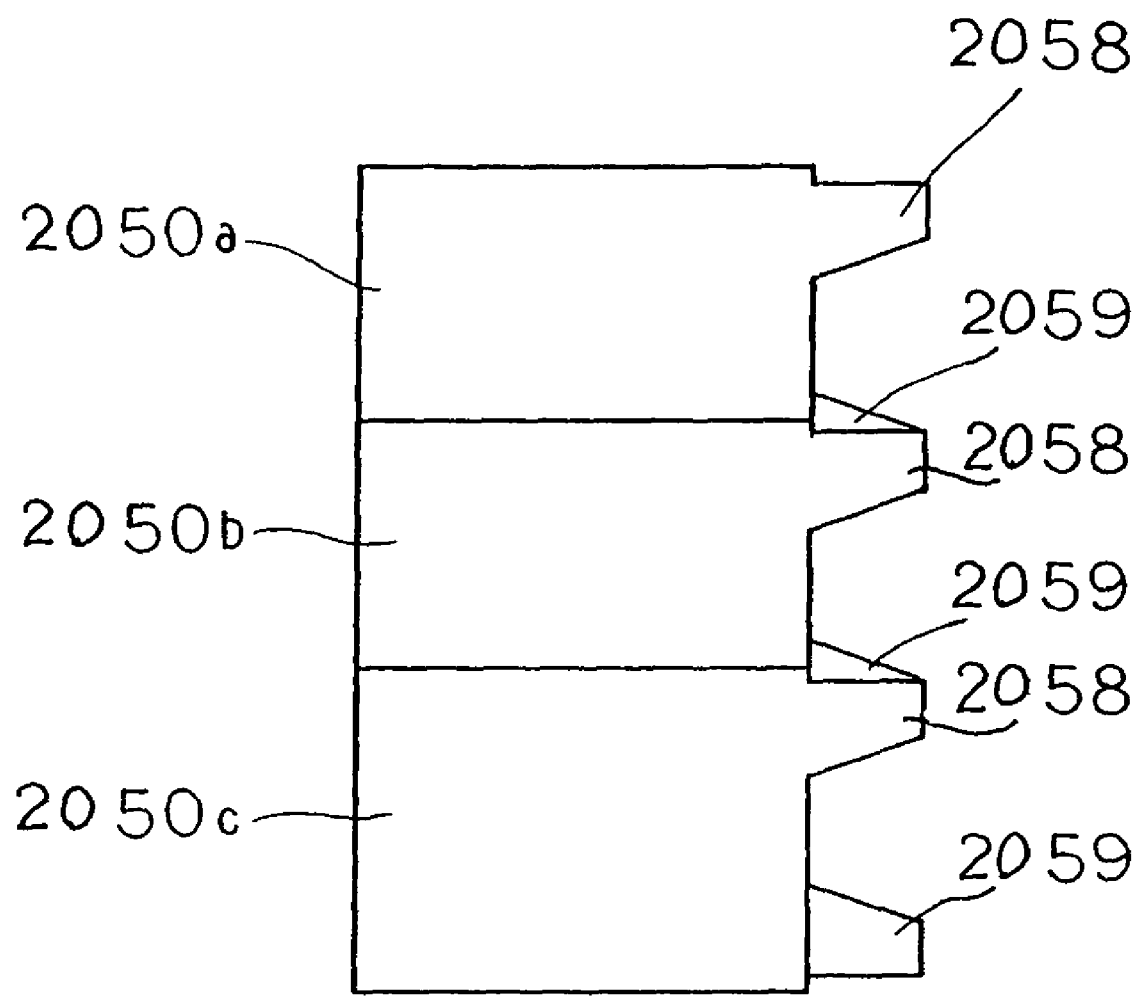
FIG. 25 illustrates the three paper batteries shown in FIGS. 24a to 24c connected in series as shown in FIG. 21b, FIG. 22 and FIGS. 23a, 23b.

FIG. 25 illustrates the three paper batteries 2050a to 2050c shown in FIGS. 24a to 24c connected in series as shown in FIG. 21b, FIG. 22 and FIGS. 23a, 23b.

As shown in FIG. 25, the three paper batteries 2050a to 2050c are connected in such a way that the paper battery 2050a and paper battery 2050b are superimposed together with the conductive ink 2055 in the protruding area 2059 of the paper battery 2050a facing the conductive ink 2054 in the protruding area 2058 of the paper battery 2050b, and the paper battery 2050b and the paper battery 2050c are superimposed together with the conductive ink 2055 in the protruding area 2059 of the paper battery 2050b facing the conductive ink 2054 in the protruding area 2058 of the paper battery 2050c. In this way, the three paper batteries 2050a to 2050c are connected in series with the conductive ink 2054 in the protruding area 2058 of the paper battery 2050a constituting a positive electrode and the conductive ink 2055 in the protruding area 2059 of the paper battery 2050c constituting a negative electrode.

Figure 26A:
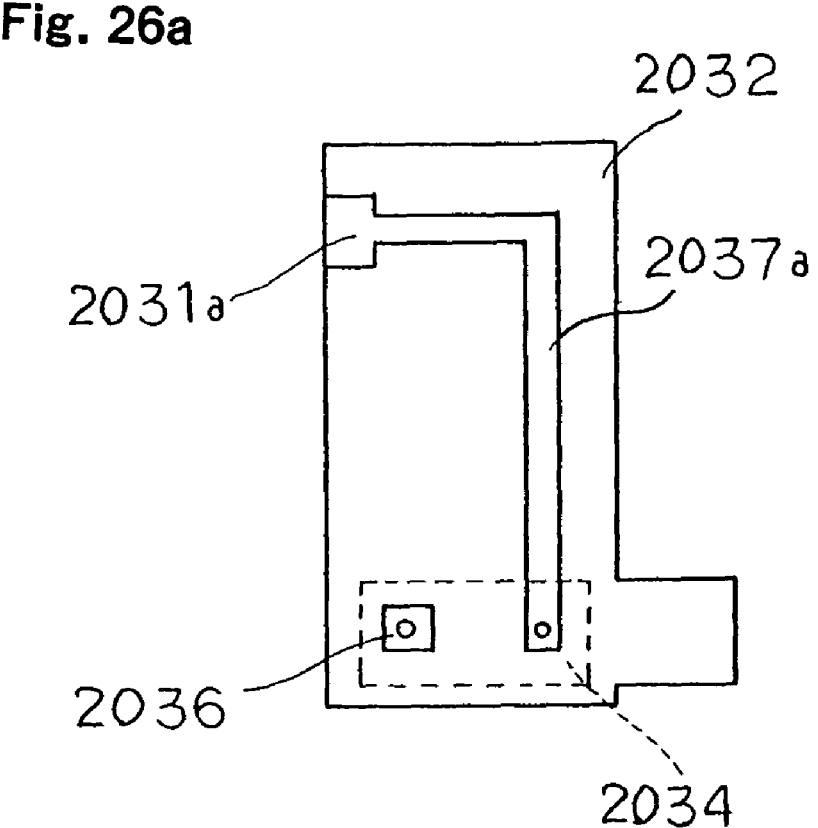
FIG. 26a illustrates how the audio substrate shown in FIG. 21b, FIG. 22
Figure 26B:
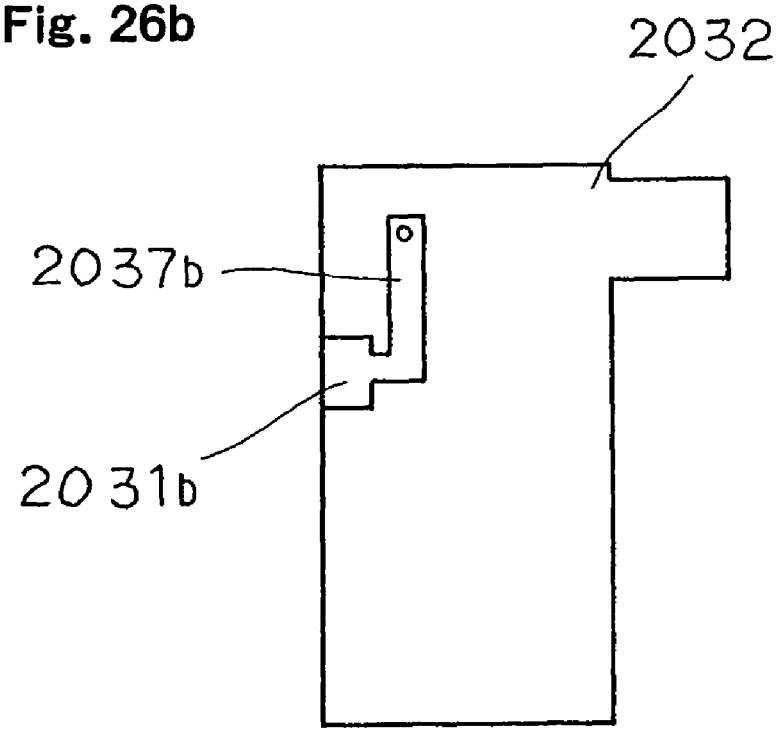
FIG. 26b illustrates how the audio substrate shown in FIG. 21b, FIG. 22

FIGS. 26a, 26b illustrate how the audio substrate 2032 shown in FIG. 21b, FIG. 22 and FIGS. 23a, 23b is connected to the paper batteries 2050a to 2050c shown in FIG. 25.

As shown in FIGS. 26a, 26b, a land 2031a which serves as a first conductive area to be connected to the conductive ink 2054 in the protruding area 2058 of the paper battery 2050a is formed on the surface of the audio substrate 2032 shown in FIG. 21b, FIG. 22 and FIGS. 23a, 23b and the land 2031a is connected to the IC chip 2034 through a wiring pattern 2037a. Furthermore, a land 2031b which serves as a second conductive area to be connected to the conductive ink 2055 in the protruding area 2059 of the paper battery 2050c is formed on the back of the audio substrate 2032 and the land 2031b is connected to a through hole 2036 through a wiring pattern 2037b and this through hole 2036 is connected to IC chip 2034.

In this way, power is supplied to the audio substrate 2032 from the power supply section which consists of the three paper batteries 2050a to 2050c connected in series.

Tenth Embodiment

Figure 27A:
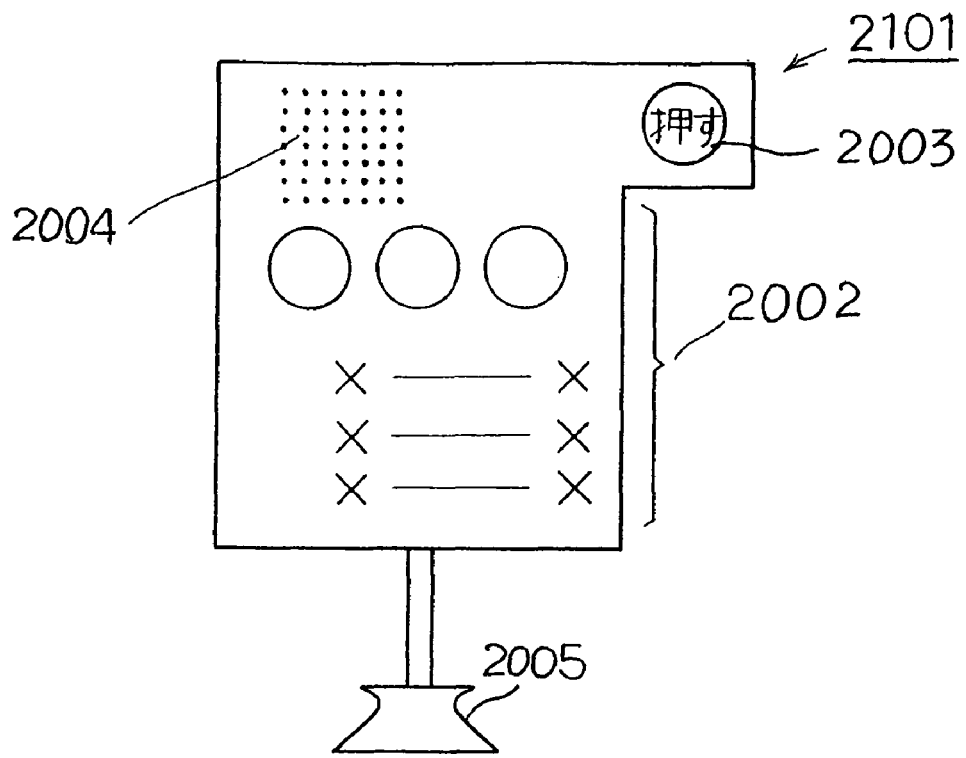
FIG. 27a is a plan view of a POP indicator according to a tenth embodiment of the present invention.
Figure 27B:
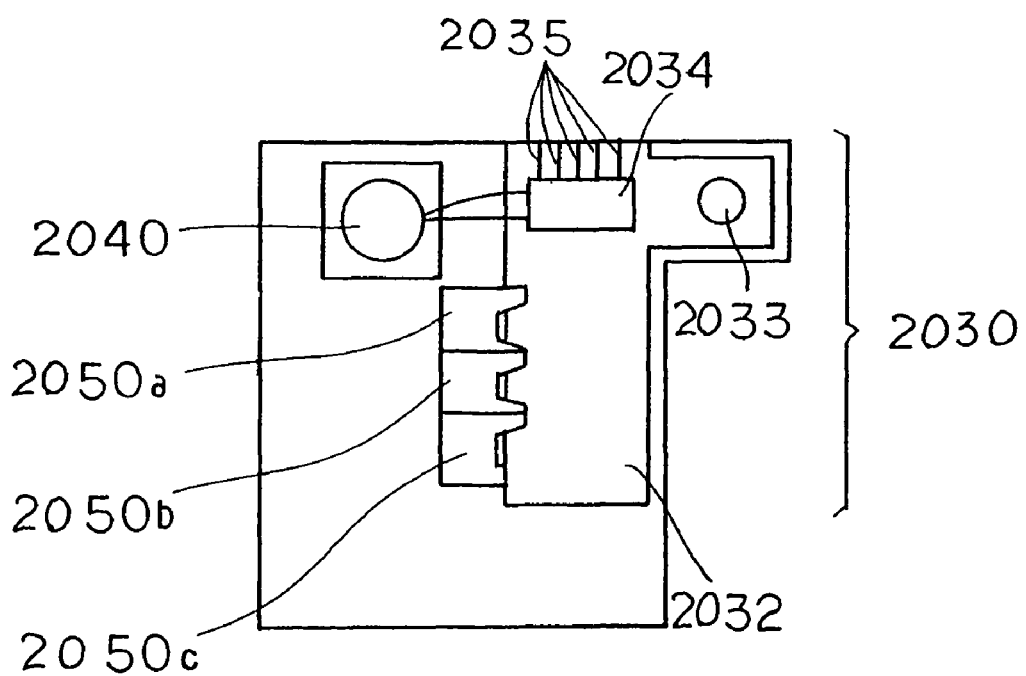

FIG. 27a is a plan view of a POP indicator 2101 according to a tenth embodiment of the present invention and FIG. 27b illustrates an inner structure of the POP indicator 2101 shown in FIG. 27a.

As shown in FIGS. 27a, 27b, this embodiment provides a mounting member 2005 below the component of the POP indicator 2101 shown in FIGS. 21a, 21b and provides a playback button 2003 in the upper part of the component of the POP indicator 2101. The rest of the structure and the corresponding inner structure are the same as those described above.

Being constructed as described above, the POP indicator 2101 in this embodiment is mounted using the mounting member 2005 for use so that the component of the POP indicator 2101 is placed above the surface of the showcase as opposed to the POP indicator 2001 shown in FIGS. 21a, 21b which is hung from the showcase using the mounting member 2005 for use.

In the above described ninth and tenth embodiments, the area provided with the switch 2033 of the audio substrate 2032 protrudes from the other areas of the surface sheet 2010a, back sheet 2010b, support sheets 2020a, 2020b and audio information recording/reproducing section 2030, but the present invention is not limited to this and part of the surface sheet 2010a, back sheet 2010b, support sheets 2020a, 2020b and audio information recording/reproducing section 2030 need not protrude from the other areas.

Furthermore, the above described ninth and tenth embodiments have explained the POP indicator with advertisement information printed as a POP on the information display area 2002 provided on the surface sheet 2010a as an example, but the present invention is also applicable to an indicator with advertisement information printed on the surface sheet without using the POP.

The invention shown in the above described ninth and tenth embodiments is a POP indicator provided with at least a surface sheet on which advertisement information is written as a POP and a mounting member for mounting the surface sheet on an object, which includes audio information recording/reproducing means capable of recording/reproducing audio information pasted to the back of the surface sheet, records audio information in the audio information recording/reproducing means and allows this audio information to be reproduced by the operating means, and therefore if advertisement information is recorded in the audio information recording/reproducing means as audio information, advertisement information is visually recognized and also provided as audio information, and it is thereby possible to attract attention of consumers and also include a large amount of advertisement information. Furthermore, the protrusion of this operating means and the surface sheet in the area to which this operating means is pasted from other areas facilitates operation of the operating means.

Furthermore, the surface sheet made of synthetic paper suitable for printing not only allows advertisement information to be printed on the surface sheet as a POP but also improves durability of the surface sheet.

Furthermore, the power supply section which supplies power to the audio information recording/reproducing means consists of a plurality of paper batteries made up of positive electrodes and negative electrodes exposed from different surfaces connected in series and the audio substrate on which the audio information recording/reproducing means is mounted and to which the power supply section is connected includes a first conductive area which is connected to one of both electrodes of the power supply section and a second conductive area connected to the other electrode of the power supply section formed on different surfaces, and therefore the plurality of paper batteries and audio substrate need only to be connected at two points, making it possible to reduce manufacturing cost.

Eleventh Embodiment

Figure 28:
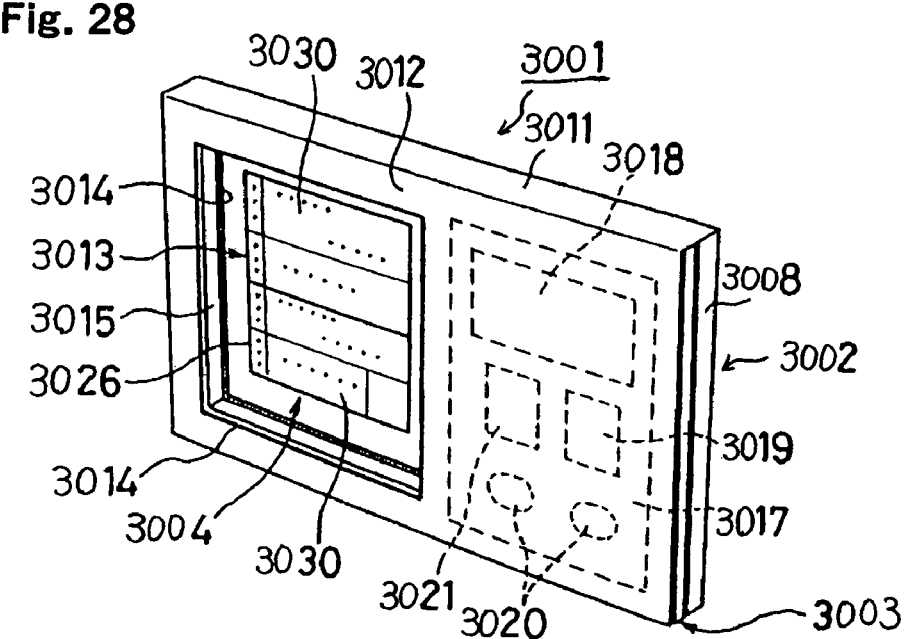
FIG. 28 illustrates a sound information delivery apparatus according to an eleventh embodiment of the present invention.
Figure 29:
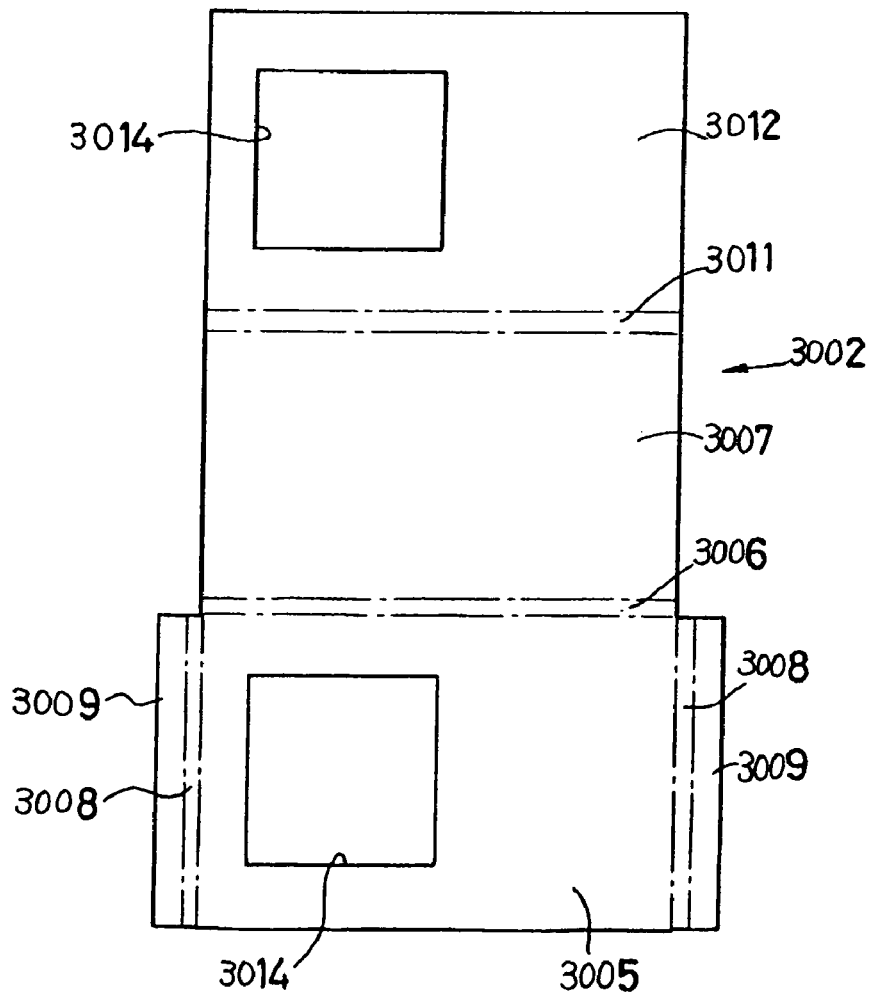
FIG. 29 is an exploded view of a package of the sound information delivery apparatus shown in FIG. 28.

FIG. 28 illustrates a sound information delivery apparatus according to an eleventh embodiment of the present invention. Furthermore, FIG. 29 is an exploded view of a package of the sound information delivery apparatus 3001 shown in FIG. 28. Furthermore, FIG. 30 illustrates the sound information delivery apparatus 3001 shown in FIG. 28 broken down into a package, recording/reproducing means carrier and delivery slip. Furthermore, FIG. 31 is a cross-sectional view of a delivery slip of the sound information delivery apparatus 3001 shown in FIG. 28.

The sound information delivery apparatus 3001 in this embodiment is a combination of an envelope-like package 3002, a thin recording/reproducing means carrier 3003 and a delivery slip 3004. As shown in FIG. 29, the package 3002 is shaped like an envelope consisting of a bottom sheet 3006 placed at bottom, a front sheet 3005 and a rear sheet 3007 placed facing each other, overlap widths 3009 connected to side sheets 3008 on both sides of the front sheet 3005 pasted to the rear sheet 3007 with an opening 3010 formed at top for inserting an object. Furthermore, a cover sheet 3012 which is connected to the rear sheet 3007 through a top sheet 3011 can be overlapped with the outside of the front sheet 3005 and pasted thereto.

Furthermore, when the delivery slip 3004 is inserted in this package 3002, delivery information described in a predetermined position of the delivery slip 3004 is exposed. In order to expose the delivery information of the delivery slip 3004 inserted in this way and visually check the delivery information as required, a window 3014 is provided as shown in the figure which has dimensions to allow the entire delivery information display section 3013 to be exposed in alignment with the delivery information display section 3013 of the delivery slip 3004 on the front sheet 3005 and the cover sheet 3012 which overlaps with this front sheet 3005.

A recording/reproducing means carrier 3 is pasted to the outer surface of the front sheet 3005 of this package 3002. This recording/reproducing means carrier 3003 is constructed of a paper material 3016 such as thick paper with an opening 3015 provided at a position corresponding to the window 3014 with a built-in thin sound information recording/reproducing means 3017. This sound information recording/reproducing means 3017 is constructed of a thin battery section 3018 such as paper battery, a sound information input/output section 3019, switch sections 3020 and a recording/reproduction control section 3021. The recording/reproduction control section 3021 is made up of an IC chip and when a predetermined operation set for recording is carried out on the switch sections 3020 with power being supplied from the battery section 3018, the recording/reproduction control section 3021 records sound information input from the sound information input/output section 3019. This recording is carried out on a memory incorporated in the IC chip. When a predetermined operation set for reproduction is carried out on the switch sections 3020 with power being supplied from the battery section 3018, the recording/reproduction control section 3021 operates the sound information input/output section 3019 to output the recorded sound information.

In this embodiment, it is preferable to use a dual-purpose thin microphone/speaker formed of a piezo-electric element, etc., as the sound information input/output section 3019. Furthermore, for the switch sections 3020, it is preferable to use a thin switch, for example, a pressure-sensitive sensor type switch or a touch sensor type switch that detects capacitance. Furthermore, as the battery section 3018, it is preferable to use a thin, flexible battery such as a lithium polymer battery. Here, power may also be constantly supplied from the battery section 3018 without depending on the operation of the switch section 3020.

In this way, the sound information recording/reproducing means 3017 has a simple and thin structure, and therefore when incorporated in the layer of the paper material 3016, the sound information recording/reproducing means 3017 falls within the range of thickness of the paper material 3016 or slightly protrudes and since the sound information recording/reproducing means carrier 3003 in which it is set is of a low profile, the sound information delivery apparatus 3001 itself becomes thin.

Furthermore, in this embodiment, the positions of the sound information input/output section 3019 and switch section 3020 of the sound information recording/reproducing means 3017 are printed and displayed on the cover 3012 where their respective sections come to the outermost surface to facilitate the recording operation and reproducing operation.

The delivery slip 3004 is provided with a delivery information display section 3013 describing delivery information such as the senders address and name and the receiver's address and name, etc., at the positions at which the delivery slip 3004 is exposed through the window 3014 of the package 3002 and the opening 3015 of the recording/reproducing means carrier 3003 When the delivery slip 3004 is placed inside the package 3002. Furthermore, a notification information display section 3022 for notifying information to the receiver of the sound information delivery apparatus 3001 using characters, patterns, etc., is provided in a desired position of the area other than the delivery information display section 3013.

As shown in FIG. 31, in this delivery slip 3004, a sheet 3024 which constitutes an area other than the delivery information display section 3013 is pasted to a mount 3023 in an inseparable manner and the notification information display section 3022 is provided in this sheet 3024. Furthermore, a sheet 3025 which constitutes the area of the delivery information display section 3013 is placed next to the sheet 3024 flush therewith through the surrounding notch 3026 and this sheet 3025 is pasted to the mount 3023 in an inseparable manner and the delivery information display section 3013 with the sender's address and name and the receiver's address and name, etc., printed thereon is constructed on top of the sheet 3025 and in this way, the delivery information display section 3013 is made detachable from the mount 3023.

To make the delivery information display section 3013 detachable, it is possible to bond an upper sheet 3028 whose back is provided with printing 3027 for adjusting a bonding force corresponding to the area of this delivery information display section 3013 to the mount 3023 through an adhesive 3029 which makes it difficult to separate both sheets from each other and then provide the notch 3026. However, the present invention is not limited to this embodiment.

The delivery information display section 3013 has dimensions large enough to be taken out through the window 3014 of the package 3002 and the opening 3015 of the recording/reproducing means carrier 3003. Furthermore, as shown in the figure, this delivery information display section 3013 consists of a plurality of slips 3030 each functioning as a delivery slip or receipt arranged on the same surface with delivery information corresponding to the function of each slip 3030 written thereon and is constructed in such a way that each slip 3030 can be taken out singly.

Since the sound information delivery apparatus 3001 is provided with the delivery information display section 3013 which can be taken out as required, it can be delivered using an existing delivery system. In this embodiment, the delivery information display section 3013 consists of a plurality of slips 3030, but this delivery information display section 3013 may also consist of a single piece of paper.

Furthermore, the package 3002 can accommodate not only the delivery slip 3004 so that this sound information delivery apparatus 3001 is delivered using an existing delivery system but also a thin article together with the delivery slip 3004 at a position that does not prevent the delivery information display section 3013 from being exposed, that is, on the back of the delivery slip 3004. An example of this thin article is a message card 3031 attached to a photo as shown in the figure, but the thin article is not limited to this message card.

Furthermore, the package 3002 in this embodiment has such a structure that the cover sheet 3012 overlaps with the entire surface of the front sheet 3005, but it is also possible to adopt a sealable letter card type sheet which seals the opening 3010 by overlapping this cover sheet 3012 only with the upper side of the front sheet 3005. Furthermore, the cover sheet 3012 is pasted so as to overlap with the entire surface of the front sheet 3005 or made into a sealable letter card type sheet to overlap with the upper side of the front sheet 3005, but it is also possible to allow this cover sheet 3012 to overlap with the front sheet to close the opening so that it can be opened or closed instead of bonding the cover sheet 3012 to the front sheet 3005.

Furthermore, the recording/reproducing means carrier 3003 is pasted to the front of the front sheet 3005 of the package 3002, but when part of the sound information recording/reproducing means 3017 protrudes on the back of the recording/reproducing means carrier 3003, it is also possible to form an opening to avoid the protrusion of the sound information recording/reproducing means 3017 on the front sheet 3005. Furthermore, the recording/reproducing means carrier 3003 can also be structured so as to be pasted to the inner surface of the front sheet 3005 or housed in the package 3002.

Furthermore, if the receiver of the sound information delivery apparatus 3001 hangs this sound information delivery apparatus 3001 on a wall, etc., this will further facilitate the reproduction operation, and therefore it is also possible to provide a hook, etc., on the rear sheet to make wall-mounting easier.

Furthermore, the upper side of the envelope component 3002 is designated as an opening for insertion, but one of the short lateral sides may also be designated as the opening for insertion. Furthermore, the present invention is not limited to the structure that part of the delivery slip is made separable as the delivery information display section, but it is also possible to bind together a plurality of slips in a detachable manner and adopt a duplicate type that delivery information written on the top slip is simultaneously duplicated to lower slips. In this case, the position of the delivery information display section in each slip should correspond to the position of the window as in the case of this embodiment.

According to the invention shown in the above described eleventh embodiment, the delivery slip including delivery information is inserted in a package so that the delivery information can be visually checked from outside and the package is provided with a recording/reproducing means carrier, and therefore it is possible to record audio in the recording/reproducing means and easily send a message with that audio as a present.

Furthermore, making the delivery information display section of the delivery slip removable through the window of the package and the opening of the recording/reproducing means carrier makes the delivery object more suitable for an ordinary delivery system which performs delivery based on the delivery information written on the delivery information display section.

Twelfth Embodiment

Figure 32A:
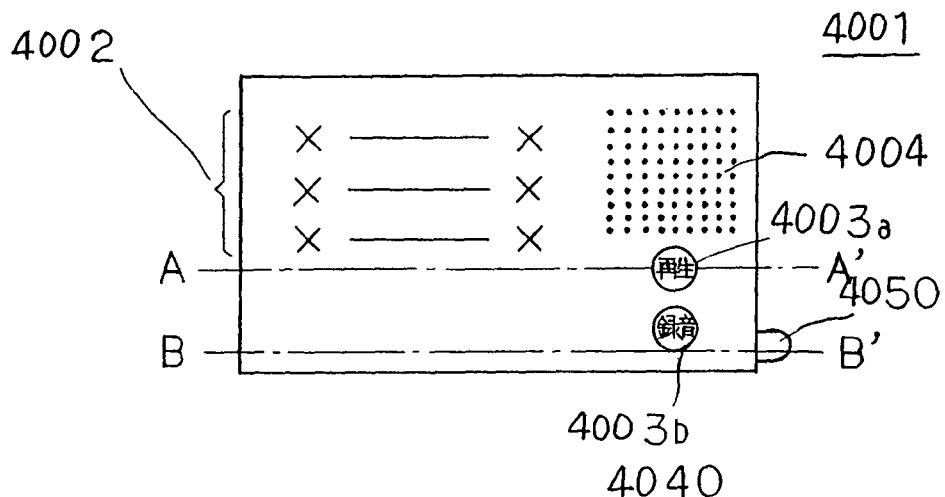
FIG. 32a is a plan view of an audio message transfer sheet according to a twelfth embodiment of the present invention.
Figure 32B:
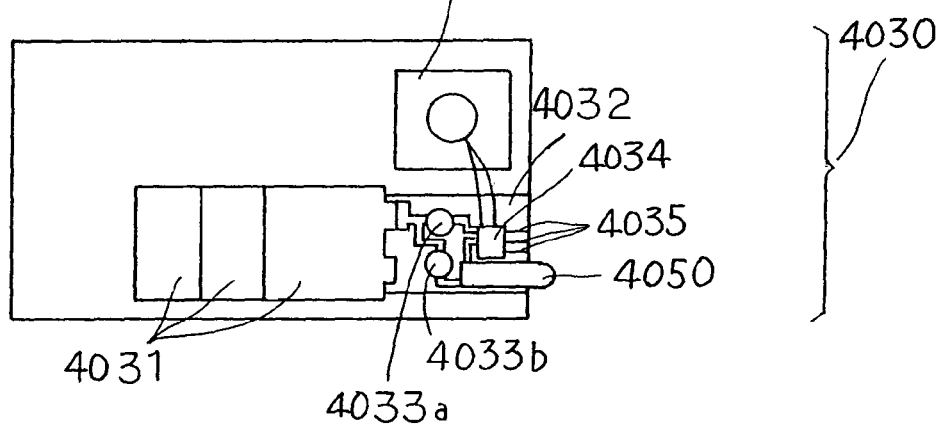
Figure 32C:
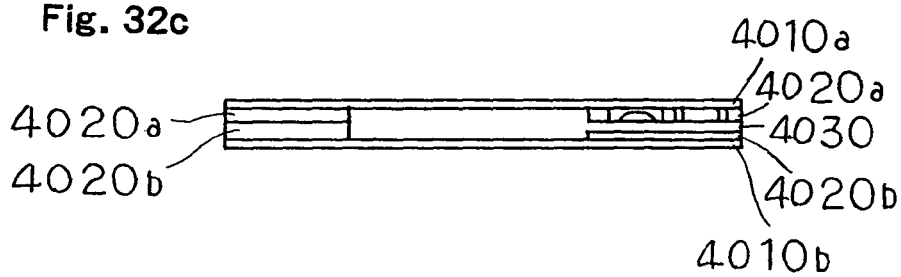
Figure 32D:
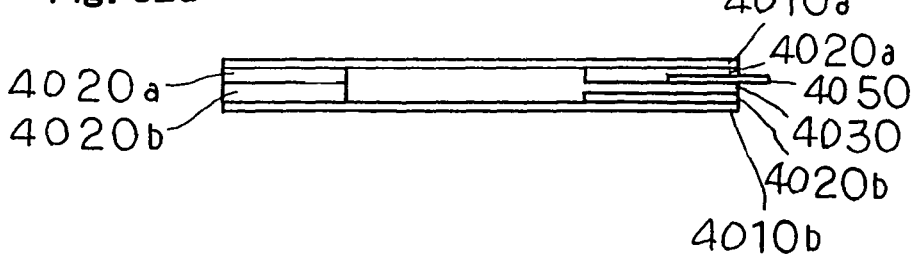
Figure 33:
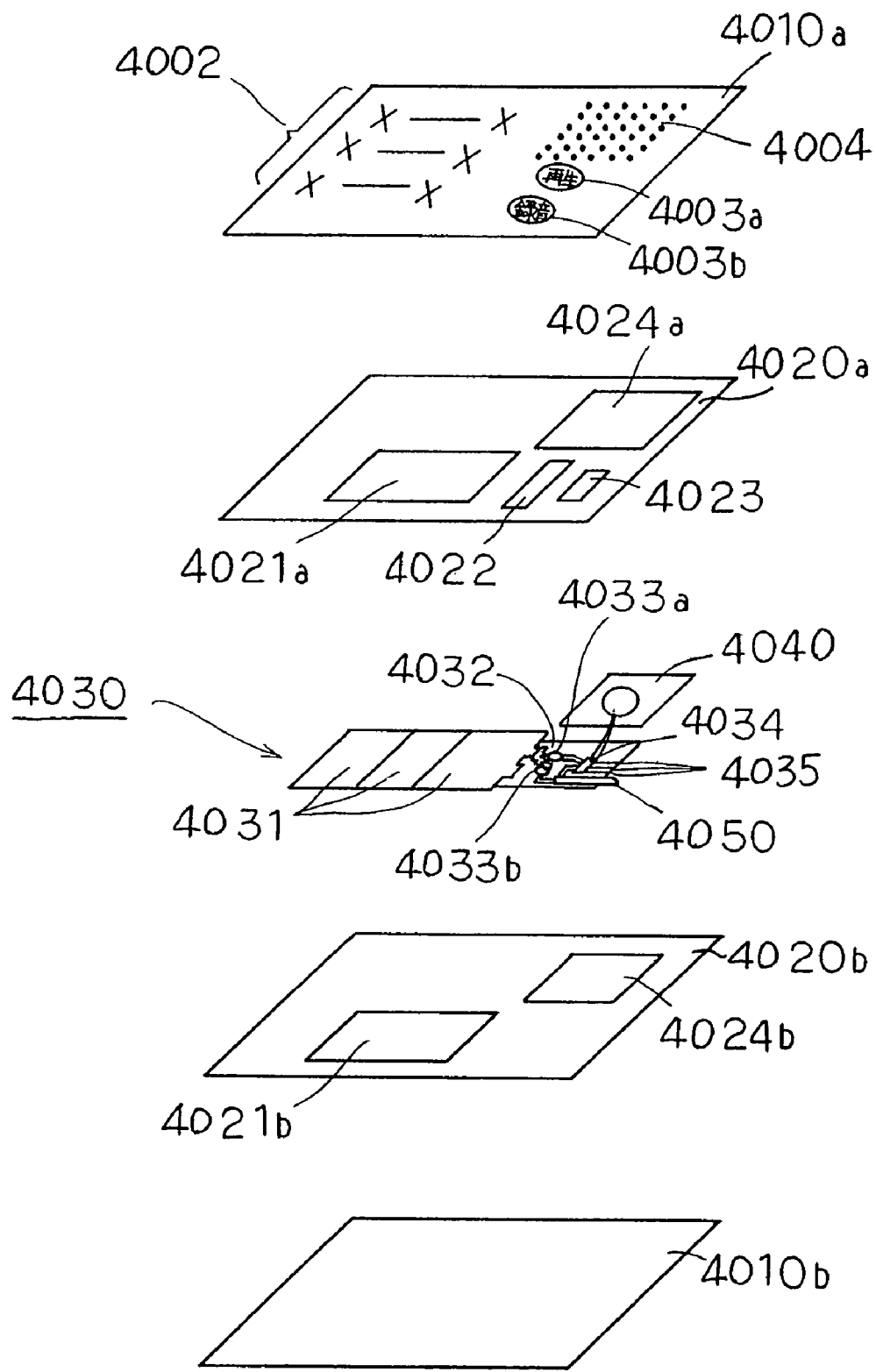
FIG. 33 illustrates a laminated structure of the audio message transfer sheet shown in FIGS. 32a to 32d.

FIG. 32a is a plan view of an audio message transfer sheet according to a twelfth embodiment of the present invention, FIG. 32b illustrates an inner structure of the audio message transfer sheet 4001 shown in FIG. 32a, FIG. 32c is a cross-sectional view along the line A-A' shown in FIG. 32a and FIG. 32d is a cross-sectional view along the line B-B' shown in FIG. 32a. Furthermore, FIG. 33 illustrates a laminated structure of the audio message transfer sheet 4001 shown in FIGS. 32a to 32d.

As shown in FIGS. 32a to 32d and FIG. 33, this embodiment is constructed of a sheet-like audio information recording/reproducing section 4030 capable of recording/reproducing audio information sandwiched between two support sheets 4020a, 4020b made of a flexible, thin base material such as paper base material, the support sheets 4020a, 4020b between which the audio information recording/reproducing section 4030 is sandwiched are further sandwiched between two surface sheets 4010a, 4010b made of a flexible, thin base material such as paper base material having the same outside shapes as those of the support sheets 4020a, 4020b and a sheet-like conductive member 4050 inserted in a detachable manner between part of the audio information recording/reproducing section 4030 and support sheet 4020a. The surface sheets 4010a, 4010b, support sheets 4020a, 4020b and audio information recording/reproducing section 4030 are bonded to one another through adhesive work applied to the front and back of the support sheets 4020a, 4020b. Furthermore, one surface of the conductive member 4050 is bonded to the support sheet 4020a through the adhesive work. This adhesive work can be realized, for example, by pasting a double-faced tape to the front and back of the support sheets 4020a, 4020b or applying a hot-melt type adhesive thereto.

Furthermore, the audio information recording/reproducing section 4030 is provided with a sheet-like audio information input/output section 4040 made up of a piezo-electric element (not shown) or diaphragm (not shown) for inputting/outputting audio information, an audio substrate 4032 mounted with a thin IC chip 4034 provided with a memory area which is a storage area for recording audio information input through the audio information input/output section 4040, circuit elements such as a capacitor and resistor and a first switch 4033a and a second switch 4033b, flexible paper batteries 4031 connected to the audio substrate 4032 for supplying power to the audio substrate 4032, and the audio substrate 4032 is further provided with connection terminals 4035 for inputting audio information to the IC chip 4034 from outside or outputting audio information recorded in the IC chip 4034 to outside. In this way, the audio information recording/reproducing section 4030 has a sheet-like structure. Here, the audio substrate 4032 is a flexible, thin substrate made of fiberglass reinforced plastics (FRP), polyethylene terephthalate (PET), polyimide or lead frame, etc., with the IC chip 4034 bonded thereto by means of anisotropic/conductive adhesive (ACP), anisotropic/conductive film (ACF) or wire bonding. Furthermore, the IC chip 4034 controls recording of audio information input through the audio information input/output section 4040 in the memory area and outputting of audio information recorded in the memory area through the audio information input/output section 4040. Furthermore, the first switch 4033a is operated to output audio information recorded in the memory area of the IC chip 4034 through the audio information input/output section 4040 and the second switch 4033b is operated to record audio information input through the audio information input/output section 4040 in the memory area of the IC chip 4034.

Furthermore, the support sheet 4020a is provided with holes 4021a, 4022, 4023, 4024a in areas facing the paper batteries 4031, switches 4033a, 4033b, IC chip 4034 and audio information input/output section 4040 respectively when superimposed on the audio information recording/reproducing section 4030, while the support sheet 4020b is provided with holes 4021b, 4024b in areas facing the paper batteries 4031 and audio information input/output section 4040 respectively when superimposed on the audio information recording/reproducing section 4030.

In this way, by forming the holes 4021a, 4022, 4023, 4024a in the areas of the support sheet 4020a facing the paper batteries 4031, switches 4033a, 4033b, IC chip 4034 and audio information input/output section 4040 respectively and forming the holes 4021b, 4024b in the areas of the support sheet 4020b facing the paper batteries 4031 and audio information input/output section 4040 area, it is possible to reduce the difference in thickness between the areas where the paper batteries 4031, switches 4033a, 4033b, IC chip 4034 and audio information input/output section 4040 are mounted and the other areas, thereby improve flatness of the surface sheets 4010a, 4010b and facilitate printing of information on the surface sheets 4010a, 4010b.

Figure 34A:
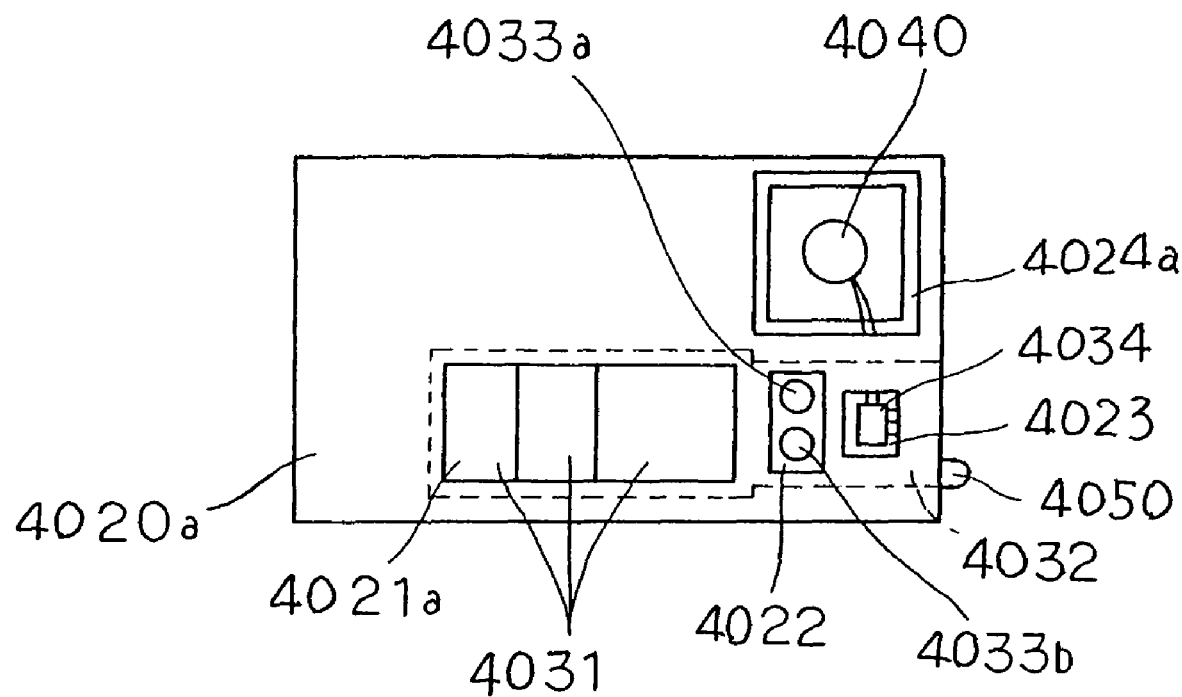
FIG. 34a illustrates a laminated structure of the support sheet and audio information recording/reproducing section shown in FIGS. 32a to 32d and FIG. 33.

FIG. 34a illustrates a laminated structure of the support sheet 4020a and audio information recording/reproducing section 4030 shown in FIGS. 32a to 32d and FIG. 33 and FIG. 34b illustrates a laminated structure of the support sheet 4020b and audio information recording/reproducing section 4030 shown in FIGS. 32a to 32d and FIG. 33.

As shown in FIG. 34a, the holes 4021a formed in the areas of the support sheet 4020a facing the paper batteries 4031 are smaller than the paper batteries 4031, the holes 4022 formed in the areas facing the switches 4033a, 4033b include the switches 4033a, 4033b, the hole 4023 formed in the area facing the IC chip 4034 is greater than the IC chip 4034 and the hole 4024a formed in the area facing the audio information input/output section 4040 is greater than the audio information input/output section 4040.

Figure 34B:
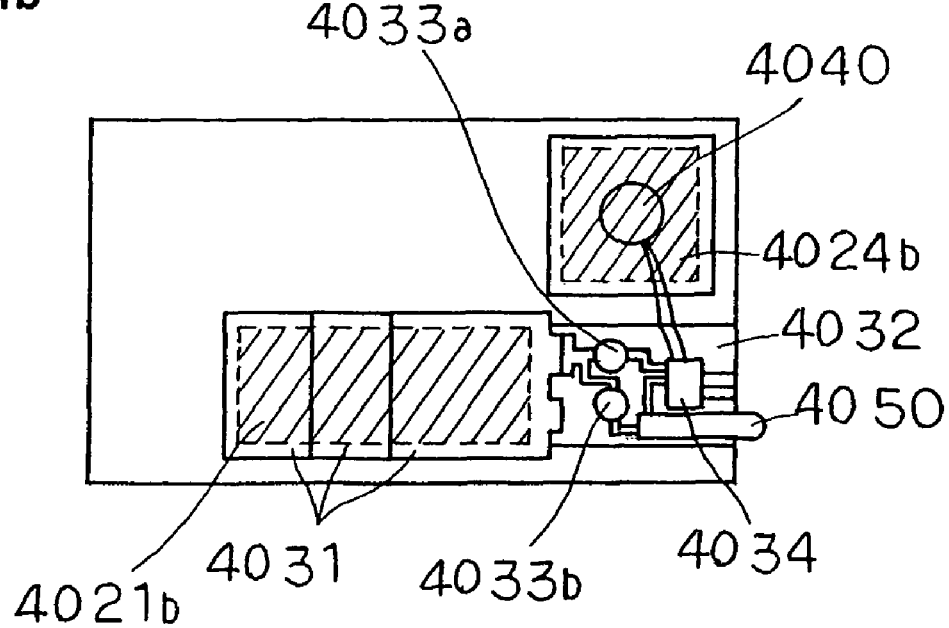
FIG. 34b illustrates a laminated structure of the support sheet and audio information recording/reproducing section shown in FIGS. 32a to 32d and FIG. 33.

Furthermore, as shown in FIG. 34b, the hole 4021b formed in the area of the support sheet 4020b facing the paper batteries 4031 is smaller than the paper batteries 4031 and the hole 4024b formed in the area facing the audio information input/output section 4040 is smaller than the audio information input/output section 4040.

In this way, the audio information recording/reproducing section 4030 is laminated in such a way that only part thereof is sandwiched from front and back between the two support sheets 4020a, 4020b and fixed through adhesive work applied to the front and back of the support sheets 4020a, 4020b.

Furthermore, of the two surface sheets 4010a, 4010b, the surface sheet 4010a facing the switches 4033a, 4033b and IC chip 4034 through the holes 4022, 4023 of the support sheet 4020a is provided with an information display area 4002 where address information, etc., is printed when this audio message transfer sheet 4001 is mailed, the area of the support sheet 4020a facing the switch 4033a through the hole 4022 is provided with a printed playback button 4003a for operating the switch 4033a, the area of the support sheet 4020a facing the switch 4033b through the hole 4022 is provided with a printed recording button 4003b for operating the switch 4033b, and in the area of the support sheet 4020a facing the audio information output section 4040 through the hole 4024a, an audio output area 4004 made up of an array of fine holes for outputting audio output from the audio information output section 4040 is formed. Even when the front and back of the audio information output section 4040 are covered with the surface sheets 4010a, 4010b, the formation of the audio output area 4004 made up of an array of fine holes can compensate for a reduction of sound volume output from the audio information input/output section 4040. In the audio output area 4004, holes of 0.1 mm in diameter are formed horizontally and vertically at intervals of 1.5 mm through laser beam machining. Therefore, unlike punching or perforation using needles, etc. to make a hole, no burrs are formed and the holes are never clogged with burrs. Furthermore, in FIG. 32a, though the information display area 4002 is not provided in the audio output area 4004, information including the playback button 4003a and the recording button 4003b is actually printed over the entire surface of the surface sheet 4010a, and therefore the information display area 4002 may also be provided in the audio output area 4004. Furthermore, instead of providing the playback button 4003a and the recording button 4003b on the surface sheet 4010a by printing, it is also possible to paste a seal to the areas facing the switches 4033a, 4033b after information is printed on the surface sheet 4010a.

The operation of the above described audio message transfer sheet 4001 during the audio information recording/reproducing operation will be explained below.

Figure 35A:
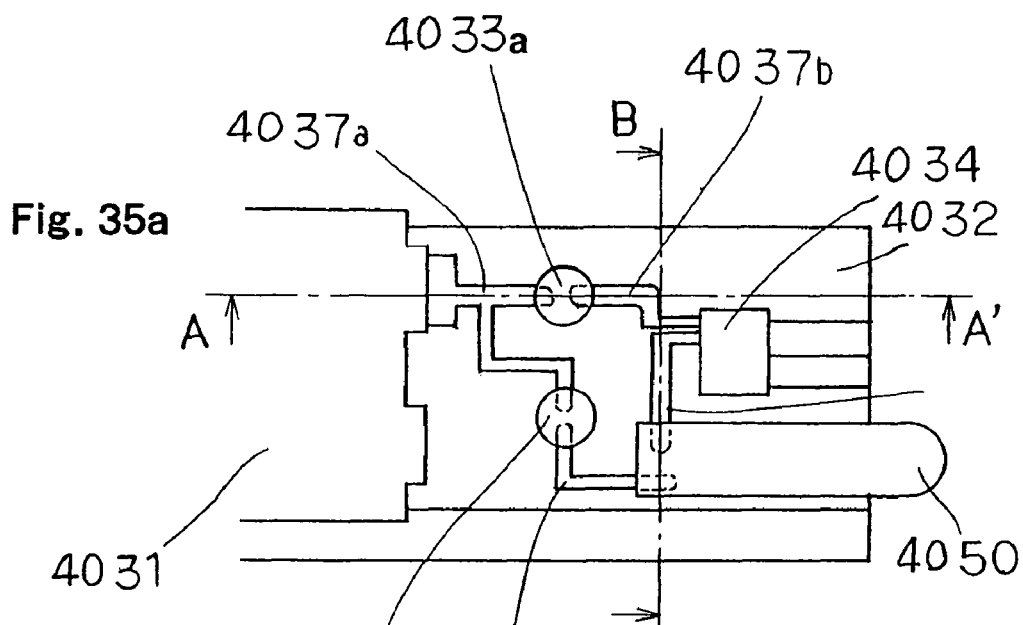
FIG. 35a illustrates a detailed structure of the audio substrate shown in FIG. 32b.
Figure 35B:
FIG. 35b is a cross-sectional view along the line A-A' of the switch shown in FIG. 35a when not operated.
Figure 35C:
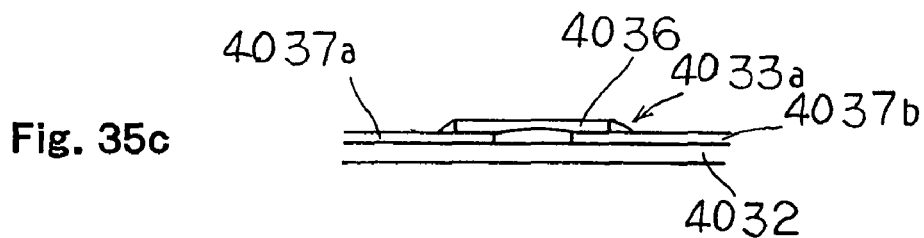
FIG. 35c is a cross-sectional view along the line A-A' of the switch shown in FIG. 35a when operated.
Figure 35D:
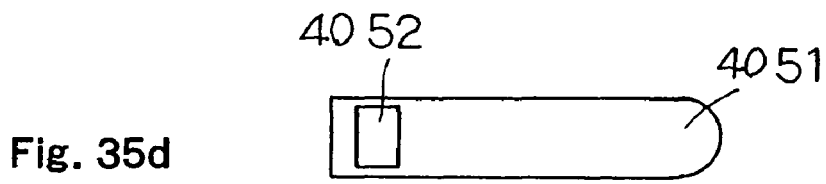
FIG. 35d illustrates a structure of the back of the conductive member shown in FIG. 32d.
Figure 35E:
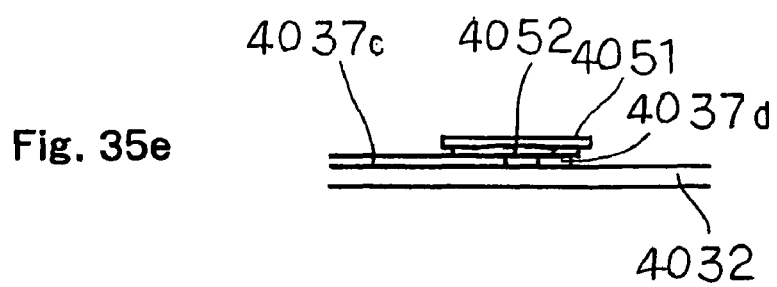

FIG. 35a illustrates a detailed structure of the audio substrate 4032 shown in FIG. 32b, FIG. 35b is a cross-sectional view along the line A-A' of the switch 4033a shown in FIG. 35a when not operated, FIG. 35c is a cross-sectional view along the line A-A' of the switch 4033a shown in FIG. 35a when operated, FIG. 35d illustrates a structure of the back of the conductive member 4050 shown in FIG. 32d and FIG. 35e is a cross-sectional view along the line B-B' shown in FIG. 35a.

As shown in FIG. 35a, in this embodiment, a wiring pattern 4037a connected to the positive electrode of the paper batteries 4031 is formed on the audio substrate 4032 so as to extend to the lower parts of the switches 4033a, 4033b, and a wiring pattern 4037b connected to the port terminal of the port terminals of the IC chip 4034 to which a first instruction signal for outputting audio information recorded in the memory area of the IC chip 4034 is input is formed on the audio substrate 4032 so as to extend to the lower part of the switch 4033a without touching the wiring pattern 4037a. Furthermore, a wiring pattern 4037c connected to the port terminal of the port terminals of the IC chip 4034 to which a second instruction signal for recording the audio information input through the audio information input/output section 4040 in the memory area of the IC chip 4034 is input is formed on the audio substrate 4032 so as to extend to the lower part of the conductive member 4050 sandwiched between the audio substrate 4032 and support sheet 4020a, and a wiring pattern 4037d which extends from the lower part of the switch 4033b to the lower part of the conductive member 4050 is formed on the audio substrate.4032 so as not to touch the wiring patterns 4037a, 4037c. When the port terminal connected to the wiring pattern 4037b becomes a power supply potential which is the potential of the first instruction signal, the IC chip 4034 outputs audio information recorded in the memory area of the IC chip 4034 and when the port terminal connected to the wiring pattern 4037c becomes a power supply potential which is the potential of the second instruction signal, the IC chip 4034 records the audio information input through the audio information input/output section 4040 in the memory area of the IC chip 4034 as long as the port terminal connected to the wiring pattern 4037c is at the power supply potential.

In the audio message transfer sheet 4001 structured as described above, when the switch 4033a is not pressed through the playback button 4003a, the wiring pattern 4037a and the wiring pattern 4037b formed on the audio substrate 4032 are not electrically connected as shown in FIG. 35b. For this reason, the port terminal of the port terminals of the IC chip 4034 connected to the wiring pattern 4037b, that is, the port terminal to which the first instruction signal for outputting the audio information recorded in the memory area of the IC chip 4034 is input is left open and the audio information recorded in the memory area of the IC chip 4034 is not output.

On the other hand, when the switch 4033a is pressed through the playback button 4003a, the wiring pattern 4037a and wiring pattern 4037b formed on the audio substrate 4032 are electrically connected through a conductive agent 4036 applied to the back of the switch 4033a as shown in FIG. 35c. Since the wiring pattern 4037a is connected to the positive electrode of the paper batteries 4031, the port terminal connected to the wiring pattern 4037b, that is, the port terminal to which the first instruction signal for outputting the audio information recorded in the memory area of the IC chip 4034 is input becomes the power supply potential and the first instruction signal is input to the IC chip 4034 and the audio information recorded in the memory area of the IC chip 4034 is output through the audio information input/output section 4040. Thus, pressing the switch 4033a through the playback button 4003a causes the audio information recorded in the IC chip 4034 to be output through the audio information input/output section 4040.

Furthermore, during the operation of the switch 4033b through the recording button 4003b as well as during the operation of the switch 4033a through the playback button 4003a, when the switch 4033b is not pressed through the recording button 4003b, the wiring pattern 4037a and wiring pattern 4037d formed on the audio substrate 4032 are not electrically connected and when the switch 4033b is pressed through the recording button 4003b, the wiring pattern 4037a and wiring pattern 4037d are electrically connected through a conductive agent (not shown) applied to the back of the switch 4033b.

Here, in this embodiment, the wiring pattern 4037d is not directly connected to the port terminal to which the second instruction signal of the IC chip 4034 is input and recording of the audio information input through the audio information input/output section 4040 in the IC chip 4034 is also controlled by the conductive member 4050.

The conductive member 4050 sandwiched between the audio substrate 4032 and support sheet 4020a is constructed with a conductive area 4052 formed by applying a conductive agent to part of the back of the film sheet 4051 as shown in FIG. 35d and the conductive member 4050 is sandwiched between the audio substrate 4032 and support sheet 4020a so that the surface on which the conductive area 4052 is formed faces the audio substrate 4032.

When the conductive member 4050 is sandwiched between the audio substrate 4032 and support sheet 4020a, as shown in FIG. 35e, the wiring pattern 4037c formed on the audio substrate 4032 and the wiring pattern 4037d are electrically connected through the conductive area 4052 provided on the back of the conductive member 4050. If the switch 4033b is pressed through the recording button 4003b in this condition, the wiring pattern 4037a formed on the audio substrate 4032 and the wiring pattern 4037c are electrically connected through the conductive agent applied to the back of the switch 4033b, wiring pattern 4037d and the conductive area 4052 provided on the back of the conductive member 4050. Since the wiring pattern 4037a is connected to the positive electrode of the paper batteries 4031, the port terminal connected to the wiring pattern 4037c, that is, the port terminal to which the second instruction signal for recording the audio information input through the audio information input/output section 4040 in the memory area of the IC chip 4034 is input becomes the power supply potential, which means that the second instruction signal has been input to the IC chip 4034, and if audio information is input through the audio information input/output section 4040 in that condition, the audio information input is recorded in the memory area of the IC chip 4034. In this way, with the conductive member 4050 sandwiched between the audio substrate 4032 and support sheet 4020a, when the switch 4033b is pressed through the recording button 4003b and at the same time audio information is input through the audio information input/output section 4040, the audio information input through the audio information input/output section 4040 is recorded in the IC chip 4034. Here, when the conductive member 4050 is sandwiched between the audio substrate 4032 and support sheet 4020a, one surface of the conductive member 4050 is fixed by being bonded to the support sheet 4020a through adhesive work applied to the support sheet 4020a, which prevents the conductive member 4050 from being shifted.

On the other hand, when the conductive member 4050 is removed from between the audio substrate 4032 and support sheet 4020a, the wiring pattern 4037c and wiring pattern 4037d are electrically left open, and therefore even if the switch 4033b is pressed through the recording button 4003b to electrically connect between the wiring pattern 4037a and wiring pattern 4037d, the port terminal to which the second instruction signal of the IC chip 4034 is input does not become the power supply potential, and therefore even if audio information is input through the audio information input/output section 4040, the audio information input is never recorded in the memory area of the IC chip 4034.

In this way, this embodiment inserts the conductive member 4050 between the support sheet 4020a and audio substrate 4032 in a detachable manner and inputs a second instruction signal to the IC chip 4034 through the conductive member 4050 so as to record audio information input through the audio information input/output section 4040 in the memory area of the IC chip 4034 only when the switch 4033b is pressed through the recording button 4003b in that condition, and therefore if this conductive member 4050 is removed after audio information is recorded in the memory area of the IC chip 4034, the input audio information is not recorded in the memory area of the IC chip 4034 even when audio information is input through the audio information input/output section 4040 later by pressing the switch 4033b through the recording button 4003b, thereby preventing the already recorded audio information from being erased by misoperation of the switch 4033b through the recording button 4003b.

In this embodiment, the audio information recording/reproducing section 4030 and conductive member 4050 are sandwiched between two support sheets 4020a, 4020b and these support sheets 4020a, 4020b are further sandwiched between the two surface sheets 4010a, 4010b, but it is also possible to adopt a structure that the audio information recording/reproducing section 4030 and conductive member 4050 are sandwiched only between the two surface sheets 4010a, 4010b without the support sheets 4020a, 4020b.

The invention shown by the above described twelfth embodiment allows the recording of audio information in the IC chip through the conductive member sandwiched between two surface sheets and prohibits the recording of audio information in the IC by removing this conductive member from the two surface sheets, and therefore even when the recording of audio information in the IC chip is prohibited, the surface sheet which becomes the outward appearance of the audio message transfer sheet remains the same, prevents the appearance from becoming unattractive, it is possible to determine whether the recording of audio information in the IC chip is prohibited or not by means of the presence/absence of the conductive member, which makes it possible to visually check whether the recording is prohibited or not.

Furthermore, in the case where the conductive member is fixed between the two surface sheets in a detachable manner, the conductive member is fixed when the conductive member is sandwiched between the two surface sheets, and it is thereby possible to prevent the conductive member from being shifted between two surface sheets or prevent the IC chip and second switch from being electrically left open while the conductive member is sandwiched between the two surface sheets with the result that audio information cannot be recorded even if the second switch is operated.

Thirteenth Embodiment

FIG. 36a is a plan view of a double postal card which constitutes an audio information delivery component according to a thirteenth embodiment of the present invention, FIG. 36b illustrates an inner structure of the double postal card 5001 shown in FIG. 36a and FIG. 36c is a rear view of the double postal card 5001 shown in FIG. 36a and FIG. 36d is a cross-sectional view along the line A-A' shown in FIG. 36a. FIG. 37 illustrates a laminated structure of the double postal card 5001 shown in FIGS. 36a to 36d.

As shown in FIGS. 36a to 36d and FIG. 37, this embodiment is a double postal card 5001 consisting of a transmitting message card 5002 which constitutes a transmitting message section and a reply message card 5003 which constitutes a reply message section connected together through a connection part 5004, comprising a sheet-like first audio information recording/reproducing section 5030 capable of recording/reproducing audio information sandwiched between two support sheets 5020a, 5020b made of a flexible and thin base material such as paper base material and support sheets 5020a, 5020b between which the audio information recording/reproducing sections 5030 is sandwiched are further sandwiched between two surface sheets 5010a, 5010b made of a flexible and thin base material such as paper base material. The surface sheets 5010a, 5010b, support sheets 5020a, 5020b and audio information recording/reproducing section 5030 are bonded to one another through adhesive work applied to the front and back of the support sheets 5020a, 5020b. This adhesive work can be realized, for example, by pasting a double-faced tape to the front and back of the support sheets 5020a, 5020b or applying a hot-melt type adhesive thereto.

Furthermore, the audio information recording/reproducing section 5030 is constructed of a sheet-like audio information input/output section 5040 made up of a piezo-electric element (not shown), a diaphragm (not shown) for inputting/outputting audio information, an audio substrate 5032 mounted with a thin IC chip 5034 which includes a memory area which is a storage area in which audio information input through the audio information input/output section 5040 is recorded, circuit elements such as a capacitor and resistor, a first switch 5033a and second switch 5033b electrically connected to the IC chip 5034, flexible paper batteries 5031 connected to the audio substrate 5032 for supplying power to the audio substrate 5032 and a connection substrate 5050 on which a wiring pattern 5037e for electrically connecting the switch 5033b and IC chip 5034 is formed. In this way, the audio information recording/reproducing section 5030 has a sheet-like structure. Furthermore, the audio substrate 5032 is provided with connection terminals 5035 for inputting audio information to the IC chip 5034 from outside and outputting audio information recorded in the IC chip 5034 to outside, a wiring pattern 5037a for connecting the positive electrode of the paper batteries 5031 and switches 5033a, 5033b, a wiring pattern 5037b for connecting the port terminal of the port terminals of the IC chip 5034 to which a first instruction signal for outputting audio information recorded in the memory area of the IC chip 5034 is input and the switch 5033a, a wiring pattern 5037c for connecting the port terminal of the port terminals of the IC chip 5034 to which a second instruction signal for recording audio information input through the audio information input/output section 5040 in the memory area of the IC chip 5034 is input and a wiring pattern 5037e formed on the connection substrate 5050, and a wiring pattern 5037d for connecting the wiring pattern 5037e and switch 5033b. Here, the wiring pattern 5037a and the wiring pattern 5037b are not electrically connected at the lower part of the switch 5033a, and the wiring pattern 5037a and the wiring pattern 5037d are not electrically connected at the lower part of the switch 5033b. Furthermore, the audio substrate 5032 is a flexible, thin substrate made of fiberglass reinforced plastics (FRP), polyethylene terephthalate (PET), polyimide or lead frame, etc., with the IC chip 5034 bonded thereto by means of anisotropic/conductive adhesive (ACP), anisotropic/conductive film (ACF) or wire bonding. Furthermore, the IC chip 5034 controls recording of audio information input through the audio information input/output section 5040 in the memory area and outputting of audio information recorded in the memory area through the audio information input/output section 5040, and when the port terminal connected to the wiring pattern 5037b becomes the power supply potential which is the potential of the first instruction signal, the IC chip 5034 outputs the audio information recorded in the memory area of the IC chip 5034 through the audio information input/output section 5040 and records the audio information input through the audio information input/output section 5040 in the memory area of the IC chip 5034 as long as the port terminal connected to the wiring pattern 5037c has the power supply potential which is the potential of the second instruction signal. Furthermore, the switch 5033a is operated to output audio information recorded in the memory area of IC chip 5034 through the audio information input/output section 5040 and the switch 5033b is operated to record audio information input through the audio information input/output section 5040 in the memory area of the IC chip 5034.

The audio information input/output section 5040, audio substrate 5032, paper batteries 5031 and connection substrate 5050 making up the audio information recording/reproducing section 5030 are sandwiched between the support sheets 5020a, 5020b so that parts of the audio information input/output section 5040, audio substrate 5032, paper batteries 5031 and connection substrate 5050 are placed on the reply message card 5003 side. That is, these parts are sandwiched between the support sheets 5020a, 5020b so that the wiring pattern 5037e formed on the connection substrate 5050 of the audio information recording/reproducing section 5030 spans the transmitting message card 5002 and reply message card 5003 through the connection part 5004.

Furthermore, as shown in FIG. 37, when superimposed on the surface sheet 5010a, the support sheet 5020a is divided into two portions through the area facing the connection part 5004 and when superimposed on the audio information recording/reproducing section 5030, holes 5021a, 5022, 5023, 5024a are formed in the areas facing the paper batteries 5031, switches 5033a, 5033b, IC chip 5034 and audio information input/output section 5040, and when superimposed on the surface sheet 5010b, the support sheet 5020b is divided into two portions through the area facing the connection part 5004 and holes 5021b, 5024b are formed in the areas facing the paper batteries 5031 and audio information input/output section 5040 when superimposed on the audio information recording/reproducing section 5030.

In this way, by forming the holes 5021a, 5022, 5023, 5024 in the areas of the support sheet 5020a facing the paper batteries 5031, switch 5033a, 5033b, IC chip 5034 and audio information input/output section 5040 respectively and forming the holes 5021b, 5024b in the areas of the support sheet 5020b facing the paper batteries 5031 and audio information input/output section 5040, it is possible to reduce the difference in thickness between the areas where the paper batteries 5031, switches 5033a, 5033b, IC chip 5034 and audio information input/output section 5040 are mounted, and the other areas, thereby improve flatness of the surface sheets 5010a, 5010b and facilitate printing of information on the surface sheets 5010a, 5010b.

FIG. 38a illustrates a laminated structure of the support sheet 5020a and audio information recording/reproducing section 5030 shown in FIGS. 36a to 36d and FIG. 37 and FIG. 38b illustrates a laminated structure of the support sheet 5020b and audio information recording/reproducing section 5030 shown in FIGS. 36a to 36d and FIG. 37.

As shown in FIG. 36a, the hole 5021a formed in the area of the support sheet 5020a facing the paper batteries 5031 is smaller than the paper batteries 5031, the hole 5022 formed in the area facing the switches 5033a, 5033b includes the switches 5033a, 5033b, the hole 5023 formed in the area facing the IC chip 5034 is greater than the IC chip 5034 and the hole 5024a formed in the area facing the audio information input/output section 5040 is greater than the audio information input/output section 5040.

Furthermore, as shown in FIG. 36b, the hole 5021b formed in the area of the support sheet 5020b facing the paper batteries 5031 is smaller than the paper batteries 5031 and the hole 5024b formed in the area facing the audio information input/output section 5040 is smaller than the audio information input/output section 5040.

In this way, the audio information recording/reproducing section 5030 is laminated in such a way that only part thereof is sandwiched between the two support sheets 5020a, 5020b from front and back and fixed through adhesive work applied to the front and back of the support sheets 5020a, 5020b.

Furthermore, as shown in FIG. 36a, of the two surface sheets 5010a, 5010b, the surface sheet 5010a facing the switches 5033a, 5033b and IC chip 5034 through the holes 5022, 5023 of the support sheet 5020a is provided with an address information entry area 5015 for entering the address and name, etc., of the receiver of this double postal card 5001 in the area which becomes the transmitting message card 5002 through the connection part 5004, the area which becomes the reply message card 5003 through the connection part 5004 facing the switch 5033a through the hole 5022 of the support sheet 5020a is provided with printing indicating a playback button 5011a for operating the switch 5033a, and the area of the support sheet 5020a facing the switch 5033b through the hole 5022 is provided with printing indicating a recording button 5011b for operating the switch 5033b. Furthermore, in the area of the support sheet 5020a facing the audio information input/output section 5040 through the hole 5024a, an audio output area 5014 made up of an array of fine holes for outputting audio output from the audio input/output section 5040 to outside is formed. Even when the front and back of the audio information input/output section 5040 are covered with the surface sheets 5010a, 5010b, the formation of the audio output area 5014 made up of an array of fine holes can compensate for a reduction of sound volume output from the audio information input/output section 5040. In the audio output area 5014, holes of 0.1 mm in diameter are formed horizontally and vertically at intervals of 1.5 mm through laser beam machining. Therefore, unlike punching or perforation using needles, etc., no burrs are formed and the holes are never clogged with burrs. Furthermore, the area of the surface sheet 5010a which becomes the reply message card 5003 through the connection part 5004 is provided with an information entry field 5013 for the receiver of the double postal card 5001 to enter information to be transmitted to the sender of the double postal card 5001 using this reply message card 5003. In FIG. 36a, though no information is printed on the audio output area 5014, information including the playback button 11a and the recording button 11b is actually printed over the entire surface of the surface sheet 5010a, and therefore information can also be printed on the audio output area 5014. Furthermore, instead of providing the playback button 5011a and the recording button 5011b on the surface sheet 5010a by printing, it is also possible to paste seals to the areas facing the switches 5033a, 5033b after information is printed on the surface sheet 5010a. Furthermore, the connection part 5004 is preferably structured to be easily detachable by forming perforation. In this embodiment, since the support sheets 5020a, 5020b are divided through the area facing the connection part 5004, perforation is formed on the surface sheets 5010a, 5010b.

A method of use of the above described double postal card 5001 will be explained below.

First, the sender of the double postal card 5001 prints the playback buttons 5011a, 5011b and information entry field 5013 in the area of the surface sheet 5010a which becomes the reply message card 5003 and prints guide information 5017 which becomes information to be transmitted to the receiver of this double postal card 5001 in the area of the surface sheet 5010b which becomes the transmitting message card 5002 and prints address information 5016 such as the address and name of the receiver of the reply message card 5003 in the area which becomes the reply message card 5003.

Furthermore, with the switch 5033b held down through the recording button 5011b, audio information to be transmitted to the receiver of the double postal card 5001 is entered through the audio information input/output section 5040 and recorded in the memory area in the IC chip 5034.

Figure 39A:
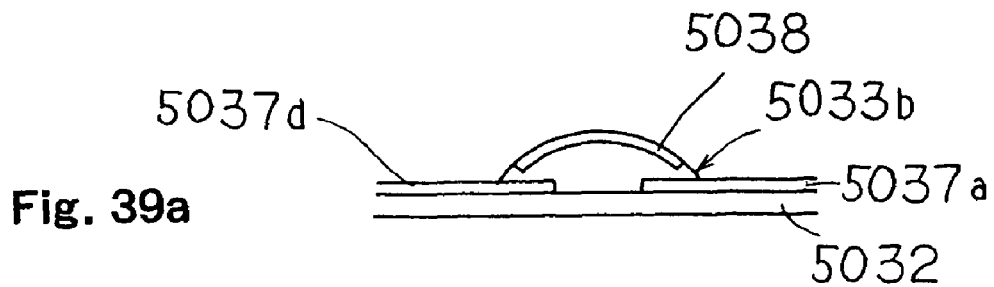
FIG. 39a is a cross-sectional view of the vicinity of the switch when the switch is not pressed through the recording button shown in FIGS. 36a, 26b.
Figure 39B:
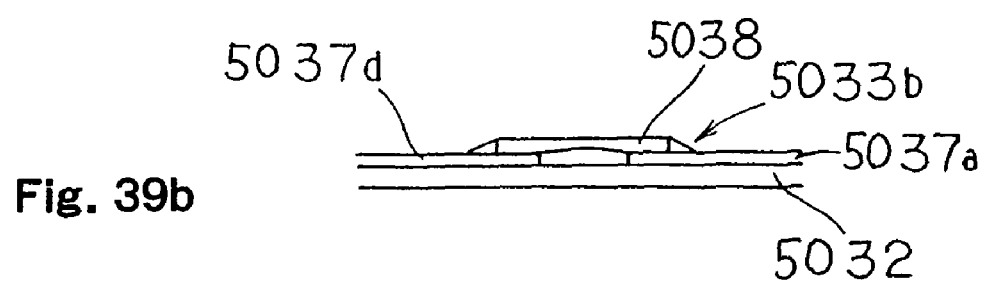
FIG. 39b is a cross-sectional view of the vicinity of the switch when the switch is pressed through the recording button shown in FIGS. 36a, 26b.

FIG. 39a is a cross-sectional view of the vicinity of the switch 5033b when the switch 5033b is not pressed through the recording button 5011b shown in FIGS. 36a, 26b and FIG. 39b is a cross-sectional view of the vicinity of the switch 5033b when the switch 5033b is pressed through the recording button 5011b shown in FIGS. 36a, 26b.

With the double postal card 1 shown in FIGS. 36a to 36d, when the switch 5033b is not pressed through the recording button 5011b, the wiring pattern 5037a formed on the audio substrate 5032 and wiring pattern 5037d are not electrically connected as shown in FIG. 39a. For this reason, the port terminal of the port terminals of the IC chip 5034 connected to the wiring pattern 5037d through the wiring patterns 5037c, 5037e, that is, the port terminal to which a second instruction signal for recording the audio information input through audio information input/output section 5040 is recorded in the memory area of the IC chip 5034 is left open and even when audio information is input through the audio information input/output section 5040 in this condition, the audio information input is not recorded in the memory area of the IC chip 5034.

On the other hand, when the switch 5033b is pressed through the recording button 5011b, as shown in FIG. 39b, the wiring pattern 5037a formed on the audio substrate 5032 and the wiring pattern 5037d are electrically connected through the conductive agent 5038 applied to the back of the switch, 5033b. Since the wiring pattern 5037a is connected to the positive electrode of the paper batteries 5031, the port terminal connected to the wiring pattern 5037d through the wiring patterns 5037c, 5037e, that is, the port terminal to which a second instruction signal for recording the audio information input through the audio information input/output section 5040 in the memory area of the IC chip 5034 is input becomes the power supply potential, which means that the second instruction signal has been input to the IC chip 5034, and when audio information is thereby input through the audio information input/output section 5040 in this condition, the audio information input is recorded in the memory area of the IC chip 5034.

As described above, by recording audio information after printing on the double postal card 5001, it is possible to record desired different pieces of audio information at the destination of the double postal card 5001, but printing may also be performed after recording audio information.

Furthermore, instead of inputting audio information through the audio information input/output section 5040, it is also possible to input audio information from outside through the connection terminal 5035 provided on the audio substrate 5032. In that case, not only audio information but also an instruction of entering this audio information is input through the connection terminal 5035 and when this instruction is input, the IC chip 5034 records the audio information input through the connection terminal 5035 in the memory area. It is also possible to output audio information recorded in the memory area of the IC chip 5034 to the outside through the connection terminal 5035. In that case, an instruction of outputting the audio information recorded in the memory area of the IC chip 5034 is input through the connection terminal 5035 and when this instruction is input, the IC chip 5034 outputs the audio information stored in the memory area through the connection terminal 5035.

In this way, when information is printed, the double postal card 5001 with audio information recorded is delivered and when the receiver receives it and presses the switch 5033a through the playback button 5011a, the audio information recorded in the memory area of the IC chip 5034 is output through the audio information input/output section 5040.

As in the case where the switch 5033b is pressed through the recording button 5011b, when the switch 5033a is not pressed through the playback button 5011a, the wiring pattern 5037a formed on the audio substrate 5032 and wiring pattern 5037b are not electrically connected, and for this reason, the port terminal of the port terminals of the IC chip 5034 connected to the wiring pattern 5037b, that is, the port terminal to which a first instruction signal for outputting the audio information recorded in the memory area of the IC chip 5034 is input is left open and the audio information recorded in the memory area of the IC chip 5034 is not output.

On the other hand, when the switch 5033a is pressed through the playback button 5011a, the wiring pattern 5037a formed on the audio substrate 5032 and the wiring pattern 5037b are electrically connected through a conductive agent (not shown) applied to the back of the switch 5033a. Since the wiring pattern 5037a is connected to the positive electrode of the paper batteries 5031, the port terminal connected to the wiring pattern 5037b, that is, the port terminal to which a first instruction signal for outputting audio information recorded in the memory area of the IC chip 5034 is input becomes the power supply potential and the first instruction signal is input to the IC chip 5034 and the audio information recorded in the memory area of the IC chip 5034 is output through the audio information input/output section 5040. In this way, by pressing the switch 5033a through the playback button 5011a, audio information recorded in the IC chip 5034 is output through the audio information input/output section 5040.

Furthermore, when the receiver of the double postal card 5001 enters information to be transmitted to the sender of the double postal card 5001 into the information entry field 5013 using this reply message card 5003 and then separates the transmitting message card 5002 from the reply message card 5003 along the connection part 5004, the connection substrate 5050 of the audio information recording/reproducing section 5030 is thereby cut and the wiring pattern 5037e formed on the connection substrate 5050 is cut. Here, the connection substrate 5050 is made of a material such as a film which is easily cut and a notch 5051 is formed in a shape which will not impair the connection condition of the wiring pattern 5037e in an area facing the connection part 5004 and the wiring pattern 5037e has a reduced line width so that the wiring pattern 5037e can be easily cut when the transmitting message card 5002 is separated from the reply message card 5003 through the connection part 5004. Furthermore, forming perforation instead of the notch 5051 in the area facing the connection part 5004 of the connection substrate 5050 can also provide a structure that the wiring pattern 5037e can be easily cut when the transmitting message card 5002 is separated from the reply message card 5003 through the connection part 5004.

Figure 40:
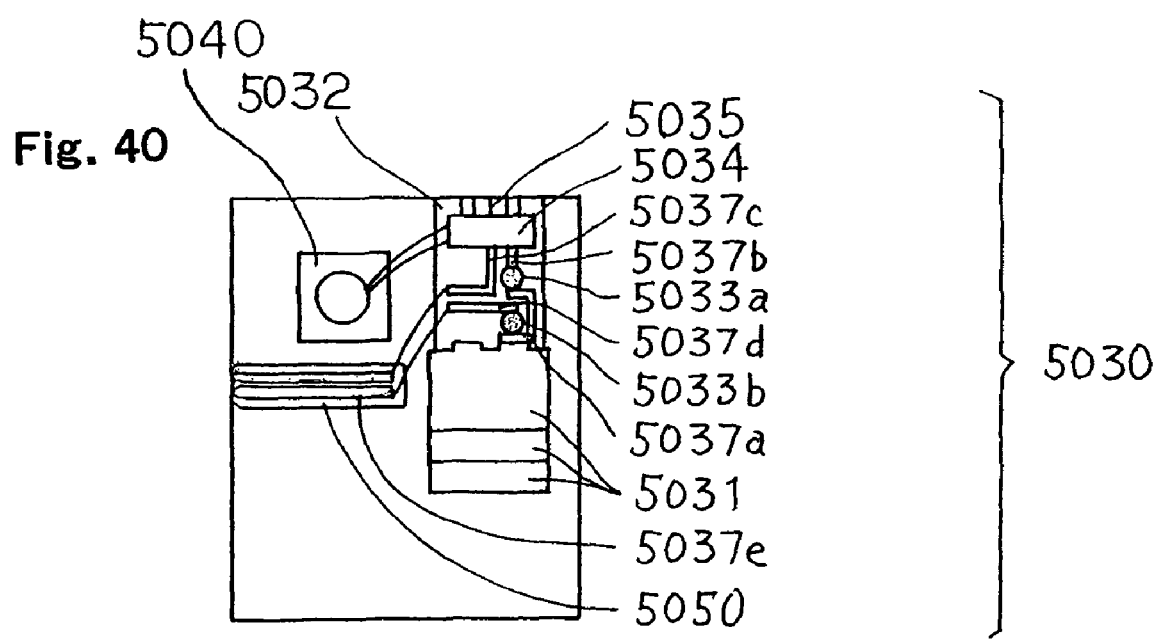
FIG. 40 illustrates an inner structure of the double postal card shown in FIGS. 36a to 36d separated into a transmitting message card and reply message card along the connection part.

FIG. 40 illustrates an inner structure of the double postal card 5001 shown in FIGS. 36a to 36d separated into the transmitting message card 5002 and the reply message card 5003 along the connection part 5004.

As shown in FIG. 40, when the transmitting message card 5002 is separated from the reply message card 5003 through the connection part 5004, the connection substrate 5050 is cut and the wiring pattern 5037e formed on the connection substrate 5050 is thereby cut. In this condition, the wiring pattern 5037d connected to the switch 5033b and the wiring pattern 5037c connected to the port terminal to which a second instruction signal for recording audio information input through the audio information input/output section 5040 in the memory area of the IC chip 5034 is input are not electrically connected, and therefore even if the switch 5033b is pressed through the recording button 5011b, the port terminal to which the second instruction signal for recording the audio information input through the audio information input/output section 5040 in the memory area of the IC chip 5034 is input does not become the power supply potential. For this reason, even if audio information is input through the audio information input/output section 5040 in this condition, the input audio information is not recorded in the memory area of the IC chip 5034.

Then, the receiver of the double postal card 5001 sends the reply message card 5003, but as described above, even if the switch 5033b is pressed through the recording button 5011b, the audio information is not recorded in the IC chip 5034, and therefore it is possible to prevent the already recorded audio information from being erased by misoperation of the switch 5033b through the recording button 5011b after the reply message card 5003 is sent.

After the reply message card 5003 sent in this way is delivered to the receiver of the reply message card 5003, if the receiver of the reply message card 5003 presses the switch 5033a through the playback button 5011a, the audio information recorded in the IC chip 5034 by the sender of the reply message card 5003 is output through the audio information input/output section 5040.

Fourteenth Embodiment

FIG. 41a is a plan view of a double postal card which constitutes an audio information delivery component according to a fourteenth embodiment of the present invention, FIG. 41b is a plan view of an inner structure of the double postal card 5101 shown in FIG. 41a, FIG. 41c is a rear view of the double postal card 5101 shown in FIG. 41a, FIG. 41d is a rear view of an inner structure of the double postal card 5101 shown in FIG. 41a and FIG. 41e is a cross-sectional view along the line A-A' shown in FIG. 41a. Furthermore, FIG. 42 illustrates a laminated structure of the double postal card shown in FIGS. 41a to 41e.

As shown in FIGS. 41a to 41e, this embodiment differs from the thirteenth embodiment in that a sheet-like second audio information recording/reproducing section 5130 capable of recording/reproducing audio information is provided on the transmitting message card 5002 side sandwiched between support sheets 5020a, 5020b and surface sheets 5010a, 5010b.

This audio information recording/reproducing section 5130 is constructed of a sheet-like audio information output section 5140 made up of a piezo-electric element (not shown) or diaphragm (not shown) for outputting audio information, an audio substrate 5132 mounted with a thin IC chip 5134 provided with a memory area which is a storage area in which audio information is recorded, circuit elements such as a capacitor, resistor and switches 5133 electrically connected to the IC chip 5134, and flexible paper batteries 5131 connected to the audio substrate 5132 for supplying power to the audio substrate 5132. In this way, the audio information recording/reproducing section 5130 has a sheet-like structure. Furthermore, the audio substrate 5132 is provided with connection terminals 5135 for inputting audio information to the IC chip 5134 from outside and outputting audio information recorded in the IC chip 5134 to outside, a wiring pattern 5137a for connecting the positive electrode of the paper batteries 5131 and switches 5133, a wiring pattern 5137b for connecting the port terminal of the port terminals of the IC chip 5134 to which an instruction signal for outputting audio information recorded in the memory area of the IC chip 5134 is input and the switches 5133. Here, the wiring pattern 5137a and the wiring pattern 5137b are not electrically connected at the lower part of the switch 5133. Furthermore, the audio substrate 5132 is a flexible, thin substrate made of fiberglass reinforced plastics (FRP), polyethylene terephthalate (PET), polyimide or lead frame, etc., with the IC chip 5134 bonded thereto by means of anisotropic/conductive adhesive (ACP), anisotropic/conductive film (ACF) or wire bonding. Furthermore, the IC chip 5134 controls recording of audio information input through the connection terminal 5135 in the memory area and outputting of audio information recorded in the memory area through the audio information output section 5140, and when the port terminal connected to the wiring pattern 5137b becomes the power supply potential which is the potential of the instruction signal, the IC chip 5134 outputs the audio information recorded in the memory area of the IC chip 5134. Furthermore, the switches 5133 are operated to output audio information recorded in the memory area of the IC chip 5134 through the audio information output section 5140.

Figure 42:
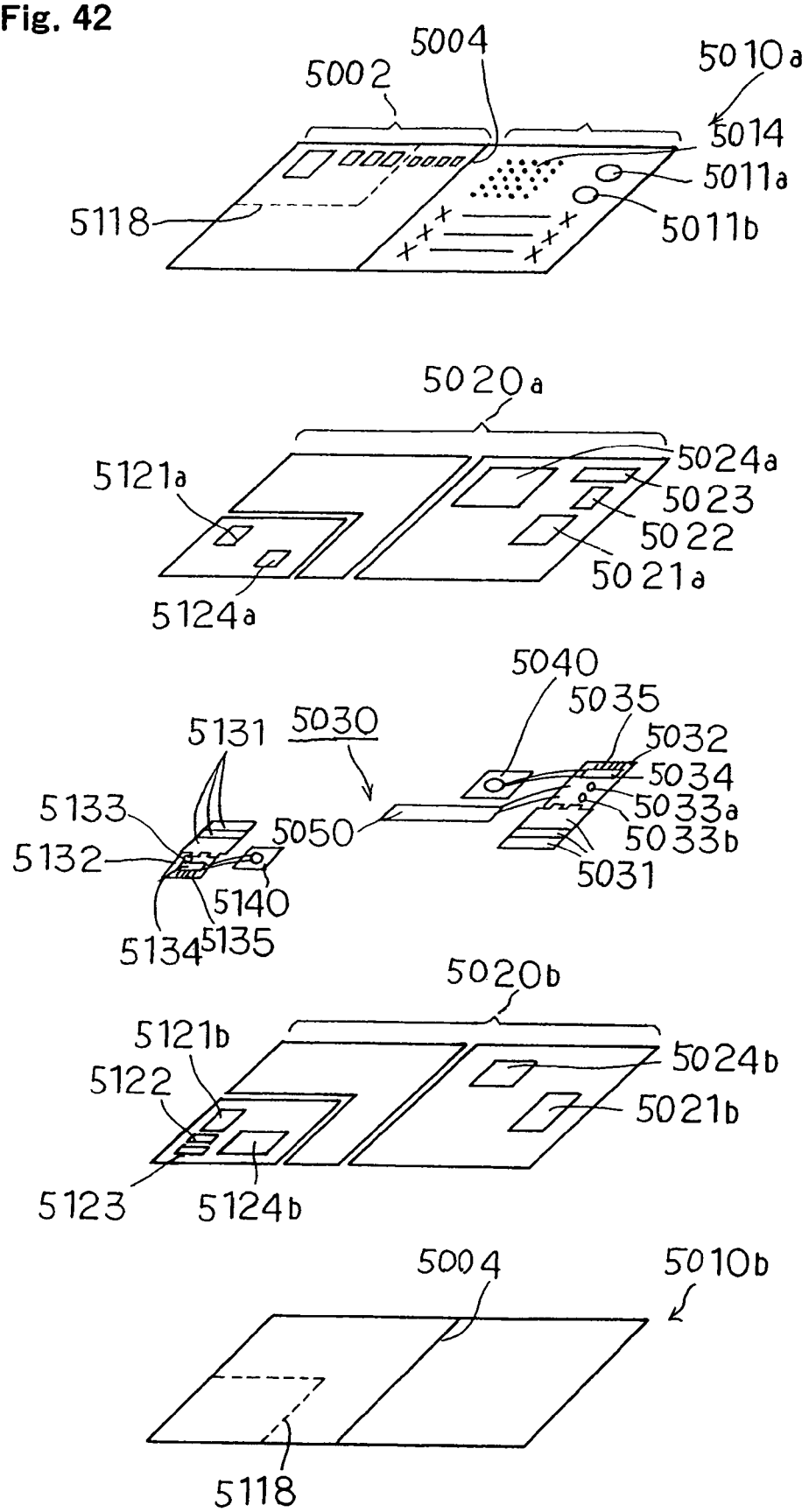
FIG. 42 illustrates a laminated structure of the double postal card shown in FIGS. 41a to 41e.

Furthermore, as shown in FIG. 42, as in the case of the thirteenth embodiment, the support sheet 5020a is divided through the area facing the connection part 5004 when superimposed on the surface sheet 5010a, and the area on the transmitting message card 5002 side in which the audio information recording/reproducing section 5130 is sandwiched is divided from the other area. Furthermore, in this area, when superimposed on the audio information recording/reproducing section 5130, holes 5121b, 5124b are formed in the areas facing the paper batteries 5131 and audio information output section 5140. On the reply message card 5003 side, as in the case of the thirteenth embodiment, when superimposed on the audio information recording/reproducing section 5030, holes 5021a, 5022, 5023, 5024a are formed in the areas facing the paper batteries 5031, switches 5033a, 5033b, IC chip 5034 and audio information input/output section 5040 respectively.

Furthermore, as in the case of the thirteenth embodiment, when superimposed on the surface sheet 5010b, the support sheet 5020b is divided through areas facing the connection part 5004, and the area on the transmitting message card 5002 side in which the audio information recording/reproducing section 5130 is sandwiched is divided from the other area. Furthermore, in this area, when superimposed on the audio information recording/reproducing section 5130, holes 5121a, 5122, 5123, 5124a are formed in the areas facing the paper batteries 5131, switches 5133, IC chip 5134 and audio information output section 5140 respectively. On the reply message card 5003 side, as in the case of the thirteenth embodiment, when superimposed on the audio information recording/reproducing section 5030, holes 5021b, 5024b are formed in the areas facing the paper batteries 5031 and audio information input/output section 5040 respectively.

In this way, by forming the hole 5021a, 5121a, 5022, 5023, 5024a, 5124a in the areas of the support sheet 5020a facing the paper batteries 5031, 5131, switches 5033a, 5033b, IC chip 5034 and audio information input/output sections 5040, 5140 respectively and forming the holes 5021b, 5121b, 5024b, 5124b, 5122, 5123 in the areas of the support sheet 5020b facing the paper batteries 5031, 5131, audio information input/output sections 5040, 5140, switch 5133 and IC chip 5134 respectively, it is possible to reduce the difference in thickness between the areas where the paper batteries 5031, 5131, switches 5033a, 5033b, 5133, IC chips 5034, 5134 and audio information input/output sections 5040, 5140 are mounted and the other areas, thereby improve flatness of the surface sheets 5010a, 5010b and facilitate printing of information on the surface sheets 5010a, 5010b.

Figure 43A:
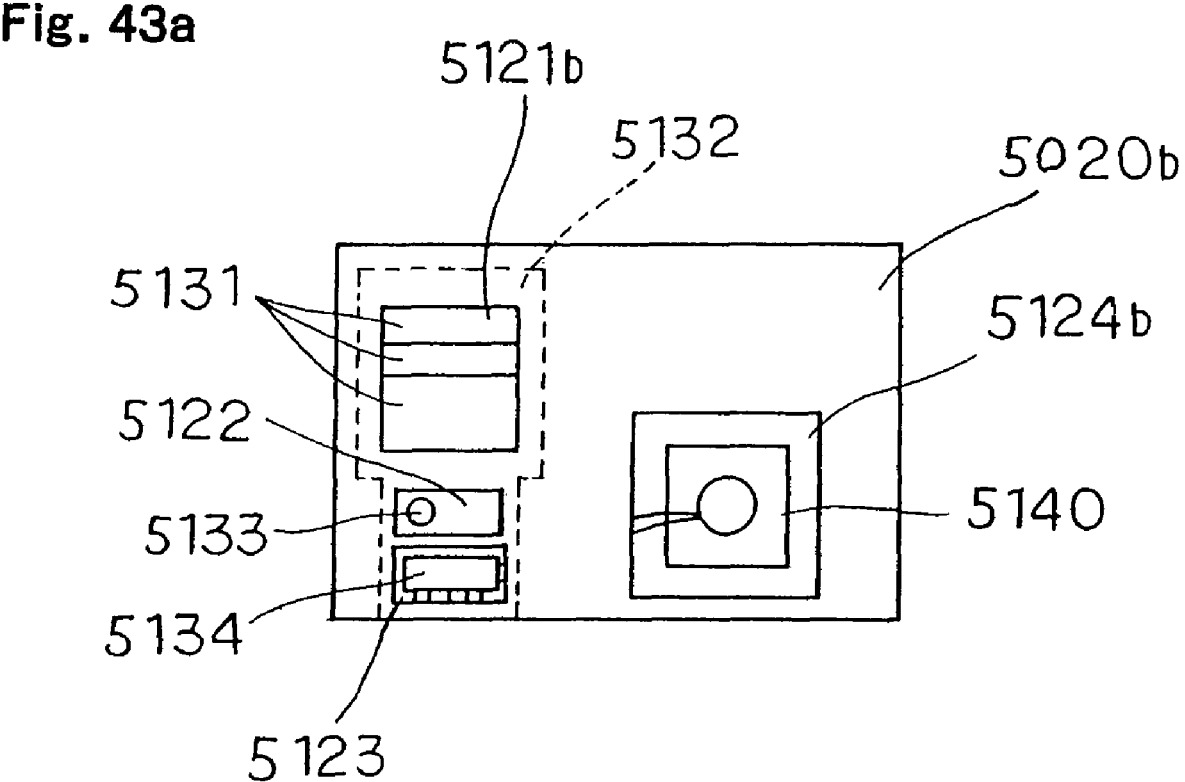
FIG. 43a illustrates a laminated structure of the support sheet and audio information recording/reproducing section shown in FIGS. 41a to 41e and FIG. 42.
Figure 43B:
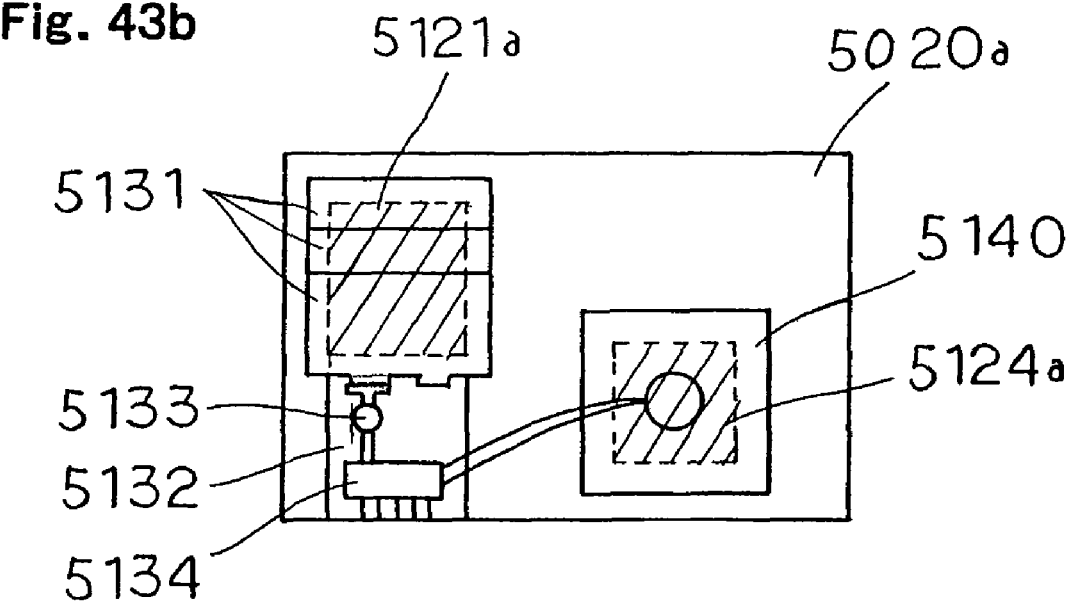
FIG. 43b illustrates a laminated structure of the support sheet and audio information recording/reproducing section shown in FIGS. 41a to 41e and FIG. 42.

FIG. 43a illustrates a laminated structure of the support sheet 5020a and audio information recording/reproducing section 5130 shown in FIGS. 41a to 41e and FIG. 42 and FIG. 43b illustrates a laminated structure of the support sheet 5020b and audio information recording/reproducing section 5130 shown in FIGS. 41a to 41e and FIG. 42. FIGS. 43a, 43b show only the areas of the support sheets 5020a, 5020b superimposed on the audio information recording/reproducing section 5130.

As shown in FIG. 43a, the hole 5121b formed in the area of the support sheet 5020b facing the paper batteries 5131 is smaller than the paper batteries 5131, the hole 5122 formed in the area facing the switch 5133 is greater than the switch 5133, the hole 5123 formed in the area facing the IC chip 5134 is greater than the IC chip 5134 and the hole 5124b formed in the area facing the audio information output section 5140 is greater than the audio information output section 5140.

Furthermore, as shown in FIG. 43b, the hole 5121a formed in the area of the support sheet 5020a facing the paper batteries 5131 is smaller than the paper batteries 5131 and the hole 5124a formed in the area facing the audio information output section 5140 is smaller than the audio information output section 5140.

In this way, the audio information recording/reproducing section 5130 is laminated in such a way that only part thereof is sandwiched between the two support sheets 5020a, 5020b from front and back and fixed through adhesive work applied to the front and back of the support sheets 5020a, 5020b.

Furthermore, as shown in FIG. 41a, the surface sheet 5010b of this embodiment differs from the thirteenth embodiment in that perforation 5118 is formed in the area which becomes the transmitting message card 5002 through the connection part 5004 to separate the area in which the audio information recording/reproducing section 5130 is sandwiched from the other areas, an audio output area 5114 made up of an array of fine holes to output audio output from the audio information output section 5140 to the outside is formed in the area facing the audio information output section 5140 through the hole 5124b of the support sheet 5020b, and a playback button 5118 for operating the switch 5133 is printed in the area facing the switch 5133 through the hole 5122 of the support sheet 5020b.

A method of use of the above described double postal card 5101 will be explained below.

First, the sender of the double postal card 5101 prints the above described information on the surface sheets 5010a, 5010b, records audio information in the IC chip 5134 through the connection terminal 5135 provided on the audio substrate 5132 of the audio information recording/reproducing section 5130 and sends this double postal card 5101 to the receiver. In this case, through the connection terminal 5135, an instruction for inputting audio information together with audio information is input and the IC chip 5134 records audio information in the memory area according to this instruction. Furthermore, as in the case of the thirteenth embodiment, it is also possible to input audio information through the audio information input/output section 5040 with the switch 5033b held down through the recording button 5011b provided in the area which becomes the reply message card 5003 of the surface sheet 5010a and record audio information in the IC chip 5034.

When the double postal card 5101 is sent to the receiver, the receiver of the double postal card 5101 presses the switch 5133 of the audio information recording/reproducing section 5130 through the playback button 5111 provided on the surface sheet 5010b, the audio information recorded in the IC chip 5134 is output through the audio information output section 5140.

Then, as in the case of the thirteenth embodiment, the receiver of the double postal card 5101 records audio information in the IC chip 5034 of the audio information recording/reproducing section 5030, separates the reply message card 5003 through the connection part 5004 and sends it to the destination of the reply message card 5003.

According to this embodiment, the area of the transmitting message card 5002 in which the audio information recording/reproducing section 5130 is sandwiched can be separated from the other area. For this reason, if the double postal card 5101 is used as an invitation to another party of a wedding ceremony, for example, when the guide information 5017 indicating the date and place of the other party of the wedding ceremony is printed in the area in which the audio information recording/reproducing section 5130 of the transmitting message card 5002 is sandwiched and detailed information, etc., thereof is recorded in the audio information recording/reproducing section 5130, the receiver of the double postal card 5101 can separate the area in which the audio information recording/reproducing section 5130 is sandwiched from the transmitting message card 5002 and visits the place of the other party of the wedding ceremony carrying the small-sized letter of invitation with him/her. Furthermore, as described above, even when the guide information 5017 indicating the date and place of the other party of the wedding ceremony is not printed in the area in which audio information recording/reproducing section 5130 of the transmitting message card 5002 is sandwiched, it is possible to keep the separated area as the card in storage. Furthermore, keeping the recorded audio information as a card in storage may also be applied to the area of the reply message card 5003 in which the audio information recording/reproducing section 5030 is sandwiched in the same way and in that case, it is necessary to form perforation, etc., for separating the area in which the audio information recording/reproducing section 5030 is sandwiched from the other area for the reply message card 5003, too.

The above described thirteenth and fourteenth embodiments adopt the structure that the support sheets 5020a, 5020b are divided by the area facing the connection part 5004, but it is also possible to adopt the support sheets 5020a, 5020b made of a material that can be easily cut or form perforation in the area facing the connection part 5004 so that the support sheets 5020a, 5020b are not divided by the area facing the connection part 5004. Likewise, in the fourteenth embodiment, it is also possible not to divide the areas of the support sheets 5020a, 5020b on the transmitting message card 5002 side.

Furthermore, in the above described thirteenth and fourteenth embodiments, the audio information recording/reproducing section 5030 is sandwiched between the two support sheets 5020a, 5020b and the support sheets 5020a, 5020b are further sandwiched between the two surface sheets 5010a, 5010b, but it is also possible to adopt a structure that the support sheets 5020a, 5020b are not provided and the audio information recording/reproducing section 5030 is only sandwiched between the two surface sheets 5010a, 5010b.

Furthermore, the above described thirteenth and fourteenth embodiments have described the double postal cards 5001, 5101 made up of the transmitting message card 5002 and reply message card 5003 connected through the connection part 5004, but the audio information delivery component of the present invention is not limited to this and the present invention is applicable to any audio information delivery component whose transmitting message section and reply message section are connected.

The inventions shown in the above described thirteenth and fourteenth embodiments provide an audio information delivery component made up of a transmitting message section and a reply message section connected, with first audio information recording/reproducing means capable of recording/reproducing audio information sandwiched between two surface sheets in such a way that wiring for recording audio information spans the transmitting message section and the reply message section, and therefore it is possible to separate the transmitting message section from the reply message section along the connection part to send the reply message section after recording audio information in the first audio information recording/reproducing means, cut the wiring for recording audio information of the first audio information recording/reproducing means sandwiched between the two surface sheets to prevent audio information from being recorded in the first audio information recording/reproducing means and thereby prevent recorded audio information from being erased mistakenly without degrading the quality of appearance.

Furthermore, in the case of the structure that second audio information recording/reproducing means capable of recording/reproducing audio information is sandwiched between areas which become transmitting message sections of two surface sheets and the area of the transmitting message section in which the second audio information recording/reproducing means is provided is made separable from the other area, the receiver of the double postal card can separate the area in which the second audio information recording/reproducing means with audio information recorded is sandwiched from the transmitting message section, and carry that area or keep it in storage.

Fifteenth Embodiment

Figure 44A:
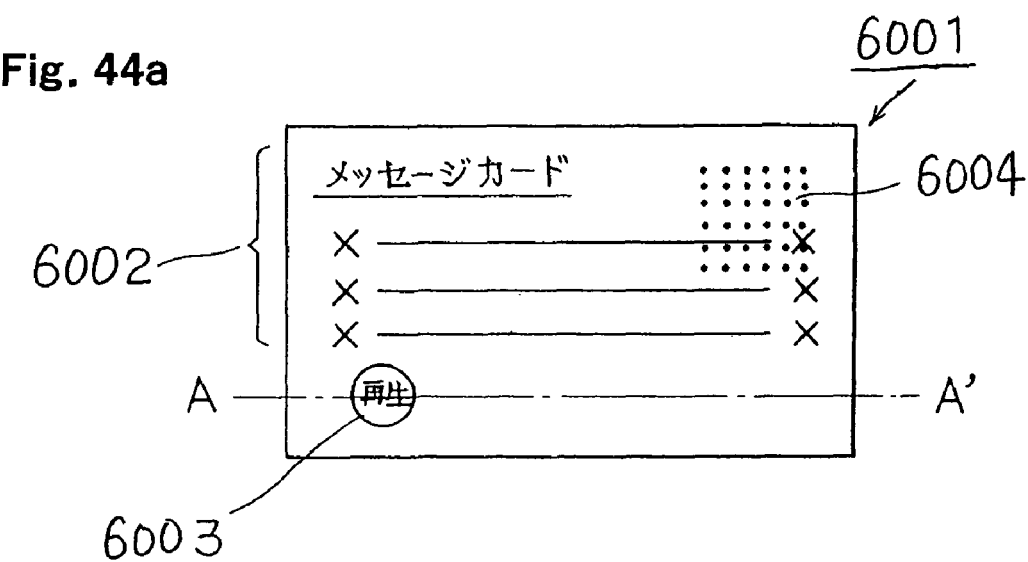
FIG. 44a is a plan view of a label according to a fifteenth embodiment of the present invention.
Figure 44B:
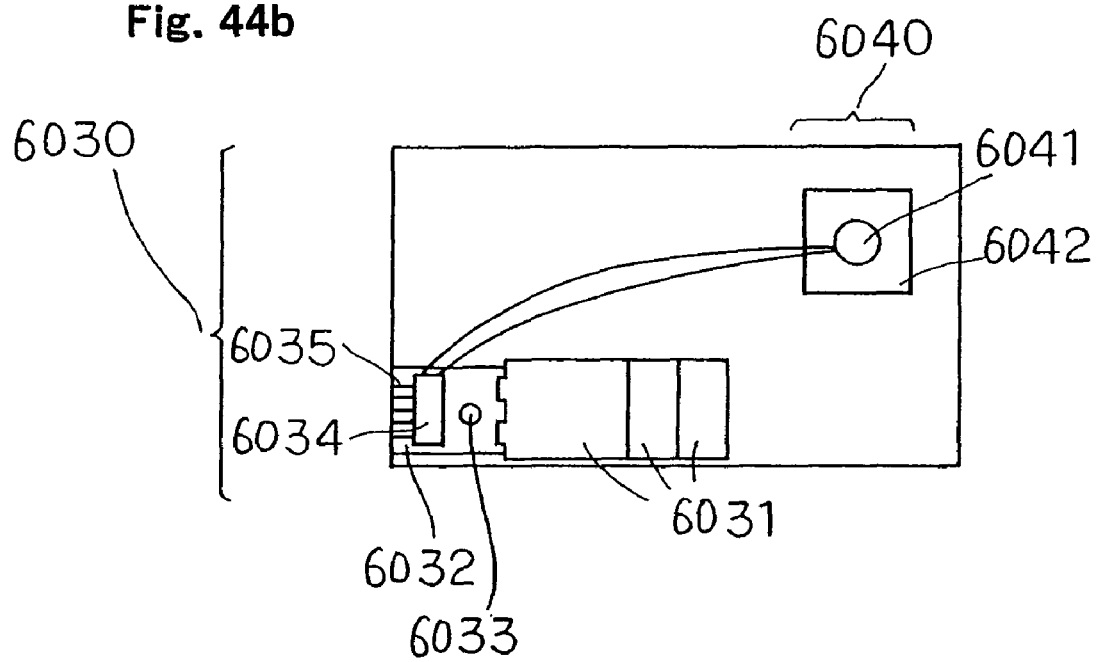
Figure 44C:
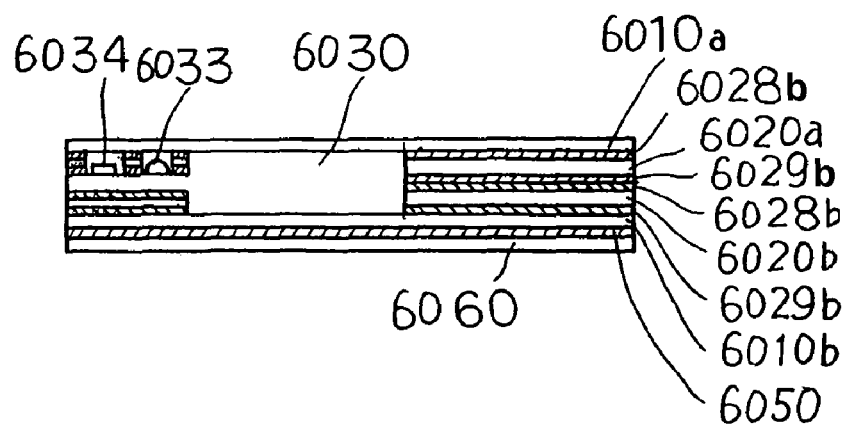
Figure 45:
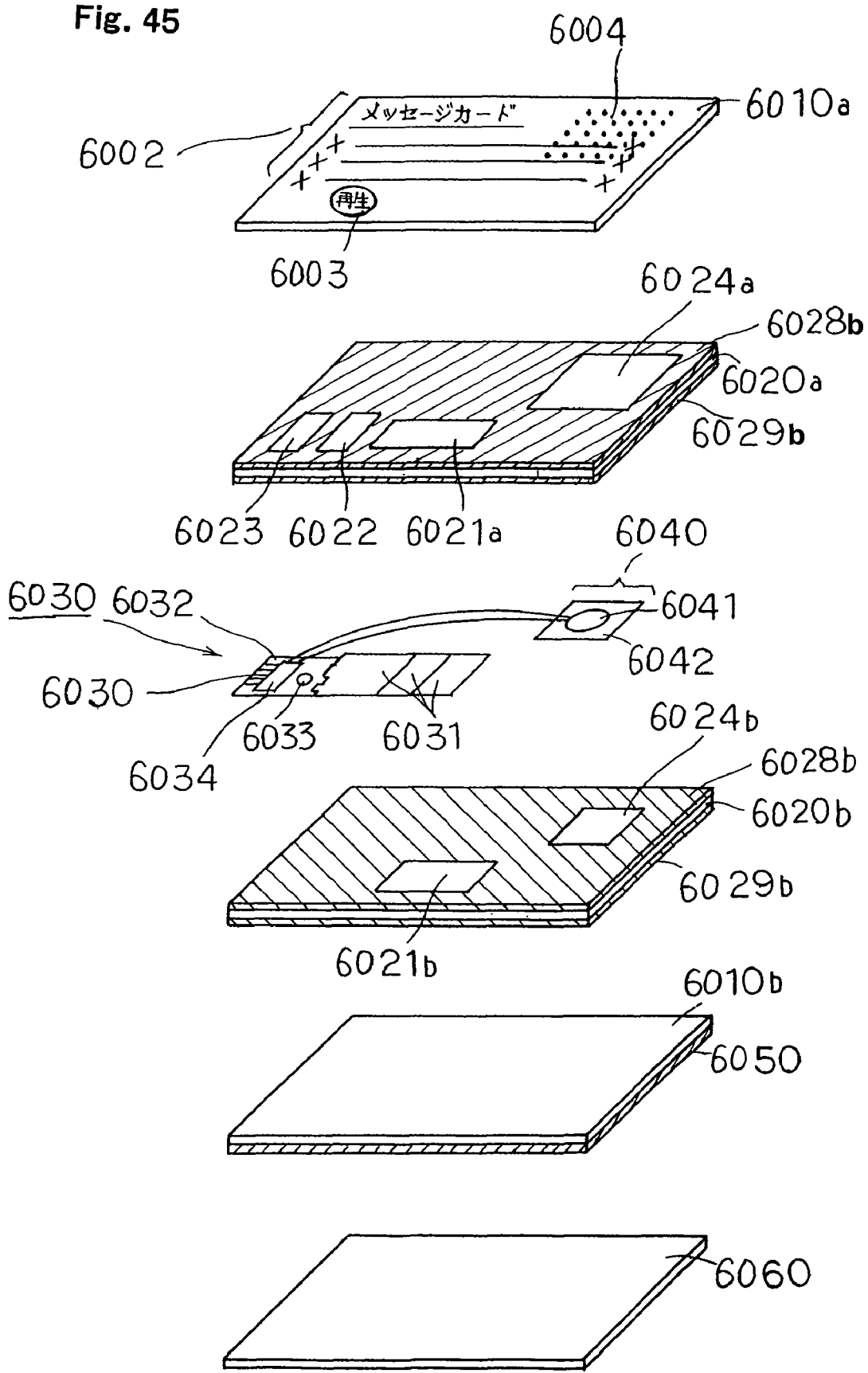
FIG. 45 illustrates a laminated structure of the label shown in FIGS. 44a to 44.

FIG. 44a is a plan view of a label according to a fifteenth embodiment of the present invention, FIG. 44b illustrates an inner structure of the label 6001 shown in FIG. 44a and FIG. 44c is a cross-sectional view along the line A-A' shown in FIG. 44a. Furthermore, FIG. 45 illustrates a laminated structure of the label 6001 shown in FIGS. 44a to 44c.

As shown in FIGS. 44a to 44c and FIG. 45, this embodiment is constructed of a sheet-like audio information recording/reproducing section 6030 capable of recording/reproducing audio information sandwiched between two support sheets 6020a, 6020b made of a flexible, thin base material such as paper base material, the support sheets 6020a, 6020b in which the audio information recording/reproducing section 6030 is sandwiched are further sandwiched between two surface sheets 6010a, 6010b made of a flexible, thin base material such as paper base material, with the surface sheets 6010a, 6010b, support sheets 6020a, 6020b and audio information recording/reproducing section 6030 bonded to one another by means of adhesives 6028a, 6029a applied to the front and back of the support sheet 6020a and adhesives 6028a, 6029a applied to the front and back of the support sheet 6020b. Furthermore, an adhesive 6050 is applied to the surface of the surface sheet 6010b not facing the support sheet 6020b and a strippable paper 6060 is adhered in a strippable manner through the adhesive 6050. One sheet base material is constructed of these surface sheet 6010a and support sheet 6020a and one sheet base material is constructed of the surface sheet 6010b and support sheet 6020b and the audio information recording/reproducing section 6030 is sandwiched between these two sheet base materials.

Furthermore, the audio information recording/reproducing section 6030 is constructed of a sheet-like audio information output section 6040 made up of a piezo-electric element 6041 and diaphragm 6042, etc., for outputting recorded audio information, an audio substrate 6032 mounted with a thin IC chip 6034 in which audio information is recorded, circuit elements such as a capacitor and resistor and thin switch 6033 which is operated to output the audio information recorded in the IC chip 6034 from the audio information output section 6040, and flexible paper batteries 6031 connected to the audio substrate 6032 for supplying power to the audio substrate 6032, and the audio substrate 6032 is further provided with a connection terminal 6035 for inputting audio information in the IC chip 6034 from the outside or outputting the audio information recorded in the IC chip 6034 to the outside. In this way, the audio information recording/reproducing section 6030 has a sheet-like structure. Here, the audio substrate 6032 is a flexible, thin substrate made of fiberglass reinforced plastics (FRP), polyethylene terephthalate (PET), polyimide or lead frame, etc., with the IC chip 6032 bonded thereto by means of anisotropic/conductive adhesive (ACP), anisotropic/conductive film (ACF) or wire bonding.

Furthermore, when superimposed on the audio information recording/reproducing section 6030, the support sheet 6020a is provided with holes 6021a, 6022, 6023, 6024a in areas facing the paper batteries 6031, switch 6033, IC chip 6034 and audio information output section 6040, respectively. Furthermore, when superimposed on the audio information recording/reproducing section 6030, the support sheet 6020b is provided with holes 6021b, 6024b in areas facing the paper batteries 6031 and audio information output section 6040, respectively.

In this way, the holes 6021a, 6022, 6023, 6024a are formed in the areas of the support sheet 6020a facing the paper batteries 6031, switch 6033, IC chip 6034 and audio information output section 6040 respectively, and the holes 6021b, 6024b are formed in the areas of the support sheet 6020b facing the paper batteries 6031 and audio information output section 6040 respectively, which reduces the difference in thickness between the areas where the paper battery 6031, switch 6033, IC chip 6034 and audio information output section 6040 are provided and the other areas, improves flatness of the surface sheet 6010a, and facilitates printing of information on the surface sheet 6010a.

Figure 46A:
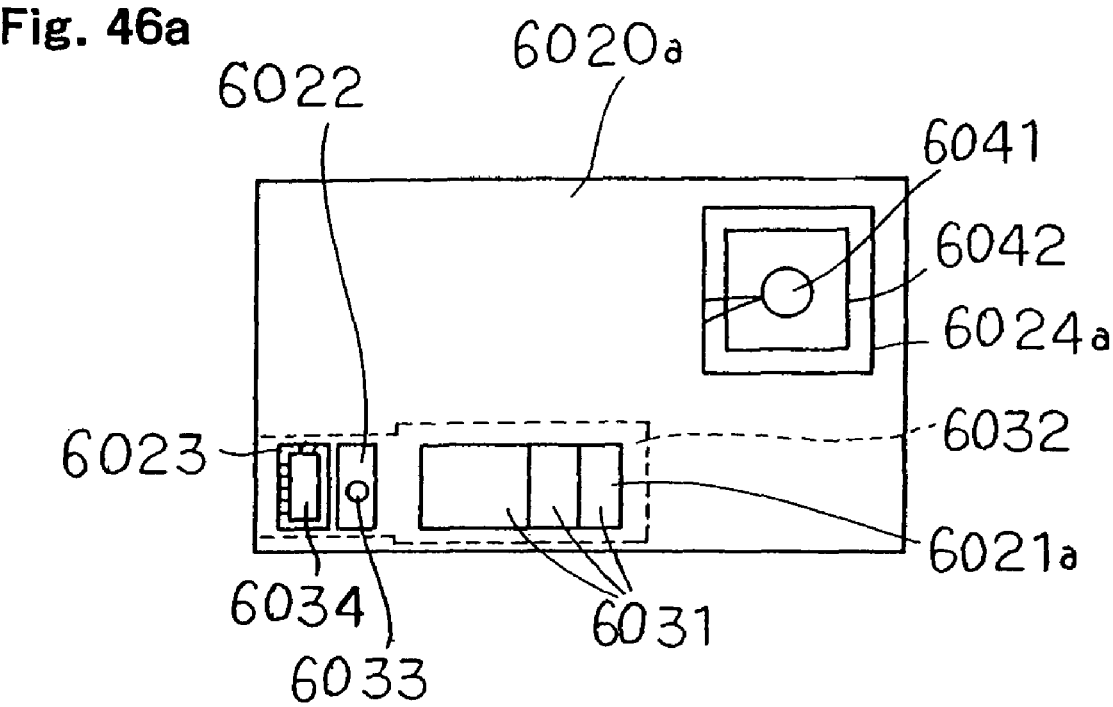
FIG. 46a illustrates a laminated structure of the support sheet and audio information recording/reproducirig section shown in FIGS. 44a to 44c and FIG. 45.

FIG. 46a illustrates a laminated structure of the support sheet 6020a and audio information recording/reproducing section 6030 shown in FIGS. 44a to 44c and FIG. 45 and FIG. 46b illustrates a laminated structure of the support sheet 6020b and audio information recording/reproducing section 6030 shown in FIGS. 44a to 44c and FIG. 45.

As shown in FIG. 46a, the hole 6021a formed in the area of the support sheet 6020a facing the paper batteries 6031 is smaller than the paper batteries 6031, the hole 6022 formed in the area facing the switch 6033 is greater than the switch 6033, the hole 6023 formed in the area facing the IC chip 6034 is greater than the IC chip 6034 and the hole 6024a formed in the area facing the audio information output section 6040 is greater than the audio information output section 6040.

Figure 46B:
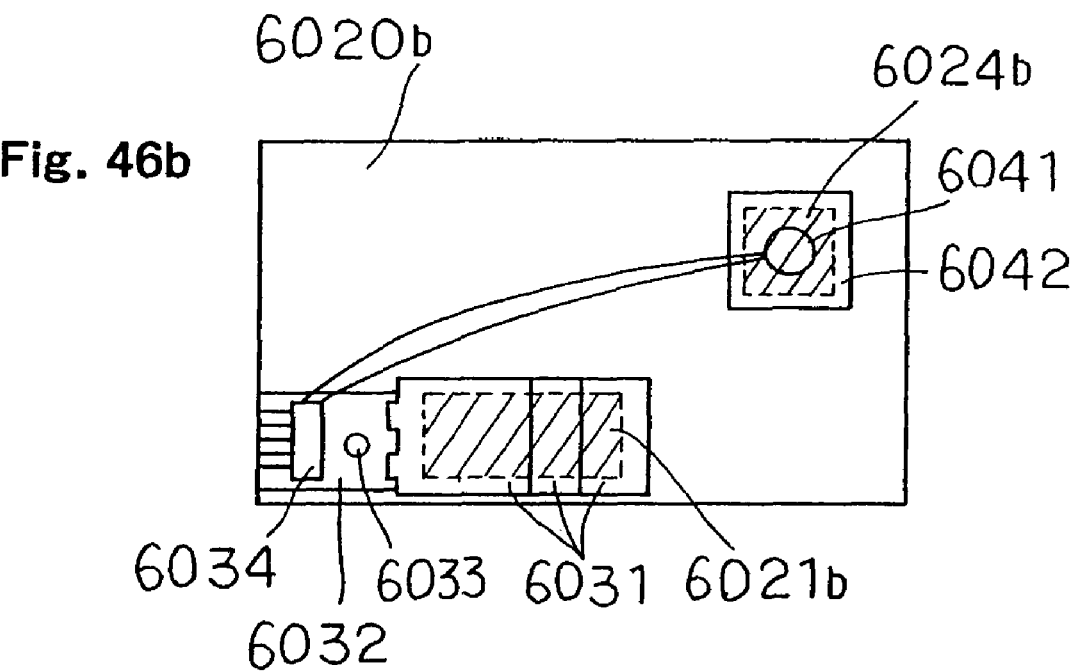
FIG. 46b illustrates a laminated structure of the support sheet and audio information recording/reproducing section shown in FIGS. 44a to 44c and FIG. 45.

Furthermore, as shown in FIG. 46b, the hole 6021b formed in the area of the support sheet 6020b facing the paper batteries 6031 is smaller than the paper batteries 6031 and the hole 6024b formed in the area facing the audio information output section 6040 is smaller than the audio information output section 6040.

In this way, the audio information recording/reproducing section 6030 is laminated in such a way that only part thereof is sandwiched from front and back between the two support sheets 6020a, 6020b and fixed through the adhesive 6029a applied to the back of the support sheet 6020a and the adhesive 6028b applied to the front of the support sheet 6020b.

Furthermore, of the two surface sheets 6010a, 6010b, the surface sheet 6010a facing the switch 6033 and IC chip 6034 through the holes 6022, 6023 of the support sheet 6020a is provided with an information display area 6002 in which information, etc., to be transmitted to the receiver of this label 6001 is printed, the area of the support sheet 6020a facing the switch 6033 through the hole 6022 is provided with a print showing the playback button 6003 for operating the switch 6033 and in the area of the support sheet 6020a facing the audio information output section 6040 through the hole 6024a, an audio output area 6004 made up of an array of fine holes for outputting audio output from the audio output section 6040 is formed. Even when the front and back of the audio information output section 6040 are covered with the surface sheets 6010a, 6010b, the formation of the audio output area 6004 made up of an array of fine holes can compensate for a reduction of sound volume output from the audio information output section 6040. In the audio output area 6004, holes of 0.1 mm in diameter are formed horizontally and vertically at intervals of 1.5 mm through laser beam machining. Therefore, unlike punching or perforation using needles, etc. to make a hole, no burrs are formed and the holes are never clogged with burrs.

Furthermore, the playback button 6003 may be printed on the surface sheet 6010*a* together with information printed on the information display area 6002, but it is also possible to paste a seal to the area facing the switch 6033 after information is printed on the information display area 6002.

In the above described label 6001, if information is printed on the information display area 6002, the audio information to be transmitted to the receiver of the label 6001 is input through the connection terminal 6035 of the audio information recording/reproducing section 6030 and recorded in the IC chip 6034, when this label 6001 is pasted to an object and delivered to the receiver of the label 6001 later, the information printed on the information display area 6002 is visually transmitted at the destination of the label 6001 and when the receiver presses the switch 6033 through the playback button 6003, the audio information recorded in the IC chip 6034 is output from the audio information output section 6040.

In this way, information is printed on the information display area 6002, audio information is recorded in the IC chip 6034 and then the audio information is output by pressing the switch 6033 through the playback button 6003, and therefore it is possible for the able-bodied and the visually handicapped alike to transmit desired information.

Sixteenth Embodiment

FIG. 47*a* is a plan view of a label according to a sixteenth embodiment of the present invention, FIG. 47*b* illustrates an inner structure of the label 6101 shown in FIG. 47*a*, FIG. 47*c* a cross-sectional view along the line A-A' shown in FIG. 47*a* and FIG. 47*d* is a cross-sectional view along the line B-B' shown in FIG. 47*a*. Furthermore, FIG. 48 illustrates a laminated structure of the label 6101 shown in FIGS. 47*a* to 47*d*.

As shown in FIGS. 47*a* to 47*d* and FIG. 48, according to this embodiment, a sheet-like audio information recording/reproducing section 6130 capable of recording/reproducing audio information is sandwiched between two support sheets 6120*a*, 6120*b* of different dimensions made of a flexible, thin base material such as paper base material and a surface sheet 6110*a* made of a flexible, thin base material such as paper base material equivalent in dimensions to the support sheet 6120*b* is superimposed on the surface of the support sheet 6120*a* not facing the audio information recording/reproducing section 6130. Furthermore, a strippable paper 6160 is bonded to the surface of the support sheet 6120*b* not facing the audio information recording/reproducing section 6130 in a strippable manner. Adhesives 6128*a*, 6129*a* are applied to the front and back of the support sheet 6120*a* and adhesives 6128*b*, 6129*b* are applied to the front and back of the support sheet 6120*b*. The surface sheet 6110*a* is bonded to the support sheet 6120*a* through an adhesive 6128*a* in the area facing the support sheet 6120*a* and bonded to the support sheet 6120*b* through an adhesive 6128*b* in the area facing the support sheet 6120*b*. Furthermore, the support sheet 6120*b* and strippable paper 6160 are bonded together through an adhesive 6129*b* in a strippable manner. One sheet base material is constructed of the surface sheet 6110*a* and support sheet 6120*a*, another sheet base material is constructed of the support sheet 6120*b*, and the audio information recording/reproducing section 6130 is sandwiched between these two sheet base materials and the audio information recording/reproducing section 6130 is fixed by the adhesive 6129*a* applied to the back of the support sheet 6120*a* and adhesive 6128*b* applied to the front of the support sheet 6120*b*.

Furthermore, the audio information recording/reproducing section 6130 is constructed of a sheet-like audio information input/output section 6140 made up of a piezo-electric element 6141 and diaphragm 6142, etc., for inputting/outputting audio information, an audio substrate 6132 mounted with a thin IC chip 6134 provided with a memory area in which audio information input through the audio information input/output section 6140 is recorded and circuit elements such as a capacitor and resistor and a first switch 6133*b* and a second switch 6133*a* electrically connected to the IC chip 6134, flexible paper batteries 6131 connected to the audio substrate 6132 for supply power to the audio substrate 6132 and a connection substrate 6170 on which a wiring pattern 6171 for electrically connecting a switch 6133*b* for recording audio information in the IC chip 6134 and the IC chip 6134 is formed. In this way, the audio information recording/reproducing section 6130 has a sheet-like structure. Furthermore, the audio substrate 6132 is provided with a connection terminal 6135 for inputting audio information in the IC chip 6134 from the outside and outputting audio information recorded in the IC chip 6134 to the outside, a wiring pattern 6137*a* which connects the positive electrode of the paper batteries 6131 to the switches 6133*a*, 6133*b*, a wiring pattern 6137*b* which connects the port terminal of the port terminals of the IC chip 6134 to which an instruction signal for outputting audio information recorded in the memory area of the IC chip 6134 is input and the switch 6133*a*, a wiring pattern 6137*c* which connects the port terminal of the port terminals of the IC chip 6134 to which an instruction signal for recording audio information input through the audio information input/output section 6140 in the memory area of the IC chip 6134 is input and the wiring pattern 6171 formed on the connection substrate 6170, and a wiring pattern 6137*d* which connects the wiring pattern 6171 and the switch 6133*b*. The wiring pattern 6137*a* and the wiring pattern 6137*b* are not electrically connected at the lower part of the switch 6133*a*, and the wiring pattern 6137*a* and wiring pattern 6137*d* are not electrically connected at the lower part of the switch 6133*b*. Furthermore, the audio substrate 6132 is a flexible, thin substrate made of fiberglass reinforced plastics (FRP), polyethylene terephthalate (PET), polyimide or lead frame, etc., with the IC chip 6134 bonded thereto by means of anisotropic/conductive adhesive (ACP), anisotropic/conductive film (ACF) or wire bonding. Furthermore, the connection substrate 6170 also needs to have the above described flexibility and further needs to be made of a material like a film that can be easily cut. Furthermore, the IC chip 6134 controls recording of audio information input through the audio information input/output section 6140 in the memory area and outputting of audio information recorded in the memory area through the audio information input/output section 6140. When the port terminal connected to the wiring pattern 6137*b* becomes the power supply potential, the IC chip 6134 outputs the audio information recorded in the memory area of the IC chip 6134 and records audio information input through the audio information input/output section 6140 in the memory area of the IC chip 6134 as long as the port terminal connected to the wiring pattern 6137*c* remains at the power supply potential. Furthermore, the switch 6133*a* is operated to output audio information recorded in the memory area of the IC chip 6134 through the audio information input/output section 6140 and the switch 6133*b* is operated to record the audio information input through the audio information input/output section 6140 in the memory area of the IC chip 6134.

The audio information input/output section 6140, audio substrate 6132, paper batteries 6131 and connection substrate 6170 constituting the audio information recording/reproducing section 6130 are sandwiched between the support sheets 6120*a*, 6120*b* and surface sheet 6110*a* so that the audio information input/output section 6140, audio substrate 6132 and paper batteries 6131 remain in only one of the two areas into which the surface sheet 6110*a* and support sheet 6120*b* are divisible along perforations 6105, 6125 formed thereon, and the connection substrate 6170 spans the two areas.

Furthermore, as shown in FIG. 48, the support sheet 6120*a* is shaped so as to be superimposed only on one of the two areas of the surface sheet 6110*a* and support sheet 6120*b* divided through perforations 6105, 6125 formed on the surface sheet 6110*a* and support sheet 6120*b* respectively, and when superimposed on the audio information recording/reproducing section 6130, the area facing the paper batteries 6131, switches 6133*a*, 6133*b*, IC chip 6134 and audio information input/output section 6140 is provided with holes 6121*a*, 6122, 6123, 6124*a*. Furthermore, the thickness thereof is smaller than that of the switch 6133*a* of the audio information recording/reproducing section 6130.

In this way, when the audio information recording/reproducing section 6130 is sandwiched between the support sheets 6120*a*, 6120*b* and surface sheet 6110*a*, only the area of the surface of the surface sheet 6110*a* on which the playback button 6103*a* is provided protrudes from the other area, which makes the playback button 6103*a* identifiable by touching from the outside. Furthermore, instead of adopting such a structure that only the area of the surface of the surface sheet 6110*a* on which the playback button 6103*a* is provided protrudes by reducing the thickness of the support sheet 6120*a* compared to the thickness of the switch 6133*a* in this way, applying convex work such as Braille characters indicating the playback button 6103*a* to the area provided with the playback button 6103*a* of the surface sheet 6110*a* can also make the playback button 6103*a* identifiable by touching from the outside.

Furthermore, the perforation 6125 is formed in the area of the support sheet 6120*b* facing the perforation 6105 formed on the surface sheet 6110*a* and holes 6121*b*, 6124*b* are formed in the areas facing the paper batteries 6131 and audio information input/output section 6140 when superimposed on the audio information recording/reproducing section 6130.

Furthermore, as shown in FIG. 47*a*, in the surface sheet 6110*a* is provided with an information display area 6102 in which information to be transmitted to the receiver of this label 6101 is printed in the area in which the audio information recording/reproducing section 6130 is sandwiched through the perforation 6105, the area of the support sheet 6120*a* facing the switch 6133*a* through the hole 6122 is provided with a print showing the playback button 6103*a* for operating the switch 6133*a* and the area of the support sheet 6120*a* facing the switch 6133*b* through the hole 6122 is provided with a print showing the recording button 6103*b* for operating the switch 6133*b*. Furthermore, in the area of the support sheet 6120*a* facing the audio information input/output section 6140 through the hole 6124*a*, an audio output area 6104 with an array of fine holes for outputting audio output from the audio information input/output section 6140 is formed. Even when the surface of the audio information input/output section 6040 is covered with the surface sheet 6010*a*, the formation of the audio output area 6104 made up of such an array of fine holes can compensate for a reduction of sound volume output from the audio information output section 6140.

In this way, the audio information recording/reproducing section 6130 is sandwiched between the surface sheet 6110*a* and support sheets 6120*a*, 6120*b*.

A method of use of the above described label 6101 will be explained below.

First, the sender of the label 6101 prints information to be transmitted in the information display area 6102 of the surface sheet 6110*a* and prints the playback button 6103*a* and recording button 6103*b*.

Furthermore, with the switch 6133*b* held down through the recording button 6103*b*, audio information to be transmitted to the receiver of the label 6101 is input through the audio information input/output section 6140 and recorded in the memory area of the IC chip 6134.

FIG. 49*a* is a cross-sectional view of the vicinity of the switch 6133*b* shown in FIGS. 47*a* to 47*c* when the switch 6133*b* is not pressed through the recording button 6103*b* and FIG. 49*b* is a cross-sectional view of the vicinity of the switch 6133*b* shown in FIGS. 47*a* to 47*c* when the switch 6133*b* is pressed through the recording button 6103*b*.

In the label 6101 shown in FIGS. 47*a* to 47*c*, when the switch 6133*b* is not pressed through the recording button 6103*b*, the wiring pattern 6137*a* and the wiring pattern 6137*d* formed on the audio substrate 6132 are not electrically connected as shown in FIG. 49*a*. For this reason, the port terminal of the port terminals of the IC chip 6134 connected to the wiring pattern 6137*d* through the wiring patterns 6137*c*, 6171, that is, the port terminal to which an instruction signal for recording the audio information input through the audio information input/output section 6140 in the memory area of the IC chip 6134 is input is left open and in this condition, even if audio information is input through the audio information input/output section 6140, the audio information input is not recorded in the memory area of the IC chip 6134.

On the other hand, when the switch 6133*b* is pressed through the recording button 6103*b*, the wiring pattern 6137*a* and the wiring pattern 6137*d* formed on the audio substrate 6132 are electrically connected through the conductive agent 6138 applied to the back of the switch 6133*b* as shown in FIG. 49*b*. Since the wiring pattern 6137*a* is connected to the positive electrode of the paper batteries 6131, the port terminal connected to the wiring pattern 6137*d* through the wiring patterns 6137*c*, 6171, that is, the port terminal to which an instruction signal for recording audio information input through the audio information input/output section 6140 in the memory area of the IC chip 6134 is input becomes the power supply potential and if audio information is input through the audio information input/output section 6140 in this condition, the input audio information is recorded in the memory area of the IC chip 6134.

As described above, desired different audio information can be recorded at the destination of the label 6101 by recording audio information after printing the information on the label 6101, but it is also possible to print the information after recording the audio information. Furthermore, instead of inputting audio information through the audio information input/output section 6140, it is also possible to input audio information from the outside through the connection terminal 6135 provided on the audio substrate 6132. In that case, not only audio information but also an instruction for inputting this audio information is input through the connection terminal 6135, and when this instruction is input, the IC chip 6134 records the audio information input in the memory area through the connection terminal 6135. Furthermore, the audio information recorded in the memory area of the IC chip 6134 can also be output to the outside through the connection terminal 6135. In that case, an instruction for outputting the audio information recorded in the memory area of the IC chip 6134 is input through the connection terminal 6135 and when this instruction is input, the IC chip 6134 outputs the audio information recorded in the memory area through the connection terminal 6135.

In this way, after information is printed and audio information is recorded in the IC chip 6134, if the surface sheet 6110*a* and support sheet 6120*b* are cut through perforations 6105, 6125, this causes the connection substrate 6170 of the audio information recording/reproducing section 6130 to be cut, which in turn disconnects the wiring pattern 6171 formed on the connection substrate 6170. In the area of the connection substrate 6170 facing the perforations 6105, 6125, notches 6172 are formed in a shape that does not impair the connection condition of the wiring pattern 6171, and since the line width of the area of the wiring pattern 6171 facing the perforations 6105, 6125 is narrow, when the surface sheet 6110*a* and support sheet 6120*b* are cut through the perforations 6105, 6125, these sheets can be easily cut through the perforations 6105, 6125.

FIG. 50 illustrates an inner structure of the label 6101 shown in FIGS. 47*a* to 47*d* when cut into two areas along perforations 6105, 6125.

As shown in FIG. 50, when the surface sheet 6110*a* and support sheet 6120*b* are cut into two areas through the perforations 6105, 6125, the connection substrate 6170 is cut, which causes the wiring pattern 6171 formed on the connection substrate 6170 also to be cut. In this condition, the wiring pattern 6137*d* connected to the switch 6133*b* and the wiring pattern 6137*c* connected to the port terminal to which an instruction signal for recording audio information input through the audio information input/output section 6140 in the memory area of the IC chip 6134 is input are not electrically connected, and therefore even if the switch 6133*b* is pressed through the recording button 6103*b*, the port terminal to which an instruction signal for recording audio information input through the audio information input/output section 6140 in the memory area of the IC chip 6134 is input does not become the power supply potential. For this reason, even if audio information is input through the audio information input/output section 6140 in this condition, the input audio information is not recorded in the memory area of the IC chip 6134.

Then, of the label 6101 whose surface sheet 6110*a* and support sheet 6120*b* are cut through the perforations 6105, 6125, the surface on which the playback button 6103*a* and recording button 6103*b* are provided is pasted to an object and this object is supplied to the destination of the label 6101. In this case, in the label 6101 pasted to the object, since the wiring pattern 6171 for recording audio information in the IC chip 6134 is disconnected, even if the switch 6133*b* is pressed through the recording button 6103*b*, audio information is not recorded in the IC chip 6134.

Furthermore, when the receiver of the label 6101 presses the switch 6133*a* through the playback button 6103*a*, audio information recorded in the memory area of the IC chip 6134 is output through the audio information input/output section 6140.

As in the case of the pressing of the switch 6133*b* through the aforementioned recording button 6103*b*, when the switch 6133*a* is not pressed through the playback button 6103*a*, the wiring pattern 6137*a* formed on the audio substrate 6132 and the wiring pattern 6137*b* are not electrically connected, and therefore the port terminal of the port terminals of the IC chip 6134 connected to the wiring pattern 6137*b*, that is, the port terminal to which an instruction signal for outputting audio information recorded in the memory area of the IC chip 6134 is input is left open, and the audio information recorded in the memory area of the IC chip 6134 is not output.

On the other hand, when the switch 6133*a* is pressed through the playback button 6103*a*, the wiring pattern 6137*a* formed on the audio substrate 6132 and wiring pattern 6137*b* are electrically connected through the conductive agent (not shown) applied to the back of the switch 6133*a*. Since the wiring pattern 6137*a* is connected to the positive electrode of the paper batteries 6131, the port terminal connected to the wiring pattern 6137*b*, that is, the port terminal to which an instruction signal for outputting audio information recorded in the memory area of the IC chip 6134 is input becomes the power supply potential, and the audio information recorded in the memory area of the IC chip 6134 is thereby output through the audio information input/output section 6140. Thus, pressing the switch 6133*a* through the playback button 6103*a* causes the audio information recorded in the IC chip 6134 to be output through the audio information input/output section 6140.

This embodiment does not provide any surface sheet on the side of an object to be pasted but performs pasting to the object through the adhesive 6129*b* applied to the back of the support sheet 6120*b*, and therefore compared to the one shown in the fifteenth embodiment which is made separable into two areas, it is only necessary to form perforation 6105 on one surface sheet 6110*a* and it is possible to realize a cost reduction as well.

Seventeenth Embodiment

Figure 52:
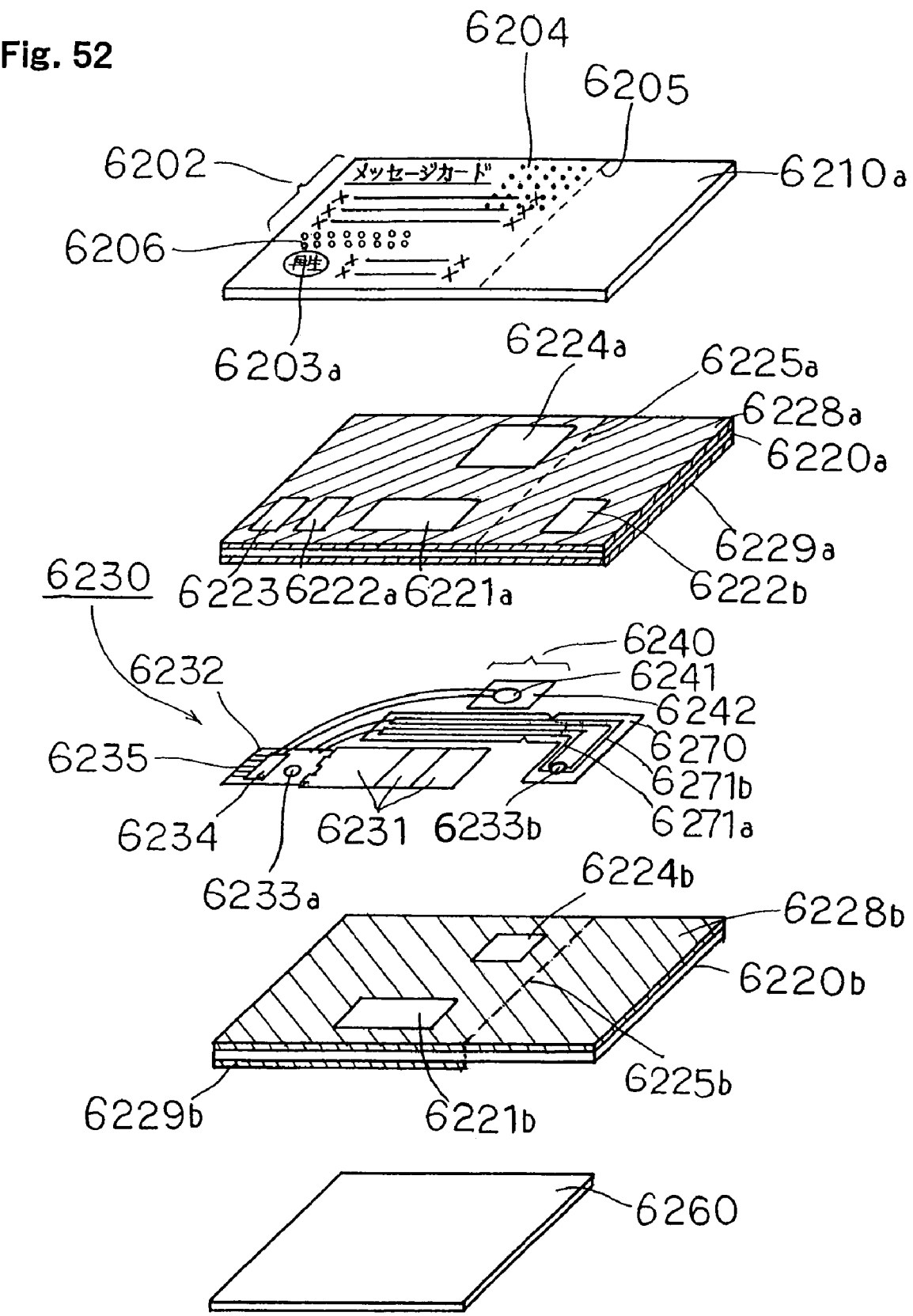
FIG. 52 illustrates laminated structure of the label shown in FIGS. 51a to 51c.

FIG. 51*a* is a plan view of a label according to a seventeenth embodiment of the present invention, FIG. 51*b* illustrates an inner structure of the label 6201 shown in FIG. 51*a* and FIG. 51*c* is a cross-sectional view along the line A-A' shown in FIG. 51*a*. Furthermore, FIG. 52 illustrates laminated structure of the label 6201 shown in FIGS. 51*a* to 51*c*.

As shown in FIGS. 51*a* to 51*c* and FIG. 52, this embodiment is constructed of a sheet-like audio information recording/reproducing section 6230 capable of recording/reproducing audio information sandwiched between two support sheets 6220*a*, 6220*b* made of a flexible, thin base material such as paper base material and a surface sheet 6210*a* made of a flexible, thin base material such as paper base material bonded to the surface of the support sheet 6220*a* not facing the audio information recording/reproducing section 6230. Furthermore, a strippable paper 6260 is bonded to part of the surface of the support sheet 6220*b* not facing the audio information recording/reproducing section 6230 in a strippable manner. Adhesives 6228*a*, 6229*a* are applied to the front and back of the support sheet 6220*a*, an adhesive 6228*b* is applied to the surface of the support sheet 6220*b* and an adhesive 6229*b* is applied to one of the two areas of the back of the support sheet 6220*b* that can be separated through a perforation 6225*b* formed on the support sheet 6220*b*. The surface sheet 6210*a* is bonded to the support sheet 6220*a* through the adhesive 6228*a* applied to the support sheet 6220*a*, and the support sheet 6220*b* and the strippable paper 6260 are bonded together through the adhesive 6229*b* applied to the support sheet 6220*b* in a strippable manner. One sheet base material is constructed of the surface sheet 6210*a* and support sheet 6220*a*, one sheet base material is constructed of the support sheet 6220*b*, and the audio information recording/reproducing section 6230 is sandwiched between these two sheet base materials and the audio information recording/reproducing section 6230 is fixed through the adhesive 6229*a* applied to the back of the support sheet 6220*a* and the adhesive 6228*b* applied to the surface of the support sheet 6220*b*. The adhesive 6229b is not applied to the back of one of the areas of the support sheet 6220b to be divided through the perforation 6225b and the strippable paper 6260 is not bonded to the area.

Furthermore, the audio information recording/reproducing section 6230 is constructed of a sheet-like audio information input/output section 6240 for inputting/outputting audio information from the piezo-electric element 6241 and diaphragm 6242, etc., an audio substrate 6232 mounted with a thin IC chip 6234 provided with a memory area in which audio information input through the audio information input/output section 6240 is recorded, circuit elements such as a capacitor and resistor and a second switch. 6233a electrically connected to the IC chip 6234 and operated to output audio information recorded in the IC chip 6234, flexible paper batteries 6231 connected to the audio substrate 6232 for supplying power to the audio substrate 6232, and a connection substrate 6270 mounted with a first switch 6233b operated to record audio information input through the audio information input/output section 6240 in the IC chip 6234 and wiring patterns 6271a, 6271b for electrically connecting the IC chip 6234 and paper batteries 6231 and switch 6233b. In this way, the audio information recording/reproducing section 6230 has a sheet-like structure. Furthermore, the audio substrate 6232 is provided with connection terminals 6235 for inputting audio information to the IC chip 6234 from outside and outputting audio information recorded in the IC chip 6234 to the outside, a wiring pattern 6237a for connecting the positive electrode of the paper batteries 6231 and switch 6233a, a wiring pattern 6237b for connecting the port terminal of the port terminals of the IC chip 6234 to which an instruction signal for outputting audio information recorded in the memory area of the IC chip 6234 is input and the switch 6233a, and a wiring pattern 6237c for connecting the port terminal of the port terminals of the IC chip 6234 to which an instruction signal for recording audio information input through the audio information input/output section 6240 in the memory area of the IC chip 6234 is input and the wiring pattern 6271b formed on the connection substrate 6270. Here, the wiring pattern 6237a and the wiring pattern 6237b are not electrically connected at the lower part of the switch 6233a and the wiring pattern 6271a and the wiring pattern 6271b are not electrically connected at the lower part of the switch 6233b. Furthermore, the audio substrate 6232 is a flexible, thin substrate made of fiberglass reinforced plastics (FRP), polyethylene terephthalate (PET), polyimide or lead frame, etc., with the IC chip 6234 bonded thereto by means of anisotropic/conductive adhesive (ACP), anisotropic/conductive film (ACF) or wire bonding. Furthermore, the connection substrate 6270 also needs to have flexibility as described above and further needs to be made of a material such as a film that can be easily cut. Furthermore, the IC chip 6234 controls recording of audio information input through the audio information input/output section 6240 in the memory area and outputting of audio information recorded in the memory area through the audio information input/output section 6240, and when the port terminal connected to the wiring pattern 6237b becomes the power supply potential, the IC chip 6234 outputs the audio information recorded in the memory area of the IC chip 6234 and records the audio information input through the audio information input/output section 6240 in the memory area of the IC chip 6234 as long as the port terminal connected to the wiring pattern 6237c remains at the power supply potential. Furthermore, the switch 6233a is operated to output audio information recorded in the memory area of the IC chip 6234 through the audio information input/output section 6240 and the switch 6233b is operated to record audio information input through the audio information input/output section 6240 in the memory area of the IC chip 6234.

The audio information input/output section 6240, audio substrate 6232, paper batteries 6231 and connection substrate 6270 constituting the audio information recording/reproducing section 6230 are sandwiched between the support sheets 6220a, 6220b so that the audio information input/output section 6240, audio substrate 6232 and paper batteries 6231 remain in only one of the two areas to be divided along perforations 6225a, 6225b, and the connection substrate 6270 spans the two areas divided along perforations 6225a, 6225b and the switch 6233b is located in an area different from the area in which the audio information input/output section 6240, audio substrate 6232, paper batteries 6231 are sandwiched.

Furthermore, as shown in FIG. 52, the perforation 6225a is formed in the area of the support sheet 6220a facing the perforation 6205 formed on the surface sheet 6210a and holes 6221a, 6222a, 6222b, 6223, 6224a are formed in the area facing the paper batteries 6231, switches 6233a, 6233b, IC chip 6234 and audio information input/output section 6240 respectively when superimposed on the audio information recording/reproducing section 6230. Furthermore, the thickness thereof is smaller than that of the switch 6233a of the audio information recording/reproducing section 6230.

In this way, when the audio information recording/reproducing section 6230 is sandwiched between the support sheets 6220a, 6220b and surface sheet 6210a, only the area of the surface of the surface sheet 6210a on which the playback button 6203a is provided protrudes from the other area, which makes the playback button 6203a identifiable by touching from the outside.

Furthermore, the perforation 6225b is formed in the area of the support sheet 6220b facing the perforation 6205 formed on the surface sheet 6210a and holes 6221b, 6224b are formed in the area facing the paper batteries 6231 and audio information input/output section 6240 respectively when superimposed on the audio information recording/reproducing section 6230.

Furthermore, as shown in FIG. 51a, in the area in which the audio information recording/reproducing section 6230 is sandwiched through the perforation 6205, the surface sheet 6210a is provided with an information display area 6202 in which information to be transmitted to the receiver of this label 6201 is printed, and the area of the support sheet 6220a facing the switch 6233a through the hole 6222a is provided with a print showing the playback button 6203a for operating the switch 6233a and the area of the support sheet 6220a facing the switch 6233b through the hole 6222b is provided with a print showing the recording button 6203b for operating the switch 6233b. Furthermore, in the area of the support sheet 6220a facing the audio information input/output section 6240 through the hole 6224a, an audio output area 6204 with an array of fine holes for outputting audio output from the audio information input/output section 6240 is formed. Even when the surface of the audio information input/output section 6240 is covered with the surface sheet 6210a, the formation of the audio output area 6204 made up of such an array of fine holes can compensate for a reduction of sound volume output from the audio information input/output section 6240. Furthermore, Braille characters information 6206 for expressing information printed on the information display area 6202 and information showing the playback button 6203a, etc., is formed.

In this way, the audio information recording/reproducing section 6230 is sandwiched between the surface sheet 6210a and support sheets 6220a, 6220b.

A method of use of the above described label 6201 will be explained below.

First, the sender of the label 6201 prints information to be transmitted in the information display area 6202 of the surface sheet 6210a and prints the playback button 6203a and recording button 6203b.

Furthermore, with the switch 6233b held down through the recording button 6203b, audio information to be transmitted to the receiver of the label 6201 is input through the audio information input/output section 6240 and recorded in the memory area of the IC chip 6234.

In the label 6201 shown in FIGS. 51a to 51c, when the switch 6233b is not pressed through the recording button 6203b, the wiring pattern 6271a and the wiring pattern 6271b formed on the connection substrate 6270 are not electrically connected. For this reason, the port terminal of the port terminals of the IC chip 6234 connected to the wiring pattern 6271b through the wiring pattern 6237c, that is, the port terminal to which an instruction signal for recording the audio information input through the audio information input/output section 6240 in the memory area of the IC chip 6234 is input is left open and in this condition, even if audio information is input through the audio information input/output section 6240, the audio information input is not recorded in the memory area of the IC chip 6234.

On the other hand, when the switch 6233b is pressed through the recording button 6203b, the wiring pattern 6271a and the wiring pattern 6271b formed on the connection substrate 6270 are electrically connected through a conductive agent (not shown) applied to the back of the switch 6233b. Since the wiring pattern 6237a formed on the audio substrate 6232 is connected to the positive electrode of the paper batteries 6231, the port terminal connected to the wiring pattern 6271b through the wiring pattern 6237c, that is, the port terminal to which an instruction signal for recording audio information input through the audio information input/output section 6240 in the memory area of the IC chip 6234 is input becomes the power supply potential and if audio information is input through the audio information input/output section 6240 in this condition, the input audio information is recorded in the memory area of the IC chip 6234.

As described above, desired different pieces of audio information can be recorded at the destination of the label 6201 by recording audio information after printing the information on the label 6201, but it is also possible to print the information after recording the audio information. Furthermore, instead of inputting audio information through the audio information input/output section 6240, it is also possible to input audio information from the outside through the connection terminal 6235 provided on the audio substrate 6232. In that case, not only audio information but also an instruction for inputting this audio information is input through the connection terminal 6235, and when this instruction is input, the IC chip 6234 records the audio information input in the memory area through the connection terminal 6235. Furthermore, the audio information recorded in the memory area of the IC chip 6234 can also be output to the outside through the connection terminal 6235. In that case, an instruction for outputting the audio information recorded in the memory area of the IC chip 6234 is input through the connection terminal 6235 and when this instruction is input, the IC chip 6234 outputs the audio information recorded in the memory area through the connection terminal 6235.

In this way, after information is printed and audio information is recorded in the IC chip 6234, if the surface sheet 6210a and support sheets 6220a, 6220b are cut through perforations 6205, 6225a, 6225b, this causes the connection substrate 6270 of the audio information recording/reproducing section 6230 to be cut, which in turn disconnects the wiring patterns 6271a, 6271b formed on the connection substrate 6270. In the areas of the connection substrate 6270 facing the perforations 6205, 6225a, 6225b, notches 6272 are formed in a shape that does not impair the connection condition of the wiring pattern 6271, and since the line width of the area of the wiring patterns 6271a, 6271b facing the perforations 6205, 6225a, 6225b is narrow, when the surface sheet 6210a and support sheets 6220a, 6220b are cut through the perforations 6205, 6225a, 6225b, these sheets can be easily cut through the perforations 6205, 6225a, 6225b.

When the surface sheet 6210a and support sheets 6220a, 6220b are cut into two areas through the perforations 6205, 6225a, 6225b, the connection substrate 6270 is cut and the wiring patterns 6271a, 6271b formed on the connection substrate 6270 are thereby cut and the switch 6233b operated to record audio information input through the audio information input/output section 6240 in the IC chip 6234 is separated from the IC chip 6234 and paper batteries 6231.

Then, of the label 6201 whose surface sheet 6210a and support sheets 6220a, 6220b are cut through the perforations 6205, 6225a, 6225b, the side on which the IC chip 6234 and paper batteries 6231 are sandwiched is pasted to an object and this object is supplied to the destination of the label 6201. In this case, since the recording button 6203b does not exist on the label 6201 pasted to the object, no audio information is recorded in the IC chip 6234.

Furthermore, when the receiver of the label 6201 presses the switch 6233a through the playback button 6203a, audio information recorded in the memory area of the IC chip 6234 is output through the audio information input/output section 6240.

As in the case of the pressing of the switch 6233b through the aforementioned recording button 6203b, when the switch 6233a is not pressed through the playback button 6203a, the wiring pattern 6237a formed on the audio substrate 6232 and the wiring pattern 6237b are not electrically connected, and therefore the port terminal of the port terminals of the IC chip 6234 connected to the wiring pattern 6237b, that is, the port terminal to which an instruction signal for outputting audio information recorded in the memory area of the IC chip 6234 is input is left open, and the audio information recorded in the memory area of the IC chip 6234 is not output.

On the other hand, when the switch 6233a is pressed through the playback button 6203a, the wiring pattern 6237a formed on the audio substrate 6232 and wiring pattern 6237b are electrically connected through a conductive agent (not shown) applied to the back of the switch 6233a. Since the wiring pattern 6237a is connected to the positive electrode of the paper batteries 6231, the port terminal connected to the wiring pattern 6237b, that is, the port terminal to which an instruction signal for outputting audio information recorded in the memory area of the IC chip 6234 is input becomes the power supply potential, and the audio information recorded in the memory area of the IC chip 6234 is thereby output through the audio information input/output section 6240. Thus, pressing the switch 6233a through the playback button 6203a causes the audio information recorded in the IC chip 6234 to be output through the audio information input/output section 6240.

As described above, this embodiment does not apply any adhesive to the surface of pasting to an object in the area of the support sheet 6220b of the two support sheets 6210a, 6220b, which becomes the side to be pasted to the object, cut through the perforation 6225 and not pasted to the object, and can thereby prevent mistaken pasting of the area which should be separated before being pasted to the object.

The labels 6001, 6101, 6201 shown in the above described fifteenth to seventeenth embodiments can be used pasted to a medicine bag, for example.

The invention shown in the above described fifteenth to seventeenth embodiments is a label pastable to an object constructed in such a way that audio information is recorded in sheet-like audio information recording/reproducing means sandwiched between two sheet base materials and the recorded audio information can be reproduced, and therefore when the label in which information to be transmitted is recorded as audio information is pasted to the object and this object is delivered to the destination of the audio information, it is possible to transmit desired information to the able-bodied and the visually handicapped alike.

Furthermore, when two sheet base materials are made separable into two areas and the audio information recording/reproducing means is sandwiched between two sheet base materials so that the wiring for recording audio information spans the two areas, if audio information is recorded in the audio information recording/reproducing means and then two sheet base materials are separated into two areas when this label is pasted to the object, the wiring for recording the audio information is disconnected and it is thereby possible to prevent the audio information from being mistakenly recorded in the label pasted to the object.

Furthermore, when two sheet base materials are made separable into two areas and the audio information recording/reproducing means is sandwiched between two sheet base materials so that a first switch operated to record audio information is disposed in one of the two areas and the other member constituting the audio information recording/reproducing means is disposed in the other area, if audio information is recorded in the audio information recording/reproducing means and then the two sheet base materials are separated into two areas when this label is pasted to the object, the first switch operated to record audio information of the audio information recording/reproducing means is not pasted to the object, and it is thereby possible to prevent the audio information from being mistakenly recorded in the label pasted to the object.

Furthermore, in the case of the structure that adhesive work is not applied to the surface to be pasted to an object of the sheet base material of the two sheet base materials in the area in which the first switch is sandwiched, it is possible to prevent mistaken pasting to the object in the area in which the first switch is sandwiched and which should be separated before being pasted to the object.

Furthermore, in the case of the structure that the areas of the two sheet base materials facing the second switch operated when audio information recorded in the audio information recording/reproducing means is reproduced is made identifiable by touching from the outside, the visually handicapped can recognize this second switch more easily.

Eighteenth Embodiment

Figure 53A:
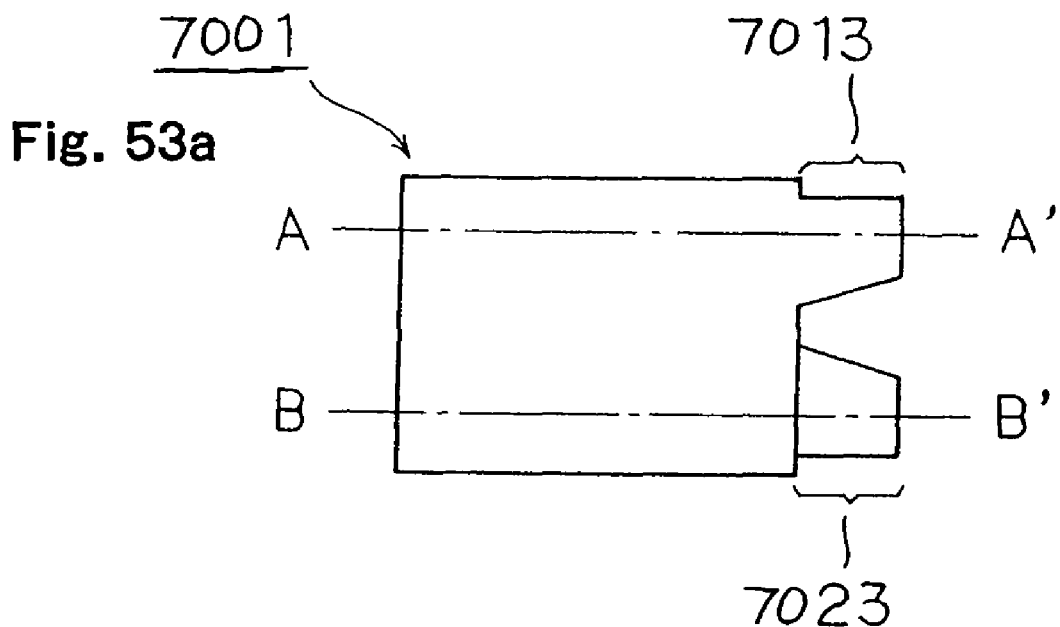
FIG. 53a is a plan view of an embodiment of a paper battery used for a power supply circuit according to an eighteenth embodiment of the present invention.
Figure 53B:
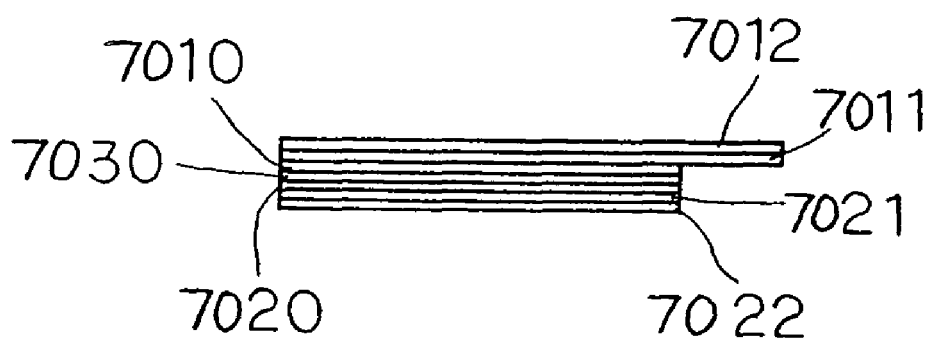
Figure 53C:
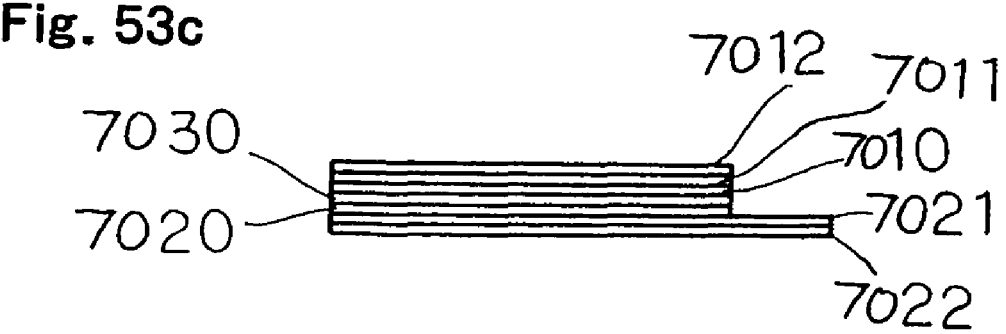

FIG. 53*a* is a plan view of an embodiment of a paper battery used for a power supply circuit according to an eighteenth embodiment of the present invention, FIG. 53*b* is a cross-sectional view along the line A-A' shown in FIG. 53*a* and FIG. 53*c* is a cross-sectional view along the line B-B' shown in FIG. 53*a*.

As shown in FIGS. 53*a* to 53*c*, the paper battery according to this embodiment is constructed of a positive electrode layer 7010 made of manganese dioxide, etc., and a negative electrode layer 7020 made of zinc, etc., laminated together through a gel electrolytic layer 7030, a protective film 7012 made of PET (polyethylene terephthalate), etc., and coated with a conductive ink 7011 laminated on the positive electrode layer 7010 side and a protective film 7022 made of PET, etc., and coated with a conductive ink 7021 laminated on the negative electrode layer 7020 side. Furthermore, the protective film 7012 coated with the conductive ink 7011 includes a protruding area 7013 which protrudes from the outside shape of the positive electrode layer 7010, the negative electrode layer 7020 and electrolytic layer 7030, and the protective film 7022 coated with the conductive ink 7021 includes a protruding area 7023 which protrudes from the outside shape of the positive electrode layer 7010, negative electrode layer 7020 and electrolytic layer 7030, and these protruding areas 7013, 7023 protrude from the outside shapes of the positive electrode layer 7010, negative electrode layer 7020 and electrolytic layer 7030 in different areas. Here, since the conductive inks 7011, 7021 are coated on the positive electrode layer 7010 side and negative electrode layer 7020 side of the protective films 7012, 7022 respectively, the surfaces of the protruding areas 7013, 7023 from which the conductive inks 7011, 7021 are exposed are different from each other.

In the paper battery 1 structured as described above, the conductive ink 7011 coated on the protective film 7012 is electrically continuous with the positive electrode layer 7010, and therefore the conductive ink 7011 in the protruding area 7013 constitutes a positive electrode and the conductive ink 7021 coated on the protective film 7022 is electrically continuous with the negative electrode layer 7020, and therefore the conductive ink 7021 in the protruding area 7023 constitutes a negative electrode.

The power supply circuit using the above described paper battery 7001 will be explained below.

Figure 54A:
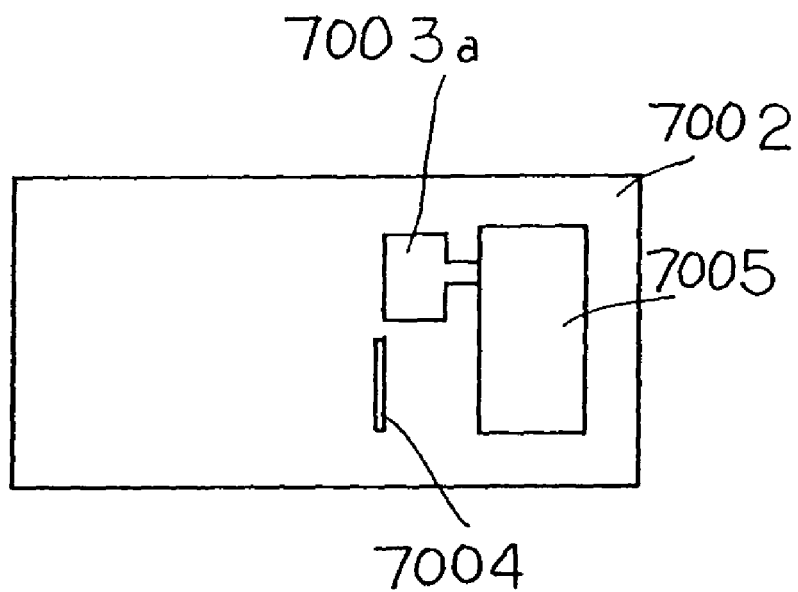
FIG. 54a illustrates a structure of the surface of an embodiment of a sheet-like circuit substrate on which the paper battery shown in FIGS. 53a to 53c is mounted, on which the paper battery 7001 is mounted.
Figure 54B:
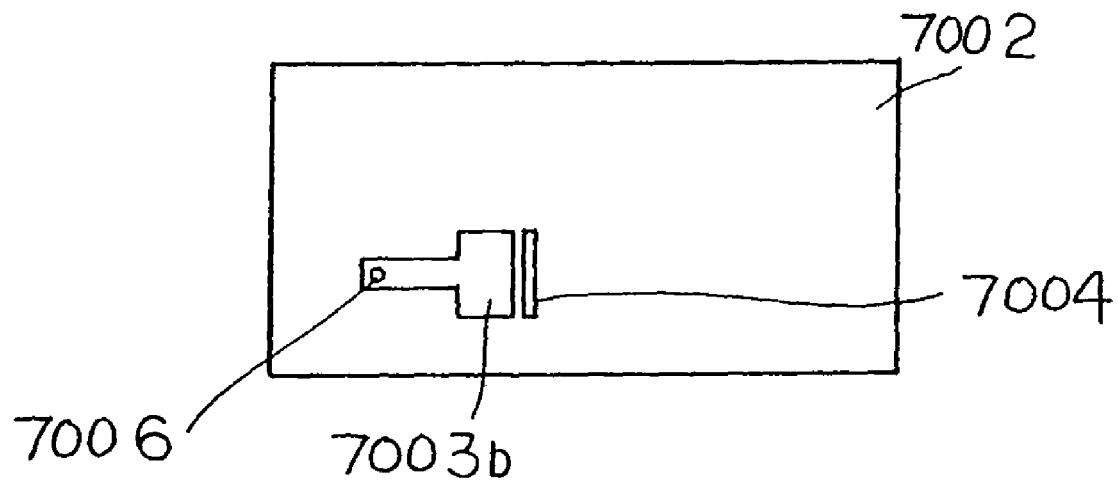
Figure 55A:
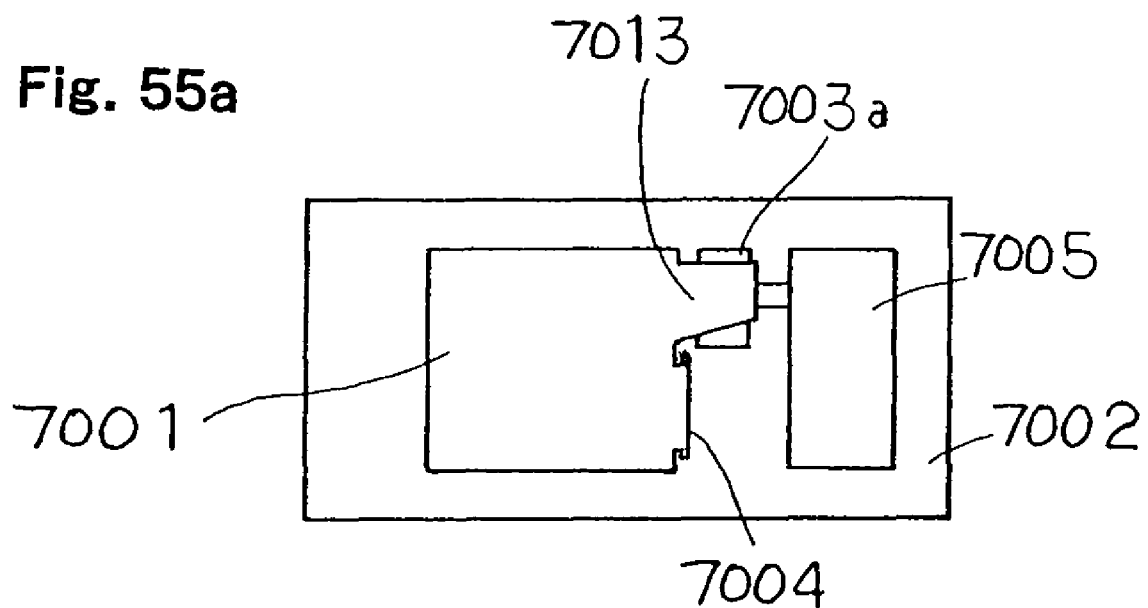
FIG. 55a illustrates a structure of the surface of a power supply circuit with the paper battery shown in FIGS. 53a to 53c mounted on the circuit substrate shown in FIGS. 54a, 54b, on which the paper battery 7001 is mounted.
Figure 55B:
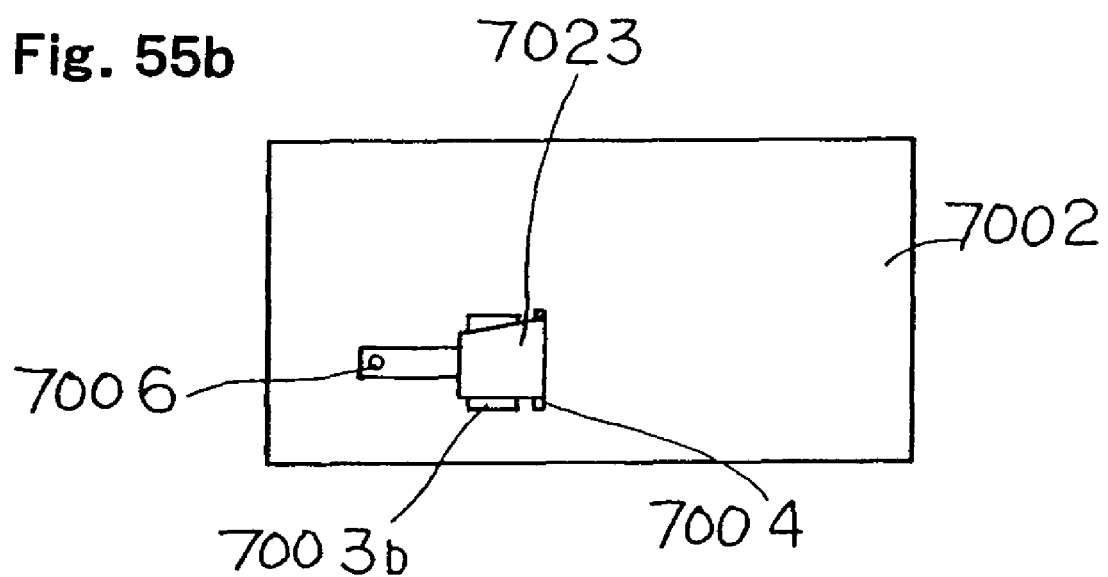

FIG. 54*a* illustrates a structure of the surface of an embodiment of a sheet-like circuit substrate on which the paper battery 7001 shown in FIGS. 53*a* to 53*c* is mounted, on which the paper battery 7001 is mounted, FIG. 54*b* illustrates a structure of the surface opposite to the surface shown in FIG. 54*a*. Furthermore, FIG. 55*a* illustrates a structure of the surface of a power supply circuit with the paper battery 7001 shown in FIGS. 53*a* to 53*c* mounted on the circuit substrate shown in FIGS. 54*a*, 54*b*, on which the paper battery 7001 is mounted and FIG. 55*b* illustrates a structure of the surface opposite to the surface shown in FIG. 55*a*.

As shown in FIGS. 54*a*, 54*b*, a land 7003*a* to be a first conductive area is formed on the surface of the substrate 7002 and a land 7003*b* to be a second conductive area is formed on the back of the substrate 7002 and a calculation circuit 7005 is mounted on the surface on which the land 7003*a* is formed in such a way that the calculation circuit 7005 is connected to the lands 7003*a*, 7003*b*. The land 7003*b* formed on the side opposite to the side on which the calculation circuit 7005 is mounted is connected to the calculation circuit 7005 through a through hole 7006. Furthermore, the substrate 7002 is provided with a notch 7004 into which the protruding area 7023 of the paper battery 7001 fits when the paper battery 7001 is mounted on the surface of the substrate 7002 on which the calculation circuit 7005 is mounted.

When the paper battery 7001 shown in FIGS. 53*a*, 53*b* is mounted on the circuit substrate structured as described above, the paper battery 7001 is mounted in such a way that the protruding area 7013 of the paper battery 7001 contacts the land 7003*a* formed on the surface of the substrate 7002 on which the calculation circuit 7005 is mounted and the protruding area 7013 and land 7003*a* are bonded together using a conductive material, for example, ACF (anisotropic/conductive film), ACP (anisotropic/conductive adhesive) or silver paste, etc. Furthermore, in this case, the protruding area 7023 of the paper battery 1 penetrates into the surface opposite to the surface on which the calculation circuit 7005 is mounted through the notch 4 provided on the substrate 7002 and contacts the land 7003*b* and the protruding area 7023 and the land 7003*b* are bonded together using a conductive material such as ACF, ACP or silver paste. Here, the surface of the protruding area 7013 which contacts the land 7003*a* is coated with the conductive ink 7011 which is electrically continuous with the positive electrode layer 7010 of the paper battery 7001, and therefore when the protruding area 7013 and the land 7003*a* are bonded together, the positive electrode layer 7010 of the paper battery 7001 is electrically connected with the land 7003*a*. Furthermore, the surface of the protruding area 7023 which contacts the land 700*b* is coated with the conductive ink 7021 which is electrically continuous with the negative electrode layer 7020 of the paper battery 7001, and therefore when the protruding area 7023 and the land 7003*b* are bonded together, the negative electrode layer 7020 of the paper battery 7001 is electrically connected with the land 7003*b*. In this way, the paper battery 7001 and lands 7003*a*, 7003*b* form a power supply circuit for supplying power to the calculation circuit 7005.

A method of manufacturing the above described power supply circuit will be explained below.

FIG. 56*a* to 56*d* illustrate the method of manufacturing the power supply circuit shown in FIGS. 55*a*, 55*b*.

First, as shown in FIG. 56*a*, when a plurality of substrates 7002 are arranged, lands 7003*a*, 7003*b* are formed on each substrate 7002 and further a calculation circuit 7005 is mounted so as to be connected to the land 7003*a*, 7003*b* as shown in FIG. 56*b*.

Next, lands 7003*a*, 7003*b* are formed as shown in FIG. 56*c* and the circuit substrates on which the calculation circuits 7005 are mounted are separated into individual pieces. In this case, notches 7004 are formed in the substrates 7002 simultaneously with the separation of the circuit substrates, and therefore there is no need to provide an additional step of forming the notches 7004.

Then, as shown in FIG. 56*d*, the paper battery 7001 is mounted on each circuit substrate in a state of individual pieces and the lands 7003*a*, 7003*b* and the protruding areas 7013, 7023 of the paper battery 7001 are bonded together.

Nineteenth Embodiment

Figure 57A:
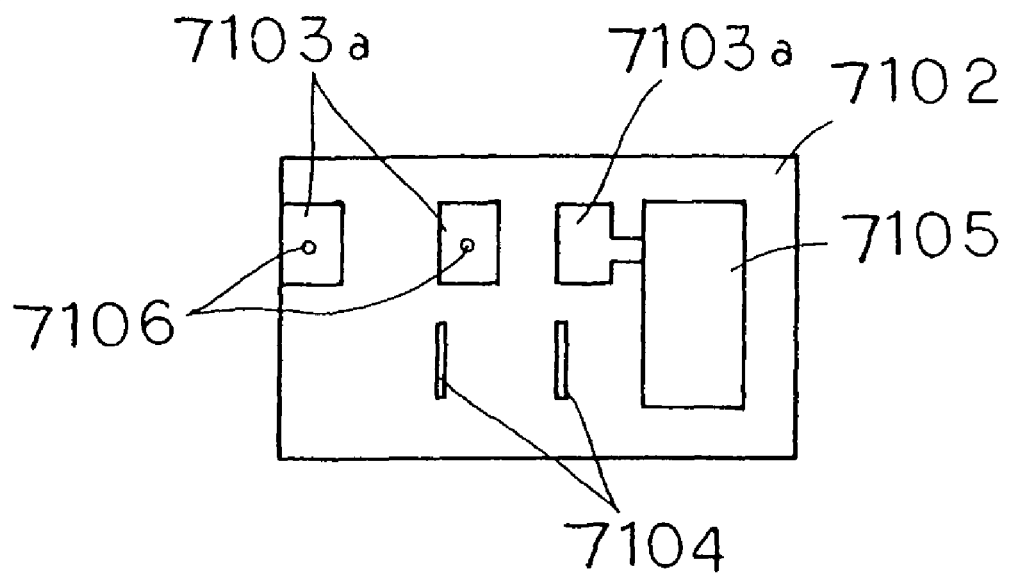
Figure 57B:
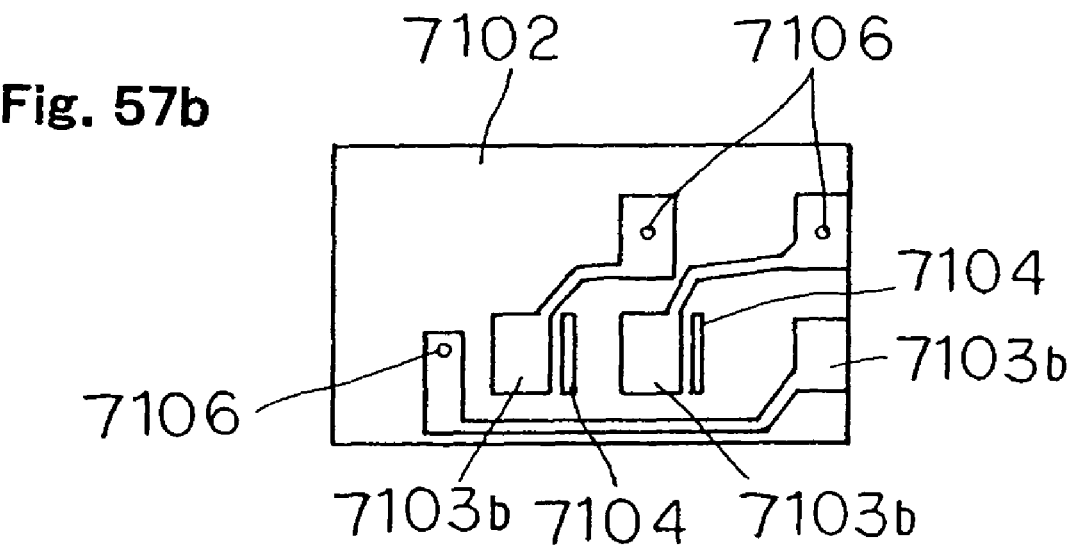
Figure 58A:
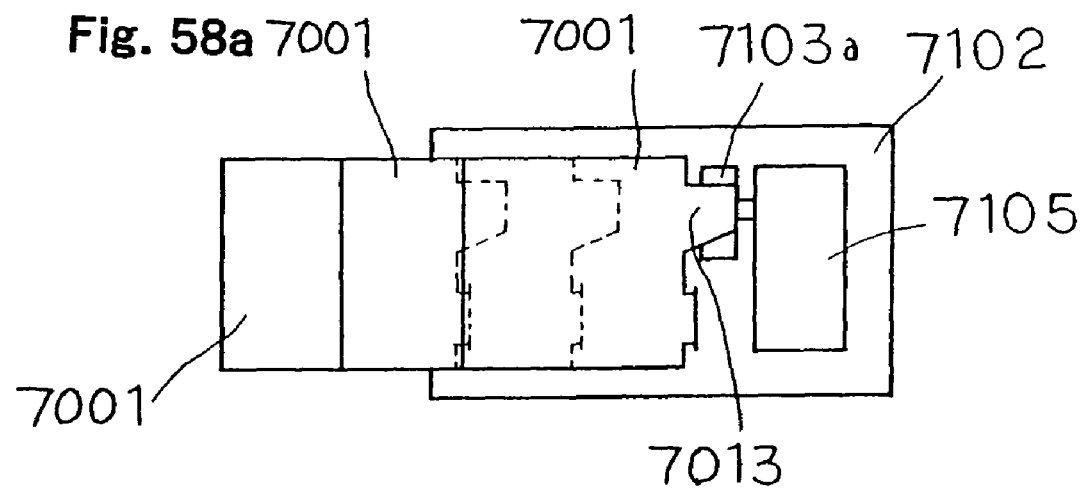
Figure 58B:
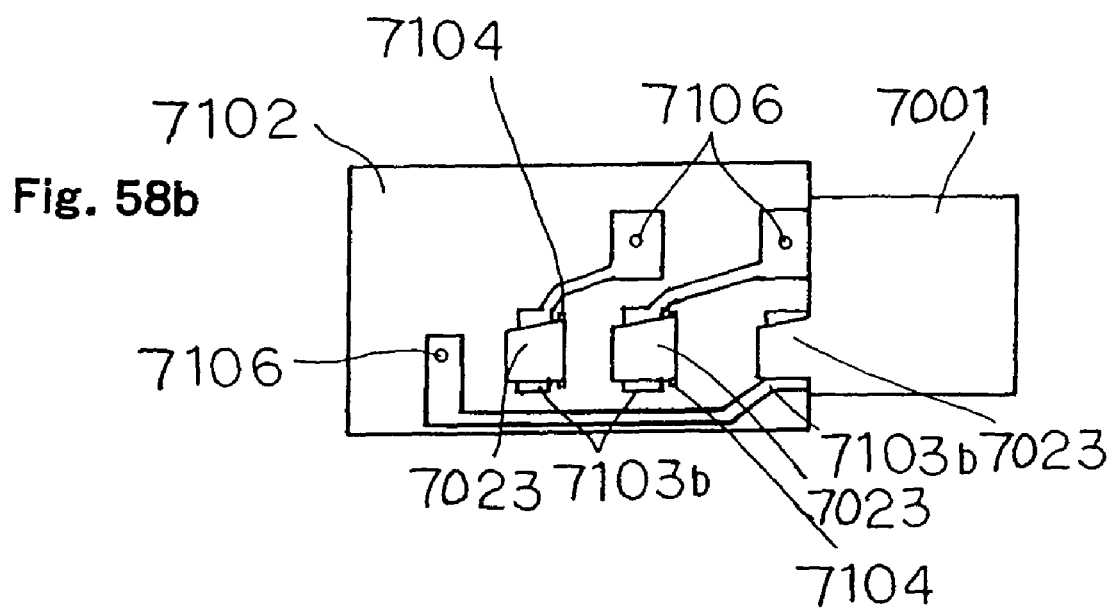

FIG. 57*a* illustrates a structure of the surface of an embodiment of a sheet-like circuit substrate on which the paper battery 7001 shown in FIGS. 53*a* to 53*c* is mounted, on which the paper battery 7001 is mounted and FIG. 57*b* illustrates a structure of the surface opposite to the surface shown in FIG. 57*a*. Furthermore, FIG. 58*a* illustrates a structure of the surface of a power supply circuit with the power battery 7001 shown in FIGS. 53*a* to 53*c* mounted on the circuit substrate shown in FIGS. 57*a* to 57*d*, on which the paper battery 7001 is mounted and FIG. 58*b* illustrates a structure of the surface opposite to the surface shown in FIG. 58*a*.

As shown in FIGS. 57*a*, 57*b*, in the circuit substrate of this embodiment, three lands 7103*a* which constitute a first conductive area are formed on the surface of a substrate 7102 and three lands 7103*b* which constitute a second conductive area are formed on the back of the substrate 7102, and a calculation circuit 7105 is mounted on the side on which the lands 7103*a* are formed so as to be connected to each of these three lands 7103*a* and three lands 7103*b*. Of the three lands 7103*a*, the land 7103*a* formed in the area nearest to the calculation circuit 7105 is connected to the calculation circuit 7105 and of the three lands 7103*b*, the land 7103*b* formed in the area farthest from the calculation circuit 7105 is connected to the calculation circuit 7105 through a through hole 7106. Furthermore, of the lands 7103*a*, the land 7103*a* formed in the area farthest from the calculation circuit 7105 is electrically continuous with the back of the substrate 7102 through the through hole 7106 and connected to the land 7103*b* out of the three lands 7103*b* formed in the area second farthest from the calculation circuit 7105, and the land 7103*a* out of the lands 7103*a* formed in the area second farthest from the calculation circuit 7105 is electrically continuous with the back of the substrate 7102 through the through hole 7106 and connected to the land 7103*b* out of the three lands 7103*b* formed in the area nearest to the calculation circuit 7105. Furthermore, the substrate 7102 is provided with three notches 7104 so that when the three paper batteries 7001 are mounted on the surface of the substrate 7102 on which the calculation circuit 7105 is mounted, protruding areas 7023 of three paper batteries 7001 fit in. Furthermore, the pitch of the three lands 7103*a*, 7103*b* is half the length of the paper battery 7001 mounted on the substrate 7102 excluding the protruding areas 7013, 7023 in the length direction in which the protruding areas 7013, 7023 are provided. In this way, when a plurality of paper batteries 7001 are mounted on the circuit substrate so as to be connected to the lands 7103*a*, 7103*b*, the plurality of paper batteries 7001 are overlapped with one another in an imbricate structure. Furthermore, in the overlapped area, only two neighboring paper batteries 7001 are overlapped with each other. In this way, adopting the structure with parts of a plurality of paper batteries 7001 overlapping with one another can reduce the area of the circuit substrate and realize a cost reduction, and as in the case of this embodiment adopting the structure that only two neighboring paper batteries 7001 overlap with each other can considerably reduce the thickness of the overlapped areas of the paper batteries 7001.

When three paper batteries 7001 shown in FIGS. 53*a* to 53*c* are mounted in the circuit substrates structured as described above, the paper batteries 7001 are mounted in such a way that the protruding areas 7013 of the three paper batteries 7001 contact the lands 7103*a* formed on the surface on which the calculation circuit 7105 of the substrate 7102 is mounted, and the three protruding areas 7013 and lands 7103*a* are bonded together using a conductive material such as ACF, ACP or silver paste. Furthermore, in this case, the protruding areas 7023 of the three paper batteries 7001 penetrate into the surface opposite to the surface on which the calculation circuit 7105 is mounted through the notch 7104 provided on the substrate 7102, contact the lands 7103*b* and the three protruding areas 7023 and lands 7103*b* are bonded together using a conductive material such as ACF, ACP or silver paste. Mounting of the three paper batteries 1 on the substrate 7102 and bonding of the protruding areas 7013 and lands 7103*a* are carried out sequentially starting from the area farthest from the calculation circuit 7105. Here, the surface on which the protruding areas 7013 contact the lands 7103*a* is coated with the conductive ink 7011 which is electrically continuous with the positive electrode layer 7010 of the paper batteries 7001, and therefore when the protruding areas 7013 and lands 7103*a* are bonded together, the positive electrode layer 7010 of the paper batteries 7001 and land 7103*a* are electrically connected. Furthermore, the surface on which the protruding areas 7023 contact the lands 7103*b* is coated with the conductive ink 7021 which is electrically continuous with the negative electrode layer 7020 of the paper batteries 7001, and therefore when the protruding areas 7023 and lands 7103*b* are bonded together, the negative electrode layer 7020 of the paper batteries 7001 and land 7103b are electrically connected. Furthermore, of the lands 7103a, the land 7103a is in the area farthest from the calculation circuit 7105 becomes electrically continuous with the back of the substrate 7102 through the through hole 7106, connected to the land 7103b of the three lands 7103b formed in the area second farthest from the calculation circuit 7105, and further the land 7103a formed in the area second farthest from the calculation circuit 7105 is electrically continuous with the back of the substrate 7102 through the through hole 7106 and connected with the land 7103b of the three lands 7103a formed in the area nearest from the calculation circuit 7105, and therefore when three paper batteries 7001 are mounted on the substrate 7102 so as to be connected to the lands 7103a, 7103b, these three paper batteries 7001 are connected in series, and the three paper batteries 7001 connected in series and lands 7103a, 7103b form a power supply circuit for supplying power to the calculation circuit 7105.

In the above described eighteenth embodiment, the protruding areas 7023 of the paper batteries 7001 penetrate into the opposite surface of the circuit substrate through the notch 7004 provided on the circuit substrate and connected to the lands 7003b, but it is also possible to construct the power supply section, as in the case of the paper battery 7001 of the three paper batteries 7001 farthest from the calculation circuit 7105 shown in the nineteenth embodiment, with only the protruding area 7023 penetrated into the surface opposite to the circuit substrate at an end of the circuit substrate and at least one paper battery 7001 connected to the land 7103b.

Twentieth Embodiment

FIG. 59a is a plan view of an embodiment of a paper battery used for a power supply circuit according to a twentieth embodiment of the present invention, FIG. 59b is a cross-sectional view along the line A-A' shown in FIG. 59a and FIG. 59c is a cross-sectional view along the line B-B' shown in FIG. 59a.

As shown in FIGS. 59a to 59c, in the paper battery in this embodiment, a positive electrode layer 7210 made of manganese dioxide, etc., and a negative electrode layer 7220 made of zinc, etc., are laminated together through a gel electrolytic layer 7230, and a protective film 7212 made of PET, etc., is laminated on the positive electrode layer 7210 side and a protective film 7222 made of PET, etc., is laminated on the negative electrode layer 7220 side. Parts of the protective films 7212, 7222 are removed, which constitute exposed areas 7213, 7223 from which parts of the positive electrode layer 7210 and negative electrode layer 7220 are exposed on different surfaces.

In the paper battery 7201 structured as described above, the exposed area 7213 from which the positive electrode layer 7210 is exposed constitutes a positive electrode and the exposed area 7223 from which the negative electrode layer 7220 is exposed constitutes a negative electrode.

A power supply circuit using the above described paper battery 7201 will be explained below.

FIG. 60a illustrates a structure of the surface of an embodiment of a sheet-like circuit substrate on which the paper battery 7201 shown in FIGS. 59a to 59c is mounted, on which the paper battery 7201 is mounted, FIG. 60b illustrates a structure of the surface opposite to the surface shown in FIG. 60a. Furthermore, FIG. 61a illustrates a structure of the surface of a power supply circuit with the paper battery 7201 shown in FIGS. 59a to 59c mounted on the circuit substrate shown in FIGS. 60a, 60b, on which the paper battery 7201 is mounted and FIG. 61b illustrates a structure of the surface opposite to the surface shown in FIG. 61a.

As shown in FIGS. 60a, 60b, in the circuit substrate in this embodiment, a land 7203a which constitutes a first conductive area is formed on the surface of the substrate 7202, a land 7203b which constitutes a second conductive area is formed on the back of the substrate 7202 and a calculation circuit 7205 is mounted on the surface on which the land 7203a is formed so as to be connected to these lands 7203a, 7203b. The land 7203b formed on the surface opposite to the surface on which the calculation circuit 7205 is mounted is connected to the calculation circuit 7205 through a through hole 7206. Furthermore, the substrate 7202 is provided with a notch 7204 into which the exposed area 7223 of the paper battery 7201 fits when the paper battery 7201 is mounted on the surface on which the calculation circuit 7205 of the substrate 7202 is mounted.

When the paper battery 7201 shown in FIGS. 59a to 59c is mounted on the circuit substrate structured in this way, the paper battery 7201 is mounted in such a way that the exposed area 7213 of the paper battery 7201 contacts the land 7203a formed on the surface of the substrate 7202 on which the calculation circuit 7205 is mounted and the exposed area 7213 and land 7203a are bonded together using, for example, a conductive material such as ACF, ACP or silver paste. Furthermore, in this case, the exposed area 7223 of the paper battery 7201 penetrates into the surface opposite to the surface on which the calculation circuit 7205 is mounted through the notch 7204 provided on the substrate 7202, contacts the land 7203b and the exposed area 7223 and the land 7203b are bonded together using a conductive material such as ACF, ACP or silver paste. Here, since the positive electrode layer 7210 of the paper battery 7201 is exposed on the surface of the exposed area 7213 contacting the land 7203a, when the exposed area 7213 and land 7203a are bonded together, the positive electrode layer 7210 of the paper battery 7201 and the land 7203a are electrically connected. Furthermore, since the negative electrode layer 7220 of the paper batteries 7201 is exposed on the surface of the exposed area 7223 contacting the land 7203b, when the exposed area 7223 and land 7203b are bonded together, the negative electrode layer 7220 of the paper battery 7201 and land 7203b are electrically connected. In this way, the paper battery 7201 and lands 7203a, 7203b form a power supply circuit for supplying power to the calculation circuit 7205.

The present invention shown in the above described eighteenth to twentieth embodiments is a power supply circuit comprising a paper battery made up of a positive electrode and a negative electrode laminated together through an electrolytic layer, with the positive electrodes and negative electrodes exposed from different surfaces, connected to a sheet-like circuit substrate on which conductive areas for connections with the electrodes are formed, having a structure that a first conductive area to be connected to one of the positive electrode and negative electrode and a second conductive area to be connected to the other electrode of the positive electrode and negative electrode are formed on different surfaces, the paper battery is mounted on the surface provided with the first conductive area so that one electrode is connected to the first conductive area and the other electrode is connected to the second conductive area, and therefore it is possible to form a power supply circuit without increasing the resistance between the paper battery and the circuit substrate and without folding the paper battery.

Furthermore, in the case of the structure that the circuit substrate includes a notch so that the other electrode penetrates from the front into the back of the circuit substrate and the other electrode of the paper battery penetrates into the side on which the second conductive area is formed through the notch and connected to the second conductive area, it is possible to allow the other electrode of the paper battery to penetrate into the other side of the circuit substrate through the notch and connect to the second conductive area even when the paper battery is mounted at any place other than the end of the circuit substrate and this does not limit the area of the circuit substrate in which the paper battery is mounted.

Furthermore, in the case of the structure that when a plurality of sets of first and second conductive areas are formed on the circuit substrate and as many paper batteries as the sets of first and second conductive areas are mounted so as to be connected to a plurality of first and second conductive areas, the plurality of first and second conductive areas are connected so that a plurality of paper batteries are connected in series, it is possible to form a power supply circuit with a plurality of paper batteries connected in series.

Furthermore, in the case of the structure that when the first and second conductive areas are mounted on the circuit substrate so that a plurality of paper batteries are connected to a plurality of first and second conductive areas, at least parts of the plurality of paper batteries overlap with one another, it is possible to reduce the area of the circuit substrate on which the plurality of paper batteries are mounted and realize a cost reduction.

Twenty-first Embodiment

FIG. 62a is a plan view of an embodiment of a paper battery used for a power supply circuit manufactured using a method of manufacturing a power supply circuit according to a twenty-first embodiment of the present invention, FIG. 62b is a cross-sectional view along the line A-A' shown in FIG. 62a and FIG. 62c is a cross-sectional view along the line B-B' shown in FIG. 62a.

As shown in FIGS. 62a to 62c, the paper battery in this embodiment is constructed in such a way that a positive electrode layer 8010 made of manganese dioxide, etc., and a negative electrode layer 8020 made of zinc, etc., are laminated together through a gel electrolytic layer 8030, a protective film 8012 made of PET (polyethylene terephthalate), etc., coated with a conductive ink 8011 is laminated on the positive electrode layer 8010 side, and a protective film 8022 made of PET, etc., coated with a conductive ink 8021 is laminated on the negative electrode layer 8020 side. Furthermore, the protective film 8012 coated with the conductive ink 8011 includes a protruding area 8013 protruding from the outside shapes of the positive electrode layer 8010, negative electrode layer 8020 and electrolytic layer 8030, the protective film 8022 coated with the conductive ink 8021 includes a protruding area 8023 protruding from the outside shapes of the positive electrode layer 8010, negative electrode layer 8020 and electrolytic layer 8030 and these protruding areas 8013, 8023 protrude from the outside shapes of the positive electrode layer 8010, negative electrode layer 8020 and electrolytic layer 8030 in different areas. Since the conductive inks 8011, 8021 are coated on the protective films 8012, 8022 on the positive electrode layer 8010 side and negative electrode layer 8020 side, respectively, the surfaces from which the conductive inks 8011, 8021 are exposed in the protruding areas 8013, 8023 are different surfaces. Furthermore, in the protective films 8012, 8022, there are areas in which the protective films 8012, 8022 are exposed without the conductive inks 8011, 8021 being applied on the surfaces coated with the conductive inks 8011, 8021 in the protruding areas 8013, 8023.

In the paper battery 8001 structured as described above, since the conductive ink 8011 applied to the protective film 8012 is electrically continuous with the positive electrode layer 8010, the conductive ink 8011 of the protruding area 8013 constitutes a positive electrode and since the conductive ink 8021 applied to the protective film 8022 is electrically continuous with the negative electrode layer 8020, the conductive ink 8021 of the protruding area 8023 constitutes a negative electrode.

FIG. 63 illustrates the three paper batteries 8001 shown in FIGS. 62a to 62c connected in series.

As shown in FIG. 63, the three paper batteries 8001a to 8001c are connected by superimposing the paper battery 8001a on the paper battery 8001b and bonding them together so that the conductive ink 8021 in the protruding area 8023 of the paper battery 8001a faces the conductive ink 8011 in the protruding area 8013 of the paper battery 8001b, and by superimposing the paper battery 8001b on the paper battery 8001c and bonding them together so that the conductive ink 8021 in the protruding area 8023 of the paper battery 8001b faces the conductive ink 8011 in the protruding area 8013 of the paper battery 8001c. In this way, the three paper batteries 8001a to 8001c are connected in series so that the conductive ink 8011 in the protruding area 13 of the paper battery 8001a constitutes a positive electrode and the conductive ink 8021 in the protruding area 8023 of the paper battery 8001c constitutes a negative electrode.

A power supply circuit using the above described paper battery 8001 will be explained below.

FIG. 64a illustrates a structure of one surface of an embodiment of a sheet-like circuit substrate used for a power supply circuit manufactured using a method of manufacturing a power supply circuit according to a twenty-first embodiment of the present invention and FIG. 64b illustrates a structure of the other surface of the circuit substrate shown in FIG. 64a. Furthermore, FIG. 65a illustrates a structure of one surface of the power supply circuit with the paper batteries 8001a to 8001c shown in FIG. 63 mounted on the circuit substrate shown in FIGS. 64a, 64b and FIG. 65b illustrates a structure of the other surface of the power supply circuit shown in FIG. 65a.

As shown in FIGS. 64a, 64b, in the circuit substrate in this embodiment, on one surface of a sheet-like substrate 8032 made of resin such as PET, a calculation element 8034 is mounted and a land 8031a which constitutes a connection terminal for connecting the conductive ink 8011 in the protruding area 8013 which becomes the positive electrode of the paper battery 8001a shown in FIG. 63 is formed, and on the other surface of the substrate 8032, a land 8031b which is a connection terminal for connecting the conductive ink 8021 in the protruding area 8023 which becomes the negative electrode of the paper battery 8001c shown in FIG. 63 is formed, the calculation element 8034 and land 8031a are connected through the wiring pattern 8037a, and the calculation element 8034 and land 8031b are connected through a through hole 8036 and a wiring pattern 8037b. Furthermore, a plurality of fine holes 8033a, 8033b are formed in the respective areas in which the lands 8031a, 8031b are formed.

When the paper batteries 8001a to 8001c shown in FIG. 63 are mounted on the circuit substrate structured in this way, as shown in FIGS. 65a, 65b, the paper batteries 8001a to 8001c are mounted on the circuit substrate so that the conductive ink 8011 in the protruding area 8013 which becomes the positive electrode of the paper battery 8001a contacts the land 8031a and the conductive ink 8021 in the protruding area 8023 which becomes the negative electrode of the paper battery 8001c contacts the land 8031b, the protruding area 8013 of the paper battery 8001*a* and the land 8031*a* are bonded through ultrasonic bonding and the protruding area 8023 of the paper battery 8001*c* and the land 8031*b* are bonded through ultrasonic bonding. Here, since the conductive ink 8011 in the protruding area 8013 of the paper battery 8001*a* which contacts the land 8031*a* is connected to the positive electrode layer 8010 of the paper battery 8001*a*, if the protruding area 8013 of the paper battery 8001*a* and land 8031*a* are bonded together, the positive electrode layer 8010 of the paper battery 8001*a* and the land 8031*a* are electrically connected. Furthermore, since the conductive ink 8021 in the protruding area 8023 of the paper battery 8001*c* which contacts the land 8031*b* is connected to the negative electrode layer 8020 of the paper battery 8001*c*, if the protruding area 8023 of the paper battery 8001*c* and the land 8031*b* are bonded together, the negative electrode layer 8020 of the paper battery 8001*c* and land 8031*b* are electrically connected. In this way, the paper battery 8001*a* to 8001*c* connected in series and the lands 8031*a*, 8031*b* form a power supply circuit for supplying power to the calculation element 8034.

A method of manufacturing the above described power supply circuit will be explained below.

FIGS. 66*a* to 66*e* illustrate a method of manufacturing the power supply circuit shown in FIGS. 65*a*, 65*b*. FIGS. 66*a* to 66*e* illustrate only one surface of the power supply circuit shown in FIGS. 65*a*, 65*b*, but the other surface will also follow the explanations below.

First, as shown in FIG. 66*a*, a land 8031*a* and a wiring pattern 8037*a* to be connected to this land 8031*a* are formed on one surface of the sheet-like substrate 8032 made of resin such as PET and a land 8031*b* and a wiring pattern 8037*b* to be connected to this land 8031*b* are formed on the other surface of the substrate 8032. Furthermore, a through hole 8036 is also formed on the substrate 8032. The lands 8031*a*, 8031*b*, wiring patterns 8037*a*, 8037*b* and through hole 8036 may be made of copper and formed through etching, for example.

Next, as shown in FIG. 66*b*, a plurality of holes 8033*a*, 8033*b* of approximately 0.5 to 2 mm in diameter penetrating from front to back of the substrate 8032 are formed on the respective areas of the substrate 8032 in which the lands 8031*a* and 8031*b* are formed. The holes 8033*a*, 8033*b* may also be formed simultaneously in the step of forming the through hole 8036 on the substrate 8032.

Next, as shown in FIG. 66*c*, a calculation element 8034 is mounted on the substrate 8032 so that the wiring pattern 8037*a* and through hole 8036 are connected.

Furthermore, as shown in FIG. 63, the paper battery 8001*a* is superimposed on the paper battery 8001*b* so that the conductive ink 8021 in the protruding area 8023 of the paper battery 8001*a* faces the conductive ink 8011 in the protruding area 8013 of the paper battery 8001*b*, and the paper battery 8001*b* is superimposed on the paper battery 8001*c* so that the conductive ink 8021 in the protruding area 8023 of the paper battery 8001*b* faces the conductive ink 8011 in the protruding area 8013 of the paper battery 8001*c*, and the superimposed areas are subjected to ultrasonic vibration in this condition. Then, the conductive ink 8021 in the protruding area 8023 of the paper battery 8001*a* and the conductive ink 8011 in the protruding area 8013 of the paper battery 8001*b* are melted by this vibration and the protruding area 8023 of the paper battery 8001*a* and the protruding area 8013 of the paper battery 8001*b* are bonded by ultrasonic bonding, and the conductive ink 8021 in the protruding area 8023 of the paper battery 8001*b* and the conductive ink 8011 in the protruding area 8013 of the paper battery 8001*c* are melted by this vibration, and the protruding area 8023 of the paper battery 8001*b* and the protruding area 8013 of the paper battery 8001*c* are bonded by ultrasonic bonding. In this way, as shown in FIG. 66*d*, the three paper batteries 8001*a* to 8001*c* are connected in series. Furthermore, in this case, the protective film 8022 exposed in the protruding area 8023 of the paper battery 8001*a* and the protective film 8012 exposed in the protruding area 8013 of the paper battery 8001*b* are melted, these are also bonded through ultrasonic bonding, and the protective film 8022 exposed in the protruding area 8023 of the paper battery 8001*b* and the protective film 8012 exposed in the protruding area 8013 of the paper battery 8001*c* are melted and these are also bonded through ultrasonic bonding.

In this embodiment, on the surface of the protruding areas 8013, 8023 coated with the conductive inks 8011, 8021, there are areas in which the conductive inks 8011, 8021 are not coated and the protective films 8012, 8022 are exposed and the protective films 8012, 8022 are bonded through ultrasonic bonding in these areas, but it is also possible to adopt a structure with the conductive ink 8011 coated on the entire surface of one side of the protective film 8012 and the conductive ink 8021 coated on the entire surface of one side of the protective film 8022. In that case, if ultrasonic vibration is applied as described above, only through the melting of the conductive ink 8021 in the protruding area 8023 of the paper battery 8001*a* and the conductive ink 8011 in the protruding area 8013 of the paper battery 8001*b*, the protruding area 8023 of the paper battery 8001*a* and the protruding area 8013 of the paper battery 8001*b* are bonded together through ultrasonic bonding. Furthermore, likewise, only through the melting of the conductive ink 8021 in the protruding area 8023 of the paper battery 8001*b* and the conductive ink 8011 in the protruding area 8013 of the paper battery 8001*c*, the protruding area 8023 of the paper battery 8001*b* and the protruding area 8013 of the paper battery 8001*c* are bonded together through ultrasonic bonding.

Then, the paper batteries 8001*a* to 8001*c* connected in series are mounted on the substrate 8032 so that the conductive ink 8011 in the protruding area 8013 of the paper battery 8001*a* faces the land 8031*a* of the substrate 8032 and the conductive ink 8021 in the protruding area 8023 of the paper battery 8001*c* faces the land 8031*b* of the substrate 8032 and ultrasonic vibration is applied to the mutually facing parts in this condition. Then, as shown in FIG. 66*e*, the conductive ink 8011 in the protruding area 8013 of the paper battery 8001*a* is melted by this vibration and the protruding area 8013 of the paper battery 8001*a* and the land 8031*a* are bonded together through ultrasonic bonding. Furthermore, the conductive ink 8021 in the protruding area 8023 of the paper battery 8001*c* is also melted through this vibration and the protruding area 8023 of the paper battery 8001*c* and the land 8031*b* are bonded together through ultrasonic bonding. In this way, the paper batteries 8001*a* to 8001*c* connected in series and the lands 8031*a*, 8031*b* are electrically connected, and the paper batteries 8001*a* to 8001*c* and lands 8031*a*, 8031*b* form a power supply circuit for supplying power to the calculation element 8034. In this case, the conductive ink 8011 melted through ultrasonic vibration is flown into the hole 8033*a* formed in the land 8031*a* and the conductive ink 8021 melted through ultrasonic vibration is flown into the hole 8033*b* formed in the land 8031*b*.

FIG. 67 illustrates a connection state between the substrate 8032 of the power supply circuit and the paper batteries 8001*a* to 8001*c* manufactured using the manufacturing method shown in FIGS. 66*a* to 66*e* and shows a cross-sectional view along the line A-A' shown in FIG. 66*e*.

As shown in FIG. 67, the conductive inks 8011, 8021 melted through ultrasonic vibration are flown into the holes 8033a, 8033b formed in the lands 8031a, 8031b. The protruding area 8013 of the paper battery 8001a and the land 8031a, and the protruding area 8023 of the paper battery 8001c and the land 8031b bonded together through ultrasonic bonding in this way are also bonded together in the holes 8033a, 8033b, which increases the bonded area and increases the bonding force.

In this embodiment, the holes 8033a, 8033b penetrating from front to back of the substrate 8032 are formed in the lands 8031a, 8031b respectively, but the holes 8033a, 8033b need not always penetrate if they allow the conductive inks 8011, 8021 melted through ultrasonic vibration to flow into the respective holes and they may also be grooves instead of holes. Furthermore, it is also possible to apply work to coarsen the surfaces of the lands 8031a, 8031b.

Twenty-second Embodiment

FIG. 68a illustrates a structure of one surface of a sheet-like circuit substrate used for a power supply circuit manufactured using a method of manufacturing a power supply circuit according to a twenty-second embodiment of the present invention and FIG. 68b illustrates a structure of the other surface of the circuit substrate shown in FIG. 68a. Furthermore, FIG. 69a illustrates a structure of one surface of the power supply circuit with the paper batteries 8001a to 8001c shown in FIG. 63 mounted on the circuit substrate shown in FIGS. 68a, 68b and FIG. 69b illustrates a structure of the other surface of the power supply circuit shown in FIG. 69a.

As shown in FIGS. 68a, 68b, in the circuit substrate in this embodiment, on one surface of a sheet-like substrate 8132 made of resin such as PET, a calculation element 8134 is mounted, a land 8131a which constitutes a connection terminal for connecting a conductive ink 8011 in a protruding area 8013 which becomes the positive electrode of the paper battery 8001a shown in FIG. 63 is formed, and on the other surface of the substrate 8132, a land 8131b which constitutes a connection terminal for connecting a conductive ink 8021 in a protruding area 8023 which becomes the negative electrode of the paper battery 8001c shown in FIG. 63 is formed, the calculation element 8134 and land 8131a are connected through the wiring pattern 8137a and the calculation element 8134 and land 8131b are connected through the through hole 8136 and wiring pattern 8137b. Here, according to this embodiment, the lands 8131a, 8131b are shaped so that when the paper batteries 8001a to 8001c are mounted on the substrate 8132 in such a way that the protruding area 8013 of the paper battery 8001a shown in FIG. 63 faces the land 8131a and the protruding area 8023 of the paper battery 8001c faces the land 8131b, the lands 8131a, 8131b are not formed in parts of the areas facing the protruding areas 8013, 8023 of the paper battery 8001a.

When the paper batteries 8001a to 8001c shown in FIG. 63 are mounted on the circuit substrate structured in this way, the paper batteries 8001a to 8001c are mounted on the circuit substrate as shown in FIGS. 69a, 69b in such a way that the conductive ink 8011 in the protruding area 8013 which becomes the positive electrode of the paper battery 8001a contacts the land 8131a and the conductive ink 8021 in the protruding area 8023 which becomes the negative electrode of the paper battery 8001c contacts the land 8131b, the protruding area 8013 of the paper battery 8001a and land 8131a are bonded together through ultrasonic bonding and the protruding area 8023 of the paper battery 8001c and the land 8131b are bonded together through ultrasonic bonding. Here, since the conductive ink 8011 in the protruding area 8013 of the paper battery 8001a which contacts the land 8131a is connected to the positive electrode layer 8010 of the paper battery 8001a, and therefore when the protruding area 8013 of the paper battery 8001a and the land 8131a are bonded together, the positive electrode layer 8010 of the paper battery 8001a and the land 8131a are electrically connected. Furthermore, since the conductive ink 8021 in the protruding area 8023 of the paper battery 8001c which contacts the land 8131b is connected to the negative electrode layer 8020 of the paper battery 8001c, and therefore when the protruding area 8023 of the paper battery 8001c and the land 8131b are bonded together, the negative electrode layer 8020 of the paper battery 8001c and the land 8131b are electrically connected. In this way, the paper batteries 8001a to 8001c connected in series and the lands 8131a, 8131b form a power supply circuit for supplying power to the calculation element 8134.

A method of manufacturing the above described power supply circuit will be explained below.

FIGS. 70a to 70d illustrate a method of manufacturing the power supply circuit shown in FIGS. 69a, 69b. FIGS. 70a to 70d illustrate only one surface of the power supply circuit shown in FIGS. 69a, 69b, but the other surface will also follow the explanations below.

First, as shown in FIG. 70a, the land 8131a and wiring pattern 8137a to be connected to this land 8131a are formed on one surface of the sheet-like substrate 8132 made of resin such as PET and the land 8131b and wiring pattern 8137b to be connected to this land 8131b are formed on the other surface of the substrate 8132. This embodiment does not form the lands 8131a, 8131b in parts of the areas facing the protruding areas 8013, 8023 of the paper battery 8001a so that the protruding area 8013 of the paper battery 8001a faces the land 8131a and the protruding area 8023 of the paper battery 8001c faces the land 8131b when the paper batteries 8001a to 8001c are mounted on the substrate 8132. Furthermore, the through hole 8136 is also formed on the substrate 8132. The lands 8131a, 8131b, wiring patterns 8137a, 8137b and through hole 8136 may be made of copper and formed through etching, for example.

Next, as shown in FIG. 70b, the calculation element 8134 is mounted on the substrate 8132 so as to be connected to the wiring pattern 8137a and through hole 8136.

Furthermore, as shown in FIG. 63, the paper battery 8001a is superimposed on the paper battery 8001b so that the conductive ink 8021 in the protruding area 8023 of the paper battery 8001a faces the conductive ink 8011 in the protruding area 8013 of the paper battery 8001b and the paper battery 8001b is superimposed on the paper battery 8001c so that the conductive ink 8021 in the protruding area 8023 of the paper battery 8001b faces the conductive ink 8011 in the protruding area 8013 of the paper battery 8001c, and ultrasonic vibration is applied to the overlapped area in this condition. Then, the conductive ink 8021 in the protruding area 8023 of the paper battery 8001a and the conductive ink 8011 in the protruding area 8013 of the paper battery 8001b are melted through this vibration, the protruding area 8023 of the paper battery 8001a and the protruding area 8013 of the paper battery 8001b are thereby bonded together through ultrasonic bonding, and furthermore, the conductive ink 8021 in the protruding area 8023 of the paper battery 8001b and the conductive ink 8011 in the protruding area 8013 of the paper battery 8001c are melted through this vibration and the protruding area 8023 of the paper battery 8001b and the protruding area 8013 of the paper battery 8001c are thereby bonded together through ultrasonic bonding. In this way, the three paper batteries 800a to 8001c are connected in series as shown in FIG. 66c. Furthermore, in this case, the protective film 8022 exposed in the protruding area 8023 of the paper battery 8001a and the protective film 8012 exposed in the protruding area 8013 of the paper battery 8001b are melted and bonded together through ultrasonic bonding, and the protective film 8022 exposed in the protruding area 8023 of the paper battery 8001b and the protective film 8012 exposed in the protruding area 8013 of the paper battery 8001c are melted and bonded together through ultrasonic bonding. In this embodiment as well as the twenty-first embodiment, when the conductive inks 8011, 8021 are applied to the entire surfaces of the protective film 8012, 8022, the protruding area 8023 of the paper battery 8001a and the protruding area 8013 of the paper battery 8001b are bonded together through ultrasonic bonding by only the melting of the conductive ink 8021 of the protruding area 8023 of the paper battery 8001a and the conductive ink 8011 of the protruding area 8013 of the paper battery 8001b and the protruding area 8023 of the paper battery 8001b and the protruding area 8013 of the paper battery 8001c are bonded together through ultrasonic bonding by only the melting of the conductive ink 8021 of the protruding area 8023 of the paper battery 8001b and the conductive ink 8011 of the protruding area 8013 of the paper battery 8001c.

Then, the paper batteries 8001a to 8001c connected in series are mounted on the substrate 8132 in such a way that the conductive ink 8011 in the protruding area 8013 of the paper battery 8001a faces the land 8131a of the substrate 8132 and the conductive ink 8021 in the protruding area 8023 of the paper battery 8001c faces the land 8131b of the substrate 8132 and ultrasonic vibration is applied to the areas facing each other in this condition. Then, as shown in FIG. 66d, the conductive ink 8011 in the protruding area 8013 of the paper battery 8001a is melted through this vibration and the protruding area 8013 of the paper battery 8001a and the land 8131a are bonded together through ultrasonic bonding. Furthermore, the conductive ink 8021 in the protruding area 8023 of the paper battery 8001c is also melted through this vibration and the protruding area 8023 of the paper battery 8001c and the land 8131b are bonded together through ultrasonic bonding. In this way, the paper batteries 8001a to 8001c connected in series are electrically connected to the lands 8131a, 8131b and the paper batteries 8001a to 8001c and lands 8131a, 8131b form a power supply circuit for supplying power to the calculation element 8134. In this case, of the area facing the protruding area 8013 of the paper battery 8001a, the area in which the land 8131a is not formed is also melted through ultrasonic vibration and of the area facing the protruding area 8023 of the paper battery 8001c, the area in which the land 8131b is not formed is also melted through ultrasonic vibration.

FIG. 71 illustrates a connection state between the substrate 8132 of the power supply circuit manufactured using the manufacturing method shown in FIGS. 70a to 70d and the paper batteries 8001a to 8001c and illustrates a cross-section along the line A-A' shown in FIG. 71d.

As shown in FIG. 71, when ultrasonic vibration is applied to the area where the protruding area 8013 of the paper battery 8001a faces the land 8131a of the substrate 8132 and the area where the protruding area 8023 of the paper battery 8001c faces the land 8131b of the substrate 8132, the conductive ink 8011 in the protruding area 8013 of the paper battery 8001a is melted and the substrate 8132 in the area facing this protruding area 8013 where the land 8131a is not formed is melted and these are bonded together. Likewise, the conductive ink 8021 in the protruding area 8023 of the paper battery 8001c is melted and the substrate 8132 in the area facing this protruding area 8023 where the land 8131b is not formed is melted and these are bonded together. In this way, the bonding force between the paper batteries 8001a to 8001c and the substrate 8132 increases.

Here, it is also possible to increase the bonding force between the paper batteries 8001a to 8001c and the substrate by combining the above described twenty-first and twenty-second embodiments.

Furthermore, the above described twenty-first and twenty-second embodiments construct the positive electrodes and negative electrodes in the protruding areas 8013, 8023 of the paper batteries 8001a to 8001c by applying the conductive inks 8011, 8021 to the protective films 8012, 8022, but it is also possible to construct the positive electrodes and negative electrodes of the paper batteries 8001a to 8001c using any one of preferable metallic substances such as graphite, iron, nickel, titanium, copper, stainless steel or a mixture of these metals.

In the invention shown in the above described twenty-first and twenty-second embodiments, the positive electrode and negative electrode of the paper battery and two connection terminals provided on the circuit substrate are electrically connected through ultrasonic bonding, and therefore when a power supply circuit made up of paper batteries connected on a circuit substrate is manufactured, it is possible to improve productivity without increasing the manufacturing cost.

Furthermore, in the case of the structure including a step of forming holes in the area of the circuit substrate in which connection terminals are formed, the positive electrode and negative electrode of the paper battery melted through ultrasonic vibration are flown into these holes, which increases the bonding force between the paper battery and the circuit substrate and improves reliability.

Furthermore, in the case of the structure with no connection terminal formed on parts of the areas facing the positive electrode and negative electrode of the circuit substrate when the paper battery is mounted on the circuit substrate, the parts of the areas facing the positive electrode and negative electrode of the circuit substrate are melted through ultrasonic vibration, causing the bonding force between the paper battery and the circuit substrate to increase, and it is possible to improve durability against external forces such as folding, and reliability.

While a preferred embodiment of the present invention has been described in specific terms, such description is for illustrative purpose only, and it is to be understood that changes and variations may be made without departing from the spirit or scope of the following claims.

What is claimed is:

1. An audio message transfer sheet comprising:
   audio information recording/reproducing means having a thin shape and capable of recording/reproducing audio information;
   two support sheets, each having at least one first hole, said support sheets being bonded together and supporting said audio information recording/reproducing means, with at least a part of said audio information recording/reproducing means being exposed from at least one of said holes in said support means; and
   two surface sheets constructed of a paper base material and bonded to said two support sheets, the surface sheets sandwiching said two support sheets,
   wherein said audio information recording/reproducing means comprises audio information outputting means for outputting recorded audio information, said audio information outputting means comprising:
   a piezo-electric element for outputting said audio information;

a film sheet having a larger diameter than said piezo-electric element, pasted to one surface of said piezo-electric element; and a diaphragm provided with a second hole having a diameter larger than the diameter of said piezo-electric element and smaller than the diameter of said film sheet, pasted to said film sheet in such a way that said piezo-electric element fits into said second hole, said diaphragm being bonded to one of said two support sheets only in an area of the surface of bonding with said film sheet where said diaphragm is not bonded to said film sheet, wherein one of said two surface sheets has an information display area, and a plurality of fine third holes in an area facing said diaphragm and the total thickness of said two support sheets is equal to or greater than the thickness of the thickest part of said audio information recording/producing means.

2. An audio message transfer sheet according to claim 1, wherein the other of said two surface sheets has an information display area and does not have fine third holes.

\* \* \* \* \*